US012527839B2

United States Patent
Li et al.

(10) Patent No.: US 12,527,839 B2
(45) Date of Patent: Jan. 20, 2026

(54) TREATMENTS FOR SYSTEMIC SCLEROSIS

(71) Applicant: Acceleron Pharma Inc., Cambridge, MA (US)

(72) Inventors: Gang Li, Cambridge, MA (US); Janethe De Oliveira Pena, Cambridge, MA (US); Ravindra Kumar, Cambridge, MA (US); Joseph Grattin Reynolds, Cambridge, MA (US)

(73) Assignee: Acceleron Pharma Inc., Cambridge, MA (US)

( * ) Notice: Subject to any disclaimer, the term of this patent is extended or adjusted under 35 U.S.C. 154(b) by 603 days.

(21) Appl. No.: 17/774,383

(22) PCT Filed: Nov. 4, 2020

(86) PCT No.: PCT/US2020/058967
§ 371 (c)(1),
(2) Date: May 4, 2022

(87) PCT Pub. No.: WO2021/092079
PCT Pub. Date: May 14, 2021

(65) Prior Publication Data
US 2024/0226235 A1 Jul. 11, 2024

Related U.S. Application Data

(60) Provisional application No. 62/930,941, filed on Nov. 5, 2019.

(51) Int. Cl.
*A61K 38/17* (2006.01)
*A61K 45/06* (2006.01)

(52) U.S. Cl.
CPC ............ *A61K 38/179* (2013.01); *A61K 45/06* (2013.01)

(58) Field of Classification Search
None
See application file for complete search history.

(56) References Cited

U.S. PATENT DOCUMENTS

| 2002/0004037 A1 | 1/2002 | Koteliansky et al. |
| 2004/0038856 A1 | 2/2004 | Chakravarty et al. |
| 2004/0248837 A1* | 12/2004 | Raz ........................ C12N 15/111 |
| | | 514/44 R |
| 2017/0037100 A1 | 2/2017 | Kumar et al. |

FOREIGN PATENT DOCUMENTS

| WO | 1998048024 A1 | 10/1998 |
| WO | 1999065948 A1 | 12/1999 |
| WO | 2008070117 A1 | 6/2008 |
| WO | 2015027082 A1 | 2/2015 |
| WO | 2018053234 A1 | 3/2018 |
| WO | 2018129331 A1 | 7/2018 |
| WO | 2018204594 A1 | 11/2018 |
| WO | 2019157342 A1 | 8/2019 |
| WO | 2019213446 A1 | 11/2019 |

OTHER PUBLICATIONS

Asano, Yoshihide, Future treatments in systemic sclerosis, Journal of Dermatology, 2010, 54-70, 37.
Distler, Jörg H. W. et al., Frontiers of Antifibrotic Therapy in Systemic Sclerosis, Arthritis & Rheumatology, 2017, 257-267, 69(2).
Lafyatis, Robert, Transforming growth factor β—at the centre of systemic sclerosis, Nat. Rev. Rheumatol., 2014, 706-719, 10.

* cited by examiner

*Primary Examiner* — Elizabeth C. Kemmerer
(74) *Attorney, Agent, or Firm* — Tamaria Dewdney; Andrew W. Custer

(57) ABSTRACT

In certain aspects, the present disclosure relates to methods of treating systemic sclerosis (SSc) using TβRII antagonists comprising a heterologous domain and a truncated, ligand-binding portion of the extracellular domain of TβRII polypeptide useful to selectively antagonize a TβRII ligand. The disclosure further provides methods for treating one or more complications of SSc, including interstitial lung disease (ILD), with TβRII antagonists of the present disclosure.

11 Claims, 12 Drawing Sheets

Specification includes a Sequence Listing.

| | | | | |
|---|---|---|---|---|
| 1 | mgrgllrglw | plhivlwtri | astipphvqk | svnndmivtd | nngavkfpql |
| 51 | ckfcdvrfst | cdngkscmsn | csitsicekp | qevcvavwrk | ndenitletv |
| 101 | chdpklpyhd | filedaaspk | cimkekkkpg | etffmcscss | decndniifs |
| 151 | eeyntsnpdl | llvifqvtgi | sllpplgvai | sviiifycyr | vnrqqklsst |
| 201 | wetgktrklm | efsehcaiil | eddrsdisst | canninhnte | llpieldtlv |
| 251 | gkgrfaevyk | aklkqntseq | fetvavkifp | yeeyaswkte | kdifsdinlk |
| 301 | henilqflta | eerktelgkq | ywlitafhak | gnlqeyltrh | viswedlrkl |
| 351 | gsslargiah | lhsdhtpcgr | pkmpivhrdl | kssnilvknd | ltcclcdfgl |
| 401 | slrldptlsv | ddlansgqvg | tarymapevl | esrmnlenve | sfkqtdvysm |
| 451 | alvlwemtsr | cnavgevkdy | eppfgskvre | hpcvesmkdn | vlrdrgrpei |
| 501 | psfwlnhqgi | qmvcetltec | wdhdpearlt | aqcvaerfse | lehldrlsgr |
| 551 | scseekiped | gslnttk | | (SEQ ID NO: 1) | |

FIGURE 1

```
  1  mgrgllrglw  plhivlwtri  astipphvqk  sdvemeaqkd  eiicpscnrt
 51  ahplrhinnd  mivtdnngav  kfpqlckfcd  vrfstcdngk  scmsncsits
101  icekpqevcv  avwrkndeni  tletvchdpk  lpyhdfiled  aaspkcimke
151  kkkpqetffm  cscssdecnd  niifseeynt  snpdlllvif  qvtgisllpp
201  lgvaisviii  fycyrvnrqq  klsstwetgk  trklmefseh  caiileddrs
251  disstcanni  nhntellpie  ldtlvgkgrf  aevykaklkq  ntseqfetva
301  vkifpyeeya  swktekdifs  dinlkhenil  qfltaeerkt  elgkqywlit
351  afhakgnlqe  yltrhviswe  dlrklgssla  rgiahlhsdh  tpcgrpkmpi
401  vhrdlkssni  lvkndltccl  cdfglslrld  ptlsvddlan  sgqvgtarym
451  apevlesrmn  lenvesfkqt  dvysmalvlw  emtsrcnavg  evkdyeppfg
501  skvrehpcve  smkdnvlrdr  grpeipsfwl  nhqgiqmvce  tltecwdhdp
551  earltaqcva  erfselehld  rlsgrscsee  kipedgslnt  tk
     (SEQ ID NO: 2)
```

|  | Fusion Protein | $k_a$ (1/Ms) | $k_d$ (1/s) | $K_D$ (pM) |
|---|---|---|---|---|
| TGFβ1 | hTβRII-hFc | $2.01 \times 10^6$ | $4.16 \times 10^{-4}$ | 207.0 |
|  | hTβRII (G4S)2-hFc | $2.91 \times 10^6$ | $4.83 \times 10^{-4}$ | 165.8 |
|  | hTβRII (G4S)3-hFc | $3.89 \times 10^6$ | $5.10 \times 10^{-4}$ | 92.4 |
|  | hTβRII (G4S)4-hFc | $6.69 \times 10^6$ | $4.57 \times 10^{-4}$ | 68.4 |
|  | hTβRII-extended hinge-hFc | $2.38 \times 10^6$ | $4.64 \times 10^{-4}$ | 195.5 |
| TGFβ3 | hTβRII-hFc | $1.99 \times 10^7$ | $1.57 \times 10^{-3}$ | 79.1 |
|  | hTβRII (G4S)2-hFc | $1.74 \times 10^7$ | $1.81 \times 10^{-3}$ | 104.1 |
|  | hTβRII (G4S)3-hFc | $2.09 \times 10^7$ | $8.32 \times 10^{-4}$ | 39.9 |
|  | hTβRII (G4S)4-hFc | $8.80 \times 10^6$ | $2.76 \times 10^{-4}$ | 31.4 |
|  | hTβRII-extended hinge-hFc | $1.51 \times 10^7$ | $1.39 \times 10^{-3}$ | 92.1 |

| Receptor | TGFβ1 | | |
|---|---|---|---|
| | $k_a$ (1/Ms) | $k_d$ (1/s) | $K_D$ (pM) |
| hTβRII (G4S)5-hFc | $7.36 \times 10^7$ | $6.48 \times 10^{-4}$ | 8.8 |
| hTβRII (G4S)6-hFc | $1.66 \times 10^8$ | $6.32 \times 10^{-4}$ | 3.8 |

| Receptor | TGFβ3 | | |
|---|---|---|---|
| | $k_a$ (1/Ms) | $k_d$ (1/s) | $K_D$ (pM) |
| hTβRII (G4S)5-hFc | $1.47 \times 10^8$ | $4.35 \times 10^{-4}$ | 2.96 |
| hTβRII (G4S)6-hFc | $5.99 \times 10^7$ | $2.75 \times 10^{-4}$ | 4.60 |

| | IC₅₀ (nM) | | |
|---|---|---|---|
| | TGFβ1 | TGFβ3 | Ratio TGFβ1/TGFβ3 |
| hTβRII-hFc | 7.69 | 0.18 | 42 |
| hTβRII (G4S)2-hFc | 1.12 | 0.13 | 8.61 |
| hTβRII (G4S)3-hFc | 0.22 | 0.17 | 1.29 |
| hTβRII (G4S)4-hFc | 0.07 | 0.03 | 2.3 |
| hTβRII extended hinge-hFc | 5.67 | 0.11 | 52 |

| Construct | TGFβ1—IC50 (nM) | TGFβ3—IC50 (nM) | Ratio TGFβ1/TGFβ3 |
|---|---|---|---|
| hTBRII (G4S)5-hFc | 0.03 | 0.04 | 0.75 |
| hTBRII (G4S)6-hFc | 0.02 | 0.04 | 0.5 |

Figure 5H

TREATMENTS FOR SYSTEMIC SCLEROSIS

CROSS-REFERENCE TO RELATED APPLICATIONS

This application is a national stage filing under 35 U.S.C. § 371 of International Application No. PCT/US2020/058967, filed on Nov. 4, 2020, which claims the benefit of and priority to U.S. Provisional Application No. 62/930,941, filed on Nov. 5, 2019. The specifications of the foregoing applications are incorporated herein by reference in their entirety.

REFERENCE TO SEQUENCE LISTING SUBMITTED ELECTRONICALLY

The sequence listing of the present application is submitted electronically via Patent Center in an ASCII format with a file name 25506-US1-Seq.txt, having a creation date of Mar. 14, 2023, and a size of 187,436 bytes. This sequence listing submitted via Patent Center is part of the disclosure and is herein incorporated by reference in its entirety.

BACKGROUND OF THE INVENTION

Members of the transforming growth factor-beta (TGFβ) superfamily are pleiotropic cytokines involved in essential cellular functions such as proliferation, differentiation, apoptosis, motility, extracellular matrix production, tissue remodeling, angiogenesis, immune response, cell adhesion, and also play a key role in pathophysiology of disease states as different as chronic inflammatory conditions and cancer. Members of the TGFβ superfamily have been classified into major family groupings, which include TGFβs, bone morphogenetic proteins (BMP), osteogenic proteins (OP), growth and differentiation factors (GDF), inhibins/activins, mullerian inhibitory substances (MIS) and glial derived neurotrophic factors (GDNF).

TGFβ superfamily members transduce their signals across the plasma membrane by inducing the formation of heteromeric complexes of specific type I and type II serine/threonine kinase receptors, which in turn activate a particular subset of SMAD proteins (some inhibitory and some excitatory). The SMAD molecule compounds relay the signals into the nucleus where they direct transcriptional responses in concert with other proteins.

Dysfunctional TGFβ superfamily signaling has been linked to several clinical disorders including cancer, fibrosis, bone diseases, diabetic nephropathy, as well as chronic vascular diseases such as atherosclerosis.

Systemic sclerosis (SSc) is a rare fibrotic disease with an incidence of between about 20 to 24 people per 1 million people in the US every year. A common manifestation of SSc is interstitial lung disease (ILD), which affects approximately 80% of SSc patients and is one of the leading causes of death of those with SSc. Currently, nintedanib is the only approved therapy available in the US for SSc-ILD, but it failed to meet key secondary endpoints such as an improvement in modified Rodnan Skin Score (mRSS) and St. George's Respiratory Questionnaire (SGRQ) score. Therefore, a need exists to develop new treatments for SSc-ILD.

SUMMARY OF THE INVENTION

In part, the disclosure relates to TGFβ type II receptor (TβRII) antagonists (inhibitors) that can be used to treat systemic sclerosis (SSc), particularly clinical complications of SSc including, for example, interstitial lung disease (ILD). Accordingly, the disclosure provides methods for treating SSc comprising administering to a patient in need thereof one or more TβRII antagonist. In some embodiments, the disclosure provides methods for treating one or more complications of SSc comprising administering to a patient in need thereof one or more TβRII antagonist. In some embodiments, the disclosure provides methods for treating SSc-ILD comprising administering to a patient in need thereof one or more TβRII antagonist. Optionally, such methods further comprise administering to the patient one or more additional active agents and/or supportive therapies for treating SSc or a complication of SSc (e.g., SSc-ILD).

In part, the disclosure provides TβRII polypeptides and the use of such polypeptides as selective antagonists for TGFβ1 or TGFβ. As described herein, fusion proteins comprising part or all of the TβRII extracellular domain (ECD), with or without additional mutations, bind to and/or inhibit TGFβ1 or TGFβ3 with varying affinities. In particular, TβRII fusion proteins comprising a heterologous portion (e.g., an Fc immunoglobulin domain) and a linker of at least 10 amino acids in length (e.g., a linker having the amino acid sequence of SEQ ID NO: 6) are associated with superior TGFβ1 and TGFβ3 binding properties as compared to TβRII polypeptides having a shorter linker. Thus, the disclosure provides TβRII polypeptides, and fusion proteins thereof, for use in antagonizing the TβRII signaling pathway as well as uses of such TβRII antagonists in treating TGFβ-associated disorders including, for example SSc as well as complications of SSc (e.g., SSc-ILD).

While TβRII antagonists, and fusion proteins comprising the same, may affect SSc, including complications of SSc (e.g., SSc-ILD), through a mechanism other that TβRII antagonism, the disclosure nonetheless provides that desirable therapeutic agents may be selected on the basis of TβRII antagonism. Therefore, while not wishing to be bound to a particular mechanism of action, it is expected that other TβRII antagonists may be useful in the treatment of SSc, particularly complications of SSc such as SSc-ILD. For example, agents that inhibit the activity and/or expression (e.g., transcription, translation, secretion from a cell, or combinations thereof) of one or more of: i) the TβRII receptor, ii) one or more TβRII-binding ligand (e.g., TGFβ 1, TGFβ2, and/or TGFβ3); iii) one or more TβRII-associated type I receptor (e.g., ALK5); iv) one or more TβRII-associated co-receptor (e.g., betaglycan); and/or v) one or more TβRII downstream signaling component (e.g., Smad proteins), as well as combinations thereof, may be useful in the treatment of SSc, particularly complications of SSc such as SSc-ILD. Such agents are collectively referred to herein as "TβRII antagonists" or "TβRII inhibitors". In some embodiments, the disclosure provides for methods of treating systemic sclerosis associated with interstitial lung disease (SSc-ILD), comprising administering a Transforming Growth Factor-β Receptor II (TβRII) antagonist to a subject in need thereof. In some embodiments, the disclosure provides for methods of treating systemic sclerosis, comprising administering a TβRII polypeptide to a subject in need thereof. In some embodiments, the systemic sclerosis is diffuse systemic sclerosis (dcSSc).

In some embodiments of the present disclosure, forced vital capacity (FVC) of the subject is measured, among other characteristics. In some embodiments of the present disclosure, forced vital capacity (FVC) of the subject is measured in liters, milliliters, and/or percentage of predicted. In some embodiments, a "normal" range for FVC is typically considered to be between 80% and 100% of predicted. In some embodiments, "of predicted" refers to reporting of the subject's results as a percentage of known predicted values for a subject of similar characteristics (e.g. height, sex, age, race, weight). In some embodiments, the subject has an FVC of greater than or equal to 50% of predicted. In some embodiments, the subject has an FVC of between about 100% and about 90% of predicted. In some embodiments, the subject has an FVC of between about 90% and about 80% of predicted. In some embodiments, the subject has an FVC of between about 80% and about 70% of predicted. In some embodiments, the subject has an FVC of between about 70% and about 60% of predicted. In some embodiments, the subject has an FVC of between about 60% and about 50% of predicted. In some embodiments, the subject has an FVC of between about 50% and about 40% of predicted. In some embodiments, the subject has an FVC of between about 40% and about 30% of predicted. In some embodiments, the subject has an FVC of between about 30% and about 20% of predicted. In some embodiments, FVC is measured by spirometry.

In some embodiments of the present disclosure, a general measurement of disease progression of the subject may be presented as an annual rate of decline in FVC. In some embodiments, an annual rate of decline in FVC of the subject is reduced by between about 1% and about 10%. In some embodiments, an annual rate of decline in FVC of the subject is reduced by between about 5% and about 10%. In some embodiments, an annual rate of decline in FVC of the subject is reduced by between about 10% and about 15%. In some embodiments, an annual rate of decline in FVC of the subject is reduced by between about 15% and about 20%. In some embodiments, an annual rate of decline in FVC of the subject is reduced by between about 20% and about 25%. In some embodiments, an annual rate of decline in FVC of the subject is reduced by between about 25% and about 30%. In some embodiments, an annual rate of decline in FVC of the subject is reduced by between about 30% and about 35%. In some embodiments, an annual rate of decline in FVC of the subject is reduced by between about 35% and about 40%. In some embodiments, an annual rate of decline in FVC of the subject is reduced by between about 40% and about 45%. In some embodiments, an annual rate of decline in FVC of the subject is reduced by between about 45% and about 50%. In some embodiments, an annual rate of decline in FVC of the subject is reduced by between about 50% and about 55%. In some embodiments, an annual rate of decline in FVC of the subject is reduced by between about 55% and about 60%. In some embodiments, an annual rate of decline in FVC of the subject is reduced by between about 60% and about 65%. In some embodiments, an annual rate of decline in FVC of the subject is reduced by between about 65% and about 70%. In some embodiments, an annual rate of decline in FVC of the subject is reduced by between about 10% and about 20%. In some embodiments, an annual rate of decline in FVC of the subject is reduced by between about 20% and about 30%. In some embodiments, an annual rate of decline in FVC of the subject is reduced by between about 30% and about 40%. In some embodiments, an annual rate of decline in FVC of the subject is reduced by between about 40% and about 50%. In some embodiments, an annual rate of decline in FVC of the subject is reduced by between about 50% and about 60%. In some embodiments, an annual rate of decline in FVC of the subject is reduced by between about 60% and about 70%.

In some embodiments, an annual rate of decline is measured in "mL". In some embodiments, an annual rate of decline in FVC of the subject is reduced by between about 1 mL and about 10 mL. In some embodiments, an annual rate of decline in FVC of the subject is reduced by between about 5 mL and about 10 mL. In some embodiments, an annual rate of decline in FVC of the subject is reduced by between about 10 mL and about 15 mL. In some embodiments, an annual rate of decline in FVC of the subject is reduced by between about 15 mL and about 20 mL. In some embodiments, an annual rate of decline in FVC of the subject is reduced by between about 20 mL and about 25 mL. In some embodiments, an annual rate of decline in FVC of the subject is reduced by between about 25 mL and about 30 mL. In some embodiments, an annual rate of decline in FVC of the subject is reduced by between about 30 mL and about 35 mL. In some embodiments, an annual rate of decline in FVC of the subject is reduced by between about 35 mL and about 40 mL. In some embodiments, an annual rate of decline in FVC of the subject is reduced by between about 40 mL and about 45 mL. In some embodiments, an annual rate of decline in FVC of the subject is reduced by between about 45 mL and about 50 mL. In some embodiments, an annual rate of decline in FVC of the subject is reduced by between about 50 mL and about 55 mL. In some embodiments, an annual rate of decline in FVC of the subject is reduced by between about 55 mL and about 60 mL. In some embodiments, an annual rate of decline in FVC of the subject is reduced by between about 60 mL and about 65 mL. In some embodiments, an annual rate of decline in FVC of the subject is reduced by between about 65 mL and about 70 mL. In some embodiments, an annual rate of decline in FVC of the subject is reduced by between about 70 mL and about 75 mL. In some embodiments, an annual rate of decline in FVC of the subject is reduced by between about 75 mL and about 80 mL. In some embodiments, an annual rate of decline in FVC of the subject is reduced by between about 85 mL and about 90 mL. In some embodiments, an annual rate of decline in FVC of the subject is reduced by between about 90 mL and about 95 mL. In some embodiments, an annual rate of decline in FVC of the subject is reduced by between about 95 mL and about 100 mL. In some embodiments, an annual rate of decline in FVC of the subject is reduced by about 100 mL. In some embodiments, an annual rate of decline in FVC of the subject is reduced by between about 10 mL and about 20 mL. In some embodiments, an annual rate of decline in FVC of the subject is reduced by between about 20 mL and about 30 mL. In some embodiments, an annual rate of decline in FVC of the subject is reduced by between about 30 mL and about 40 mL. In some embodiments, an annual rate of decline in FVC of the subject is reduced by between about 40 mL and about 50 mL. In some embodiments, an annual rate of decline in FVC of the subject is reduced by between about 50 mL and about 60 mL. In some embodiments, an annual rate of decline in FVC of the subject is reduced by between about 60 mL and about 70 mL. In some embodiments, an annual rate of decline in FVC of the subject is reduced by between about 70 mL and about 80 mL. In some embodiments, an annual rate of decline in FVC of the subject is reduced by between about 80 mL and about 90 mL. In some embodiments, an annual rate of decline in FVC of the subject is reduced by between about 90 mL and about 100 mL. In some embodiments, an annual rate of decline in FVC of the subject is reduced by more than about 100 mL.

In some embodiments, the administration slows the annual rate of decline in FVC. In some embodiments, the subject is determined to have a slowing in the rate of decline in pulmonary function after the administering. In some embodiments, an annual rate of decline in forced vital capacity (FVC) of the subject is measured over a time period of at least one year after the administering and is compared to a baseline measurement. In some embodiments, an annual rate of decline in forced vital capacity (FVC) of the subject is measured over a time period of at least one year after the administering and is compared to a subject treated with standard of care (SOC).

In some embodiments of the present disclosure, High Resolution-Computer Topography (HRCT) can be utilized for diagnosing and evaluating an amount of fibrosis of the lungs. In some embodiments, the subject has at least between about 1% and about 10% fibrosis of the lungs. In some embodiments, the subject has at least between about 1% and about 5% fibrosis of the lungs. In some embodiments, the subject has at least between about 5% and about 10% fibrosis of the lungs. In some embodiments, the subject has between about 10% and about 15% fibrosis of the lungs. In some embodiments, the subject has at least between about 10% and about 20% fibrosis of the lungs. In some embodiments, the subject has at least between about 20% and about 30% fibrosis of the lungs. In some embodiments, the subject has at least between about 30% and about 40% fibrosis of the lungs. In some embodiments, the subject has at least between about 40% and about 50% fibrosis of the lungs. In some embodiments, the subject has a pattern of nonspecific interstitial pneumonia (NSIP) in the lungs. In some embodiments, the subject has a pattern of usual interstitial pneumonia (UIP) in the lungs. In some embodiments, the amount of fibrosis or pattern of interstitial pneumonia is determined by High Resolution Computed Topography (HRCT) scan of the lungs. In some embodiments, an HRCT scan reveals lung parenchymal changes in the subject including any round glass opacity and fibrotic peripheral reticulations and honey combing without abnormalities. In some embodiments, the subject has at least 10% fibrosis of the lungs as determined by HRCT. In some embodiments, an HRCT scan is further paired with functional respiratory imaging (FRI).

In some embodiments of the present disclosure, serologic tests are performed in the subject. In some embodiments, antibodies (e.g. autoantibodies) are detected in a serologic test. In some embodiments, the subject has an increased level of one or more antibodies selected from the group consisting of antinuclear (ANA), anticentromere (ACA), anti-topoisomerase I (anti-ScI-70), and anti-RNA polymerase III antibodies. In some embodiment, the subject has antinuclear antibodies. In some embodiments, the subject has anti-topoisomerase I antibodies.

In some embodiments of the present disclosure, the subject has a diffusing capacity for carbon monoxide (DLCO) of greater than or equal to 40% of predicted. In some embodiments of the present disclosure, the subject has a DLCO of between about 40% and about 89% of predicted. In some embodiments of the present disclosure, the subject has a DLCO of between about 90% and about 80% of predicted. In some embodiments, the subject has a DLCO of between about 80% and about 70% of predicted. In some embodiments, the subject has a DLCO of between about 70% and about 60% of predicted. In some embodiments, the subject has a DLCO of between about 60% and about 50% of predicted. In some embodiments, the subject has a DLCO of between about 50% and about 40% of predicted. In some embodiments, the subject has a DLCO of between about 40% and about 30% of predicted. In some embodiments, the subject has a DLCO of between about 30% and about 20% of predicted. In some embodiments, the DLCO is measured by a rapidly responding gas analyzer (RGA).

In some embodiments, the present disclosure provides methods of treating SSc with one or more pulmonary complications (e.g., SSc-ILD), comprising administering a Transforming Growth Factor-β Receptor II (TβRII) antagonist to a subject in need thereof, wherein the subject has an improved distance walked in a six minute walk test after the administration. In some embodiments, a subject improves distance walked in a six minute walk test by at least about 30 meters compared to a reference subject. In some embodiments, a reference subject is a healthy person of similar characteristics (e.g., sex, age, height, weight).

In some embodiments, a subject improves distance walked in a six minute walk test by at least between about 10 meters and about 15 meters compared to a reference subject. In some embodiments, a subject improves distance walked in a six minute walk test by at least between about 15 meters and about 20 meters compared to a reference subject. In some embodiments, a subject improves distance walked in a six minute walk test by at least between about 20 meters and about 25 meters compared to a reference subject. In some embodiments, a subject improves distance walked in a six minute walk test by at least between about 25 meters and about 30 meters compared to a reference subject. In some embodiments, a subject improves distance walked in a six minute walk test by at least between about 30 meters and about 35 meters compared to a reference subject. In some embodiments, a subject improves distance walked in a six minute walk test by at least between about 35 meters and about 40 meters compared to a reference subject. In some embodiments, a subject improves distance walked in a six minute walk test by at least between about 40 meters and about 45 meters compared to a reference subject. In some embodiments, a subject improves distance walked in a six minute walk test by at least between about 45 meters and about 50 meters compared to a reference subject. In some embodiments, a subject improves distance walked in a six minute walk test by at least between about 50 meters and about 55 meters compared to a reference subject. In some embodiments, a subject improves distance walked in a six minute walk test by at least between about 55 meters and about 60 meters compared to a reference subject. In some embodiments, a subject improves distance walked in a six minute walk test by at least between about 60 meters and about 65 meters compared to a reference subject. In some embodiments, a subject improves distance walked in a six minute walk test by at least between about 65 meters and about 70 meters compared to a reference subject. In some embodiments, a subject improves distance walked in a six minute walk test by at least between about 70 meters and about 75 meters compared to a reference subject. In some embodiments, a subject improves distance walked in a six minute walk test by at least between about 75 meters and about 80 meters compared to a reference subject. In some embodiments, a subject improves distance walked in a six minute walk test by at least between about 80 meters and about 85 meters compared to a reference subject. In some embodiments, a subject improves distance walked in a six minute walk test by at least between about 85 meters and about 90 meters compared to a reference subject. In some embodiments, a subject improves distance walked in a six minute walk test by at least between about 90 meters and about 95 meters compared to a reference subject. In some embodiments, a subject improves distance walked in a six minute walk test by at least between about 95 meters and about 100 meters compared to a reference subject. In some embodiments, a subject improves distance walked in a six minute walk test by at least more than 100 meters compared to a reference subject.

In some embodiments, the subject is evaluated for skin thickness using a modified rodnan skin score (mRSS). In some embodiments, the administration improves a modified rodnan skin score (mRSS) of the subject. In some embodiments, the administration improves an mRSS of the subject by between about 1% and about 3%. In some embodiments, the administration improves an mRSS of the subject by between about 1% and about 5%. In some embodiments, the administration improves an mRSS of the subject by between about 1% and about 8%. In some embodiments, the administration improves an mRSS of the subject by between about 1% and about 10%. In some embodiments, the administration improves an mRSS of the subject by between about 10% and about 15%. In some embodiments, the administration improves the mRSS by between about 10% and about 20%. In some embodiments, the administration improves the mRSS by between about 20% and about 30%. In some embodiments, the administration improves the mRSS by between about 30% and about 40%. In some embodiments, the administration improves the mRSS by between about 40% and about 50%. In some embodiments, the administration improves the mRSS by between about 50% and about 60%. In some embodiments, the administration improves the mRSS by between about 60% and about 70%. In some embodiments, the mRSS is improved after the administering, compared to a baseline measurement. In some embodiments, the mRSS is decreased after the administering, compared to a baseline measurement. In some embodiments, the mRSS is an average of measurements of multiple areas on the subject. In some embodiments, the subject has a total mRSS of greater than or equal to 15 at baseline.

In some embodiments, the administration improves a St. George's Respiratory Questionnaire (SGRQ) score of the subject. In some embodiments, the administration improves a St. George's Respiratory Questionnaire (SGRQ) score of a subject by between about 1% and about 3%. In some embodiments, the administration improves a St. George's Respiratory Questionnaire (SGRQ) score of a subject by between about 1% and about 5%. In some embodiments, the administration improves a St. George's Respiratory Questionnaire (SGRQ) score of a subject by between about 1% and about 8%. In some embodiments, the administration improves a St. George's Respiratory Questionnaire (SGRQ) score of a subject by between about 1% and about 10%. In some embodiments, the administration improves a St. George's Respiratory Questionnaire (SGRQ) score of a subject by between about 10% and about 15%. In some embodiments, the administration improves the SGRQ by between about 10% and about 20%. In some embodiments, the administration improves the SGRQ by between about 20% and about 30%. In some embodiments, the administration improves the SGRQ by between about 30% and about 40%. In some embodiments, the administration improves the SGRQ by between about 40% and about 50%. In some embodiments, the administration improves the SGRQ by between about 50% and about 60%. In some embodiments, the administration improves the SGRQ by between about 60% and about 70%. In some embodiments, the SGRQ score is improved after the administering, compared to a baseline measurement. In some embodiments, the SGRQ is decreased after the administering, compared to a baseline measurement. In some embodiments, the subject is evaluated for respiratory function using a St. George's Respiratory Questionnaire (SGRQ). In some embodiments, the administration changes the subject's SGRQ score by about 4 units. In some embodiments, the administration changes the subject's SGRQ score by about 8 units. In some embodiments, the administration changes the subject's SGRQ score by about 12 units. In some embodiments, the administration changes the subject's SGRQ score by between about 0 and about 4 units. In some embodiments, the administration changes the subject's SGRQ score by between about 1 and about 4 units. In some embodiments, the administration changes the subject's SGRQ score by between about 5 and about 8 units. In some embodiments, the administration changes the subject's SGRQ score by between about 9 and about 12 units. In some embodiments, the administration changes the subject's SGRQ score by about more than 12 units.

In some embodiments, the administration improves a Composite Response Index in Systemic Sclerosis (CRISS) score of the subject. In some embodiments, the CRISS score is improved after the administering, compared to a baseline measurement. In some embodiments, the CRISS score is increased after the administering, compared to a baseline measurement.

In some embodiments, the administration improves a King's Brief Interstitial Lung Disease (KBILD) score of the subject. In some embodiments, the KBILD score is improved after the administering, compared to a baseline measurement. In some embodiments, the KBILD score is increased after the administering, compared to a baseline measurement.

In some embodiments, the administration improves a Health Assessment Questionnaire-Diability Index (HAQ-DI) score of the subject. In some embodiments, the HAQ-DI score is improved after the administering, compared to a baseline measurement.

In some embodiments, the administration improves a physical/physician global assessment score of the subject. In some embodiments, the physical/physician global assessment score is improved after the administering, compared to a baseline measurement.

In some embodiments, the administration improves a patient global assessment score of the subject. In some embodiments, the patient global assessment score is improved after the administering, compared to a baseline measurement.

In some embodiments of the present disclosure, the administration increases the subject's length of life. In some embodiments, the administration reduces the subject's risk of death due to SSc (e.g. SSc-ILD). In some embodiments, the administration reduces the subject's risk of hospitalization due to SSc (e.g. SSc-ILD). In some embodiments, the administration lengthens the time to clinical worsening of the subject. In some embodiments, the administration prevents a decline in FVC of the subject of greater than 10% of predicted relative to a baseline measurement. In some embodiments, the administration prevents at least a greater than 20% increase in mRSS of the subject. In some embodiments, the administration prevents at least a greater than 5 point increase in total mRSS of the subject.

In some embodiments, the subject has an increased level of one or more biomarkers selected from the group consisting of αSMA, ADAM12, Anti-HSP70 IgG, BAFF, BLyS, C3M, C4M, C6M, Ca15.3, CC16, CCL2, CCL18, Col1a1, Col3a1, CTGF, CXCL4, E-selectin, ET-1, fibronectin, ICAM, IL-6, IL-8, KL-6, MCP-1, MMP7, MMP12, Muc5B, Osteopontin, PAI-1, periostin, pro-C3, pro-C4, SP-A, SP-D, Tnfa, VCAM, VEGF, WFDC2 (HE4) and YKL-40. In some embodiments, the subject has an increased level of one or more biomarkers selected from the group consisting of Ca15.3, CC16, KL-6, SP-A, and SP-D. In some embodiments, the subject has an increased level of one or more biomarkers selected from the group consisting of Col1a1, Col3a1, CTGF, fibronectin, PAI-1, and Tnfa. In some embodiments, the subject has an increased level of one or more biomarkers selected from the group consisting of pro-C3, pro-C4, pro-C6, C3M, C4M, C6M, Col1a1, and αSMA. In some embodiments, the subject has an increased level of one or more biomarkers selected from the group consisting of WFDC2 (HE4), CCL18, osteopontin, periostin, KL-6, YKL-40, and SP-D. In some embodiments, the subject has an increased level of one or more biomarkers selected from the group consisting of pro-C3, pro-C4, pro-C6, C3M, C4M, C6M, Col1a1, αSMA, WFDC2 (HE4), CCL18, osteopontin, periostin, KL-6, YKL-40, and SP-D.

In some embodiments, the subject has a C-reactive protein (CRP) level of greater than or equal to 3 mg/L.

In some embodiments, a subject of the present disclosure has one or more clinical complications of SSc. In some embodiments, the subject has one or more clinical complications of the skin. In some embodiments, one or more clinical complications of the skin is selected from the group consisting of calcinosis cutis, capillary changes at the nail beds, depigmentation, digital tip ulcers and/or pitting at fingertips, dryness, edema, hyperpigmentation, lipoatrophy, loss of appendicular hair, pruritus, telangiectasia, and/or traumatic skin ulcerations over finger joints.

In some embodiments, one or more clinical complications of SSc is selected from the group consisting of fibrosis of the skin and/or other internal organs, production of specific autoantibodies (e.g., antinuclear antibody (ANA), anticentromere, anti-topoisomerase I, anti-RNA polymerase III), and evidence of vasculopathy. In some embodiments, the subject has one or more clinical complications of SSc according to the European League Against Rheumatism (EULAR) criteria. In some embodiments, one or more clinical complications of SSc is selected from the group consisting of skin thickening of fingers extending proximal to metacarpophalangeal joints. In some embodiments, one or more clinical complications of SSc is selected from the group consisting of skin thickening of the fingers, fingertip lesions, telangiectasia, Raynaud's phenomenon, abnormal nailfold capillaroscopy, and/or presence of pulmonary arterial hypertension (PAH) and interstitial lung disease (ILD.) In some embodiments, one or more clinical complications of SSc is selected from the group consisting of heartburn, erectile dysfunction in men, and dyspnea. In some embodiments, one or more clinical complications of SSc is selected from the group consisting of fatigue, breathlessness, dry cough, and bibasilar fine respiratory crackles. In some embodiments, one or more clinical complications of SSc is selected from the group consisting of arrythmia, kidney damage (scleroderma renal crisis), increased risk of cancers, myocardial disease (e.g., myocardial fibrosis, myocardial ischemia), muscle atrophy (e.g., sarcopenia), muscle weakness, myopathy, pericardial disease, and thromboembolic risk.

In some embodiments, of the present disclosure, one or more clinical complications of SSc is selected from the group consisting of musculoskeletal complications, gastrointestinal complications, cardiac complications, renal complications, neuromuscular complications (e.g., muscle atrophy, muscle weakness, myopathy), genitourinary complications (e.g., erectile dysfunction in men), increased risk of cancer (e.g., lung cancer), and increased risk of thromboembolic complications.

In some embodiments, the subject has one or more clinical complications of SSc comprising one or more complications of the lungs. In some embodiments, one or more complications of the lungs is selected from the group consisting of alveolitis, interstitial pulmonary fibrosis or interstitial lung disease (ILD), recurrent aspiration, and pulmonary vasculopathy. In some embodiments, one or more complications of the lungs is selected from the group consisting of ground glass opacities on HRCT, a neutrophilic or eosinophilic BAL, and declining FVC and/or DLCO scores.

In some embodiments of the present disclosure, the subject has one or more clinical complications of SSc comprising one or more musculoskeletal complications. In some embodiments, one or more musculoskeletal complications of SSc is selected from the group consisting of arthritis, tendinitis, tendon friction rubs, and/or joint contractures. In some embodiments, one or more musculoskeletal complications of SSc is selected from the group consisting of swelling of the hands, arthralgia, myalgia, and fatigue.

In some embodiments of the present disclosure, the subject has one or more clinical complications of SSc comprising one or more gastrointestinal complications. In some embodiments, one or more gastrointestinal complications of SSc is selected from the group consisting of dysphagia, choking, heartburn, hoarseness, cough after swallowing, early satiety, bloating, alternating constipation and/or diarrhea, episodic pseudo-obstruction and/or bacterial small bowel overgrowth with malabsorption, fecal incontinence, chronic gastroesophageal reflux, and recurrent episodes of microaspiration. In some embodiments, the subject has one or more of chronic gastroesophageal reflux and/or recurrent episodes of microaspiration.

In some embodiments of the present disclosure, the subject has one or more clinical complications of SSc comprising one or more cardiac complications. In some embodiments, one or more cardiac complications of SSc is selected from the group consisting of complications in myocardium, pericardium, and/or conduction system In some embodiments, the subject has one or more clinical complications of SSc comprising one or more renal complications. In some embodiments, one or more renal complications of SSc is selected from the group consisting of kidney damage, vascular fibrosis of the kidney, interstitial collagen accumulation of the kidney, glomerulonephritis, impaired renal reserve, microalbuminuria, and scleroderma renal crisis (SRC). In some embodiments, the subject has one a complication of SSc comprising SRC. In some embodiments, SRC comprises one or more complications selected from the group consisting of abrupt onset of marked or malignant hypertension, acute onset of oliguric renal failure, urinalysis that reveals only mild proteinuria with few cells or casts, microangiopathic hemolysis anemia and thrombocytopenia.

In some embodiments, the disclosure provides methods of treating systemic sclerosis associated with interstitial lung disease (SSc-ILD), comprising administering a Transforming Growth Factor-β Receptor II (TβRII) antagonist to a subject in need thereof, wherein a dose of the TβRII antagonist comprises between about 0.75 mg/to about 6.0 mg/kg of the antagonists. In some embodiments, the TβRII antagonist is administered in a dose of about 0.75 mg/kg once every two weeks to a subject in need thereof. In some embodiments, the TβRII antagonist is administered in a dose of about 2.25 mg/kg once every four weeks to a subject in need thereof. In some embodiments, the TβRII antagonist is administered in a dose of about 1.5 mg/kg once every two weeks to a subject in need thereof. In some embodiments, the TβRII antagonist is administered in a dose of about 4.5 mg/kg once every four weeks to a subject in need thereof. In some embodiments, the TβRII antagonist is administered in a dose of about 3.0 mg/kg once every two weeks to a subject in need thereof. In some embodiments, the TβRII antagonist is administered in a dose of about 6.0 mg/kg once every four weeks to a subject in need thereof. In some embodiments, the TβRII antagonist is administered subcutaneously. In some embodiments, the TβRII antagonist is administered at a dose that achieves a serum concentration of antagonist of between about 10 and about 20 ug/mL in the subject. In some embodiments, the TβRII antagonist is administered at a dose that achieves a concentration of antagonist in the lung of between about 30 and about 50 ug/mL in the subject.

In some embodiments, the subject has been treated with one or more of abatacept, abituzumab, ajulemic acid, ambrisentan, AVID200, AVID300, azathioprine, BCD-089, belimumab, BG00011, BMS-986020, bortezomib, bosentan, brentuximab, carlumab, CC-90001, clazakizumab, COR-001, cyclophosphamide (CYC), cyclosporine A, dectrekumab, EHP-101, elzonris/SL-401, etanercept, FCX-013, fresolimumab, GLPG1690, GASK2126458, GSK2330811, GSK3008348, IBIO-CFB03, ifetroban, IFNγ, imatinib, immune globulin, IW001, lanifibranor, lebrikizumab, levilimab, losartan, macitentan, MEDI-5117, methotrexate, MSCs, mycophenolate mofetil (MMF), NAC, nandrolone decanoate, nintedanib (Ofev), olokizumab, pamrevlumab, pirfenidone, pirfenidone and vismodegib, pomalidomide, PRM-151. riociguat, rituximab, SAR156597, sildenafil, siltuximab, simtuzumab, sirolimus, sirukumab, tacrolimus, tadalafil, tanzisertib, TD139, tetrathiomolybdate, tocilizumab, tralokinumab, treprostinil, vobarilizumab, warfarin, zileuton, and ziltivekimab.

In some embodiments, methods of the present disclosure further comprise administration of one or more of abatacept, abituzumab, ajulemic acid, ambrisentan, AVID200, AVID300, azathioprine, BCD-089, belimumab, BG00011, BMS-986020, bortezomib, bosentan, brentuximab, carlumab, CC-90001, clazakizumab, COR-001, cyclophosphamide (CYC), cyclosporine A, dectrekumab, EHP-101, elzonris/SL-401, etanercept, FCX-013, fresolimumab, GLPG1690, GASK2126458, GSK2330811, GSK3008348, IBIO-CFB03, ifetroban, IFNγ, imatinib, immune globulin, IW001, lanifibranor, lebrikizumab, levilimab, losartan, macitentan, MEDI-5117, MSCs, mycophenolate mofetil (MMF), NAC, nandrolone decanoate, olokizumab, pamrevlumab, pirfenidone, pirfenidone and vismodegib, pomalidomide, PRM-151. riociguat, rituximab, SAR156597, sildenafil, siltuximab, simtuzumab, sirolimus, sirukumab, tacrolimus, tadalafil, tanzisertib, TD139, tetrathiomolybdate, tocilizumab, tralokinumab, treprostinil, vobarilizumab, warfarin, zileuton, and ziltivekimab.

In some embodiments of the present disclosure, the subject has been treated with one or more of abatacept, abituzumab, ajulemic acid, AVID200, AVID300, azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and tocilizumab.

In some embodiments, methods of the present disclosure further comprise administration of one or more of abatacept, abituzumab, ajulemic acid, AVID200, AVID300, azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and tocilizumab. In some embodiments, the subject has been treated with one or more of azathioprine, cyclophosphamide (CYC), mycophenolate mofetil (MMF), and nintedanib.

In some embodiments, methods of the present disclosure further comprise administration of one or more of azathioprine, cyclophosphamide (CYC), methotrexate, mycophenolate mofetil (MMF), and nintedanib.

In some embodiments, methods of the present disclosure further comprise administration of one or more of cyclophosphamide (CYC), methotrexate, mycophenolate mofetil (MMF), nintedanib, and rituximab.

In some embodiments, the disclosure provides methods of treating systemic sclerosis associated with interstitial lung disease (SSc-ILD), comprising administering a Transforming Growth Factor-β Receptor II (TβRII) polypeptide to a subject in need thereof, wherein the method further comprises administration of one or more of IL-6 and/or IL-6R antibodies.

In some embodiments, IL-6 antibodies comprise one or more of clazakizumab, COR-001, MEDI-5117, olokizumab, siltuximab, sirukumab, and ziltivekimab. In some embodiments, IL-6R antibodies comprise one or more of BCD-089 (levilimab), tocilizumab, and vobarilizumab.

In some embodiments, the subject has been treated with one or more of clazakizumab, COR-001, MEDI-5117, olokizumab, siltuximab, sirukumab, and ziltivekimab.

In some embodiments, methods of the present disclosure further comprise administration of one or more of clazakizumab, COR-001, MEDI-5117, olokizumab, siltuximab, sirukumab, and ziltivekimab.

In some embodiments, the subject has been treated with one or more of BCD-089 (levilimab), tocilizumab, and vobarilizumab.

In some embodiments, methods of the present disclosure further comprise administration of one or more of BCD-089 (levilimab), tocilizumab, and vobarilizumab.

In some embodiments, the disclosure provides methods of treating systemic sclerosis associated with interstitial lung disease (SSc-ILD), steps comprising: measuring at least one initial point of lung function in a subject; administering a TβRII fusion protein to the subject; re-measuring the at least one point of lung function in the subject; and based on the measuring, determining a change in the rate of decline in lung function of the subject.

In some embodiments, the rate of decline in lung function is measured by Forced Vital Capacity (FVC) of the subject.

In some embodiments, the rate of decline in lung function is measured as an annual rate of decline in Forced Vital Capacity (FVC) of the subject.

In some embodiments, the initial point of lung function comprises an FVC of greater than or equal to 50% of predicted. In some embodiments, the initial point of lung function comprises an FVC of between about 100% and about 90% of predicted. In some embodiments, the initial point of lung function comprises an FVC of between about 90% and about 80% of predicted. In some embodiments, the initial point of lung function comprises an FVC of between about 80% and about 70% of predicted. In some embodiments, the initial point of lung function comprises an FVC of between about 70% and about 60% of predicted. In some embodiments, the initial point of lung function comprises an FVC of between about 60% and about 50% of predicted. In some embodiments, the initial point of lung function comprises an FVC of between about 50% and about 40% of predicted. In some embodiments, the initial point of lung function comprises an FVC of between about 40% and about 30% of predicted. In some embodiments, the initial point of lung function comprises an FVC of between about 30% and about 20% of predicted.

In some embodiments, an annual rate of decline in FVC of the subject is reduced by between about 1% and about 10%. In some embodiments, an annual rate of decline in FVC of the subject is reduced by between about 5% and about 10%. In some embodiments, an annual rate of decline in FVC of the subject is reduced by between about 10% and about 15%. In some embodiments, an annual rate of decline in FVC of the subject is reduced by between about 15% and about 20%. In some embodiments, an annual rate of decline in FVC of the subject is reduced by between about 20% and about 25%. In some embodiments, an annual rate of decline in FVC of the subject is reduced by between about 25% and about 30%. In some embodiments, an annual rate of decline in FVC of the subject is reduced by between about 30% and about 35%. In some embodiments, an annual rate of decline in FVC of the subject is reduced by between about 35% and about 40%. In some embodiments, an annual rate of decline in FVC of the subject is reduced by between about 40% and about 45%. In some embodiments, an annual rate of decline in FVC of the subject is reduced by between about 45% and about 50%. In some embodiments, an annual rate of decline in FVC of the subject is reduced by between about 50% and about 55%. In some embodiments, an annual rate of decline in FVC of the subject is reduced by between about 55% and about 60%. In some embodiments, an annual rate of decline in FVC of the subject is reduced by between about 60% and about 65%. In some embodiments, an annual rate of decline in FVC of the subject is reduced by between about 65% and about 70%. In some embodiments, an annual rate of decline in FVC of the subject is reduced by between about 10% and about 20%. In some embodiments, an annual rate of decline in FVC of the subject is reduced by between about 20% and about 30%. In some embodiments, an annual rate of decline in FVC of the subject is reduced by between about 30% and about 40%. In some embodiments, an annual rate of decline in FVC of the subject is reduced by between about 40% and about 50%. In some embodiments, an annual rate of decline in FVC of the subject is reduced by between about 50% and about 60%. In some embodiments, an annual rate of decline in FVC of the subject is reduced by between about 60% and about 70%.

In some embodiments, an annual rate of decline in FVC of the subject is reduced by between about 1 mL and about 10 mL. In some embodiments, an annual rate of decline in FVC of the subject is reduced by between about 5 mL and about 10 mL. In some embodiments, an annual rate of decline in FVC of the subject is reduced by between about 10 mL and about 15 mL. In some embodiments, an annual rate of decline in FVC of the subject is reduced by between about 15 mL and about 20 mL. In some embodiments, an annual rate of decline in FVC of the subject is reduced by between about 20 mL and about 25 mL. In some embodiments, an annual rate of decline in FVC of the subject is reduced by between about 25 mL and about 30 mL. In some embodiments, an annual rate of decline in FVC of the subject is reduced by between about 30 mL and about 35 mL. In some embodiments, an annual rate of decline in FVC of the subject is reduced by between about 35 mL and about 40 mL. In some embodiments, an annual rate of decline in FVC of the subject is reduced by between about 40 mL and about 45 mL. In some embodiments, an annual rate of decline in FVC of the subject is reduced by between about 45 mL and about 50 mL. In some embodiments, an annual rate of decline in FVC of the subject is reduced by between about 50 mL and about 55 mL. In some embodiments, an annual rate of decline in FVC of the subject is reduced by between about 55 mL and about 60 mL. In some embodiments, an annual rate of decline in FVC of the subject is reduced by between about 60 mL and about 65 mL. In some embodiments, an annual rate of decline in FVC of the subject is reduced by between about 65 mL and about 70 mL. In some embodiments, an annual rate of decline in FVC of the subject is reduced by between about 70 mL and about 75 mL. In some embodiments, an annual rate of decline in FVC of the subject is reduced by between about 75 mL and about 80 mL. In some embodiments, an annual rate of decline in FVC of the subject is reduced by between about 85 mL and about 90 mL. In some embodiments, an annual rate of decline in FVC of the subject is reduced by between about 90 mL and about 95 mL. In some embodiments, an annual rate of decline in FVC of the subject is reduced by between about 95 mL and about 100 mL. In some embodiments, an annual rate of decline in FVC of the subject is reduced by about 100 mL. In some embodiments, an annual rate of decline in FVC of the subject is reduced by between about 10 mL and about 20 mL. In some embodiments, an annual rate of decline in FVC of the subject is reduced by between about 20 mL and about 30 mL. In some embodiments, an annual rate of decline in FVC of the subject is reduced by between about 30 mL and about 40 mL. In some embodiments, an annual rate of decline in FVC of the subject is reduced by between about 40 mL and about 50 mL. In some embodiments, an annual rate of decline in FVC of the subject is reduced by between about 50 mL and about 60 mL. In some embodiments, an annual rate of decline in FVC of the subject is reduced by between about 60 mL and about 70 mL. In some embodiments, an annual rate of decline in FVC of the subject is reduced by between about 70 mL and about 80 mL. In some embodiments, an annual rate of decline in FVC of the subject is reduced by between about 80 mL and about 90 mL. In some embodiments, an annual rate of decline in FVC of the subject is reduced by between about 90 mL and about 100 mL. In some embodiments, an annual rate of decline in FVC of the subject is reduced by more than about 100 mL. In some embodiments, an annual rate of decline in forced vital capacity (FVC) of the subject is measured over a time period of at least one year after the administering and is relative to a subject treated with standard of care (SOC).

In some embodiments, the disclosure provides methods of treating systemic sclerosis associated with interstitial lung disease (SSc-ILD), comprising administering a Transforming Growth Factor-β Receptor II (TβRII) antagonist to a subject in need thereof, wherein a dose of the TβRII antagonist comprises between about 0.75 mg/to about 6.0 mg/kg of the antagonists. In some embodiments, the TβRII antagonist is administered in a dose of about 0.75 mg/kg once every two weeks to a subject in need thereof. In some embodiments, the TβRII antagonist is administered in a dose of about 2.25 mg/kg once every four weeks to a subject in need thereof. In some embodiments, the TβRII antagonist is administered in a dose of about 1.5 mg/kg once every two weeks to a subject in need thereof. In some embodiments, the TβRII antagonist is administered in a dose of about 4.5 mg/kg once every four weeks to a subject in need thereof. In some embodiments, the TβRII antagonist is administered in a dose of about 3.0 mg/kg once every two weeks to a subject in need thereof. In some embodiments, the TβRII antagonist is administered in a dose of about 6.0 mg/kg once every four weeks to a subject in need thereof. In some embodiments, the TβRII antagonist is administered subcutaneously. In some embodiments, the TβRII antagonist is administered at a dose that achieves a serum concentration of antagonist of between about 10 and about 20 ug/mL in the subject. In some embodiments, the TβRII antagonist is administered at a dose that achieves a concentration of antagonist in the lung of between about 30 and about 50 ug/mL in the subject.

In some embodiments of the present disclosure, the subject has been treated with one or more of abatacept, abituzumab, ajulemic acid, AVID200, AVID300, azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and tocilizumab.

In some embodiments, methods of the present disclosure further comprise administration of one or more of abatacept, abituzumab, ajulemic acid, AVID200, AVID300, azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and tocilizumab. In some embodiments, the subject has been treated with one or more of azathioprine, cyclophosphamide (CYC), mycophenolate mofetil (MMF), and nintedanib.

In some embodiments, methods of the present disclosure further comprise administration of one or more of azathioprine, cyclophosphamide (CYC), methotrexate, mycophenolate mofetil (MMF), and nintedanib.

In some embodiments, methods of the present disclosure further comprise administration of one or more of cyclophosphamide (CYC), methotrexate, mycophenolate mofetil (MMF), nintedanib, and rituximab.

In some embodiments, the disclosure provides methods of treating systemic sclerosis associated with interstitial lung disease (SSc-ILD), comprising administering a Transforming Growth Factor-β Receptor II (TβRII) polypeptide to a subject in need thereof, wherein the method further comprises administration of one or more of IL-6 and/or IL-6R antibodies.

In some embodiments, IL-6 antibodies comprise one or more of clazakizumab, COR-001, MEDI-5117, olokizumab, siltuximab, sirukumab, and ziltivekimab. In some embodiments, IL-6R antibodies comprise one or more of BCD-089 (levilimab), tocilizumab, and vobarilizumab. In some embodiments, the subject has been treated with one or more of clazakizumab, COR-001, MEDI-5117, olokizumab, siltuximab, sirukumab, and ziltivekimab.

In some embodiments, methods of the present disclosure further comprise administration of one or more of clazakizumab, COR-001, MEDI-5117, olokizumab, siltuximab, sirukumab, and ziltivekimab.

In some embodiments, the subject has been treated with one or more of BCD-089 (levilimab), tocilizumab, and vobarilizumab.

In some embodiments, methods of the present disclosure further comprise administration of one or more of BCD-089 (levilimab), tocilizumab, and vobarilizumab.

In some embodiments, the disclosure provides for a TβRII antagonist comprising a TβRII extracellular domain, wherein the TβRII extracellular domain comprises an amino acid sequence at least 80% identical to: i) a sequence beginning at any of positions 23 to 35 of SEQ ID NO: 1 and ending at any of positions 153 to 159 of SEQ ID NO: 1 or ii) a sequence beginning at any of positions 23 to 60 of SEQ ID NO: 2 and ending at any of positions 178 to 184 of SEQ ID NO: 2. In some embodiments, the TβRII extracellular domain comprises an amino acid sequence at least 90% identical to a sequence beginning at any of positions 23 to 35 of SEQ ID NO: 1 and ending at any of positions 153 to 159 of SEQ ID NO: 1. In some embodiments, the TβRII extracellular domain comprises an amino acid sequence at least 95% identical to a sequence beginning at any of positions 23 to 35 of SEQ ID NO: 1 and ending at any of positions 153 to 159 of SEQ ID NO: 1. In some embodiments, the TβRII extracellular domain comprises an amino acid sequence beginning at any of positions 23 to 35 of SEQ ID NO: 1 and ending at any of positions 153 to 159 of SEQ ID NO: 1. In some embodiments, the TβRII extracellular domain comprises an amino acid sequence at least 90% identical to a sequence beginning at any of positions 23 to 60 of SEQ ID NO: 2 and ending at any of positions 178 to 184 of SEQ ID NO: 2. In some embodiments, the TβRII extracellular domain comprises an amino acid sequence at least 95% identical to a sequence beginning at any of positions 23 to 60 of SEQ ID NO: 2 and ending at any of positions 178 to 184 of SEQ ID NO: 2. In some embodiments, the TβRII extracellular domain comprises an amino acid sequence beginning at any of positions 23 to 60 of SEQ ID NO: 2 and ending at any of positions 178 to 184 of SEQ ID NO: 2. In some embodiments, the TβRII extracellular domain comprises an amino acid sequence at least 90% identical to SEQ ID NO: 18. In some embodiments, the TβRII extracellular domain comprises an amino acid sequence at least 95% identical to SEQ ID NO: 18. In some embodiments, the TβRII extracellular domain comprises the amino acid sequence of SEQ ID NO: 18.

In some embodiments, the TβRII polypeptide is a fusion protein further comprising a heterologous domain. In some embodiments, the heterologous domain comprises an immunoglobulin Fc domain. In some embodiments, the immunoglobulin Fc domain is a human immunoglobulin Fc domain. In some embodiments, the heterologous domain comprises an amino acid sequence that is at least 90% identical to SEQ ID NO: 20. In some embodiments, the heterologous domain comprises an amino acid sequence that is at least 95% identical to SEQ ID NO: 20. In some embodiments, the heterologous domain comprises the amino acid sequence of SEQ ID NO: 20. In some embodiments, the C-terminal lysine residue of the Fc domain can be deleted. The amino acid sequence of SEQ ID NO: 20 may optionally be provided with the lysine removed from the C-terminus (SEQ ID NO: 72). In some embodiments, the heterologous domain comprises an amino acid sequence that is at least 90% identical to SEQ ID NO: 72. In some embodiments, the heterologous domain comprises an amino acid sequence that is at least 95% identical to SEQ ID NO: 72. In some embodiments, the heterologous domain comprises the amino acid sequence of SEQ ID NO: 72.

In some embodiments, the TβRII antagonist or fusion protein further comprises a linker. In some embodiments, the linker comprises (GGGGS)n, wherein n=≥4 (SEQ ID NO: 59). In some embodiments, the linker comprises the amino acid sequence of SEQ ID NO: 6.

In some embodiments, the TβRII antagonist or fusion protein does not include amino acids 185-592 of SEQ ID NO: 2. In some embodiments, the TβRII polypeptide or fusion protein does not include amino acids 1-22 of SEQ ID NO: 2.

In some embodiments, the fusion protein consists of or consists essentially of: a) a TβRII polypeptide portion comprising an amino acid sequence that is at least 85%, 90%, 95%, 97%, or 99% identical to the amino acid sequence of SEQ ID NO: 18 and no more than 10, 9, 8, 7, 6, 5, 4, 3, 2 or 1 additional amino acids; b) a linker portion comprising an amino acid sequence that is at least 85%, 90%, 95%, 97%, or 99% identical to the amino acid sequence of SEQ ID NO: 6 and no more than 5, 4, 3, 2 or 1 additional amino acids; c) a heterologous portion comprising an amino acid sequence that is at least 85%, 90%, 95%, 97%, or 99% identical to the amino acid sequence of SEQ ID NO: 20 and no more than 25, 20, 15, 10, 5, 4, 3, 2, or 1 additional amino acids; and d) optionally a leader sequence (e.g., SEQ ID NO: 23).

In some embodiments, the fusion protein consists of or consists essentially of: a) a TβRII polypeptide portion comprising an amino acid sequence that is at least 85%, 90%, 95%, 97%, or 99% identical to the amino acid sequence of SEQ ID NO: 18 and no more than 10, 9, 8, 7, 6, 5, 4, 3, 2 or 1 additional amino acids; b) a linker portion comprising an amino acid sequence that is at least 85%, 90%, 95%, 97%, or 99% identical to the amino acid sequence of SEQ ID NO: 6 and no more than 5, 4, 3, 2 or 1 additional amino acids; c) a heterologous portion comprising an amino acid sequence that is at least 85%, 90%, 95%, 97%, or 99% identical to the amino acid sequence of SEQ ID NO: 72 and no more than 25, 20, 15, 10, 5, 4, 3, 2, or 1 additional amino acids; and d) optionally a leader sequence (e.g., SEQ ID NO: 23).

In some embodiments, the fusion protein consists of or consists essentially of: a) a TβRII polypeptide portion comprising the amino acid sequence of SEQ ID NO: 18 and no more than 10, 9, 8, 7, 6, 5, 4, 3, 2 or 1 additional amino acids; b) a linker portion comprising the amino acid sequence of SEQ ID NO: 6 and no more than 5, 4, 3, 2 or 1 additional amino acids; c) a heterologous portion comprising the amino acid sequence of SEQ ID NO: 20 and no more than 25, 20, 15, 10, 5, 4, 3, 2, or 1 additional amino acids; and d) optionally a leader sequence (e.g., SEQ ID NO: 23).

In some embodiments, the fusion protein consists of or consists essentially of: a) a TβRII polypeptide portion comprising the amino acid sequence of SEQ ID NO: 18 and no more than 10, 9, 8, 7, 6, 5, 4, 3, 2 or 1 additional amino acids; b) a linker portion comprising the amino acid sequence of SEQ ID NO: 6 and no more than 5, 4, 3, 2 or 1 additional amino acids; c) a heterologous portion comprising the amino acid sequence of SEQ ID NO: 72 and no more than 25, 20, 15, 10, 5, 4, 3, 2, or 1 additional amino acids; and d) optionally a leader sequence (e.g., SEQ ID NO: 23).

In some embodiments, the fusion protein comprises: a) an extracellular domain of a TβRII portion; wherein the extracellular domain comprises an amino acid sequence that is at least 85%, 90%, 95%, 97%, or 99% identical to the sequence of SEQ ID NO: 18; b) a heterologous portion, wherein the heterologous portion comprises an amino acid sequence that is at least 85%, 90%, 95%, 97%, or 99% identical to the sequence of SEQ ID NO: 20; and c) a linker portion connecting the extracellular domain and the heterologous portion; wherein the linker comprises an amino acid sequence that is at least 85%, 90%, 95%, 97%, or 99% identical to the amino acid sequence of SEQ ID NO: 6.

In some embodiments, the fusion protein comprises: a) an extracellular domain of a TβRII portion; wherein the extracellular domain comprises an amino acid sequence that is at least 85%, 90%, 95%, 97%, or 99% identical to the sequence of SEQ ID NO: 18; b) a heterologous portion, wherein the heterologous portion comprises an amino acid sequence that is at least 85%, 90%, 95%, 97%, or 99% identical to the sequence of SEQ ID NO: 72; and c) a linker portion connecting the extracellular domain and the heterologous portion; wherein the linker comprises an amino acid sequence that is at least 85%, 90%, 95%, 97%, or 99% identical to the amino acid sequence of SEQ ID NO: 6.

In some embodiments, the fusion protein comprises: a) an extracellular domain of a TβRII portion; wherein the extracellular domain comprises the amino acid sequence of SEQ ID NO: 18; b) a heterologous portion, wherein the heterologous portion comprises the amino acid sequence of SEQ ID NO: 20; and c) a linker portion connecting the extracellular domain and the heterologous portion; wherein the linker comprises the amino acid sequence of SEQ ID NO: 6.

In some embodiments, the fusion protein comprises: a) an extracellular domain of a TβRII portion; wherein the extracellular domain comprises the amino acid sequence of SEQ ID NO: 18; b) a heterologous portion, wherein the heterologous portion comprises the amino acid sequence of SEQ ID NO: 72; and c) a linker portion connecting the extracellular domain and the heterologous portion; wherein the linker comprises the amino acid sequence of SEQ ID NO: 6.

In some embodiments, the TβRII antagonist comprises an amino acid sequence at least 90% identical to SEQ ID NO: 48. In some embodiments, the TβRII antagonist comprises an amino acid sequence at least 95% identical to SEQ ID NO: 48. In some embodiments, TβRII antagonist comprises the amino acid sequence of SEQ ID NO: 48. In some embodiments, the TβRII antagonist consists of the amino acid sequence of SEQ ID NO: 48.

In some embodiments, the TβRII antagonist comprises an amino acid sequence at least 90% identical to SEQ ID NO: 67. In some embodiments, the TβRII antagonist comprises an amino acid sequence at least 95% identical to SEQ ID NO: 67. In some embodiments, the TβRII antagonist comprises the amino acid sequence of SEQ ID NO: 67. In some embodiments, the TβRII antagonist consists of the amino acid sequence of SEQ ID NO: 67

In some embodiments, the polypeptide includes one or more modified amino acid residues selected from: a glycosylated amino acid, a PEGylated amino acid, a farnesylated amino acid, an acetylated amino acid, a biotinylated amino acid, an amino acid conjugated to a lipid moiety, and an amino acid conjugated to an organic derivatizing agent. In some embodiments, the polypeptide is glycosylated.

BRIEF DESCRIPTION OF THE DRAWINGS

FIG. 1 shows the amino acid sequence of native precursor for the B (short) isoform of human TGFβ receptor type II (hTRII) (NP_003233.4) (SEQ ID NO: 1). Solid underline indicates the mature extracellular domain (ECD) (residues 23-159), and double underline indicates valine that is replaced in the A (long) isoform. Dotted underline denotes leader (residues 1-22).

FIG. 2 shows the amino acid sequence of native precursor for the A (long) isoform of human TβRII (NP_001020018.1) (SEQ ID NO: 2). Solid underline indicates the mature ECD (residues 23-184), and double underline indicates the splice-generated isoleucine substitution. Dotted underline denotes leader (residues 1-22).

FIGS. 4A and 4B show in tabular form the binding affinity between TGFβ1 and TGFβ3 and one of several different TβRII-Fc fusion protein constructs.

FIGS. 5E and 5F provide $IC_{50}$ data from these same experiments in tabular form.

DETAILED DESCRIPTION

1. Overview

Figure 3:
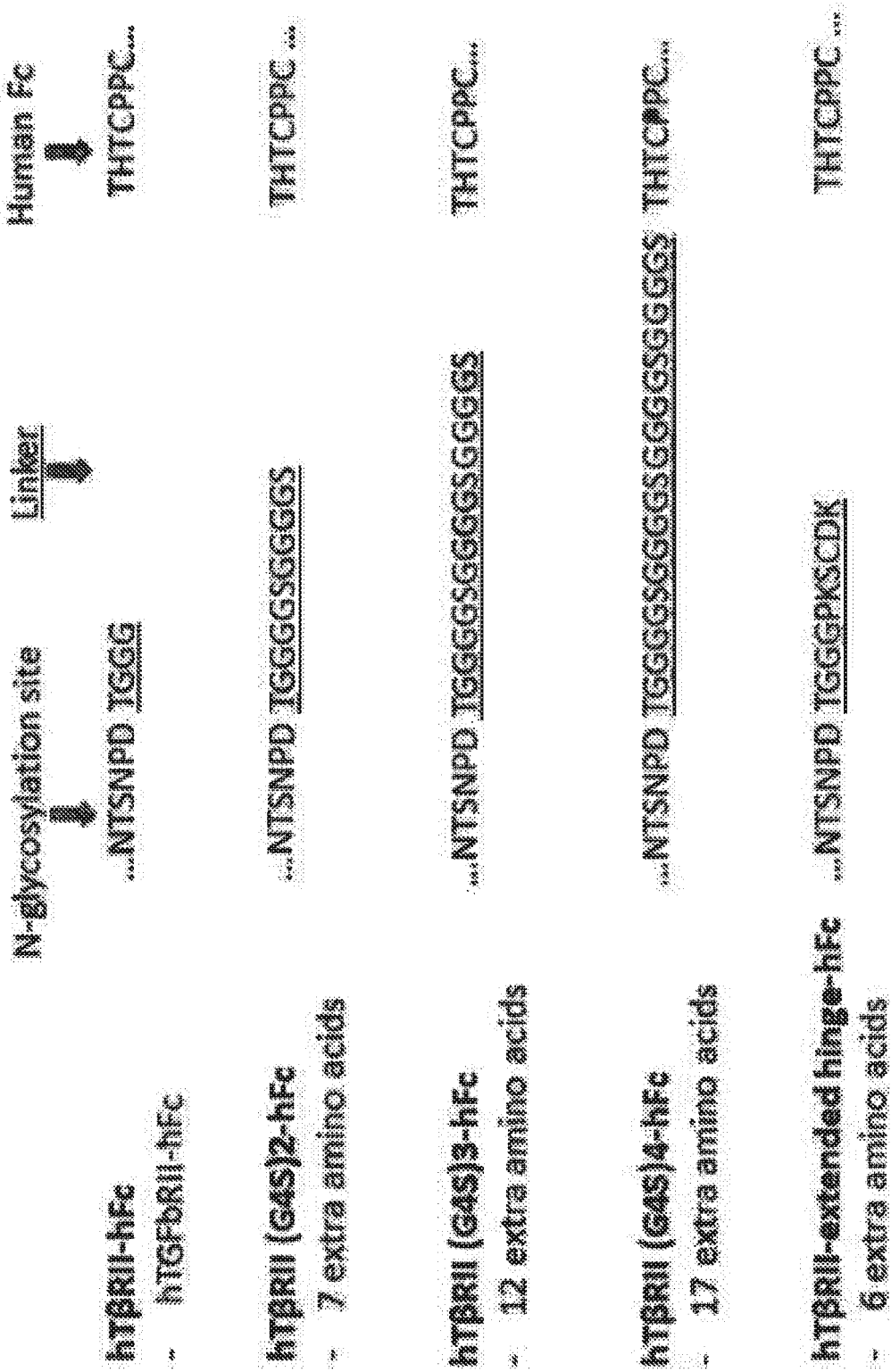
FIG. 3 shows a comparison of the linker sequences of five different TβRII constructs (SEQ ID NOs 62-66, respectively, in order of appearance).

Proteins described herein are the human forms, unless otherwise specified. NCBI references for the proteins are as follows: human TβRII isoform A ($hTβRII_{long}$), (NP_001020018.1) (SEQ ID NO: 2) and human TβRII isoform B ($hTβRII_{short}$), (NP_003233.4) (SEQ ID NO: 1). Sequences of native TβRII proteins from human are set forth in FIGS. 1 and 2. In some embodiments, the TβRII proteins are from non-human animals, such as a mouse, rat, cow or monkey.

The TGFβ superfamily contains a variety of growth factors that share common sequence elements and structural motifs. These proteins are known to exert biological effects on a large variety of cell types in both vertebrates and invertebrates. Members of the superfamily perform important functions during embryonic development in pattern formation and tissue specification and can influence a variety of differentiation processes, including adipogenesis, myogenesis, chondrogenesis, cardiogenesis, hematopoiesis, neurogenesis, and epithelial cell differentiation. By manipulating the activity of a member of the TGFβ family, it is often possible to cause significant physiological changes in an organism. For example, the Piedmontese and Belgian Blue cattle breeds carry a loss-of-function mutation in the GDF8 (also called myostatin) gene that causes a marked increase in muscle mass. Grobet et al., Nat Genet. 1997, 17(1):71-4. Similarly, in humans, inactive alleles of GDF8 are associated with increased muscle mass and, reportedly, exceptional strength. Schuelke et al., N Engl J Med 2004, 350: 2682-8.

TGFβ signals are mediated by heteromeric complexes of type I (e.g. TβRI) and type II (e.g. TβRII) serine/threonine kinase receptors, which phosphorylate and activate downstream SMAD proteins upon ligand stimulation (Massague, 2000, Nat. Rev. Mol. Cell Biol. 1:169-178). These type I and type II receptors are transmembrane proteins, composed of a ligand-binding extracellular domain with cysteine-rich region, a transmembrane domain, and a cytoplasmic domain with predicted serine/threonine specificity. Type I receptors are essential for signaling; and type II receptors are required for binding ligands and for expression of type I receptors. Type I and II receptors form a stable complex after ligand binding, resulting in phosphorylation of type I receptors by type II receptors. TGFβ has three mammalian isoforms, TGFβ1, TGFβ2 and TGFβ3, each with distinct functions in vivo. The binding of TGFβs to TβRII is a crucial step in initiating activation of the TGFβ signaling pathway, leading to phosphorylation of SMAD2, and translocation of the activated SMAD2/SMAD4 complex to the nucleus to modulate gene expression.

In part, the disclosure relates to TβRII antagonists that can be used to treat systemic sclerosis (SSc), particularly clinical complications of SSc including, for example, interstitial lung disease (ILD). In some embodiments, the disclosure provides TβRII polypeptides as antagonists of TGFβ1 or TGFβ3 for use in treating SSc or a complication of SSc (e.g., SSc-ILD). As described in greater detail below, the disclosure demonstrates that TβRII-Fc fusion proteins comprising linkers of certain lengths (e.g., a linker having 21 amino acids) were surprisingly able to bind TGFβ-1 and TGFβ-3 with stronger affinity than TβRII-Fc fusion proteins having a linker of only four amino acids. While TβRII polypeptides, and fusion proteins comprising the same, may affect SSc, including complications of SSc (e.g., SSc-ILD), through a mechanism other that TβRII antagonism, the disclosure nonetheless provides that desirable therapeutic agents may be selected on the basis of TβRII antagonism. Therefore, while not wishing to be bound to a particular mechanism of action, it is expected that other TβRII antagonists may be useful in the treatment of SSc, particularly complications of SSc such as SSc-ILD.

The terms used in this specification generally have their ordinary meanings in the art, within the context of this invention and in the specific context where each term is used. Certain terms are discussed below or elsewhere in the specification, to provide additional guidance to the practitioner in describing the compositions and methods of the invention and how to make and use them. The scope or meaning of any use of a term will be apparent from the specific context in which the term is used.

"Homologous," in all its grammatical forms and spelling variations, refers to the relationship between two proteins that possess a "common evolutionary origin," including proteins from superfamilies in the same species of organism, as well as homologous proteins from different species of organism. Such proteins (and their encoding nucleic acids)

have sequence homology, as reflected by their sequence similarity, whether in terms of percent identity or by the presence of specific residues or motifs and conserved positions. The term "sequence similarity," in all its grammatical forms, refers to the degree of identity or correspondence between nucleic acid or amino acid sequences that may or may not share a common evolutionary origin. However, in common usage and in the instant application, the term "homologous," when modified with an adverb such as "highly," may refer to sequence similarity and may or may not relate to a common evolutionary origin.

"Percent (%) sequence identity" or "percent (%) identical" with respect to a reference polypeptide (or nucleotide) sequence is defined as the percentage of amino acid residues (or nucleic acids) in a candidate sequence that are identical to the amino acid residues (or nucleic acids) in the reference polypeptide (nucleotide) sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared. For purposes herein, however, % amino acid (nucleic acid) sequence identity values are generated using the sequence comparison computer program ALIGN-2. The ALIGN-2 sequence comparison computer program was authored by Genentech, Inc., and the source code has been filed with user documentation in the U.S. Copyright Office, Washington D.C., 20559, where it is registered under U.S. Copyright Registration No. TXU510087. The ALIGN-2 program is publicly available from Genentech, Inc., South San Francisco, Calif., or may be compiled from the source code. The ALIGN-2 program should be compiled for use on a UNIX operating system, including digital UNIX V4.0D. All sequence comparison parameters are set by the ALIGN-2 program and do not vary.

"Agonize", in all its grammatical forms, refers to the process of activating a protein and/or gene (e.g., by activating or amplifying that protein's gene expression or by inducing an inactive protein to enter an active state) or increasing a protein's and/or gene's activity.

"Antagonize", in all its grammatical forms, refers to the process of inhibiting a protein and/or gene (e.g., by inhibiting or decreasing that protein's gene expression or by inducing an active protein to enter an inactive state) or decreasing a protein's and/or gene's activity.

The terms "about" and "approximately" as used in connection with a numerical value throughout the specification and the claims denotes an interval of accuracy, familiar and acceptable to a person skilled in the art.

Numeric ranges disclosed herein are inclusive of the numbers defining the ranges.

The terms "a" and "an" include plural referents unless the context in which the term is used clearly dictates otherwise. The terms "a" (or "an"), as well as the terms "one or more," and "at least one" can be used interchangeably herein. Furthermore, "and/or" where used herein is to be taken as specific disclosure of each of the two or more specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Throughout this specification, the word "comprise" or variations such as "comprises" or "comprising" will be understood to imply the inclusion of a stated integer or groups of integers but not the exclusion of any other integer or group of integers. As used herein, the term "comprises" also encompasses the use of the narrower terms "consisting" and "consisting essentially of."

The term "consisting essentially of" is limited to the specified materials or steps and those that do not materially affect the basic and novel characteristics of the invention(s) disclosed herein.

The term "appreciable affinity" as used herein means binding with a dissociation constant ($K_D$) of less than 50 nM.

The terms "polypeptide", "oligopeptide", "peptide" and "protein" are used interchangeably herein to refer to chains of amino acids of any length. The chain may be linear or branched, it may comprise modified amino acids, and/or may be interrupted by non-amino acids. The terms also encompass an amino acid chain that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. It is understood that the polypeptides can occur as single chains or associated chains.

2. TβRII Antagonists

In part, the disclosure relates to TGFβ type II receptor (TβRII) polypeptides that can be used to treat systemic sclerosis (SSc), particularly clinical complications of SSc including, for example, interstitial lung disease (ILD). While TβRII polypeptides may affect SSc, including complications of SSc (e.g., SSc-ILD), through a mechanism other that inhibiting TβRII activity, the disclosure nonetheless provides that desirable therapeutic agents may be selected on the basis of TβRII antagonism. Therefore, while not wishing to be bound to a particular mechanism of action, it is expected that additional TβRII antagonists may be useful in the treatment of SSc, particularly complications of SSc (e.g., SSc-ILD). For example, agents that inhibit the activity and/or expression (e.g., transcription, translation, secretion from a cell, or combinations thereof) of one or more of: i) the TβRII receptor, ii) one or more TβRII-binding ligand (e.g., TGFβ1, TGFβ2, and/or TGFβ3); iii) one or more TβRII-associated type I receptor (e.g., ALK5); iv) one or more TβRII-associated co-receptor (e.g., betaglycan); and/or v) one or more TβRII downstream signaling component (e.g., Smad proteins), as well as combinations thereof, may be useful in the treatment of SSc, particularly complications of SSc (e.g., SSc-ILD). Such agents are collectively referred to herein as "TβRII antagonists" or "TβRII inhibitors".

In certain aspects, a TβRII antagonist to be used in accordance with methods and uses described herein is an agent that inhibits activity and/or expression of at least TGFβ1 (e.g., a TGFβ1 antagonist). Effects on TGFβ1 inhibition may be determined, for example, using a cell-based assay including those described herein (e.g., Smad signaling assay). Therefore, in some embodiments, a TβRII antagonist of the disclosure may bind to at least TGFβ1. Ligand binding activity may be determined, for example, using a binding affinity assay including those described herein. In some embodiments, a TβRII antagonist of the disclosure binds to at least TGFβ1 with a $K_D$ of at least $1\times10^{-7}$ M (e.g., at least $1\times10^{-8}$ M, at least $1\times10^{-9}$ M, at least $1\times10^{-10}$ M, at least $1\times10^{-11}$ M, or at least $1\times10^{-12}$ M). As described herein, various TβRII antagonists that inhibit TGFβ1 can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits TGFβ1 may further inhibit one or more of: TGFβ2, TGFβ3, TβRII, ALK5, and betaglycan. In some embodiments, a TβRII antagonist that inhibits TGFβ1 further inhibits TGFβ3. In some embodiments, a TβRII antagonist that inhibits TGFβ1 does not inhibit or does not substantially inhibit TGFβ2. In some embodiments, a TβRII antagonist that inhibits TGFβ1 further inhibits TGFβ3 but does not inhibit or does not substantially inhibit TGFβ2.

In certain aspects, a TβRII antagonist to be used in accordance with methods and uses described herein is an agent that inhibits activity and/or expression of at least TGFβ2 (e.g., a TGFβ2 antagonist). Effects on TGFβ2 inhibition may be determined, for example, using a cell-based assay including those described herein (e.g., Smad signaling assay). Therefore, in some embodiments, a TβRII antagonist of the disclosure may bind to at least TGFβ2. Ligand binding activity may be determined, for example, using a binding affinity assay including those described herein. In some embodiments, a TβRII antagonist of the disclosure binds to at least TGFβ2 with a $K_D$ of at least $1\times10^{-7}$ M (e.g., at least $1\times10^{-8}$ M, at least $1\times10^{-9}$ M, at least $1\times10^{-10}$ M, at least $1\times10^{-11}$ M, or at least $1\times10^{-12}$ M). As described herein, various TβRII antagonists that inhibit TGFβ2 can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits TGFβ2 may further inhibit one or more of: TGFβ1, TGFβ3, TβRII, ALK5, and betaglycan.

In certain aspects, a TβRII antagonist to be used in accordance with methods and uses described herein is an agent that inhibits activity and/or expression of at least TGFβ3 (e.g., a TGFβ3 antagonist). Effects on TGFβ3 inhibition may be determined, for example, using a cell-based assay including those described herein (e.g., Smad signaling assay). Therefore, in some embodiments, a TβRII antagonist of the disclosure may bind to at least TGFβ3. Ligand binding activity may be determined, for example, using a binding affinity assay including those described herein. In some embodiments, a TβRII antagonist of the disclosure binds to at least TGFβ3 with a $K_D$ of at least $1\times10^{-7}$ M (e.g., at least $1\times10^{-8}$ M, at least $1\times10^{-9}$ M, at least $1\times10^{-10}$ M, at least $1\times10^{-11}$ M, or at least $1\times10^{-12}$ M). As described herein, various TβRII antagonists that inhibit TGFβ3 can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits TGFβ3 may further inhibit one or more of: TGFβ 1, TGFβ2, TβRII, ALK5, and betaglycan. In some embodiments, a TβRII antagonist that inhibits TGFβ3 further inhibits TGFβ 1. In some embodiments, a TβRII antagonist that inhibits TGFβ3 does not inhibit or does not substantially inhibit TGFβ2. In some embodiments, a TβRII antagonist that inhibits TGFβ3 further inhibits TGFβ1 but does not inhibit or does not substantially inhibit TGFβ2.

In certain aspects, a TβRII antagonist to be used in accordance with methods and uses described herein is an agent that inhibits activity and/or expression of at least a TβRII receptor (e.g., a TβRII receptor antagonist). Effects on TβRII inhibition may be determined, for example, using a cell-based assay including those described herein (e.g., Smad signaling assay). Therefore, in some embodiments, a TβRII antagonist of the disclosure may bind to at least a TβRII receptor. Ligand binding activity may be determined, for example, using a binding affinity assay including those described herein. In some embodiments, a TβRII antagonist of the disclosure binds to at least a TβRII receptor with a $K_D$ of at least $1\times10^{-7}$ M (e.g., at least $1\times10^{-8}$ M, at least $1\times10^{-9}$ M, at least $1\times10^{-10}$ M, at least $1\times10^{-11}$ M, or at least $1\times10^{-12}$ M). As described herein, various TβRII antagonists that inhibit a TβRII receptor can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits the TβRII receptor may further inhibit one or more of: TGFβ1, TGFβ2, TGFβ3, ALK5, and betaglycan. In some embodiments, a TβRII antagonist that inhibits the TβRII receptor does not inhibit or does not substantially inhibit TGFβ2.

In certain aspects, a TβRII antagonist to be used in accordance with methods and uses described herein is an agent that inhibits activity and/or expression of at least ALK5 (e.g., an ALK5 antagonist). Effects on ALK5 inhibition may be determined, for example, using a cell-based assay including those described herein (e.g., Smad signaling assay). Therefore, in some embodiments, a TβRII antagonist of the disclosure may bind to at least ALK5. Ligand binding activity may be determined, for example, using a binding affinity assay including those described herein. In some embodiments, an ALK5 antagonist of the disclosure binds to at least ALK5 with a $K_D$ of at least $1\times10^{-7}$ M (e.g., at least $1\times10^{-8}$ M, at least $1\times10^{-9}$ M, at least $1\times10^{-10}$ M, at least $1\times10^{-11}$ M, or at least $1\times10^{-12}$ M). As described herein, various TβRII antagonists that inhibit ALK5 can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits ALK5 may further inhibit one or more of: TGFβ 1, TGFβ2, TGFβ3, TβRII, and betaglycan. In some embodiments, a TβRII antagonist that inhibits ALK5 does not inhibit or does not substantially inhibit TGFβ2.

In certain aspects, a TβRII antagonist to be used in accordance with methods and uses described herein is an agent that inhibits activity and/or expression of at least betaglycan (e.g., a betaglycan antagonist). Effects on betaglycan inhibition may be determined, for example, using a cell-based assay including those described herein (e.g., Smad signaling assay). Therefore, in some embodiments, a TβRII antagonist of the disclosure may bind to at least betaglycan. Ligand binding activity may be determined, for example, using a binding affinity assay including those described herein. In some embodiments, a betaglycan antagonist of the disclosure binds to at least betaglycan with a $K_D$ of at least $1\times10^{-7}$ M (e.g., at least $1\times10^{-8}$ M, at least 1×10⁻⁹ M, at least 1×10⁻¹⁰ M, at least 1×10⁻¹¹ M, or at least 1×10⁻¹² M). As described herein, various TβRII antagonists that inhibit betaglycan can be used in accordance with the methods and uses described herein including, for example, ligand traps (e.g., TβRII or betaglycan polypeptides as well as variants thereof), antibodies, small molecules, nucleotide sequences, and combinations thereof. In certain embodiments, a TβRII antagonist that inhibits betaglycan may further inhibit one or more of: TGFβ1, TGFβ2, TGFβ3, TβRII, and ALK5. In some embodiments, a TβRII antagonist that inhibits betaglycan does not inhibit or does not substantially inhibit TGFβ2.

3. TβRII Polypeptides

In certain aspects, a TβRII antagonist to be used in accordance with the methods and uses disclosed herein is a TβRII polypeptide. A TβRII polypeptide may inhibit and/or bind to, for example, one or more TβRII ligands (e.g., TGFβ1 and/or TGFβ3). In some embodiments, the ability for a TβRII polypeptide to inhibit activity (e.g., Smad signaling) and/or bind to a target is determined in an in vitro or cell-based assay including, for example, those disclosed herein. As described herein, a TβRII polypeptide may be used alone or in combination with one or more additional active agents or supportive therapies to treat SSc or one or more complications of SSc (e.g., SSc-ILD).

Naturally occurring TβRII proteins are transmembrane proteins, with a portion of the protein positioned outside the cell (the extracellular portion) and a portion of the protein positioned inside the cell (the intracellular portion). Aspects of the present disclosure encompass variant TβRII polypeptides comprising mutations within the extracellular domain and/or truncated portions of the extracellular domain of TβRII. As described above, human TβRII occurs naturally in at least two isoforms—A (long) and B (short)—generated by alternative splicing in the extracellular domain (ECD) (FIGS. 1 and 2 and SEQ ID NOS: 1 and 2). SEQ ID NO: 27, which corresponds to residues 23-159 of SEQ ID NO: 1, depicts the native full-length extracellular domain of the short isoform of TβRII. SEQ ID NO: 18, which corresponds to residues 23-184 of SEQ ID NO: 2, depicts the native full-length extracellular domain of the long isoform of TβRII. Unless noted otherwise, amino acid position numbering with regard to variants based on the TβRII short and long isoforms refers to the corresponding position in the native precursors, SEQ ID NO: 1 and SEQ ID NO: 2, respectively.

In certain embodiments, the disclosure provides variant TβRII polypeptides. A TβRII polypeptide of the disclosure may bind to and inhibit the function of a TGFβ superfamily member, such as but not limited to, TGFβ 1 or TGFβ3. TβRII polypeptides may include a polypeptide consisting of, or comprising, an amino acid sequence at least 80% identical, and optionally at least 85%, 90%, 91%, 92%, 93%, 94%, 95%, 96%, 97%, 98%, 99%, or 100% identical to a truncated ECD domain of a naturally occurring TβRII polypeptide, whose C-terminus occurs at any of amino acids 153-159 of SEQ ID NO: 1. TβRII polypeptides may include a polypeptide consisting of, or comprising, an amino acid sequence at least 80% identical, and optionally at least 85%, 90%, 91%, 92%, 93%, 94%, 95%, 96%, 97%, 98%, 99%, or 100% identical to a truncated ECD domain of a naturally occurring TβRII polypeptide, whose C-terminus occurs at any of amino acids 178-184 of SEQ ID NO: 2. In particular embodiments, the TβRII polypeptides comprise an amino acid sequence at least 80% identical, and optionally at least 85%, 90%, 91%, 92%, 93%, 94%, 95%, 96%, 97%, 98%, 99%, or 100% identical to the amino acid sequence of SEQ ID NO: 18. Optionally, a TβRII polypeptide does not include more than 5 consecutive amino acids, or more than 10, 20, 30, 40, 50, 52, 60, 70, 80, 90, 100, 150 or 200 or more consecutive amino acids from a sequence consisting of amino acids 160-567 of SEQ ID NO: 1 or from a sequence consisting of amino acids 185-592 of SEQ ID NO: 2. In some embodiments, the TβRII polypeptide does not include amino acids 160-567 of SEQ ID NO: 1. In some embodiments, the TβRII polypeptide does not include amino acids 1-22 of SEQ ID NO: 1. In some embodiments, the TβRII polypeptide does not include amino acids 1-22 and 160-567 of SEQ ID NO: 1. In some embodiments, the TβRII polypeptide does not include amino acids 185-592 of SEQ ID NO: 2. In some embodiments, the TβRII polypeptide does not include amino acids 1-22 of SEQ ID NO: 2. In some embodiments, the TβRII polypeptide does not include amino acids 1-22 and 185-592 of SEQ ID NO: 2. The unprocessed TβRII polypeptide may either include or exclude any signal sequence, as well as any sequence N-terminal to the signal sequence. As elaborated herein, the N-terminus of the mature (processed) TβRII polypeptide may occur at any of amino acids 23-35 of SEQ ID NO: 1 or 23-60 of SEQ ID NO: 2. Examples of mature TβRII polypeptides include, but are not limited to, amino acids 23-159 of SEQ ID NO: 1 (set forth in SEQ ID NO: 27), amino acids 29-159 of SEQ ID NO: 1 (set forth in SEQ ID NO: 28), amino acids 35-159 of SEQ ID NO: 1 (set forth in SEQ ID NO: 29), amino acids 23-153 of SEQ ID NO: 1 (set forth in SEQ ID NO: 30), amino acids 29-153 of SEQ ID NO: 1 (set forth in SEQ ID NO: 31), amino acids 35-153 of SEQ ID NO: 1 (set forth in SEQ ID NO: 32), amino acids 23-184 of SEQ ID NO: 2 (set forth in SEQ ID NO: 18), amino acids 29-184 of SEQ ID NO: 2 (set forth in SEQ ID NO: 33), amino acids 60-184 of SEQ ID NO: 2 (set forth in SEQ ID NO: 29), amino acids 23-178 of SEQ ID NO: 2 (set forth in SEQ ID NO: 34), amino acids 29-178 of SEQ ID NO: 2 (set forth in SEQ ID NO: 35), and amino acids 60-178 of SEQ ID NO: 2 (set forth in SEQ ID NO: 32). It will be understood by one of skill in the art that corresponding variants based on the long isoform of TβRII will include nucleotide sequences encoding the 25-amino acid insertion along with a conservative Val-Ile substitution at the flanking position C-terminal to the insertion. The TβRII polypeptides accordingly may include isolated extracellular portions of TβRII polypeptides, including both the short and the long isoforms, variants thereof (including variants that comprise, for example, no more than 2, 3, 4, 5, 10, 15, 20, 25, 30, or 35 amino acid substitutions in the sequence corresponding to amino acids 23-159 of SEQ ID NO: 1 or amino acids 23-184 of SEQ ID NO: 2), fragments thereof, and fusion proteins comprising any of the foregoing, but in each case preferably any of the foregoing TβRII polypeptides will retain substantial affinity for at least one of, or both of, TGFβ1 or TGFβ. Generally, a TβRII polypeptide will be designed to be soluble in aqueous solutions at biologically relevant temperatures, pH levels, and osmolarity.

In some embodiments, the variant TβRII polypeptides of the disclosure comprise one or more mutations in the extracellular domain that confer an altered ligand binding profile. A TβRII polypeptide may include one, two, five or more alterations in the amino acid sequence relative to the corresponding portion of a naturally occurring TβRII polypeptide. In some embodiments, the mutation results in a substitution, insertion, or deletion at the position corresponding to position 70 of SEQ ID NO: 1. In some embodiments, the mutation results in a substitution, insertion, or deletion at the position corresponding to position 110 of SEQ ID NO: 1. Examples include, but are not limited to, an N to D substitution or a D to K substitution in the positions corresponding to positions 70 and 110, respectively, of SEQ ID NO: 1. Examples of such variant TβRII polypeptides include, but are not limited to, the sequences set forth in SEQ ID NOs: 36-39. A TβRII polypeptide may comprise a polypeptide or portion thereof that is encoded by any one of SEQ ID NOs: 10, 12, 14 or 16, or silent variants thereof or nucleic acids that hybridize to the complement thereof under stringent hybridization conditions. In particular embodiments, a TβRII polypeptide may comprise a polypeptide or portion thereof that is encoded by any one of SEQ ID NO: 12, or silent variants thereof or nucleic acids that hybridize to the complement thereof under stringent hybridization conditions.

In some embodiments, the variant TβRII polypeptides of the disclosure further comprise an insertion of 36 amino acids (SEQ ID NO: 41) between the pair of glutamate residues (positions 151 and 152 of SEQ ID NO: 1, or positions 176 and 177 of SEQ ID NO: 2) located near the C-terminus of the human TβRII ECD, as occurs naturally in the human TβRII isoform C (Konrad et al., BMC Genomics 8:318, 2007).

The disclosure further demonstrates that TβRII polypeptides can be modified to selectively antagonize TβRII ligands. The N70 residue represents a potential glycosylation site. In some embodiments, the TβRII polypeptides are aglycosylated. In some embodiments, the TβRII polypeptides are aglycosylated or have reduced glycosylation at position Asn157. In some embodiments, the TβRII polypeptides are aglycosylated or have reduced glycosylation at position Asn73.

In certain embodiments, a TβRII polypeptide binds to TGFβ1, and the TβRII polypeptide does not show substantial binding to TGFβ3. In certain embodiments, a TβRII polypeptide binds to TGFβ3, and the TβRII polypeptide does not show substantial binding to TGFβ1. Binding may be assessed using purified proteins in solution or in a surface plasmon resonance system, such as a Biacore™ system.

In certain embodiments, a TβRII polypeptide inhibits TGFβ 1 cellular signaling, and the TβRII polypeptide has an intermediate or limited inhibitory effect on TGFβ3 signaling. In certain embodiments, a TβRII polypeptide inhibits TGFβ3 cellular signaling, and the TβRII polypeptide has an intermediate or limited inhibitory effect on TGFβ1 signaling. Inhibitory effect on cell signaling can be assayed by methods known in the art.

Taken together, an active portion of a TβRII polypeptide may comprise amino acid residues 23-153, 23-154, 23-155, 23-156, 23-157, or 23-158 of SEQ ID NO: 1, as well as variants of these amino acid residues starting at any of amino acids 24-35 of SEQ ID NO: 1. Similarly, an active portion of a TβRII polypeptide may comprise amino acid residues 23-178, 23-179, 23-180, 23-181, 23-182, or 23-183 of SEQ ID NO: 2, as well as variants of these amino acid residues starting at any of amino acids 24-60 of SEQ ID NO: 2. Exemplary TβRII polypeptides comprise amino acid residues 29-159, 35-159, 23-153, 29-153 and 35-153 of SEQ ID NO: 1 or amino acid residues 29-184, 60-184, 23-178, 29-178 and 60-178 of SEQ ID NO: 2. Variants within these ranges are also contemplated, particularly those having at least 80%, 85%, 90%, 95%, or 99% identity to the corresponding portion of SEQ ID NO: 1 or SEQ ID NO: 2. A TβRII polypeptide may be selected that does not include the sequence consisting of amino acid residues 160-567 of SEQ ID NO: 1 or amino acid residues 185-592 of SEQ ID NO: 2. In particular embodiments, the TβRII polypeptides comprise an amino acid sequence at least 80% identical, and optionally at least 85%, 90%, 91%, 92%, 93%, 94%, 95%, 96%, 97%, 98%, 99%, or 100% identical to the amino acid sequence of SEQ ID NO: 18.

As described above, the disclosure provides TβRII polypeptides sharing a specified degree of sequence identity or similarity to a naturally occurring TβRII polypeptide. To determine the percent identity of two amino acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The amino acid residues at corresponding amino acid positions are then compared. When a position in the first sequence is occupied by the same amino acid residue as the corresponding position in the second sequence, then the molecules are identical at that position (as used herein amino acid "identity" is equivalent to amino acid "homology"). The percent identity between the two sequences is a function of the number of identical positions shared by the sequences, taking into account the number of gaps, and the length of each gap, which need to be introduced for optimal alignment of the two sequences.

The comparison of sequences and determination of percent identity and similarity between two sequences can be accomplished using a mathematical algorithm (Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part 1, Griffin, A. M., and Griffin, H. G., eds., Humana Press, New Jersey, 1994; Sequence Analysis in Molecular Biology, von Heinje, G., Academic Press, 1987; and Sequence Analysis Primer, Gribskov, M. and Devereux, J., eds., M Stockton Press, New York, 1991).

In one embodiment, the percent identity between two amino acid sequences is determined using the Needleman and Wunsch (J Mol. Biol. (48):444-453 (1970)) algorithm which has been incorporated into the GAP program in the GCG software package (available at http://www.gcg.com). In a specific embodiment, the following parameters are used in the GAP program: either a Blosum 62 matrix or a PAM250 matrix, and a gap weight of 16, 14, 12, 10, 8, 6, or 4 and a length weight of 1, 2, 3, 4, 5, or 6. In yet another embodiment, the percent identity between two nucleotide sequences is determined using the GAP program in the GCG software package (Devereux, J., et al., Nucleic Acids Res. 12(1):387 (1984)) (available at http://www.gcg.com). Exemplary parameters include using a NWSgapdna.CMP matrix and a gap weight of 40, 50, 60, 70, or 80 and a length weight of 1, 2, 3, 4, 5, or 6. Unless otherwise specified, percent identity between two amino acid sequences is to be determined using the GAP program using a Blosum 62 matrix, a GAP weight of 10 and a length weight of 3, and if such algorithm cannot compute the desired percent identity, a suitable alternative disclosed herein should be selected.

In another embodiment, the percent identity between two amino acid sequences is determined using the algorithm of E. Myers and W. Miller (CABIOS, 4:11-17 (1989)) which has been incorporated into the ALIGN program (version 2.0), using a PAM120 weight residue table, a gap length penalty of 12 and a gap penalty of 4.

Another embodiment for determining the best overall alignment between two amino acid sequences can be determined using the FASTDB computer program based on the algorithm of Brutlag et al. (*Comp. App. Biosci.*, 6:237-245 (1990)). In a sequence alignment the query and subject sequences are both amino acid sequences. The result of said global sequence alignment is presented in terms of percent identity. In one embodiment, amino acid sequence identity is performed using the FASTDB computer program based on the algorithm of Brutlag et al. (*Comp. App. Biosci.*, 6:237-245 (1990)). In a specific embodiment, parameters employed to calculate percent identity and similarity of an amino acid alignment comprise: Matrix=PAM 150, k-tuple=2, Mismatch Penalty=1, Joining Penalty=20, Randomization Group Length=0, Cutoff Score=1, Gap Penalty=5 and Gap Size Penalty=0.05.

TβRII polypeptides may additionally include any of various leader sequences at the N-terminus. Such a sequence would allow the peptides to be expressed and targeted to the secretion pathway in a eukaryotic system. See, e.g., Ernst et al., U.S. Pat. No. 5,082,783 (1992). Alternatively, a native TβRII signal sequence may be used to effect extrusion from the cell. Possible leader sequences include native leaders, tissue plasminogen activator (TPA) and honeybee mellitin (SEQ ID NOs: 22-24, respectively). Examples of TβRII-Fc fusion proteins incorporating a TPA leader sequence include SEQ ID NOs: 11, 13, 15, 17, 68, 69, 70, and 71. Processing of signal peptides may vary depending on the leader sequence chosen, the cell type used and culture conditions, among other variables, and therefore actual N-terminal start sites for mature TβRII polypeptides may shift by 1, 2, 3, 4 or 5 amino acids in either the N-terminal or C-terminal direction. Examples of TβRII-Fc fusion proteins include SEQ ID NOs: 11, 13, 15, 17, 68, 69, 70, and 71. It will be understood by one of skill in the art that corresponding variants based on the long isoform of TβRII will include the 25-amino acid insertion along with a conservative Val-Ile substitution at the flanking position C-terminal to the insertion.

In some embodiments, any of the TβRII polypeptides disclosed herein are at least 80%, 85%, 90%, 91%, 92%, 93%, 94%, 95%, 97%, 99% or 100% identical to the amino acid sequence of any one of SEQ ID NOs: 18, 27, 30, 34, 36, 37, 38, 39, 48, 49 51, or 67, but lack one or more N-terminal amino acids as compared to the amino acid sequences of SEQ ID NO: 18, 27, 30, 34, 36, 37, 38, 39, 48, 49 51, 67, or 78. In some embodiments, the TβRII polypeptide lacks the amino acid corresponding to the first amino acid (threonine) of any one of SEQ ID NOs: 18, 27, 30, 34, 36, 37, 38, 39, 48, 49, 51, 67, or 78. In some embodiments, the TβRII polypeptide lacks the amino acids corresponding to the first and second amino acids (threonine and isoleucine, respectively) of any one of SEQ ID NOs: 18, 27, 30, 34, 36, 37, 38, 39, 48, 49, 51, 67, or 78. In some embodiments, the TβRII polypeptide lacks the amino acids corresponding to the first, second and third amino acids (threonine, isoleucine, and proline, respectively) of any one of SEQ ID NOs: 18, 27, 30, 34, 36, 37, 38, 39, 48, 49, 51, 67, or 78. In some embodiments, the TβRII polypeptide lacks the amino acids corresponding to the first, second, third and fourth amino acids (threonine, isoleucine, proline, proline, respectively) of any one of SEQ ID NOs: 18, 27, 30, 34, 36, 37, 38, 39, 48, 49, 51, 67, or 78.

In some embodiments, any of the TβRII polypeptides disclosed herein are at least 80%, 85%, 90%, 91%, 92%, 93%, 94%, 95%, 97%, 99% or 100% identical to the amino acid sequence of any one of SEQ ID NOs: 18, 51, or 78, but lack the amino acid corresponding to the first amino acid (threonine) of SEQ ID NO: 18, 51, or 78. In some embodiments, the TβRII polypeptide lacks the amino acids corresponding to the first and second amino acids (threonine and isoleucine, respectively) of SEQ ID NO: 18, 51, or 78. In some embodiments, the TβRII polypeptide lacks the amino acids corresponding to the first, second and third amino acids (threonine, isoleucine, and proline, respectively) of SEQ ID NO: 18, 51, or 78. In some embodiments, the TβRII polypeptide lacks the amino acids corresponding to the first, second, third and fourth amino acids (threonine, isoleucine, proline, proline, respectively) of SEQ ID NO: 18, 51, or 78.

In some embodiments, the disclosure provides for a composition comprising a mixture of TβRII polypeptides, wherein the TβRII polypeptides in the composition each comprise an amino acid sequence that is at least 80%, 85%, 90%, 91%, 92%, 93%, 94%, 95%, 97%, 99% or 100% identical to the amino acid sequence of any one of SEQ ID NOs: 18, 27, 30, 34, 36, 37, 38, 39, 48, 49, 51, 67, or 78; but wherein at least a portion of the TβRII polypeptides (e.g., at least 1%, 3%, 4%, 5%, 10%, 15%, 20%, 25%, 30%, 40%, 50%, 60%, 70%, 80%, 90%, 91%, 92%, 93%, 94%, 95%) in the composition include the amino acids corresponding to the first, second, third and fourth amino acids (threonine, isoleucine, proline and proline, respectively) of any one of SEQ ID NOs: 18, 27, 30, 34, 36, 37, 38, 39, 48, 49, 51, 67, or 78; and wherein at least a portion of the TβRII polypeptides (e.g., at least 1%, 3%, 4%, 5%, 10%, 15%, 20%, 25%, 30%, 40%, 50%, 60%, 70%, 80%, 90%, 91%, 92%, 93%, 94%, 95%) in the composition lack one or more of the amino acids corresponding to the first, second, third and fourth amino acids (threonine, isoleucine, proline and proline, respectively) of any one of SEQ ID NOs: 18, 27, 30, 34, 36, 37, 38, 39, 48, 49, 51, 67, or 78. In some embodiments, the disclosure provides for a composition comprising a mixture of TβRII polypeptides, wherein the TβRII polypeptides are at least 80%, 85%, 90%, 91%, 92%, 93%, 94%, 95%, 97%, 99% or 100% identical to the amino acid sequence of any one of SEQ ID NOs: 18, 51, or 78, but wherein at least 30% to 80% of the TβRII polypeptides in the composition lack the amino acid corresponding to the first amino acid (threonine) of SEQ ID NO: 18, 51, or 78.

In certain embodiments, the present disclosure contemplates specific mutations of the TβRII polypeptides so as to alter the glycosylation of the polypeptide. Such mutations may be selected so as to introduce or eliminate one or more glycosylation sites, such as O-linked or N-linked glycosylation sites. Asparagine-linked glycosylation recognition sites generally comprise a tripeptide sequence, asparagine-X-threonine (or asparagine-X-serine) (where "X" is any amino acid) which is specifically recognized by appropriate cellular glycosylation enzymes. The alteration may also be made by the addition of, or substitution by, one or more serine or threonine residues to the sequence of the wild-type TβRII polypeptide (for O-linked glycosylation sites). A variety of amino acid substitutions or deletions at one or both of the first or third amino acid positions of a glycosylation recognition site (and/or amino acid deletion at the second position) results in non-glycosylation at the modified tripeptide sequence. Another means of increasing the number of carbohydrate moieties on a TβRII polypeptide is by chemical or enzymatic coupling of glycosides to the TβRII polypeptide. Depending on the coupling mode used, the sugar(s) may be attached to (a) arginine and histidine; (b) free carboxyl groups; (c) free sulfhydryl groups such as those of cysteine; (d) free hydroxyl groups such as those of serine, threonine, or hydroxyproline; (e) aromatic residues such as those of phenylalanine, tyrosine, or tryptophan; or (f) the amide group of glutamine. These methods are described in WO 87/05330 published Sep. 11, 1987, and in Aplin and Wriston (1981) CRC Crit. Rev. Biochem., pp. 259-306, incorporated by reference herein. Removal of one or more carbohydrate moieties present on a TβRII polypeptide may be accomplished chemically and/or enzymatically. Chemical deglycosylation may involve, for example, exposure of the TβRII polypeptide to the compound trifluoromethanesulfonic acid, or an equivalent compound. This treatment results in the cleavage of most or all sugars except the linking sugar (N-acetylglucosamine or N-acetylgalactosamine), while leaving the amino acid sequence intact. Chemical deglycosylation is further described by Hakimuddin et al. (1987) Arch. Biochem. Biophys. 259:52 and by Edge et al. (1981) Anal. Biochem. 118:131. Enzymatic cleavage of carbohydrate moieties on TβRII polypeptides can be achieved by the use of a variety of endo- and exo-glycosidases as described by Thotakura et al. (1987) Meth. Enzymol. 138:350. The sequence of a TβRII polypeptide may be adjusted, as appropriate, depending on the type of expression system used, as mammalian, yeast, insect and plant cells may all introduce differing glycosylation patterns that can be affected by the amino acid sequence of the peptide. In general, TβRII polypeptides for use in humans will be expressed in a mammalian cell line that provides proper glycosylation, such as HEK293 or CHO cell lines, although other mammalian expression cell lines, yeast cell lines with engineered glycosylation enzymes, and insect cells are expected to be useful as well.

This disclosure further contemplates a method of generating mutants, particularly sets of combinatorial mutants of a TβRII polypeptide, as well as truncation mutants; pools of combinatorial mutants are especially useful for identifying functional variant sequences. The purpose of screening such combinatorial libraries may be to generate, for example, TβRII polypeptide variants which can act as either agonists or antagonist, or alternatively, which possess novel activities all together. A variety of screening assays are provided below, and such assays may be used to evaluate variants. For example, a TβRII polypeptide variant may be screened for ability to bind to a TβRII ligand, to prevent binding of a TβRII ligand to a TβRII polypeptide or to interfere with signaling caused by a TβRII ligand. The activity of a TβRII polypeptide or its variants may also be tested in a cell-based or in vivo assay, particularly any of the assays disclosed in the Examples.

Combinatorially-derived variants can be generated which have a selective or generally increased potency relative to a TβRII polypeptide comprising an extracellular domain of a naturally occurring TβRII polypeptide. Likewise, mutagenesis can give rise to variants which have serum half-lives dramatically different than the corresponding wild-type TβRII polypeptide. For example, the altered protein can be rendered either more stable or less stable to proteolytic degradation or other processes which result in destruction of, or otherwise elimination or inactivation of, a native TβRII polypeptide. Such variants, and the genes which encode them, can be utilized to alter TβRII polypeptide levels by modulating the half-life of the TβRII polypeptides. For instance, a short half-life can give rise to more transient biological effects and can allow tighter control of recombinant TβRII polypeptide levels within the patient. In an Fc fusion protein, mutations may be made in the linker (if any) and/or the Fc portion to alter the half-life of the protein.

A combinatorial library may be produced by way of a degenerate library of genes encoding a library of polypeptides which each include at least a portion of potential TβRII polypeptide sequences. For instance, a mixture of synthetic oligonucleotides can be enzymatically ligated into gene sequences such that the degenerate set of potential TβRII polypeptide nucleotide sequences are expressible as individual polypeptides, or alternatively, as a set of larger fusion proteins (e.g., for phage display).

There are many ways by which the library of potential TβRII polypeptide variants can be generated from a degenerate oligonucleotide sequence. Chemical synthesis of a degenerate gene sequence can be carried out in an automatic DNA synthesizer, and the synthetic genes then be ligated into an appropriate vector for expression. The synthesis of degenerate oligonucleotides is well known in the art (see for example, Narang, SA (1983) Tetrahedron 39:3; Itakura et al., (1981) Recombinant DNA, Proc. 3rd Cleveland Sympos. Macromolecules, ed. AG Walton, Amsterdam: Elsevier pp 273-289; Itakura et al., (1984) Annu. Rev. Biochem. 53:323; Itakura et al., (1984) Science 198:1056; Ike et al., (1983) Nucleic Acid Res. 11:477). Such techniques have been employed in the directed evolution of other proteins (see, for example, Scott et al., (1990) Science 249:386-390; Roberts et al., (1992) PNAS USA 89:2429-2433; Devlin et al., (1990) Science 249: 404-406; Cwirla et al., (1990) PNAS USA 87: 6378-6382; as well as U.S. Pat. Nos. 5,223,409, 5,198,346, and 5,096,815).

Alternatively, other forms of mutagenesis can be utilized to generate a combinatorial library. For example, TβRII polypeptide variants can be generated and isolated from a library by screening using, for example, alanine scanning mutagenesis and the like (Ruf et al., (1994) Biochemistry 33:1565-1572; Wang et al., (1994) J. Biol. Chem. 269:3095-3099; Balint et al., (1993) Gene 137:109-118; Grodberg et al., (1993) Eur. J. Biochem. 218:597-601; Nagashima et al., (1993) J. Biol. Chem. 268:2888-2892; Lowman et al., (1991) Biochemistry 30:10832-10838; and Cunningham et al., (1989) Science 244:1081-1085), by linker scanning mutagenesis (Gustin et al., (1993) Virology 193:653-660; Brown et al., (1992) Mol. Cell Biol. 12:2644-2652; McKnight et al., (1982) Science 232:316); by saturation mutagenesis (Meyers et al., (1986) Science 232:613); by PCR mutagenesis (Leung et al., (1989) Method Cell Mol Biol 1:11-19); or by random mutagenesis, including chemical mutagenesis, etc. (Miller et al., (1992) A Short Course in Bacterial Genetics, CSHL Press, Cold Spring Harbor, NY; and Greener et al., (1994) Strategies in Mol Biol 7:32-34). Linker scanning mutagenesis, particularly in a combinatorial setting, is an attractive method for identifying truncated (bioactive) forms of TβRII polypeptides.

A wide range of techniques are known in the art for screening gene products of combinatorial libraries made by point mutations and truncations, and, for that matter, for screening cDNA libraries for gene products having a certain property. Such techniques will be generally adaptable for rapid screening of the gene libraries generated by the combinatorial mutagenesis of TβRII polypeptides. The most widely used techniques for screening large gene libraries typically comprises cloning the gene library into replicable expression vectors, transforming appropriate cells with the resulting library of vectors, and expressing the combinatorial genes under conditions in which detection of a desired activity facilitates relatively easy isolation of the vector encoding the gene whose product was detected. Preferred assays include TβRII ligand binding assays and ligand-mediated cell signaling assays.

In certain embodiments, the TβRII polypeptides of the disclosure may further comprise post-translational modifications in addition to any that are naturally present in the TβRII polypeptides. Such modifications include, but are not limited to, acetylation, carboxylation, glycosylation, phosphorylation, lipidation, pegylation (polyethylene glycol) and acylation. As a result, the modified TβRII polypeptides may contain non-amino acid elements, such as polyethylene glycols, lipids, mono- or poly-saccharides, and phosphates. Effects of such non-amino acid elements on the functionality of a TβRII polypeptide may be tested as described herein for other TβRII polypeptide variants. When a TβRII polypeptide is produced in cells by cleaving a nascent form of the TβRII polypeptide, post-translational processing may also be important for correct folding and/or function of the protein. Different cells (such as CHO, HeLa, MDCK, 293, WI38, NIH-3T3 or HEK-293) have specific cellular machinery and characteristic mechanisms for such post-translational activities and may be chosen to ensure the correct modification and processing of the TβRII polypeptides.

4. Linkers

The disclosure provides for TβRII fusion proteins, and in these embodiments, the TβRII portion is connected to the heterologous portion (e.g., Fc portion) by means of a linker. In some embodiments, the linkers are glycine and serine rich linkers. Other near neutral amino acids, such as, but not limited to, Thr, Asn, Pro and Ala, may also be used in the linker sequence. In some embodiments, the linker comprises various permutations of amino acid sequences containing Gly and Ser. In some embodiments, the linker is greater than 10 amino acids in length. In further embodiments, the linkers have a length of at least 12, 15, 20, 21, 25, 30, 35, 40, 45 or 50 amino acids. In some embodiments, the linker is less than 40, 35, 30, 25, 22 or 20 amino acids. In some embodiments, the linker is 10-50, 10-40, 10-30, 10-25, 10-21, 10-15, 10, 15-25, 17-22, 20, or 21 amino acids in length. In preferred embodiments, the linker comprises the amino acid sequence GlyGlyGlyGlySer (GGGGS) (SEQ ID NO: 19), or repetitions thereof (GGGGS)n, where n≥2 (SEQ ID NO: 57). In particular embodiments n≥3, or n=3-10. The application teaches the surprising finding that proteins comprising a TβRII portion and a heterologous portion fused together by means of a (GGGGS)$_4$ linker (SEQ ID NO: 59) were associated with a stronger affinity for TGFβ1 and TGFβ3 as compared to a TβRII fusion protein where n<4. As such, in preferred embodiments, n≥4, or n=4-10. The application also teaches that proteins comprising (GGGGS)n linkers ('GGGGS' disclosed as SEQ ID NO: 19) in which n≥4 had similar inhibitory properties as proteins having the (GGGGS)$_4$ linker (SEQ ID NO: 59). As such, in some embodiments, n is not greater than 4 in a (GGGGS)n linker (SEQ ID NO: 19). In some embodiments, n=4-10, 4-9, 4-8, 4-7, 4-6, 4-5, 5-8, 5-7, or 5-6. In some embodiments, n=3, 4, 5, 6, or 7. In particular embodiments, n=4. In some embodiments, a linker comprising a (GGGGS)$_n$ sequence (SEQ ID NO: 19) also comprises an N-terminal threonine. In some embodiments, the linker is any one of the following:

```
                                         (SEQ ID NO: 21)
GGGGSGGGGS (SEQ ID NO: 4)
TGGGGSGGGGS (SEQ ID NO: 5)
TGGGGSGGGGSGGGGS (SEQ ID NO: 6)
TGGGGSGGGGSGGGGSGGGGS
```

```
                                         (SEQ ID NO: 25)
TGGGGGGGGSGGGGSGGGGSGGGGS (SEQ ID NO: 26)
TGGGGSGGGGSGGGGSGGGGSGGGGSGGGGS
or (SEQ ID NO: 40)
TGGGGSGGGGSGGGGSGGGGSGGGGSGGGGSGGGGS.
```

In some embodiments, the linker comprises the amino acid sequence of TGGGPKSCDK (SEQ ID NO: 7). In some embodiments, the linker is any one of SEQ ID NOs: 21, 4-7, 25-26 or 40 lacking the N-terminal threonine. In some embodiments, the linker does not comprise the amino acid sequence of SEQ ID NO: 26 or 40.

5. Heterologous Domains

In certain aspects, functional variants or modified forms of the TβRII polypeptides include fusion proteins having at least a portion of the TβRII polypeptides and one or more heterologous portions. Well-known examples of such heterologous portions include, but are not limited to, polyhistidine, Glu-Glu, glutathione S transferase (GST), thioredoxin, protein A, protein G, an immunoglobulin heavy chain constant region (Fc), maltose binding protein (MBP), or human serum albumin. A heterologous portion may be selected so as to confer a desired property. For example, some heterologous portions are particularly useful for isolation of the fusion proteins by affinity chromatography. For the purpose of affinity purification, relevant matrices for affinity chromatography, such as glutathione-, amylase-, and nickel- or cobalt-conjugated resins are used. Many of such matrices are available in "kit" form, such as the Pharmacia GST purification system and the QIAexpress™ system (Qiagen) useful with (HIS$_6$ (SEQ ID NO: 61)) fusion partners. As another example, a heterologous portion may be selected so as to facilitate detection of the TβRII polypeptides. Examples of such detection domains include the various fluorescent proteins (e.g., GFP) as well as "epitope tags," which are usually short peptide sequences for which a specific antibody is available. Well known epitope tags for which specific monoclonal antibodies are readily available include FLAG, influenza virus haemagglutinin (HA), and c-myc tags. In some cases, the heterologous portions have a protease cleavage site, such as for Factor Xa or Thrombin, which allows the relevant protease to partially digest the fusion proteins and thereby liberate the recombinant proteins therefrom. The liberated proteins can then be isolated from the heterologous portion by subsequent chromatographic separation. In certain preferred embodiments, a TβRII polypeptide is fused with a domain that stabilizes the TβRII polypeptide in vivo (a "stabilizer" domain). By "stabilizing" is meant anything that increases serum half life, regardless of whether this is because of decreased destruction, decreased clearance by the kidney, or other pharmacokinetic effect. Fusions with the Fc portion of an immunoglobulin are known to confer desirable pharmacokinetic properties on a wide range of proteins. Likewise, fusions to human serum albumin can confer desirable properties. Other types of heterologous portions that may be selected include multimerizing (e.g., dimerizing, tetramerizing) domains and functional domains.

As specific examples, the present disclosure provides fusion proteins comprising variants of TβRII polypeptides fused to an Fc domain sequence of SEQ ID NO: 20. Optionally, the Fc domain has one or more mutations at residues such as Asp-265, Lys-322, and Asn-434 (numbered in accordance with the corresponding full-length IgG). In certain cases, the mutant Fc domain having one or more of these mutations (e.g., Asp-265 mutation) has reduced ability of binding to the Fcγ receptor relative to a wildtype Fc domain. In other cases, the mutant Fc domain having one or more of these mutations (e.g., Asn-434 mutation) has increased ability of binding to the MHC class I-related Fc-receptor (FcRN) relative to a wildtype Fc domain. In some embodiments, the C-terminal lysine residue of the Fc domain can be deleted. The amino acid sequence of SEQ ID NO: 20 may optionally be provided with the lysine removed from the C-terminus (SEQ ID NO: 72).

It is understood that different elements of the fusion proteins may be arranged in any manner that is consistent with the desired functionality. For example, a TβRII polypeptide may be placed C-terminal to a heterologous domain, or, alternatively, a heterologous domain may be placed C-terminal to a TβRII polypeptide. The TβRII polypeptide domain and the heterologous domain need not be adjacent in a fusion protein, and additional domains or amino acid sequences may be included C- or N-terminal to either domain or between the domains.

As used herein, the term "immunoglobulin Fc domain" or simply "Fc" is understood to mean the carboxyl-terminal portion of an immunoglobulin chain constant region, preferably an immunoglobulin heavy chain constant region, or a portion thereof. For example, an immunoglobulin Fc region may comprise 1) a CH1 domain, a CH2 domain, and a CH3 domain, 2) a CH1 domain and a CH2 domain, 3) a CH1 domain and a CH3 domain, 4) a CH2 domain and a CH3 domain, or 5) a combination of two or more domains and an immunoglobulin hinge region. In a preferred embodiment the immunoglobulin Fc region comprises at least an immunoglobulin hinge region a CH2 domain and a CH3 domain, and preferably lacks the CH1 domain. In some embodiments, the immunoglobulin Fc region is a human immunoglobulin Fc region.

In one embodiment, the class of immunoglobulin from which the heavy chain constant region is derived is IgG (Igγ) (γ subclasses 1, 2, 3, or 4). Other classes of immunoglobulin, IgA (Igα), IgD (Igδ), IgE (Igε) and IgM (Igμ), may be used. The choice of appropriate immunoglobulin heavy chain constant region is discussed in detail in U.S. Pat. Nos. 5,541,087 and 5,726,044. The choice of particular immunoglobulin heavy chain constant region sequences from certain immunoglobulin classes and subclasses to achieve a particular result is considered to be within the level of skill in the art. The portion of the DNA construct encoding the immunoglobulin Fc region preferably comprises at least a portion of a hinge domain, and preferably at least a portion of a CH3 domain of Fc gamma or the homologous domains in any of IgA, IgD, IgE, or IgM.

Furthermore, it is contemplated that substitution or deletion of amino acids within the immunoglobulin heavy chain constant regions may be useful in the practice of the methods and compositions disclosed herein. One example would be to introduce amino acid substitutions in the upper CH2 region to create an Fc variant with reduced affinity for Fc receptors (Cole et al. (1997) J. Immunol. 159:3613).

Antibodies and Fc fusion proteins with reduced effector function may be produced by introducing changes in the amino acid sequence, including, but are not limited to, the Ala-Ala mutation described by Bluestone et al. (see WO 94/28027 and WO 98/47531; also see Xu et al. 2000 Cell Immunol 200; 16-26). Thus, in certain embodiments, Fc fusion proteins of the disclosure with mutations within the constant region including the Ala-Ala mutation may be used to reduce or abolish effector function. According to these embodiments, antibodies and Fc fusion proteins may comprise a mutation to an alanine at position 234 or a mutation to an alanine at position 235, or a combination thereof. In one embodiment, the antibody or Fc fusion protein comprises an IgG4 framework, wherein the Ala-Ala mutation would describe a mutation(s) from phenylalanine to alanine at position 234 and/or a mutation from leucine to alanine at position 235. In another embodiment, the antibody or Fc fusion protein comprises an IgG1 framework, wherein the Ala-Ala mutation would describe a mutation(s) from leucine to alanine at position 234 and/or a mutation from leucine to alanine at position 235. While alanine substitutions at these sites are effective in reducing ADCC in both human and murine antibodies, these substitutions are less effective at reducing CDC activity. Another single variant P329A, identified by a random mutagenesis approach to map the C1q binding site of the Fc, is highly effective at reducing CDC activity while retaining ADCC activity. A combination of L234A, L235A, and P329A (LALA-PG, Kabat positions) substitutions have been shown to effectively silence the effector function of human IgG1 antibodies. For a detailed discussion of LALA, LALA-PG, and other mutations, see Lo et al. (2017) 1 Biol. Chem. 292:3900-3908, the contents of which are hereby incorporated herein by reference in their entirety. In some embodiments, Fc fusion proteins of the disclosure comprise L234A, L235A, and P329G mutations (LALA-PG; Kabat positions) in the Fc region of the heavy chain. The antibody or Fc fusion protein may alternatively or additionally carry other mutations, including the point mutation K322A in the CH2 domain (Hezareh et al. 2001 J Virol. 75: 12161-8).

In particular embodiments, the antibody or Fc fusion protein may be modified to either enhance or inhibit complement dependent cytotoxicity (CDC). Modulated CDC activity may be achieved by introducing one or more amino acid substitutions, insertions, or deletions in an Fc region (see, e.g., U.S. Pat. No. 6,194,551). Alternatively, or additionally, cysteine residue(s) may be introduced in the Fc region, thereby allowing interchain disulfide bond formation in this region. The homodimeric antibody or Fc fusion protein thus generated may have improved or reduced internalization capability and/or increased or decreased complement-mediated cell killing. See Caron et al., J. Exp Med. 176:1191-1195 (1992) and Shopes, B. J. Immunol. 148:2918-2922 (1992), WO99/51642, Duncan & Winter Nature 322: 738-40 (1988); U.S. Pat. Nos. 5,648,260; 5,624,821; and WO94/29351.

In some embodiments, the disclosure provides for TβRII polypeptides fusion proteins comprising an amino acid sequence that is at least 80%, 85%, 90%, 91%, 92%, 93%, 94%, 95%, 96%, 97%, 98%, or 99% identical to the amino acid sequence of any one of SEQ ID NOs: 11, 13, 15, 17, 68, 69, 70, and 71, or biologically active fragments thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NOs: 11, 13, 15, 17, 68, 69, 70, and 71 or biologically active fragments thereof. In some embodiments, the C-terminal lysine residue of an Fc domain can be deleted. The amino acid sequence of SEQ ID NO: 11 may optionally be provided with the lysine removed from the C-terminus (SEQ ID NO: 68). The amino acid sequence of SEQ ID NO: 13 may optionally be provided with the lysine removed from the C-terminus (SEQ ID NO: 69). The amino acid sequence of SEQ ID NO: 15 may optionally be provided with the lysine removed from the C-terminus (SEQ ID NO: 70). The amino acid sequence of SEQ ID NO: 17 may optionally be provided with the lysine removed from the C-terminus (SEQ ID NO: 71).

In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 13, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 69, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 50, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 77, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 51, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 78, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 52, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 79, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 53, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 80, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 54, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 81, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 55, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 82, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 56, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 83, or a biologically active fragment thereof. In some embodiments, the TβRII polypeptides fusion protein comprises an amino acid sequence that is at least 80%, 85%, 90%, 91%, 92%, 93%, 94%, 95%, 96%, 97%, 98%, or 99% identical to the amino acid sequence of SEQ ID NO: 20, or a biologically active fragment thereof. In some embodiments, the TβRII polypeptides fusion proteins comprise an amino acid sequence that is at least 80%, 85%, 90%, 91%, 92%, 93%, 94%, 95%, 96%, 97%, 98%, or 99% identical to the amino acid sequence of any one of SEQ ID NO: 72, or a biologically active fragment thereof. In some embodiments, the fusion proteins described herein have improved binding affinity for TGFβ1 and TGFβ3. In some embodiments, a fusion protein comprising a linker at least 10 amino acids in length (e.g., a fusion protein having the amino acid sequence of any one of SEQ ID NOs: 11, 13, 15, 50-56, 68-70, and 77-83) has improved binding affinity for TGFβ1 and TGFβ3 as compared to a reference fusion protein (e.g., a fusion protein having the amino acid sequence of SEQ ID NO: 9 or SEQ ID NO: 88). In some embodiments, the fusion protein binds to TGFβ1 with a $K_D$ of less than 200 pM, less than 150 pM, less than 100 pM, less than 75 pM, less than 50 pM or less than 25 pM. In some embodiments, the fusion protein binds to TGFβ3 with a $K_D$ of less than 75 pM, less than 70 pM, less than 60 pM, less than 50 pM, less than 40 pM, less than 35 pM, less than 25 pM, less than 15, less than 10, or less than 5 pM.

In some embodiments any of the polypeptides disclosed herein inhibits TGFβ1 and/or TGFβ3 in a measurable assay. In some embodiments, the polypeptide inhibits TGFβ1 with an $IC_{50}$ of less than 1.0, 0.9, 0.8. 0.7, 0.6, 0.5, 0.4, 0.3, 0.2, 0.1, 0.08, 0.09, 0.07, 0.06, 0.05, 0.04, 0.03, or 0.02 nM, as determined using a reporter gene assay. In some embodiments, the polypeptide inhibits TGFβ3 with an $IC_{50}$ of less than 1.0, 0.9, 0.8. 0.7, 0.6, 0.5, 0.4, 0.3, 0.2, 0.1, 0.09, 0.08, 0.07, 0.06, 0.05, 0.04, 0.03, or 0.02 nM, as determined using a reporter gene assay. In some embodiments, the reporter gene assay is a CAGA reporter assay. In some embodiments, the CAGA assay is based on a human lung carcinoma cell line transfected with a pGL3(CAGA)12 reporter plasmid (Dennler et al, 1998, EMBO 17: 3091-3100) as well as a Renilla reporter plasmid (pRLCMV) to control for transfection efficiency. The CAGA motif is present in the promoters of TGFβ-responsive genes (for example, PAI-1), so this vector is of general use for factors signaling through SMAD2 and SMAD3. See, e.g., Example 2.

6. Fusion Polypeptides

In some embodiments, the disclosure provides for TβRII-containing fusion polypeptides. The fusion polypeptides may be prepared according to any of the methods disclosed herein or that are known in the art.

In some embodiments, any of the fusion polypeptides disclosed herein comprises the following components: a) any of the TβRII polypeptides disclosed herein ("A"), b) any of the linkers disclosed herein ("B"), c) any of the heterologous portions disclosed herein ("C"), and optionally a linker ("X"). In such embodiments, the fusion polypeptide may be arranged in a manner as follows (N-terminus to C-terminus): A-B-C or C-B-A. In such embodiments, the fusion polypeptide may be arranged in a manner as follows (N-terminus to C-terminus): X-A-B-C or X-C-B-A. In some embodiments, the fusion polypeptide comprises each of A, B and C (and optionally a leader sequence such as the amino acid sequence of SEQ ID NO: 23), and comprises no more than 100, 90, 80, 70, 60, 50, 40, 30, 20, 10, 5, 4, 3, 2 or 1 additional amino acids (but which may include further post-translational modifications, such as PEGylation). In some embodiments, the fusion polypeptide comprises a leader sequence (e.g., SEQ ID NO: 23) positioned in a manner as follows (N-terminus to C-terminus): X-A-B-C, and the fusion polypeptide comprises 1, 2, 3, 4, or 5 amino acids between X and A. In some embodiments, the fusion polypeptide comprises a leader sequence (e.g., SEQ ID NO: 23) positioned in a manner as follows (N-terminus to C-terminus): X-C-B-A, and the fusion polypeptide comprises 1, 2, 3, 4, or 5 amino acids between X and C. In some embodiments, the fusion polypeptide comprises a leader sequence (e.g., SEQ ID NO: 23) positioned in a manner as follows (N-terminus to C-terminus): X-A-B-C, and the fusion polypeptide comprises an alanine between X and A. In some embodiments, the fusion polypeptide comprises a leader sequence (e.g., SEQ ID NO: 23) positioned in a manner as follows (N-terminus to C-terminus): X-C-B-A, and the fusion polypeptide comprises an alanine between X and C. In some embodiments, the fusion polypeptide comprises a leader sequence (e.g., SEQ ID NO: 23) positioned in a manner as follows (N-terminus to C-terminus): X-A-B-C, and the fusion polypeptide comprises a glycine and an alanine between X and A. In some embodiments, the fusion polypeptide comprises a leader sequence (e.g., SEQ ID NO: 23) positioned in a manner as follows (N-terminus to C-terminus): X-C-B-A, and the fusion polypeptide comprises a glycine and an alanine between X and C. In some embodiments, the fusion polypeptide comprises a leader sequence (e.g., SEQ ID NO: 23) positioned in a manner as follows (N-terminus to C-terminus): X-A-B-C, and the fusion polypeptide comprises a threonine between X and A. In some embodiments, the fusion polypeptide comprises a leader sequence (e.g., SEQ ID NO: 23) positioned in a manner as follows (N-terminus to C-terminus): X-C-B-A, and the fusion polypeptide comprises a threonine between X and C.

In some embodiments, the fusion polypeptide comprises an amino acid sequence that is at least 85%, 90%, 91%, 92%, 93%, 94%, 95%, 97%, or 99% identical to any of the TβRII polypeptide amino acid sequences disclosed herein (e.g., SEQ ID NO: 18), wherein the TβRII polypeptide portion of the fusion polypeptide comprises no more than 10, 9, 8, 7, 6, 5, 4, 3, 2 or 1 additional amino acids (but which may include further post-translational modifications, such as PEGylation). In some embodiments, the fusion polypeptide comprises an amino acid sequence that is at least 85%, 90%, 91%, 92%, 93%, 94%, 95%, 97%, or 99% identical to any of the linker sequences disclosed herein (e.g., SEQ ID NO: 6), wherein the linker portion of the fusion polypeptide comprises no more than 5, 4, 3, 2 or 1 additional amino acids (but which may include further post-translational modifications, such as PEGylation). In some embodiments, the fusion polypeptide comprises an amino acid sequence that is at least 85%, 90%, 91%, 92%, 93%, 94%, 95%, 97%, or 99% identical to any of the heterologous portion sequences disclosed herein (e.g., SEQ ID NO: 20), wherein the heterologous portion of the fusion polypeptide comprises no more than 25, 20, 15, 10, 5, 4, 3, 2, or 1 additional amino acids (but which may include further post-translational modifications, such as PEGylation). In some embodiments, the fusion polypeptide comprises any of the TβRII polypeptide amino acid sequences disclosed herein (e.g., SEQ ID NO: 18), wherein the TβRII polypeptide portion of the fusion polypeptide comprises no more than 10, 9, 8, 7, 6, 5, 4, 3, 2 or 1 additional amino acids (but which may include further post-translational modifications, such as PEGylation). In some embodiments, the fusion polypeptide comprises any of the linker sequences disclosed herein (e.g., SEQ ID NO: 6), wherein the linker portion of the fusion polypeptide comprises no more than 5, 4, 3, 2 or 1 additional amino acids (but which may include further post-translational modifications, such as PEGylation). In some embodiments, the fusion polypeptide comprises any of the heterologous portion sequences disclosed herein (e.g., SEQ ID NO: 20 or 72), wherein the heterologous portion of the fusion polypeptide comprises no more than 25, 20, 15, 10, 5, 4, 3, 2, or 1 additional amino acids (but which may include further post-translational modifications, such as PEGylation).

In some embodiments, the disclosure provides for a fusion polypeptide, wherein the fusion polypeptide consists or consists essentially of (and not necessarily in the following order): a) an amino acid sequence that is at least 85%, 90%, 91%, 92%, 93%, 94%, 95%, 97%, or 99% identical to any of the TβRII polypeptide amino acid sequences disclosed herein (e.g., SEQ ID NO: 18), wherein the TβRII polypeptide portion of the fusion polypeptide comprises no more than 10, 9, 8, 7, 6, 5, 4, 3, 2 or 1 additional amino acids (but which may include further post-translational modifications, such as PEGylation); b) an amino acid sequence that is at least 85%, 90%, 91%, 92%, 93%, 94%, 95%, 97%, or 99% identical to any of the linker sequences disclosed herein (e.g., SEQ ID NO: 6), wherein the linker portion of the fusion polypeptide comprises no more than 5, 4, 3, 2 or 1 additional amino acids (but which may include further post-translational modifications, such as PEGylation); and c) an amino acid sequence that is at least 85%, 90%, 91%, 92%, 93%, 94%, 95%, 97%, or 99% identical to any of the heterologous portion sequences disclosed herein (e.g., SEQ ID NO: 20 or 72), wherein the heterologous portion of the fusion polypeptide comprises no more than 25, 20, 15, 10, 5, 4, 3, 2, or 1 additional amino acids (but which may include further post-translational modifications, such as PEGylation); and d) optionally a leader sequence (e.g., SEQ ID NO: 23). In some embodiments, the disclosure provides for a fusion polypeptide, wherein the fusion polypeptide consists or consists essentially of (and not necessarily in the following order): a) any of the TβRII polypeptide amino acid sequences disclosed herein (e.g., SEQ ID NO: 18), wherein the TβRII polypeptide portion of the fusion polypeptide comprises no more than 10, 9, 8, 7, 6, 5, 4, 3, 2 or 1 additional amino acids (but which may include further post-translational modifications, such as PEGylation); b) any of the linker sequences disclosed herein (e.g., SEQ ID NO: 6), wherein the linker portion of the fusion polypeptide comprises no more than 5, 4, 3, 2 or 1 additional amino acids (but which may include further post-translational modifications, such as PEGylation); and c) any of the heterologous portion sequences disclosed herein (e.g., SEQ ID NO: 20 or 72), wherein the heterologous portion of the fusion polypeptide comprises no more than 25, 20, 15, 10, 5, 4, 3, 2, or 1 additional amino acids (but which may include further post-translational modifications, such as PEGylation); and d) optionally a leader sequence (e.g., SEQ ID NO: 23).

In some embodiments, the disclosure provides for a fusion polypeptide consisting of or consisting essentially of (and not necessarily in the following order): a) a TβRII polypeptide portion consisting of an amino acid sequence that is at least 85%, 90%, 91%, 92%, 93%, 94%, 95%, 97%, or 99% identical to the amino acid sequence of SEQ ID NO: 18 and no more than 10, 9, 8, 7, 6, 5, 4, 3, 2 or 1 additional amino acids (but which may include further post-translational modifications, such as PEGylation); b) a linker portion consisting of an amino acid sequence that is at least 85%, 90%, 91%, 92%, 93%, 94%, 95%, 97%, or 99% identical to the amino acid sequence of SEQ ID NO: 6 and no more than 5, 4, 3, 2 or 1 additional amino acids (but which may include further post-translational modifications, such as PEGylation); and c) a heterologous portion consisting of an amino acid sequence that is at least 85%, 90%, 91%, 92%, 93%, 94%, 95%, 97%, or 99% identical to the amino acid sequence of SEQ ID NO: 20 or SEQ ID NO: 72 and no more than 25, 20, 15, 10, 5, 4, 3, 2, or 1 additional amino acids (but which may include further post-translational modifications, such as PEGylation); and d) optionally a leader sequence (e.g., SEQ ID NO: 23). In some embodiments, the disclosure provides for a fusion polypeptide consisting or consisting essentially of (and not necessarily in the following order): a) a TβRII polypeptide portion consisting of the amino acid sequence of SEQ ID NO: 18 and no more than 10, 9, 8, 7, 6, 5, 4, 3, 2 or 1 additional amino acids (but which may include further post-translational modifications, such as PEGylation); b) a linker portion consisting of the amino acid sequence of SEQ ID NO: 6 and no more than 5, 4, 3, 2 or 1 additional amino acids (but which may include further post-translational modifications, such as PEGylation); and c) a heterologous portion consisting of the amino acid sequence of SEQ ID NO: 20 or SEQ ID NO: 72 and no more than 25, 20, 15, 10, 5, 4, 3, 2, or 1 additional amino acids (but which may include further post-translational modifications, such as PEGylation); and d) optionally a leader sequence (e.g., SEQ ID NO: 23).

In some embodiments, the fusion protein does not comprise a leader sequence. In some embodiments, the fusion protein comprises an amino acid sequence that is at least 85%, 90%, 91%, 92%, 93%, 94%, 95%, 96%, 97%, 99%, or 100% identical to the amino acid sequence of SEQ ID NO: 48.

```
                                         (SEQ ID NO: 48)
TIPPHVQKSDVEMEAQKDEIICPSCNRTAHPLRHINNDMIVTDNNGAVKF

PQLCKFCDVRFSTCDNQKSCMSNCSITSICEKPQEVCVAVWRKNDENITL

ETVCHDPKLPYHDFILEDAASPKCIMKEKKKPGETFFMCSCSSDECNDNI

IFSEEYNTSNPDTGGGSGGGGSGGGGSGGGGSTHTCPPCPAPELLGGPS

VFLFPPKPKDTLMISRTPEVTCVVVDVSHEDPEVKFNWYVDGVEVHNAKT

KPREEQYNSTYRVVSVLTVLHQDWLNGKEYKCKVSNKALPAPIEKTISKA

KGQPREPQVYTLPPSREEMTKNQVSLTCLVKGFYPSDIAVEWESNGQPEN

NYKTTPPVLDSDGSFFLYSKLTVDKSRWQQGNVFSCSVMHEALHNHYTQK

SLSLSPGK.
```

In some embodiments, the C-terminal lysine residue of the Fc domain can be deleted. In some embodiments, the amino acid sequence of SEQ ID NO: 48 may optionally be provided with the lysine removed from the C-terminus (SEQ ID NO: 67):

```
                                         (SEQ ID NO: 67)
TIPPHVQKSDVEMEAQKDEIICPSCNRTAHPLRHINNDMIVTDNNGAVKF

PQLCKFCDVRFSTCDNQKSCMSNCSITSICEKPQEVCVAVWRKNDENITL

ETVCHDPKLPYHDFILEDAASPKCIMKEKKKPGETFFMCSCSSDECNDNI

IFSEEYNTSNPDTGGGSGGGGSGGGGSGGGGSTHTCPPCPAPELLGGPS

VFLFPPKPKDTLMISRTPEVTCVVVDVSHEDPEVKFNWYVDGVEVHNAKT

KPREEQYNSTYRVVSVLTVLHQDWLNGKEYKCKVSNKALPAPIEKTISKA

KGQPREPQVYTLPPSREEMTKNQVSLTCLVKGFYPSDIAVEWESNGQPEN

NYKTTPPVLDSDGSFFLYSKLTVDKSRWQQGNVFSCSVMHEALHNHYTQK

SLSLSPG.
```

In some embodiments, the disclosure provides for a TβRII fusion polypeptide wherein the polypeptide does not comprise an antibody or antigen-binding portion thereof. In some embodiments, the polypeptide does not bind with appreciable affinity to a cytokine other than a transforming growth factor beta superfamily ligand (e.g., TGFβ1, TGFβ2 and/or TGFβ3). In some embodiments, the polypeptide does not bind with appreciable affinity to a cytokine other than TGFβ1, TGFβ2 and/or TGFβ3. In some embodiments, the polypeptide does not bind with appreciable affinity to a cytokine other than TGFβ1 and/or TGFβ3. In some embodiments, the polypeptide does not bind with appreciable affinity to CD4, CD8, CD25, CTLA-4, IL-10, TGFβ Receptor, PD-1, PD-L1, PD-L2, RANK, RANKL, HER2/neu, EGFR1, CD20, VEGF, TNF-α, TNFR2, FoxP3, CD80, CD86, IFN-α, IFN-β, IFN-γ, GITR, 4-1BB, OX-40, TLR1-10, ErbB-1, HER1, ErbB-3/HiER3, ErbB-4/HiER4, IGFR, IGFBP, IGF-1R, PDGFR, FGFR, VEGFR, HGFR, TRK receptor, ephrin receptors, AXL receptors, LTK receptors, TIE receptors, angiopoietin1, 2, ROR receptor, DDR receptor, RET receptor, KLG receptor, RYK receptor, MuSK receptor, ILβR, IIαR, TNTRSF, TRAIL receptor, ARTC1, alpha-actinin-4, Bcr-abl, B-RAF, caspases, beta-catenin, fibronectin, GPNMB, GDP-L, LDLR, HLA-A2, MLA-A11, HSP70, KIAA205, MART2, MUM-1, 2, 3, PAP, neo-PAP, NFYC, OGT, OS-9, pm1-RARalpha fusion protein, PRDX5, PTPRK, KRAS2, NRAS, HRAS, RBAF600, SIRT2. SNRPD1, SYT-SSX1 or -SSX2 fusion protein, Triosephosphate Isomerase, BAGE, BAGE-1. BAGE-2, 3, 4, 5, GAGE-1, 2, 3, 4, 5, 6, 7, 8, GnT-V, HERV-K MEL, KK-LC, KM-HN-1, LAGE, LAGE-1, CAMEL, MAGE-1, MAGE-A2, MAGE-A3, MAGE-A4, MAGE-AS, MAGE-A6, MAGE-A8, MAGE-A9, MAGE-A10. MAGE-A11, MAGE-A12, MAGE-3, MAGE-B1, MAGE-B2, MAGE-B5. MAGE-B6, MAGE-C1, MAGE-C2, mucin 1 (MUC1), MART-1/Melan-A (MLANA), gp100, gp100/Pme117 (S1LV), tyrosinase (TYR), TRP-1, HAGE, NA-88, NY-ESO-1, NY-ESO-1/LAGE-2, SAGE, Sp17. SSX-1, 2, 3, 4, TRP2-1NT2, carcino-embryonic antigen (CEA), Kallikfein 4, mammaglobm-A, OA1, prostate specific antigen (PSA), prostate specific membrane antigen, TRP-1/, 75. TRP-2, AIM-2. BING-4, CPSF, cyclin D1, Ep-CAM, EpbA3, FGF-5, gp250, iCE), AFP, M-CSF, mdm-2, MUC1, p53 (TP53), PBF, FRAME, PSMA, RAGE-1. RNF43, RU2AS, SOX10, STEAP1, survivin (BIRCS), hTERT, telomerase, WT1, SYCP1, BRDT, SPANX, XAGE, ADAM2, PAGE-5, LIP1, CTAGE-1, CSAGE, MMA1, CAGE, BORIS, HOM-TES-85, AF15q14, HCA66I, LDHC, MORC, SGY-1, SPO11, TPX1, NY-SAR-35, FTHLI7, NXF2 TDRD1, TEX 15, FATE, TPTE, estrogen receptors (ER), androgen receptors (AR), CD40, CD30, CD20, CD19, CD33, CD4, CD25, CD3, CA 72-4, CA 15-3, CA 27-29, CA 125, CA 19-9, beta-human chorionic gonadotropin, 1-2 microglobulin, squamous cell carcinoma antigen, neuron-specific enoJase, heat shock protein gp96, GM2, sargramostim, CTLA-4, 707-AP, ART-4, CAP-1, CLCA2, Cyp-B, HST-2, HPV proteins, EBV proteins, Hepatitis B or C virus proteins, and/or HIV proteins.

In some embodiments, the disclosure provides for a TβRII fusion polypeptide wherein the polypeptide does not comprise an additional ligand binding domain in addition to the TβRII domain. In some embodiments, the polypeptide comprises a linear amino acid sequence comprising a TβRII domain and a heterologous portion (e.g., an Fc portion), but the linear amino acid sequence does not comprise any additional ligand binding domains. In some embodiments, the polypeptide comprises a linear amino acid sequence comprising a TβRII domain and an Fc portion, but the linear amino acid sequence does not comprise any additional ligand binding domains. In some embodiments, the disclosure provides for a TβRII fusion polypeptide wherein the polypeptide does not comprise multiple ligand binding domains in a single linear amino acid sequence. In some embodiments, the disclosure provides for a TβRII fusion polypeptide wherein the polypeptide does not comprise more than one continuous linker sequence in a single linear amino acid sequence. In some embodiments, the polypeptide does not comprise multiple continuous glycine and/or serine linkers (e.g., a linker comprising (GGGGS)n, wherein n=≥4 (SEQ ID NO: 59)) in a single linear amino acid sequence. In some embodiments, the disclosure provides for a TβRII fusion polypeptide wherein the heterologous portion is an Fc domain, and wherein only one continuous linker is covalently bound to the Fc domain. In some embodiments, the only one continuous linker comprises or consists of a (GGGGS)n linker, wherein n=≥4 (SEQ ID NO: 59).

7. Nucleic Acids and Methods of Manufacture

In certain embodiments, the present disclosure makes available isolated and/or purified forms of the TβRII polypeptides fusion proteins, which are isolated from, or otherwise substantially free of (e.g., at least 80%, 90%, 91%, 92%, 93%, 94%, 95%, 96%, 97%, 98%, or 99% free of), other proteins and/or other TβRII polypeptide species. TβRII polypeptides will generally be produced by expression from recombinant nucleic acids.

In certain embodiments, the disclosure includes nucleic acids encoding soluble TβRII polypeptides comprising the coding sequence for an extracellular portion of a TβRII protein. In further embodiments, this disclosure also pertains to a host cell comprising such nucleic acids. The host cell may be any prokaryotic or eukaryotic cell. For example, a polypeptide of the present disclosure may be expressed in bacterial cells such as *E. coli*, insect cells (e.g., using a baculovirus expression system), yeast, or mammalian cells. Other suitable host cells are known to those skilled in the art.

Accordingly, some embodiments of the present disclosure further pertain to methods of producing the TβRII polypeptides.

In certain aspects, the disclosure provides isolated and/or recombinant nucleic acids encoding any of the TβRII polypeptides, including fragments, functional variants and fusion proteins disclosed herein. SEQ ID NOs: 10, 12 and 14 encode variants of TβRII extracellular domain fused to an IgG Fc domain. The subject nucleic acids may be single-stranded or double stranded. Such nucleic acids may be DNA or RNA molecules. These nucleic acids may be used, for example, in methods for making TβRII polypeptides or as direct therapeutic agents (e.g., in an antisense, RNAi or gene therapy approach).

In certain aspects, the subject nucleic acids encoding TβRII polypeptides are further understood to include nucleic acids that are variants of SEQ ID NOs: 10, 12 and 14. Variant nucleotide sequences include sequences that differ by one or more nucleotide substitutions, additions or deletions, such as allelic variants.

In certain embodiments, the disclosure provides isolated or recombinant nucleic acid sequences that are at least 80%, 85%, 90%, 91%, 92%, 93%, 94%, 95%, 96%, 97%, 98%, 99% or 100% identical to SEQ ID NOs: 10, 12 and 14. In particular embodiments, the disclosure provides isolated or recombinant nucleic acid sequences that are at least 80%, 85%, 90%, 91%, 92%, 93%, 94%, 95%, 96%, 97%, 98%, 99% or 100% identical to SEQ ID NO: 12, or fragments thereof. One of ordinary skill in the art will appreciate that nucleic acid sequences complementary to SEQ ID NOs: 10, 12 and 14, and variants of SEQ ID NOs: 10, 12 and 14 are also within the scope of this disclosure. In further embodiments, the nucleic acid sequences of the disclosure can be isolated, recombinant, and/or fused with a heterologous nucleotide sequence, or in a DNA library.

In other embodiments, nucleic acids of the disclosure also include nucleotide sequences that hybridize under highly stringent conditions to the nucleotide sequences designated in SEQ ID NOs: 10, 12 and 14 complement sequences of SEQ ID NOs: 10, 12 and 14, or fragments thereof. As discussed above, one of ordinary skill in the art will understand readily that appropriate stringency conditions which promote DNA hybridization can be varied. For example, one could perform the hybridization at 6.0× sodium chloride/sodium citrate (SSC) at about 45° C., followed by a wash of 2.0×SSC at 50° C. For example, the salt concentration in the wash step can be selected from a low stringency of about 2.0×SSC at 50° C. to a high stringency of about 0.2×SSC at 50° C. In addition, the temperature in the wash step can be increased from low stringency conditions at room temperature, about 22° C., to high stringency conditions at about 65° C. Both temperature and salt may be varied, or temperature or salt concentration may be held constant while the other variable is changed. In some embodiments, the disclosure provides nucleic acids which hybridize under low stringency conditions of 6×SSC at room temperature followed by a wash at 2×SSC at room temperature.

Isolated nucleic acids which differ from the nucleic acids as set forth in SEQ ID NOs: 10, 12 and 14 due to degeneracy in the genetic code are also within the scope of the disclosure. For example, a number of amino acids are designated by more than one triplet. Codons that specify the same amino acid, or synonyms (for example, CAU and CAC are synonyms for histidine) may result in "silent" mutations which do not affect the amino acid sequence of the protein. However, it is expected that DNA sequence polymorphisms that do lead to changes in the amino acid sequences of the subject proteins will exist among mammalian cells. One skilled in the art will appreciate that these variations in one or more nucleotides (up to about 3-5% of the nucleotides) of the nucleic acids encoding a particular protein may exist among individuals of a given species due to natural allelic variation. Any and all such nucleotide variations and resulting amino acid polymorphisms are within the scope of this disclosure.

It will be appreciated by one of skill in the art that corresponding variants based on the long isoform of TβRII will include nucleotide sequences encoding the 25-amino acid insertion along with a conservative Val-Ile substitution at the flanking position C-terminal to the insertion. It will also be appreciated that corresponding variants based on either the long (A) or short (B) isoforms of TβRII will include variant nucleotide sequences comprising an insertion of 108 nucleotides, encoding a 36-amino-acid insertion (SEQ ID NO: 41), at the same location described for naturally occurring TβRII isoform C.

In certain embodiments, the recombinant nucleic acids of the disclosure may be operably linked to one or more regulatory nucleotide sequences in an expression construct. Regulatory nucleotide sequences will generally be appropriate to the host cell used for expression. Numerous types of appropriate expression vectors and suitable regulatory sequences are known in the art for a variety of host cells. Typically, said one or more regulatory nucleotide sequences may include, but are not limited to, promoter sequences, leader or signal sequences, ribosomal binding sites, transcriptional start and termination sequences, translational start and termination sequences, and enhancer or activator sequences. Constitutive or inducible promoters as known in the art are contemplated by the disclosure. The promoters may be either naturally occurring promoters, or hybrid promoters that combine elements of more than one promoter. An expression construct may be present in a cell on an episome, such as a plasmid, or the expression construct may be inserted in a chromosome. In a preferred embodiment, the expression vector contains a selectable marker gene to allow the selection of transformed host cells. Selectable marker genes are well known in the art and will vary with the host cell used.

In certain aspects disclosed herein, the subject nucleic acid is provided in an expression vector comprising a nucleotide sequence encoding a TβRII polypeptide and operably linked to at least one regulatory sequence. Regulatory sequences are art-recognized and are selected to direct expression of the TβRII polypeptide. Accordingly, the term regulatory sequence includes promoters, enhancers, and other expression control elements. Exemplary regulatory sequences are described in Goeddel; *Gene Expression Technology: Methods in Enzymology*, Academic Press, San Diego, CA (1990). For instance, any of a wide variety of expression control sequences that control the expression of a DNA sequence when operatively linked to it may be used in these vectors to express DNA sequences encoding a TβRII polypeptide. Such useful expression control sequences, include, for example, the early and late promoters of SV40, tet promoter, adenovirus or cytomegalovirus immediate early promoter, RSV promoters, the lac system, the trp system, the TAC or TRC system, T7 promoter whose expression is directed by T7 RNA polymerase, the major operator and promoter regions of phage lambda, the control regions for fd coat protein, the promoter for 3-phosphoglycerate kinase or other glycolytic enzymes, the promoters of acid phosphatase, e.g., Pho5, the promoters of the yeast α-mating factors, the polyhedron promoter of the baculovirus system and other sequences known to control the expression of genes of prokaryotic or eukaryotic cells or their viruses, and various combinations thereof. It should be understood that the design of the expression vector may depend on such factors as the choice of the host cell to be transformed and/or the type of protein desired to be expressed. Moreover, the vector's copy number, the ability to control that copy number and the expression of any other protein encoded by the vector, such as antibiotic markers, should also be considered.

A recombinant nucleic acid included in the disclosure can be produced by ligating the cloned gene, or a portion thereof, into a vector suitable for expression in either prokaryotic cells, eukaryotic cells (yeast, avian, insect or mammalian), or both. Expression vehicles for production of a recombinant TβRII polypeptide include plasmids and other vectors. For instance, suitable vectors include plasmids of the types: pBR322-derived plasmids, pEMBL-derived plasmids, pEX-derived plasmids, pBTac-derived plasmids and pUC-derived plasmids for expression in prokaryotic cells, such as *E. coli*.

Some mammalian expression vectors contain both prokaryotic sequences to facilitate the propagation of the vector in bacteria, and one or more eukaryotic transcription units that are expressed in eukaryotic cells. The pcDNAI/amp, pcDNAI/neo, pRc/CMV, pSV2gpt, pSV2neo, pSV2-dhfr, pTk2, pRSVneo, pMSG, pSVT7, pko-neo and pHyg derived vectors are examples of mammalian expression vectors suitable for transfection of eukaryotic cells. Some of these vectors are modified with sequences from bacterial plasmids, such as pBR322, to facilitate replication and drug resistance selection in both prokaryotic and eukaryotic cells. Alternatively, derivatives of viruses such as the bovine papilloma virus (BPV-1), or Epstein-Barr virus (pHEBo, pREP-derived and p205) can be used for transient expression of proteins in eukaryotic cells. Examples of other viral (including retroviral) expression systems can be found below in the description of gene therapy delivery systems. The various methods employed in the preparation of the plasmids and in transformation of host organisms are well known in the art. For other suitable expression systems for both prokaryotic and eukaryotic cells, as well as general recombinant procedures, see *Molecular Cloning A Laboratory Manual*, 3rd Ed., ed. by Sambrook, Fritsch and Maniatis (Cold Spring Harbor Laboratory Press, 2001). In some instances, it may be desirable to express the recombinant polypeptides by the use of a baculovirus expression system. Examples of such baculovirus expression systems include pVL-derived vectors (such as pVL1392, pVL1393 and pVL941), pAcUW-derived vectors (such as pAcUW1), and pBlueBac-derived vectors (such as the β-gal containing pBlueBac III).

In certain embodiments, a vector will be designed for production of the subject TβRII polypeptides in CHO cells, such as a Pcmv-Script vector (Stratagene, La Jolla, Calif), pcDN4 vectors (Invitrogen, Carlsbad, Calif) and pCI-neo vectors (Promega, Madison, Wisc.). In a preferred embodiment, a vector will be designed for production of the subject TβRII polypeptides in HEK-293 cells. As will be apparent, the subject gene constructs can be used to cause expression of the subject TβRII polypeptides in cells propagated in culture, e.g., to produce proteins, including fusion proteins or variant proteins, for purification.

This disclosure also pertains to a host cell transfected with a recombinant gene including a coding sequence (e.g., SEQ ID NOs: 10, 12, or 14) for one or more of the subject TβRII polypeptides. The host cell may be any prokaryotic or eukaryotic cell. For example, a TβRII polypeptide disclosed herein may be expressed in bacterial cells such as *E. coli*, insect cells (e.g., using a baculovirus expression system), yeast, or mammalian cells. Other suitable host cells are known to those skilled in the art.

Accordingly, the present disclosure further pertains to methods of producing the subject TβRII polypeptides. For example, a host cell transfected with an expression vector encoding a TβRII polypeptide can be cultured under appropriate conditions to allow expression of the TβRII polypeptide to occur. The TβRII polypeptide may be secreted and isolated from a mixture of cells and medium containing the TβRII polypeptide. Alternatively, the TβRII polypeptide may be retained cytoplasmically or in a membrane fraction and the cells harvested, lysed and the protein isolated. A cell culture includes host cells, and media. Suitable media for cell culture are well known in the art. The subject TβRII polypeptides can be isolated from cell culture medium, host cells, or both, using techniques known in the art for purifying proteins, including ion-exchange chromatography, gel filtration chromatography, ultrafiltration, electrophoresis, immunoaffinity purification with antibodies specific for particular epitopes of the TβRII polypeptides and affinity purification with an agent that binds to a domain fused to the TβRII polypeptide (e.g., a protein A column may be used to purify an TβRII-Fc fusion). In a preferred embodiment, the TβRII polypeptide is a fusion protein containing a domain which facilitates its purification. As an example, purification may be achieved by a series of column chromatography steps, including, for example, three or more of the following, in any order: protein A chromatography, Q sepharose chromatography, phenylsepharose chromatography, size exclusion chromatography, and cation exchange chromatography. The purification could be completed with viral filtration and buffer exchange.

In another embodiment, a fusion gene coding for a purification leader sequence, such as a poly-(His)/enterokinase cleavage site sequence at the N-terminus of the desired portion of the recombinant TβRII polypeptide, can allow purification of the expressed fusion protein by affinity chromatography using a Ni$^{2+}$ metal resin. The purification leader sequence can then be subsequently removed by treatment with enterokinase to provide the purified TβRII polypeptide (e.g., see Hochuli et al., (1987) *J. Chromatography* 411:177; and Janknecht et al., *PNAS USA* 88:8972).

Techniques for making fusion genes are well known. Essentially, the joining of various DNA fragments coding for different polypeptide sequences is performed in accordance with conventional techniques, employing blunt-ended or stagger-ended termini for ligation, restriction enzyme digestion to provide for appropriate termini, filling-in of cohesive ends as appropriate, alkaline phosphatase treatment to avoid undesirable joining, and enzymatic ligation. In another embodiment, the fusion gene can be synthesized by conventional techniques including automated DNA synthesizers. Alternatively, PCR amplification of gene fragments can be carried out using anchor primers which give rise to complementary overhangs between two consecutive gene fragments which can subsequently be annealed to generate a chimeric gene sequence (see, for example, *Current Protocols in Molecular Biology*, eds. Ausubel et al., John Wiley & Sons: 1992).

8. Alterations in Fc-Fusion Proteins

The application further provides TβRII-Fc fusion proteins with engineered or variant Fc regions. Such antibodies and Fc fusion proteins may be useful, for example, in modulating effector functions, such as, antigen-dependent cytotoxicity (ADCC) and complement-dependent cytotoxicity (CDC). Additionally, the modifications may improve the stability of the antibodies and Fc fusion proteins. Amino acid sequence variants of the antibodies and Fc fusion proteins are prepared by introducing appropriate nucleotide changes into the DNA, or by peptide synthesis. Such variants include, for example, deletions from, and/or insertions into and/or substitutions of, residues within the amino acid sequences of the antibodies and Fc fusion proteins disclosed herein. Any combination of deletion, insertion, and substitution is made to arrive at the final construct, provided that the final construct possesses the desired characteristics. The amino acid changes also may alter post-translational processes of the antibodies and Fc fusion proteins, such as changing the number or position of glycosylation sites.

Antibodies and Fc fusion proteins with reduced effector function may be produced by introducing changes in the amino acid sequence, including, but are not limited to, the Ala-Ala mutation described by Bluestone et al. (see WO 94/28027 and WO 98/47531; also see Xu et al. 2000 Cell Immunol 200; 16-26). Thus, in certain embodiments, Fc fusion proteins of the disclosure with mutations within the constant region including the Ala-Ala mutation may be used to reduce or abolish effector function. According to these embodiments, antibodies and Fc fusion proteins may comprise a mutation to an alanine at position 234 or a mutation to an alanine at position 235, or a combination thereof. In one embodiment, the antibody or Fc fusion protein comprises an IgG4 framework, wherein the Ala-Ala mutation would describe a mutation(s) from phenylalanine to alanine at position 234 and/or a mutation from leucine to alanine at position 235. In another embodiment, the antibody or Fc fusion protein comprises an IgG1 framework, wherein the Ala-Ala mutation would describe a mutation(s) from leucine to alanine at position 234 and/or a mutation from leucine to alanine at position 235. The antibody or Fc fusion protein may alternatively or additionally carry other mutations, including the point mutation K322A in the CH2 domain (Hezareh et al. 2001 J Virol. 75: 12161-8).

In particular embodiments, the antibody or Fc fusion protein may be modified to either enhance or inhibit complement dependent cytotoxicity (CDC). Modulated CDC activity may be achieved by introducing one or more amino acid substitutions, insertions, or deletions in an Fc region (see, e.g., U.S. Pat. No. 6,194,551). Alternatively, or additionally, cysteine residue(s) may be introduced in the Fc region, thereby allowing interchain disulfide bond formation in this region. The homodimeric antibody thus generated may have improved or reduced internalization capability and/or increased or decreased complement-mediated cell killing. See Caron et al., J. Exp Med. 176:1191-1195 (1992) and Shopes, B. J. Immunol. 148:2918-2922 (1992), WO99/51642, Duncan & WinterNature 322: 738-40 (1988); U.S. Pat. Nos. 5,648,260; 5,624,821; and WO94/29351.

9. Antibody Antagonists

In certain aspects, a TβRII antagonist to be used in accordance with the methods and uses disclosed herein is an antibody, or combination of antibodies. An antibody TβRII antagonist may inhibit and/or bind to, for example, one or more TβRII ligands (e.g., TGFβ 1, TGFβ2, and/or TGFβ3), the TβRII receptor, TβRII-associated type I receptor (e.g., ALK5), and/or TβRII co-receptor (e.g., betaglycan). In some embodiments, the ability for an antibody TβRII antagonist antibody to inhibit activity (e.g., Smad signaling) and/or bind to a target is determined in an in vitro or cell-based assay including, for example, those disclosed herein. As described herein, an antibody TβRII antagonist may be used alone or in combination with one or more additional active agents or supportive therapies to treat SSc or one or more complications of SSc (e.g., SSc-ILD).

In certain embodiments, a TβRII antagonist is an antibody that inhibits at least TGFβ1. Therefore, in some embodiments, an antibody TβRII antagonist binds to at least TGFβ1. As used herein, a TGFβ1 antibody (anti-TGFβ1 antibody) generally refers to an antibody that is capable of binding to TGFβ1 with sufficient affinity such that the antibody is useful as a diagnostic and/or therapeutic agent in targeting TGFβ 1. In certain embodiments, the extent of binding of an anti-TGFβ1 antibody to an unrelated, non-TGFβ1 protein is less than about 10%, 9%, 8%, 7%, 6%, 5%, 4%, 3%, 2%, or less than 1% of the binding of the antibody to TGFβ1 as measured, for example, by a radioimmunoassay (RIA). In certain embodiments, an anti-TGFβ1 antibody binds to an epitope of TGFβ1 that is conserved among TGFβ1 from different species. In certain preferred embodiments, an anti-TGFβ1 antibody binds to human TGFβ1. In some embodiments, a TGFβ1 antibody may inhibit TGFβ1 from binding to a type I, type II, and/or co-receptor (e.g., TβRII, ALK5, and/or betaglycan) and thus inhibit TGFβ1-mediated signaling (e.g., Smad signaling). It should be noted that TGFβ1 shares some sequence homology to TGFβ2 and TGFβ3. Therefore, antibodies that bind TGFβ1, in some embodiments, may also bind to TGFβ2 and/or TGFβ3. In some embodiments, the disclosure relates to a multispecific antibody (e.g., bi-specific antibody), and uses thereof, that binds to TGFβ1 and further binds to, for example, one or more additional TβRII ligands (e.g., TGFβ2, TGFβ3, or TGFβ2 and TGFβ3), one or more type I and/or type II receptors (e.g., TβRII and ALK5), and/or one or more co-receptors (e.g., betaglycan). In some embodiments, a multispecific antibody that binds to TGFβ1 does not bind or does not substantially bind to TGFβ2 (e.g., binds to TGFβ2 with a $K_D$ of greater than $1 \times 10^{-7}$ M or has relatively modest binding, e.g., about $1 \times 10^{-8}$ M or about $1 \times 10^{-9}$ M). In some embodiments, a multispecific antibody that binds to TGFβ1 further binds to TGFβ3 but does not bind or does not substantially bind to TGFβ2 (e.g., binds to TGFβ2 with a $K_D$ of greater than $1 \times 10^{-7}$ M or has relatively modest binding, e.g., about $1 \times 10^{-8}$ M or about $1 \times 10^{-9}$ M). In some embodiments, the disclosure relates to combinations of antibodies, and uses thereof, wherein the combination of antibodies comprises a TGFβ1 antibody and one or more additional antibodies that bind to, for example, one or more additional TβRII ligands (e.g., TGFβ2, TGFβ3, or TGFβ2 and TGFβ3), one or more type I and/or type II receptors (e.g., TβRII and ALK5), and/or one or more co-receptors (e.g., betaglycan). In some embodiments, a combination of antibodies that comprises a TGFβ1 antibody does not comprise a TGFβ2 antibody. In some embodiments, a combination of antibodies that comprises a TGFβ1 antibody further comprises a TGFβ3 antibody but does not comprise a TGFβ2 antibody.

In certain embodiments, an antibody TβRII antagonist is an antibody that inhibits at least TGFβ2. Therefore, in some embodiments, an antibody TβRII antagonist antibody binds to at least TGFβ2. As used herein, a TGFβ2 antibody (anti-TGFβ2 antibody) generally refers to an antibody that is capable of binding to TGFβ2 with sufficient affinity such that the antibody is useful as a diagnostic and/or therapeutic agent in targeting TGFβ2. In certain embodiments, the extent of binding of an anti-TGFβ2 antibody to an unrelated, non-TGFβ2 protein is less than about 10%, 9%, 8%, 7%, 6%, 5%, 4%, 3%, 2%, or less than 1% of the binding of the antibody to TGFβ2 as measured, for example, by a radioimmunoassay (RIA). In certain embodiments, an anti-TGFβ2 antibody binds to an epitope of TGFβ2 that is conserved among TGFβ2 from different species. In certain preferred embodiments, an anti-TGFβ2 antibody binds to human TGFβ2. In some embodiments, a TGFβ2 antibody may inhibit TGFβ2 from binding to a type I, type II, and/or co-receptor (e.g., TβRII, ALK5, and/or betaglycan) and thus inhibit TGFβ2 activity (e.g., Smad signaling). It should be noted that TGFβ2 shares some sequence homology to TGFβ1 and TGFβ3. Therefore, antibodies that bind TGFβ2, in some embodiments, may also bind to TGFβ1 and/or TGFβ3. In some embodiments, the disclosure relates to a multispecific antibody (e.g., bi-specific antibody), and uses thereof, that binds to TGFβ2 and further binds to, for example, one or more additional TβRII ligands (e.g., TGFβ1, TGFβ3, or TGFβ1 and TGFβ3), one or more type I and/or type II receptors (e.g., TβRII and ALK5), and/or one or more co-receptors (e.g., betaglycan) In some embodiments, the disclosure relates to combinations of antibodies, and uses thereof, wherein the combination of antibodies comprises a TGFβ2 antibody and one or more additional antibodies that bind to, for example, one or more additional TβRII ligands (e.g., TGFβ1, TGFβ3, or TGFβ1 and TGFβ3), one or more type I and/or type II receptors (e.g., TβRII and ALK5), and/or one or more co-receptors (e.g., betaglycan).

In certain embodiments, an antibody TβRII antagonist is an antibody that inhibits at least TGFβ3. Therefore, in some embodiments, an antibody TβRII antagonist antibody binds to at least TGFβ3. As used herein, a TGFβ3 antibody (anti-TGFβ3 antibody) generally refers to an antibody that is capable of binding to TGFβ3 with sufficient affinity such that the antibody is useful as a diagnostic and/or therapeutic agent in targeting TGFβ3. In certain embodiments, the extent of binding of an anti-TGFβ3 antibody to an unrelated, non-TGFβ3 protein is less than about 10%, 9%, 8%, 7%, 6%, 5%, 4%, 3%, 2%, or less than 1% of the binding of the antibody to TGFβ3 as measured, for example, by a radioimmunoassay (RIA). In certain embodiments, an anti-TGFβ3 antibody binds to an epitope of TGFβ3 that is conserved among TGFβ3 from different species. In certain preferred embodiments, an anti-TGFβ3 antibody binds to human TGFβ3. In some embodiments, a TGFβ3 antibody may inhibit TGFβ3 from binding to a type I, type II, and/or co-receptor (e.g., TβRII, ALK5, and/or betaglycan) and thus inhibit TGFβ3 activity (e.g., Smad signaling). It should be noted that TGFβ3 shares some sequence homology to TGFβ2 and TGFβ1. Therefore, antibodies that bind TGFβ3, in some embodiments, may also bind to TGFβ2 and/or TGFβ1. In some embodiments, the disclosure relates to a multispecific antibody (e.g., bi-specific antibody), and uses thereof, that binds to TGFβ3 and further binds to, for example, one or more additional TβRII ligands (e.g., TGFβ2, TGFβ1, or TGFβ2 and TGFβ1), one or more type I and/or type II receptors (e.g., TβRII and ALK5), and/or one or more co-receptors (e.g., betaglycan). In some embodiments, a multispecific antibody that binds to TGFβ3 does not bind or does not substantially bind to TGFβ2 (e.g., binds to TGFβ2 with a $K_D$ of greater than $1 \times 10^{-7}$ M or has relatively modest binding, e.g., about $1 \times 10^{-8}$ M or about $1 \times 10^{-9}$ M). In some embodiments, a multispecific antibody that binds to TGFβ3 further binds to TGFβ1 but does not bind or does not substantially bind to TGFβ2 (e.g., binds to TGFβ2 with a $K_D$ of greater than $1 \times 10^{-7}$ M or has relatively modest binding, e.g., about $1 \times 10^{-8}$ M or about $1 \times 10^{-9}$ M).

In some embodiments, the disclosure relates to combinations of antibodies, and uses thereof, wherein the combination of antibodies comprises a TGFβ3 antibody and one or more additional antibodies that bind to, for example, one or more additional TβRII ligands (e.g., TGFβ2, TGFβ 1, or TGFβ2 and TGFβ 1), one or more type I and/or type II receptors (e.g., TβRII and ALK5), and/or one or more co-receptors (e.g., betaglycan). In some embodiments, a combination of antibodies that comprises a TGFβ3 antibody does not comprise a TGFβ2 antibody. In some embodiments, a combination of antibodies that comprises a TGFβ3 antibody further comprises a TGFβ1 antibody but does not comprise a TGFβ2 antibody.

In certain aspects, an antibody TβRII antagonist is an antibody that inhibits at least the TβRII receptor. Therefore, in some embodiments, an antibody TβRII antagonist binds to at least the TβRII receptor. As used herein, a TβRII receptor antibody generally refers to an antibody that binds to a TβRII receptor with sufficient affinity such that the antibody is useful as a diagnostic and/or therapeutic agent in targeting a TβRII receptor. In certain embodiments, the extent of binding of an anti-TβRII receptor antibody to an unrelated, non-TβRII receptor protein is less than about 10%, 9%, 8%, 7%, 6%, 5%, 4%, 3%, 2%, or less than about 1% of the binding of the antibody to the TβRII receptor as measured, for example, by a radioimmunoassay (RIA), Biacore, or other protein-protein interaction or binding affinity assay. In certain embodiments, an anti-TβRII receptor antibody binds to an epitope of a TβRII receptor that is conserved among TβRII receptors from different species. In certain preferred embodiments, an anti-TβRII receptor antibody binds to a human TβRII receptor. In some embodiments, an anti-TβRII receptor antibody may inhibit one or more TβRII ligands [e.g., TGFβ 1; TGFβ2; TGFβ3; TGFβ1 and TGFβ3; TGFβ1 and TGFβ2; TGFβ2 and TGFβ3; or TGFβ1, TGFβ2, and TGFβ3] from binding to a TβRII receptor. In some embodiments, an anti-TβRII receptor antibody is a multispecific antibody (e.g., bi-specific antibody) that binds to a TβRII receptor and one or more TβRII ligands [e.g., TGFβ1, TGFβ2, and TGFβ3], type I receptor (e.g., ALK5), and/or co-receptor (e.g., betaglycan). In some embodiments, the disclosure relates to combinations of antibodies, and uses thereof, wherein the combination of antibodies comprises an anti-TβRII receptor antibody and one or more additional antibodies that bind to, for example, one or more TβRII ligands [e.g., TGFβ1, TGFβ2, and TGFβ3], type I receptors (e.g., ALK5), and/or co-receptor (e.g., betaglycan).

In certain aspects, an antibody TβRII antagonist is an antibody that inhibits at least ALK5. Therefore, in some embodiments, an antibody TβRII antagonist antibody binds to at least ALK5. As used herein, an ALK5 antibody (anti-ALK5 antibody) generally refers to an antibody that binds to ALK5 with sufficient affinity such that the antibody is useful as a diagnostic and/or therapeutic agent in targeting ALK5. In certain embodiments, the extent of binding of an anti-ALK5 antibody to an unrelated, non-ALK5 protein is less than about 10%, 9%, 8%, 7%, 6%, 5%, 4%, 3%, 2%, or less than about 1% of the binding of the antibody to ALK5 as measured, for example, by a radioimmunoassay (RIA), Biacore, or other protein-protein interaction or binding affinity assay. In certain embodiments, an anti-ALK5 antibody binds to an epitope of ALK5 that is conserved among ALK5 from different species. In certain preferred embodiments, an anti-ALK5 antibody binds to human ALK5. In some embodiments, an anti-ALK5 antibody may inhibit one or more TβRII ligands [e.g., TGFβ1; TGFβ2; TGFβ3; TGFβ1 and TGFβ3; TGFβ1 and TGFβ2; TGFβ2 and TGFβ3; or TGFβ1, TGFβ2, and TGFβ3] from binding to ALK5. In some embodiments, an anti-ALK5 antibody is a multispecific antibody (e.g., bi-specific antibody) that binds to ALK5 and one or more TβRII ligands [e.g., TGFβ1, TGFβ2, and TGFβ3], type II receptor (e.g., TβRII), and/or co-receptor (e.g., betaglycan). In some embodiments, the disclosure relates to combinations of antibodies, and uses thereof, wherein the combination of antibodies comprises an anti-ALK5 antibody and one or more additional antibodies that bind to, for example, one or more TβRII ligands [e.g., TGFβ1, TGFβ2, and TGFβ3], type II receptors (e.g., TβRII), and/or co-receptor (e.g., betaglycan).

In certain aspects, an antibody TβRII antagonist is an antibody that inhibits at least betaglycan. Therefore, in some embodiments, an antibody TβRII antagonist binds to at least betaglycan. As used herein, a betaglycan antibody (anti-betaglycan antibody) generally refers to an antibody that binds to betaglycan with sufficient affinity such that the antibody is useful as a diagnostic and/or therapeutic agent in targeting betaglycan. In certain embodiments, the extent of binding of an anti-betaglycan antibody to an unrelated, non-betaglycan protein is less than about 10%, 9%, 8%, 7%, 6%, 5%, 4%, 3%, 2%, or less than about 1% of the binding of the antibody to betaglycan as measured, for example, by a radioimmunoassay (RIA), Biacore, or other protein-protein interaction or binding affinity assay. In certain embodiments, an anti-betaglycan antibody binds to an epitope of betaglycan that is conserved among betaglycan from different species. In certain preferred embodiments, an anti-betaglycan antibody binds to human betaglycan. In some embodiments, an anti-betaglycan antibody may inhibit one or more TβRII ligands [e.g., TGFβ1; TGFβ2; TGFβ3; TGFβ1 and TGFβ3; TGFβ1 and TGFβ2; TGFβ2 and TGFβ3; or TGFβ1, TGFβ2, and TGFβ3] from binding to betaglycan. In some embodiments, an anti-betaglycan antibody is a multispecific antibody (e.g., bi-specific antibody) that binds to betaglycan and one or more TβRII ligands [e.g., TGFβ1, TGFβ2, and TGFβ3], type I receptor (e.g., ALK5), and/or type II receptors (e.g., TβRII). In some embodiments, the disclosure relates to combinations of antibodies, and uses thereof, wherein the combination of antibodies comprises an anti-betaglycan antibody and one or more additional antibodies that bind to, for example, one or more TβRII ligands [e.g., TGFβ1, TGFβ2, and TGFβ3], type I receptors (e.g., ALK5), and/or type II receptors (e.g., TβRII).

The term antibody is used herein in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity. An antibody fragment refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; single-chain antibody molecules (e.g., scFv); and multispecific antibodies formed from antibody fragments. See, e.g., Hudson et al. (2003) Nat. Med. 9:129-134; Plückthun, in The Pharmacology of Monoclonal Antibodies, vol. 113, Rosenburg and Moore eds., (Springer-Verlag, New York), pp. 269-315 (1994); WO 93/16185; and U.S. Pat. Nos. 5,571,894, 5,587,458, and 5,869,046. Antibodies disclosed herein may be polyclonal antibodies or monoclonal antibodies. In certain embodiments, the antibodies of the present disclosure comprise a label attached thereto and able to be detected (e.g., the label can be a radioisotope, fluorescent compound, enzyme, or enzyme co-factor). In preferred embodiments, the antibodies of the present disclosure are isolated antibodies. Diabodies are antibody fragments with two antigen-binding sites that may be bivalent or bispecific. See, e.g., EP 404,097; WO 1993/01161; Hudson et al. (2003) Nat. Med. 9:129-134 (2003); and Hollinger et al. (1993) Proc. Natl. Acad. Sci. USA 90: 6444-6448. Triabodies and tetrabodies are also described in Hudson et al. (2003) Nat. Med. 9:129-134. Single-domain antibodies are antibody fragments comprising all or a portion of the heavy-chain variable domain or all or a portion of the light-chain variable domain of an antibody. In certain embodiments, a single-domain antibody is a human single-domain antibody. See, e.g., U.S. Pat. No. 6,248,516. Antibody fragments can be made by various techniques, including but not limited to proteolytic digestion of an intact antibody as well as production by recombinant host cells (e.g., E. coli or phage), as described herein.

The antibodies herein may be of any class. The class of an antibody refers to the type of constant domain or constant region possessed by its heavy chain. There are five major classes of antibodies: IgA, IgD, IgE, IgG, and IgM, and several of these may be further divided into subclasses (isotypes), for example, $IgG_1$, $IgG_2$, $IgG_3$, $IgG_4$, $IgA_1$, and $IgA_2$. The heavy-chain constant domains that correspond to the different classes of immunoglobulins are called alpha, delta, epsilon, gamma, and mu.

In general, an antibody for use in the methods disclosed herein specifically binds to its target antigen, preferably with high binding affinity. Affinity may be expressed as a $K_D$ value and reflects the intrinsic binding affinity (e.g., with minimized avidity effects). Typically, binding affinity is measured in vitro, whether in a cell-free or cell-associated setting. Any of a number of assays known in the art, including those disclosed herein, can be used to obtain binding affinity measurements including, for example, surface plasmon resonance (Biacore™ assay), radiolabeled antigen binding assay (RIA), and ELISA. In some embodiments, antibodies of the present disclosure bind to their target antigens (e.g. TGFβ1, TGFβ2, TGFβ2, ALK5, betaglycan, and TβRII.) with at least a $K_D$ of $1\times10^{-7}$ or stronger, $1\times10^{-8}$ or stronger, $1\times10^{-9}$ or stronger, $1\times10^{-10}$ or stronger, $1\times10^{11}$ or stronger, $1\times10^{12}$ or stronger, $1\times10^{-13}$ or stronger, or $1\times10^{-14}$ or stronger.

In certain embodiments, $K_D$ is measured by RIA performed with the Fab version of an antibody of interest and its target antigen as described by the following assay. Solution binding affinity of Fabs for the antigen is measured by equilibrating Fab with a minimal concentration of radiolabeled antigen (e.g., $^{125}$I-labeled) in the presence of a titration series of unlabeled antigen, then capturing bound antigen with an anti-Fab antibody-coated plate [see, e.g., Chen et al. (1999) J. Mol. Biol. 293:865-881]. To establish conditions for the assay, multi-well plates (e.g., MICROTITER® from Thermo Scientific) are coated (e.g., overnight) with a capturing anti-Fab antibody (e.g., from Cappel Labs) and subsequently blocked with bovine serum albumin, preferably at room temperature (e.g., approximately 23° C.). In a non-adsorbent plate, radiolabeled antigen are mixed with serial dilutions of a Fab of interest [e.g., consistent with assessment of the anti-VEGF antibody, Fab-12, in Presta et al., (1997) Cancer Res. 57:4593-4599]. The Fab of interest is then incubated, preferably overnight but the incubation may continue for a longer period (e.g., about 65 hours) to ensure that equilibrium is reached. Thereafter, the mixtures are transferred to the capture plate for incubation, preferably at room temperature for about one hour. The solution is then removed and the plate is washed times several times, preferably with polysorbate 20 and PBS mixture. When the plates have dried, scintillant (e.g., MICROSCINT® from Packard) is added, and the plates are counted on a gamma counter (e.g., TOPCOUNT® from Packard).

According to another embodiment, $K_D$ is measured using surface plasmon resonance assays using, for example a BIACORE® 2000 or a BIACORE®3000 (Biacore, Inc., Piscataway, N.J.) with immobilized antigen CM5 chips at about 10 response units (RU). Briefly, carboxymethylated dextran biosensor chips (CM5, Biacore, Inc.) are activated with N-ethyl-N'-(3-dimethylaminopropyl)-carbodiimide hydrochloride (EDC) and N-hydroxysuccinimide (NHS) according to the supplier's instructions. For example, an antigen can be diluted with 10 mM sodium acetate, pH 4.8, to 5 μg/ml (about 0.2 μM) before injection at a flow rate of 5 μl/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20®) surfactant (PBST) at a flow rate of approximately 25 μl/min. Association rates ($k_{on}$) and dissociation rates ($k_{off}$) are calculated using, for example, a simple one-to-one Langmuir binding model (BIACORE® Evaluation Software version 3.2) by simultaneously fitting the association and dissociation sensorgrams. The equilibrium dissociation constant ($K_D$) is calculated as the ratio $k_{off}/k_{on}$ [see, e.g., Chen et al., (1999) J. Mol. Biol. 293:865-881]. If the on-rate exceeds, for example, $10^6$ $M^{-1}$ $s^{-1}$ by the surface plasmon resonance assay above, then the on-rate can be determined by using a fluorescent quenching technique that measures the increase or decrease in fluorescence emission intensity (e.g., excitation=295 nm; emission=340 nm, 16 nm band-pass) of a 20 nM anti-antigen antibody (Fab form) in PBS in the presence of increasing concentrations of antigen as measured in a spectrometer, such as a stop-flow equipped spectrophotometer (Aviv Instruments) or a 8000-series SLM-AMINCO® spectrophotometer (ThermoSpectronic) with a stirred cuvette.

The nucleic acid and amino acid sequences of TβRII, ALK5, betaglycan, TGFβ1, TGFβ2, and TGFβ3, particularly human sequences, are well known in the art and thus antibody antagonists for use in accordance with this disclosure may be routinely made by the skilled artisan based on the knowledge in the art and teachings provided herein.

In certain embodiments, an antibody provided herein is a chimeric antibody. A chimeric antibody refers to an antibody in which a portion of the heavy and/or light chain is derived from a particular source or species, while the remainder of the heavy and/or light chain is derived from a different source or species. Certain chimeric antibodies are described, for example, in U.S. Pat. No. 4,816,567; and Morrison et al., (1984) Proc. Natl. Acad. Sci. USA, 81:6851-6855. In some embodiments, a chimeric antibody comprises a non-human variable region (e.g., a variable region derived from a mouse, rat, hamster, rabbit, or non-human primate, such as a monkey) and a human constant region. In some embodiments, a chimeric antibody is a "class switched" antibody in which the class or subclass has been changed from that of the parent antibody. In general, chimeric antibodies include antigen-binding fragments thereof.

In certain embodiments, a chimeric antibody provided herein is a humanized antibody. A humanized antibody refers to a chimeric antibody comprising amino acid residues from non-human hypervariable regions (HVRs) and amino acid residues from human framework regions (FRs). In certain embodiments, a humanized antibody will comprise substantially all of at least one, and typically two, variable domains, in which all or substantially all of the HVRs (e.g., CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization. Humanized antibodies and methods of making them are reviewed, for example, in Almagro and Fransson (2008) Front. Biosci. 13:1619-1633 and are further described, for example, in Riechmann et al., (1988) Nature 332:323-329; Queen et al. (1989) Proc. Nat'l Acad. Sci. USA 86:10029-10033; U.S. Pat. Nos. 5,821,337, 7,527,791, 6,982,321, and 7,087,409; Kashmiri et al., (2005) Methods 36:25-34 [describing SDR (a-CDR) grafting]; Padlan, Mol. Immunol. (1991) 28:489-498 (describing "resurfacing"); Dall'Acqua et al. (2005) Methods 36:43-60 (describing "FR shuffling"); Osbourn et al. (2005) Methods 36:61-68; and Klimka et al. Br. J. Cancer (2000) 83:252-260 (describing the "guided selection" approach to FR shuffling).

Human framework regions that may be used for humanization include but are not limited to: framework regions selected using the "best-fit" method [see, e.g., Sims et al. (1993) J. Immunol. 151:2296]; framework regions derived from the consensus sequence of human antibodies of a particular subgroup of light-chain or heavy-chain variable regions [see, e.g., Carter et al. (1992) Proc. Natl. Acad. Sci. USA, 89:4285; and Presta et al. (1993) J. Immunol., 151: 2623]; human mature (somatically mutated) framework regions or human germline framework regions [see, e.g., Almagro and Fransson (2008) Front. Biosci. 13:1619-1633]; and framework regions derived from screening FR libraries [see, e.g., Baca et ed., (1997) J. Biol. Chem. 272:10678-10684; and Rosok et ed., (1996) J. Biol. Chem. 271:22611-22618].

In certain embodiments, an antibody provided herein is a human antibody. Human antibodies can be produced using various techniques known in the art. Human antibodies are described generally in van Dijk and van de Winkel (2001) Curr. Opin. Pharmacol. 5: 368-74 and Lonberg (2008) Curr. Opin. Immunol. 20:450-459.

In some embodiments, human antibodies may be prepared by administering an immunogen (e.g., a TβRII, ALK5, betaglycan, TGFβ1, TGFβ2, or TGFβ3 polypeptide) to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic animals, the endogenous immunoglobulin loci have generally been inactivated. For a review of methods for obtaining human antibodies from transgenic animals, see, for example, Lonberg (2005) Nat. Biotechnol. 23:1117-1125; U.S. Pat. Nos. 6,075,181 and 6,150,584 (describing XENOMOUSE™ technology); U.S. Pat. No. 5,770,429 (describing HuMab® technology); U.S. Pat. No. 7,041,870 (describing K-M MOUSE® technology); and U.S. Patent Application Publication No. 2007/0061900 (describing VelociMouse® technology). Human variable regions from intact antibodies generated by such animals may be further modified, for example, by combining with a different human constant region.

Human antibodies provided herein can also be made by hybridoma-based methods. Human myeloma and mouse-human heteromyeloma cell lines for the production of human monoclonal antibodies have been described [see, e.g., Kozbor J. Immunol., (1984) 133: 3001; Brodeur et al. (1987) Monoclonal Antibody Production Techniques and Applications, pp. 51-63, Marcel Dekker, Inc., New York; and Boerner et al. (1991) J. Immunol., 147: 86]. Human antibodies generated via human B-cell hybridoma technology are also described in Li et al., (2006) Proc. Natl. Acad. Sci. USA, 103:3557-3562. Additional methods include those described, for example, in U.S. Pat. No. 7,189,826 (describing production of monoclonal human IgM antibodies from hybridoma cell lines) and Ni, Xiandai Mianyixue (2006) 26(4):265-268 (2006) (describing human-human hybridomas). Human hybridoma technology (Trioma technology) is also described in Vollmers and Brandlein (2005) Histol. Histopathol., 20(3):927-937 (2005) and Vollmers and Brandlein (2005) Methods Find Exp. Clin. Pharmacol., 27(3):185-91.

Human antibodies provided herein may also be generated by isolating Fv clone variable-domain sequences selected from human-derived phage display libraries. Such variable-domain sequences may then be combined with a desired human constant domain. Techniques for selecting human antibodies from antibody libraries are described herein.

For example, antibodies of the present disclosure may be isolated by screening combinatorial libraries for antibodies with the desired activity or activities. A variety of methods are known in the art for generating phage-display libraries and screening such libraries for antibodies possessing the desired binding characteristics. Such methods are reviewed, for example, in Hoogenboom et al. (2001) in Methods in Molecular Biology 178:1-37, O'Brien et al., ed., Human Press, Totowa, N.J. and further described, for example, in the McCafferty et al. (1991) Nature 348:552-554; Clackson et al., (1991) Nature 352: 624-628; Marks et al. (1992) J. Mol. Biol. 222:581-597; Marks and Bradbury (2003) in Methods in Molecular Biology 248:161-175, Lo, ed., Human Press, Totowa, N.J.; Sidhu et al. (2004) J. Mol. Biol. 338(2):299-310; Lee et al. (2004) J. Mol. Biol. 340(5):1073-1093; Fellouse (2004) Proc. Natl. Acad. Sci. USA 101(34): 12467-12472; and Lee et al. (2004) J. Immunol. Methods 284(1-2): 119-132.

In certain phage display methods, repertoires of VH and VL genes are separately cloned by polymerase chain reaction (PCR) and recombined randomly in phage libraries, which can then be screened for antigen-binding phage as described in Winter et al. (1994) Ann. Rev. Immunol., 12: 433-455. Phage typically display antibody fragments, either as single-chain Fv (scFv) fragments or as Fab fragments. Libraries from immunized sources provide high-affinity antibodies to the immunogen (e.g., a betaglycan, TβRII, TGFβ 1, TGFβ2, or TGFβ3 polypeptide) without the requirement of constructing hybridomas. Alternatively, the naive repertoire can be cloned (e.g., from human) to provide a single source of antibodies directed against a wide range of non-self and also self-antigens without any immunization as described by Griffiths et al. (1993) EMBO J, 12: 725-734. Finally, naive libraries can also be made synthetically by cloning un-rearranged V-gene segments from stem cells and using PCR primers containing random sequence to encode the highly variable CDR3 regions and to accomplish rearrangement in vitro, as described by Hoogenboom and Winter (1992) J. Mol. Biol., 227: 381-388. Patent publications describing human antibody phage libraries include, for example: U.S. Pat. No. 5,750,373, and U.S. Patent Publication Nos. 2005/0079574, 2005/0119455, 2005/0266000, 2007/0117126, 2007/0160598, 2007/0237764, 2007/0292936, and 2009/0002360.

In certain embodiments, an antibody provided herein is a multispecific antibody, for example, a bispecific antibody. Multispecific antibodies (typically monoclonal antibodies) have binding specificities for at least two different epitopes (e.g., two, three, four, five, or six or more) on one or more (e.g., two, three, four, five, six or more) antigens. Engineered antibodies with three or more functional antigen binding sites, including "octopus antibodies," are also included herein (see, e.g., US 2006/0025576A1).

In certain embodiments, the antibodies disclosed herein are monoclonal antibodies. Monoclonal antibody refers to an antibody obtained from a population of substantially homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different epitopes, each monoclonal antibody of a monoclonal antibody preparation is directed against a single epitope on an antigen. Thus, the modifier "monoclonal" indicates the character of the antibody as being obtained from a substantially homogeneous population of antibodies and is not to be construed as requiring production of the antibody by any particular method. For example, the monoclonal antibodies to be used in accordance with the present methods may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

For example, by using immunogens derived from a TβRII receptor polypeptide, anti-protein/anti-peptide antisera or monoclonal antibodies can be made by standard protocols [see, e.g., Antibodies: A Laboratory Manual (1988) ed. by Harlow and Lane, Cold Spring Harbor Press]. A mammal, such as a mouse, hamster, or rabbit can be immunized with an immunogenic form of the TβRII polypeptide, an antigenic fragment which is capable of eliciting an antibody response, or a fusion protein. Techniques for conferring immunogenicity on a protein or peptide include conjugation to carriers or other techniques well known in the art. An immunogenic portion of a TβRII polypeptide can be administered in the presence of adjuvant. The progress of immunization can be monitored by detection of antibody titers in plasma or serum. Standard ELISA or other immunoassays can be used with the immunogen as antigen to assess the levels of antibody production and/or level of binding affinity.

Following immunization of an animal with an antigenic preparation of TβRII polypeptide, antisera can be obtained and, if desired, polyclonal antibodies can be isolated from the serum. To produce monoclonal antibodies, antibody-producing cells (lymphocytes) can be harvested from an immunized animal and fused by standard somatic cell fusion procedures with immortalizing cells such as myeloma cells to yield hybridoma cells. Such techniques are well known in the art, and include, for example, the hybridoma technique [see, e.g., Kohler and Milstein (1975) Nature, 256: 495-497], the human B cell hybridoma technique [see, e.g., Kozbar et al. (1983) Immunology Today, 4:72], and the EBV-hybridoma technique to produce human monoclonal antibodies [Cole et al. (1985) Monoclonal Antibodies and Cancer Therapy, Alan R. Liss, Inc. pp. 77-96]. Hybridoma cells can be screened immunochemically for production of antibodies specifically reactive with a TβRII polypeptide, and monoclonal antibodies isolated from a culture comprising such hybridoma cells.

In certain embodiments, one or more amino acid modifications may be introduced into the Fc region of an antibody provided herein thereby generating an Fc-region variant. The Fc-region variant may comprise a human Fc-region sequence (e.g., a human IgG1, IgG2, IgG3 or IgG4 Fc region) comprising an amino acid modification (e.g., a substitution, deletion, and/or addition) at one or more amino acid positions.

For example, the present disclosure contemplates an antibody variant that possesses some but not all effector functions, which make it a desirable candidate for applications in which the half-life of the antibody in vivo is important yet for which certain effector functions [e.g., complement-dependent cytotoxicity (CDC) and antibody-dependent cellular cytotoxicity (ADCC)] are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity), but retains FcRn binding ability. The primary cells for mediating ADCC, NK cells, express FcγRIII only, whereas monocytes express FcγRI, FcγRII and FcγRIII. FcR expression on hematopoietic cells is summarized in, for example, Ravetch and Kinet (1991) Annu. Rev. Immunol. 9:457-492. Non-limiting examples of in vitro assays to assess ADCC activity of a molecule of interest are described in U.S. Pat. No. 5,500,362; Hellstrom, I. et al. (1986) Proc. Nat'l Acad. Sci. USA 83:7059-7063; Hellstrom, I et al. (1985) Proc. Nat'l Acad. Sci. USA 82:1499-1502; U.S. Pat. No. 5,821,337; and Bruggemann, M. et al. (1987) J. Exp. Med. 166:1351-1361. Alternatively, non-radioactive assay methods may be employed (e.g., ACTI™, non-radioactive cytotoxicity assay for flow cytometry; Cell Technology, Inc. Mountain View, Calif; and CytoTox 96® non-radioactive cytotoxicity assay, Promega, Madison, Wis.). Useful effector cells for such assays include peripheral blood mononuclear cells (PBMC) and natural killer (NK) cells. Alternatively, or additionally, ADCC activity of the molecule of interest may be assessed in vivo, for example, in an animal model such as that disclosed in Clynes et al. (1998) Proc. Nat'l Acad. Sci. USA 95:652-656. C1q binding assays may also be carried out to confirm that the antibody is unable to bind C1q and hence lacks CDC activity [see, e.g., C1q and C3c binding ELISA in WO 2006/029879 and WO 2005/100402]. To assess complement activation, a CDC assay may be performed [see, e.g., Gazzano-Santoro et al. (1996) J. Immunol. Methods 202:163; Cragg, M. S. et al. (2003) Blood 101:1045-1052; and Cragg, M. S, and M. J. Glennie (2004) Blood 103:2738-2743]. FcRn binding and in vivo clearance/half-life determinations can also be performed using methods known in the art [see, e.g., Petkova, S. B. et al. (2006) Int. Immunol. 18(12):1759-1769].

Antibodies of the present disclosure with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

In certain embodiments, it may be desirable to create cysteine-engineered antibodies, e.g., "thioMAbs," in which one or more residues of an antibody are substituted with cysteine residues. In particular embodiments, the substituted residues occur at accessible sites of the antibody. By substituting those residues with cysteine, reactive thiol groups are thereby positioned at accessible sites of the antibody and may be used to conjugate the antibody to other moieties, such as drug moieties or linker-drug moieties, to create an immunoconjugate, as described further herein. In certain embodiments, any one or more of the following residues may be substituted with cysteine: V205 (Kabat numbering) of the light chain; A118 (EU numbering) of the heavy chain; and S400 (EU numbering) of the heavy-chain Fc region. Cysteine engineered antibodies may be generated as described, for example, in U.S. Pat. No. 7,521,541.

In addition, the techniques used to screen antibodies in order to identify a desirable antibody may influence the properties of the antibody obtained. For example, if an antibody is to be used for binding an antigen in solution, it may be desirable to test solution binding. A variety of different techniques are available for testing interaction between antibodies and antigens to identify particularly desirable antibodies. Such techniques include ELISAs, surface plasmon resonance binding assays (e.g., the Biacore™ binding assay, Biacore AB, Uppsala, Sweden), sandwich assays (e.g., the paramagnetic bead system of IGEN International, Inc., Gaithersburg, Maryland), western blots, immunoprecipitation assays, and immunohistochemistry.

In certain embodiments, amino acid sequence variants of the antibodies and/or the binding polypeptides provided herein are contemplated. For example, it may be desirable to improve the binding affinity and/or other biological properties of the antibody and/or binding polypeptide. Amino acid sequence variants of an antibody and/or binding polypeptides may be prepared by introducing appropriate modifications into the nucleotide sequence encoding the antibody and/or binding polypeptide, or by peptide synthesis. Such modifications include, for example, deletions from, and/or insertions into, and/or substitutions of residues within, the amino acid sequences of the antibody and/or binding polypeptide. Any combination of deletion, insertion, and substitution can be made to arrive at the final construct, provided that the final construct possesses the desired characteristics, e.g., target-binding (TβRII, ALK5, betaglycan, TGFβ1, TGFβ2, and/or TGFβ3).

Alterations (e.g., substitutions) may be made in HVRs, for example, to improve antibody affinity. Such alterations may be made in HVR "hotspots," i.e., residues encoded by codons that undergo mutation at high frequency during the somatic maturation process (see, e.g., Chowdhury (2008) Methods Mol. Biol. 207:179-196 (2008)), and/or SDRs (a-CDRs), with the resulting variant VH or VL being tested for binding affinity. Affinity maturation by constructing and reselecting from secondary libraries has been described in the art [see, e.g., Hoogenboom et al., in Methods in Molecular Biology 178:1-37, O'Brien et al., ed., Human Press, Totowa, N.J., (2001)]. In some embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves HVR-directed approaches, in which several HVR residues (e.g., 4-6 residues at a time) are randomized. HVR residues involved in antigen binding may be specifically identified, e.g., using alanine scanning mutagenesis or modeling. CDR-H3 and CDR-L3 in particular are often targeted.

In certain embodiments, substitutions, insertions, or deletions may occur within one or more HVRs so long as such alterations do not substantially reduce the ability of the antibody to bind to the antigen. For example, conservative alterations (e.g., conservative substitutions as provided herein) that do not substantially reduce binding affinity may be made in HVRs. Such alterations may be outside of HVR "hotspots" or SDRs. In certain embodiments of the variant VH and VL sequences provided above, each HVR either is unaltered, or contains no more than one, two, or three amino acid substitutions.

A useful method for identification of residues or regions of the antibody and/or the binding polypeptide that may be targeted for mutagenesis is called "alanine scanning mutagenesis", as described by Cunningham and Wells (1989) Science, 244:1081-1085. In this method, a residue or group of target residues (e.g., charged residues such as arg, asp, his, lys, and glu) are identified and replaced by a neutral or negatively charged amino acid (e.g., alanine or polyalanine) to determine whether the interaction of the antibody or binding polypeptide with antigen is affected. Further substitutions may be introduced at the amino acid locations demonstrating functional sensitivity to the initial substitutions. Alternatively, or additionally, a crystal structure of an antigen-antibody complex can be used to identify contact points between the antibody and antigen. Such contact residues and neighboring residues may be targeted or eliminated as candidates for substitution. Variants may be screened to determine whether they contain the desired properties.

Amino-acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include fusion of the N- or C-terminus of the antibody to an enzyme (e.g., for ADEPT) or a polypeptide which increases the serum half-life of the antibody.

In certain embodiments, an antibody and/or binding polypeptide provided herein may be further modified to contain additional non-proteinaceous moieties that are known in the art and readily available. The moieties suitable for derivatization of the antibody and/or binding polypeptide include but are not limited to water-soluble polymers. Non-limiting examples of water-soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone) polyethylene glycol, propropylene glycol homopolymers, prolypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody and/or binding polypeptide may vary, and if more than one polymer are attached, they can be the same or different molecules. In general, the number and/or type of polymers used for derivatization can be determined based on considerations including, but not limited to, the particular properties or functions of the antibody and/or binding polypeptide to be improved, whether the antibody derivative and/or binding polypeptide derivative will be used in a therapy under defined conditions.

10. Small Molecule Antagonists

In certain aspects, a TβRII antagonist to be used in accordance with the methods and uses disclosed herein is a small molecule (a small molecule TβRII antagonist), or combination of small molecules. A small molecule TβRII antagonist may inhibit, for example, one or more TβRII ligands (e.g., TGFβ 1, TGFβ2, and TGFβ3), TβRII receptor, TβRII-associated type I receptor (e.g., ALK5), TβRII-associated co-receptor (e.g., betaglycan), and/or downstream signaling component (e.g., Smad proteins). In some embodiments, the ability for a small molecule TβRII antagonist to inhibit signaling (e.g., Smad signaling) is determined in a cell-based assay including, for example, those described herein. A small molecule TβRII antagonist may be used alone or in combination with one or more additional active agents and/or supportive therapies to treat SSc or a clinical complication of SSc (e.g., SSc-ILD).

In certain aspects, a small molecule TβRII antagonist inhibits at least TGFβ1 (e.g., inhibition of Smad signaling). Therefore, in some embodiments, a small molecule inhibitor of TGFβ1 binds to TGFβ1. In some embodiments, a small molecule inhibitor of TGFβ1 inhibits expression (e.g., transcription, translation, secretion, or combinations thereof) of TGFβ 1. In some embodiments, a small molecule inhibitor of TGFβ1 further inhibits one or more of TGFβ2, TGFβ3, TβRII, ALK5, and betaglycan. In some embodiments, a small molecule inhibitor of TGFβ1 does not inhibit or does not substantially inhibit TGFβ2. In some embodiments, a small molecule inhibitor of TGFβ1 further inhibits TGFβ3 but does not inhibit or does not substantially inhibit TGFβ2. In certain aspects, a small molecule TβRII antagonist inhibits at least TGFβ2. Therefore, in some embodiments, a small molecule inhibitor of TGFβ2 binds to TGFβ2. In some embodiments, a small molecule inhibitor of TGFβ2 inhibits expression (e.g., transcription, translation, secretion, or combinations thereof) of TGFβ2. In some embodiments, a small molecule inhibitor of TGFβ2 further inhibits one or more of TGFβ3, TGFβ1, TβRII, ALK5, and betaglycan. In certain aspects, a small molecule TβRII antagonist inhibits at least TGFβ3. Therefore, in some embodiments, a small molecule inhibitor of TGFβ3 binds to TGFβ3. In some embodiments, a small molecule inhibitor of TGFβ3 inhibits expression (e.g., transcription, translation, secretion, or combinations thereof) of TGFβ3. In some embodiments, a small molecule inhibitor of TGFβ3 further inhibits one or more of TGFβ2, TGFβ1, TβRII, ALK5, and betaglycan. In some embodiments, a small molecule inhibitor of TGFβ3 does not inhibit or does not substantially inhibit TGFβ2. In some embodiments, a small molecule inhibitor of TGFβ3 further inhibits TGFβ1 but does not inhibit or does not substantially inhibit TGFβ2. In certain aspects, a small molecule TβRII antagonist inhibits at least a TβRII receptor. Therefore, in some embodiments, a small molecule inhibitor of TβRII binds to a TβRII receptor. In some embodiments, a small molecule inhibitor of TβRII inhibits expression (e.g., transcription, translation, secretion, or combinations thereof) of a TβRII receptor. In some embodiments, a small molecule inhibitor of a TβRII receptor further inhibits one or more of TGFβ1, TGFβ2, TGFβ3, ALK5, and betaglycan. In certain aspects, a small molecule TβRII antagonist inhibits TGFβ1 from binding to a TβRII receptor. In certain aspects, a small molecule TβRII antagonist small molecule inhibits TGFβ2 from binding to a TβRII receptor. In certain aspects, a small molecule TβRII antagonist inhibits TGFβ3 from binding to a TβRII receptor. In certain aspects, a small molecule TβRII antagonist inhibits TGFβ1 and TGFβ3 from binding to a TβRII receptor. In certain aspects, a small molecule TβRII antagonist inhibits TGFβ1, TGFβ2, and TGFβ3 from binding to a TβRII receptor. In certain aspects, a small molecule TβRII antagonist inhibits TGFβ1 from binding to a TβRII receptor but does not inhibit or does not substantially inhibit TGFβ2 from binding to a TβRII receptor. In certain aspects, a small molecule TβRII antagonist inhibits TGFβ3 from binding to a TβRII receptor but does not inhibit or does not substantially inhibit TGFβ2 from binding to a TβRII receptor. In certain aspects, a small molecule TβRII antagonist inhibits TGFβ1 and TGFβ3 from binding to a TβRII receptor but does not inhibit or does not substantially inhibit TGFβ2 from binding to a TβRII receptor. In certain aspects, a small molecule TβRII antagonist inhibits at least ALK5. Therefore, in some embodiments, a small molecule inhibitor of ALK5 binds to ALK5. In some embodiments, a small molecule inhibitor of ALK5 inhibits expression (e.g., transcription, translation, secretion, or combinations thereof) of ALK5. In some embodiments, a small molecule inhibitor of ALK5 further inhibits one or more of TGFβ 1, TGFβ2, TGFβ3, TβRII, and betaglycan. In certain aspects, a small molecule TβRII antagonist inhibits TGFβ1 from binding to ALK5. In certain aspects, a small molecule TβRII antagonist inhibits TGFβ2 from binding to ALK5. In certain aspects, a small molecule TβRII antagonist inhibits TGFβ3 from binding to ALK5. In certain aspects, a small molecule TβRII antagonist inhibits TGFβ1 and TGFβ3 from binding to ALK5. In certain aspects, a small molecule TβRII antagonist inhibits TGFβ1, TGFβ2, and TGFβ3 from binding to ALK5. In certain aspects, a small molecule TβRII antagonist inhibits TGFβ1 from binding to ALK5 but does not inhibit or does not substantially inhibit TGFβ2 from binding to ALK5. In certain aspects, a small molecule TβRII antagonist inhibits TGFβ3 from binding to ALK5 but does not inhibit or does not substantially inhibit TGFβ2 from binding to ALK5. In certain aspects, a small molecule TβRII antagonist inhibits TGFβ1 and TGFβ3 from binding to ALK5 but does not inhibit or does not substantially inhibit TGFβ2 from binding to ALK5. In certain aspects, a small molecule TβRII antagonist inhibits at least betaglycan. Therefore, in some embodiments, a small molecule inhibitor of betaglycan binds to betaglycan. In some embodiments, a small molecule inhibitor of betaglycan inhibits expression (e.g., transcription, translation, secretion, or combinations thereof) of betaglycan. In some embodiments, a small molecule inhibitor of betaglycan further inhibits one or more of TGFβ 1, TGFβ2, TGFβ3, TβRII, and ALK5. In certain aspects, a small molecule TβRII antagonist inhibits TGFβ1 from binding to betaglycan. In certain aspects, a small molecule TβRII antagonist inhibits TGFβ2 from binding to betaglycan. In certain aspects, a small molecule TβRII antagonist small molecule inhibits TGFβ3 from binding to betaglycan. In certain aspects, a small molecule TβRII antagonist inhibits TGFβ1 and TGFβ3 from binding to betaglycan. In certain aspects, a small molecule TβRII antagonist inhibits TGFβ1, TGFβ2, and TGFβ3 from binding to betaglycan. In certain aspects, a small molecule TβRII antagonist inhibits TGFβ1 from binding to betaglycan but does not inhibit or does not substantially inhibit TGFβ2 from binding to betaglycan. In certain aspects, a small molecule TβRII antagonist inhibits TGFβ3 from binding to betaglycan but does not inhibit or does not substantially inhibit TGFβ2 from binding to betaglycan. In certain aspects, a small molecule TβRII antagonist inhibits TGFβ1 and TGFβ3 from binding to betaglycan but does not inhibit or does not substantially inhibit TGFβ2 from binding to betaglycan.

Small molecule TβRII antagonist can be direct or indirect inhibitors. For example, a small molecule TβRII antagonist, or combination of small molecules, may inhibit the expression (e.g., transcription, translation, cellular secretion, or combinations thereof) of at least one or more of TβRII, ALK5, betaglycan, TGFβ 1, TGFβ2, TGFβ3, and/or one or more downstream TβRII signaling factors (Smads). Alternatively, a direct small molecule TβRII antagonist, or combination of small molecules, may directly bind to, for example, one or more of TβRII, ALK5, betaglycan, TGFβ1, TGFβ2, and TGFβ3 or one or more downstream TβRII signaling factors. Combinations of one or more indirect and one or more direct small molecule TβRII antagonist may be used in accordance with the methods and uses disclosed herein.

Binding organic small molecule antagonists of the present disclosure may be identified and chemically synthesized using known methodology (see, e.g., PCT Publication Nos. WO 00/00823 and WO 00/39585). In general, small molecule antagonists of the disclosure are usually less than about 2000 daltons in size, alternatively less than about 1500, 750, 500, 250 or 200 daltons in size, wherein such organic small molecules that are capable of binding, preferably specifically, to a polypeptide as described herein (e.g., TβRII, ALK5, betaglycan, TGFβ1, TGFβ2, and TGFβ3). Such small molecule antagonists may be identified without undue experimentation using well-known techniques. In this regard, it is noted that techniques for screening organic small molecule libraries for molecules that are capable of binding to a polypeptide target are well-known in the art (see, e.g., international patent publication Nos. WO00/00823 and WO00/39585).

Binding organic small molecules of the present disclosure may be, for example, aldehydes, ketones, oximes, hydrazones, semicarbazones, carbazides, primary amines, secondary amines, tertiary amines, N-substituted hydrazines, hydrazides, alcohols, ethers, thiols, thioethers, disulfides, carboxylic acids, esters, amides, ureas, carbamates, carbonates, ketals, thioketals, acetals, thioacetals, aryl halides, aryl sulfonates, alkyl halides, alkyl sulfonates, aromatic compounds, heterocyclic compounds, anilines, alkenes, alkynes, diols, amino alcohols, oxazolidines, oxazolines, thiazolidines, thiazolines, enamines, sulfonamides, epoxides, aziridines, isocyanates, sulfonyl chlorides, diazo compounds, and acid chlorides.

11. Antagonist Polynucleotides

In certain aspects, a TβRII antagonist to be used in accordance with the methods and uses disclosed herein is a polynucleotide (a polynucleotide TβRII antagonist), or combination of polynucleotides. A polynucleotide TβRII antagonist may inhibit, for example, one or more TβRII ligands (e.g., TGFβ 1, TGFβ2, and TGFβ3), TβRII receptor, TβRII-associated type I receptor (e.g., ALK5), TβRII-associated co-receptor (e.g., betaglycan), and/or downstream signaling component (e.g., Smad proteins). In some embodiments, the ability for a polynucleotide TβRII antagonist to inhibit signaling (e.g., Smad signaling) is determined in a cell-based assay including, for example, those described herein. A polynucleotide TβRII antagonist may be used alone or in combination with one or more additional active agents and/or supportive therapies to treat SSc or a clinical complication of SSc (e.g., SSc-ILD).

In certain aspects, a polynucleotide TβRII antagonist inhibits at least TGFβ1 (e.g., inhibition of Smad signaling). Therefore, in some embodiments, a polynucleotide inhibitor of TGFβ1 binds to TGFβ1. In some embodiments, a polynucleotide inhibitor of TGFβ1 inhibits expression (e.g., transcription, translation, secretion, or combinations thereof) of TGFβ 1. In some embodiments, a polynucleotide inhibitor of TGFβ1 further inhibits one or more of TGFβ2, TGFβ3, TβRII, ALK5, and betaglycan. In some embodiments, a polynucleotide inhibitor of TGFβ1 does not inhibit or does not substantially inhibit TGFβ2. In some embodiments, a polynucleotide inhibitor of TGFβ1 further inhibits TGFβ3 but does not inhibit or does not substantially inhibit TGFβ2. In certain aspects, a polynucleotide TβRII antagonist inhibits at least TGFβ2. Therefore, in some embodiments, a polynucleotide inhibitor of TGFβ2 binds to TGFβ2. In some embodiments, a polynucleotide inhibitor of TGFβ2 inhibits expression (e.g., transcription, translation, secretion, or combinations thereof) of TGFβ2. In some embodiments, a polynucleotide inhibitor of TGFβ2 further inhibits one or more of TGFβ3, TGFβ1, TβRII, ALK5, and betaglycan. In certain aspects, a polynucleotide TβRII antagonist inhibits at least TGFβ3. Therefore, in some embodiments, a polynucleotide inhibitor of TGFβ3 binds to TGFβ3. In some embodiments, a polynucleotide inhibitor of TGFβ3 inhibits expression (e.g., transcription, translation, secretion, or combinations thereof) of TGFβ3. In some embodiments, a polynucleotide inhibitor of TGFβ3 further inhibits one or more of TGFβ2, TGFβ1, TβRII, ALK5, and betaglycan. In some embodiments, a polynucleotide inhibitor of TGFβ3 does not inhibit or does not substantially inhibit TGFβ2. In some embodiments, a polynucleotide inhibitor of TGFβ3 further inhibits TGFβ1 but does not inhibit or does not substantially inhibit TGFβ2. In certain aspects, a polynucleotide TβRII antagonist inhibits at least a TβRII receptor. Therefore, in some embodiments, a polynucleotide inhibitor of TβRII binds to a TβRII receptor. In some embodiments, a polynucleotide inhibitor of TβRII inhibits expression (e.g., transcription, translation, secretion, or combinations thereof) of a TβRII receptor. In some embodiments, a polynucleotide inhibitor of a TβRII receptor further inhibits one or more of TGFβ 1, TGFβ2, TGFβ3, ALK5, and betaglycan. In some embodiments, a polynucleotide TβRII antagonist inhibits TGFβ1 from binding to a TβRII receptor. In some embodiments, a polynucleotide TβRII antagonist inhibits TGFβ2 from binding to a TβRII receptor. In some embodiments, a polynucleotide TβRII antagonist inhibits TGFβ3 from binding to a TβRII receptor. In some embodiments, a polynucleotide TβRII antagonist inhibits TGFβ1 and TGFβ3 from binding to a TβRII receptor. In some embodiments, a polynucleotide TβRII antagonist inhibits TGFβ1, TGFβ2, and TGFβ3 from binding to a TβRII receptor. In some embodiments, a polynucleotide TβRII antagonist inhibits TGFβ1 from binding to a TβRII receptor but does not inhibit or does not substantially inhibit TGFβ2 from binding to a TβRII receptor. In some embodiments, a polynucleotide TβRII antagonist inhibits TGFβ3 from binding to a TβRII receptor but does not inhibit or does not substantially inhibit TGFβ2 from binding to a TβRII receptor. In some embodiments, a polynucleotide TβRII antagonist inhibits TGFβ1 and TGFβ3 from binding to a TβRII receptor but does not inhibit or does not substantially inhibit TGFβ2 from binding to a TβRII receptor. In certain aspects, a polynucleotide TβRII antagonist inhibits at least ALK5. Therefore, in some embodiments, a polynucleotide inhibitor of ALK5 binds to ALK5. In some embodiments, a polynucleotide inhibitor of ALK5 inhibits expression (e.g., transcription, translation, secretion, or combinations thereof) of ALK5. In some embodiments, a polynucleotide inhibitor of ALK5 further inhibits one or more of TGFβ 1, TGFβ2, TGFβ3, TβRII, and betaglycan. In some embodiments, a polynucleotide TβRII antagonist inhibits TGFβ1 from binding to ALK5. In some embodiments, a polynucleotide TβRII antagonist inhibits TGFβ2 from binding to ALK5. In some embodiments, a polynucleotide TβRII antagonist inhibits TGFβ3 from binding to ALK5. In some embodiments, a polynucleotide TβRII antagonist inhibits TGFβ1 and TGFβ3 from binding to ALK5. In some embodiments, a polynucleotide TβRII antagonist inhibits TGFβ1, TGFβ2, and TGFβ3 from binding to ALK5. In some embodiments, a polynucleotide TβRII antagonist inhibits TGFβ1 from binding to ALK5 but does not inhibit or does not substantially inhibit TGFβ2 from binding to ALK5. In some embodiments, a polynucleotide TβRII antagonist inhibits TGFβ3 from binding to ALK5 but does not inhibit or does not substantially inhibit TGFβ2 from binding to ALK5. In some embodiments, a polynucleotide TβRII antagonist inhibits TGFβ1 and TGFβ3 from binding to ALK5 but does not inhibit or does not substantially inhibit TGFβ2 from binding to ALK5. In certain aspects, a polynucleotide TβRII antagonist inhibits at least betaglycan. Therefore, in some embodiments, a polynucleotide inhibitor of betaglycan binds to betaglycan. In some embodiments, a polynucleotide inhibitor of betaglycan inhibits expression (e.g., transcription, translation, secretion, or combinations thereof) of betaglycan. In some embodiments, a polynucleotide inhibitor of betaglycan further inhibits one or more of TGFβ 1, TGFβ2, TGFβ3, TβRII, and ALK5. In some embodiments, a polynucleotide TβRII antagonist inhibits TGFβ1 from binding to betaglycan. In some embodiments, a polynucleotide TβRII antagonist inhibits TGFβ2 from binding to betaglycan. In some embodiments, a polynucleotide TβRII antagonist inhibits TGFβ3 from binding to betaglycan. In some embodiments, a polynucleotide TβRII antagonist inhibits TGFβ1 and TGFβ3 from binding to betaglycan. In some embodiments, a polynucleotide TβRII antagonist inhibits TGFβ1, TGFβ2, and TGFβ3 from binding to betaglycan. In some embodiments, a polynucleotide TβRII antagonist inhibits TGFβ1 from binding to betaglycan but does not inhibit or does not substantially inhibit TGFβ2 from binding to betaglycan. In some embodiments, a polynucleotide TβRII antagonist inhibits TGFβ3 from binding to betaglycan but does not inhibit or does not substantially inhibit TGFβ2 from binding to betaglycan. In some embodiments, a polynucleotide TβRII antagonist inhibits TGFβ1 and TGFβ3 from binding to betaglycan but does not inhibit or does not substantially inhibit TGFβ2 from binding to betaglycan.

The polynucleotide antagonists of the present disclosure may be an antisense nucleic acid, an RNAi molecule [e.g., small interfering RNA (siRNA), small-hairpin RNA (shRNA), microRNA (miRNA)], an aptamer and/or a ribozyme. The nucleic acid and amino acid sequences of human TβRII, ALK5, betaglycan, TGFβ 1, TGFβ2, and TGFβ3 are known in the art and thus polynucleotide antagonists for use in accordance with methods of the present disclosure may be routinely made by the skilled artisan based on the knowledge in the art and teachings provided herein.

For example, antisense technology can be used to control gene expression through antisense DNA or RNA, or through triple-helix formation. Antisense techniques are discussed, for example, in Okano (1991) J. Neurochem. 56:560; Oligodeoxynucleotides as Antisense Inhibitors of Gene Expression, CRC Press, Boca Raton, Fla. (1988). Triple helix formation is discussed in, for instance, Cooney et al. (1988) Science 241:456; and Dervan et al., (1991) Science 251: 1300. The methods are based on binding of a polynucleotide to a complementary DNA or RNA. In some embodiments, the antisense nucleic acids comprise a single-stranded RNA or DNA sequence that is complementary to at least a portion of an RNA transcript of a desired gene. However, absolute complementarity, although preferred, is not required.

A sequence "complementary to at least a portion of an RNA," referred to herein, means a sequence having sufficient complementarity to be able to hybridize with the RNA, forming a stable duplex; in the case of double-stranded antisense nucleic acids of a gene disclosed herein, a single strand of the duplex DNA may thus be tested, or triplex formation may be assayed. The ability to hybridize will depend on both the degree of complementarity and the length of the antisense nucleic acid. Generally, the larger the hybridizing nucleic acid, the more base mismatches with an RNA it may contain, and still form a stable duplex (or triplex as the case may be). One skilled in the art can ascertain a tolerable degree of mismatch by use of standard procedures to determine the melting point of the hybridized complex.

Polynucleotides that are complementary to the 5' end of the message, for example, the 5'-untranslated sequence up to and including the AUG initiation codon, should work most efficiently at inhibiting translation. However, sequences complementary to the 3'-untranslated sequences of mRNAs have been shown to be effective at inhibiting translation of mRNAs as well [see, e.g., Wagner, R., (1994) Nature 372:333-335]. Thus, oligonucleotides complementary to either the 5'- or 3'-untranslated, noncoding regions of a gene of the disclosure, could be used in an antisense approach to inhibit translation of an endogenous mRNA. Polynucleotides complementary to the 5'-untranslated region of the mRNA should include the complement of the AUG start codon. Antisense polynucleotides complementary to mRNA coding regions are less efficient inhibitors of translation but could be used in accordance with the methods of the present disclosure. Whether designed to hybridize to the 5'-untranslated, 3'-untranslated, or coding regions of an mRNA of the disclosure, antisense nucleic acids should be at least six nucleotides in length, and are preferably oligonucleotides ranging from 6 to about 50 nucleotides in length. In specific aspects, the oligonucleotide is at least 10 nucleotides, at least 17 nucleotides, at least 25 nucleotides, or at least 50 nucleotides.

In one embodiment, the antisense nucleic acid of the present disclosure is produced intracellularly by transcription from an exogenous sequence. For example, a vector or a portion thereof, is transcribed, producing an antisense nucleic acid (RNA) of a gene of the disclosure. Such a vector would contain a sequence encoding the desired antisense nucleic acid. Such a vector can remain episomal or become chromosomally integrated, as long as it can be transcribed to produce the desired antisense RNA. Such vectors can be constructed by recombinant DNA technology methods standard in the art. Vectors can be plasmid, viral, or others known in the art, used for replication and expression in vertebrate cells. Expression of the sequence encoding desired genes of the instant disclosure, or fragments thereof, can be by any promoter known in the art to act in vertebrate, preferably human cells. Such promoters can be inducible or constitutive. Such promoters include, but are not limited to, the SV40 early promoter region [see, e.g., Benoist and Chambon (1981) Nature 29:304-310], the promoter contained in the 3' long terminal repeat of Rous sarcoma virus [see, e.g., Yamamoto et al. (1980) Cell 22:787-797], the herpes thymidine promoter [see, e.g., Wagner et al. (1981) Proc. Natl. Acad. Sci. U.S.A. 78:1441-1445], and the regulatory sequences of the metallothionein gene [see, e.g., Brinster, et al. (1982) Nature 296:39-42].

In some embodiments, the polynucleotide antagonists are interfering RNA or RNAi molecules that target the expression of one or more genes. RNAi refers to the expression of an RNA which interferes with the expression of the targeted mRNA. Specifically, RNAi silences a targeted gene via interacting with the specific mRNA through a siRNA (small interfering RNA). The ds RNA complex is then targeted for degradation by the cell. An siRNA molecule is a double-stranded RNA duplex of 10 to 50 nucleotides in length, which interferes with the expression of a target gene which is sufficiently complementary (e.g. at least 80% identity to the gene). In some embodiments, the siRNA molecule comprises a nucleotide sequence that is at least 85, 90, 95, 96, 97, 98, 99, or 100% identical to the nucleotide sequence of the target gene.

Additional RNAi molecules include short-hairpin RNA (shRNA); also short-interfering hairpin and microRNA (miRNA). The shRNA molecule contains sense and antisense sequences from a target gene connected by a loop. The shRNA is transported from the nucleus into the cytoplasm, and it is degraded along with the mRNA. Pol III or U6 promoters can be used to express RNAs for RNAi. Paddison et al. [Genes & Dev. (2002) 16:948-958, 2002] have used small RNA molecules folded into hairpins as a means to effect RNAi. Accordingly, such short hairpin RNA (shRNA) molecules are also advantageously used in the methods described herein. The length of the stem and loop of functional shRNAs varies; stem lengths can range anywhere from about 25 to about 30 nt, and loop size can range between 4 to about 25 nt without affecting silencing activity. While not wishing to be bound by any particular theory, it is believed that these shRNAs resemble the double-stranded RNA (dsRNA) products of the DICER RNase and, in any event, have the same capacity for inhibiting expression of a specific gene. The shRNA can be expressed from a lentiviral vector. An miRNA is a single-stranded RNA of about 10 to 70 nucleotides in length that are initially transcribed as pre-miRNA characterized by a "stem-loop" structure and which are subsequently processed into mature miRNA after further processing through the RISC.

Molecules that mediate RNAi, including without limitation siRNA, can be produced in vitro by chemical synthesis (Hohjoh, FEBS Lett 521:195-199, 2002), hydrolysis of dsRNA (Yang et al., Proc Natl Acad Sci USA 99:9942-9947, 2002), by in vitro transcription with T7 RNA polymerase (Donzeet et al., Nucleic Acids Res 30:e46, 2002; Yu et al., Proc Natl Acad Sci USA 99:6047-6052, 2002), and by hydrolysis of double-stranded RNA using a nuclease such as E. coli RNase III (Yang et al., Proc Natl Acad Sci USA 99:9942-9947, 2002).

According to another aspect, the disclosure provides polynucleotide antagonists including but not limited to, a decoy DNA, a double-stranded DNA, a single-stranded DNA, a complexed DNA, an encapsulated DNA, a viral DNA, a plasmid DNA, a naked RNA, an encapsulated RNA, a viral RNA, a double-stranded RNA, a molecule capable of generating RNA interference, or combinations thereof.

In some embodiments, the polynucleotide antagonists of the disclosure are aptamers. Aptamers are nucleic acid molecules, including double-stranded DNA and single-stranded RNA molecules, which bind to and form tertiary structures that specifically bind to a target molecule, such as a TβRII, betaglycan, TGFβ1, TGFβ2, and TGFβ3 polypeptide. The generation and therapeutic use of aptamers are well established in the art. See, e.g., U.S. Pat. No. 5,475,096. Additional information on aptamers can be found in U.S. Patent Application Publication No. 20060148748. Nucleic acid aptamers are selected using methods known in the art, for example via the Systematic Evolution of Ligands by Exponential Enrichment (SELEX) process. SELEX is a method for the in vitro evolution of nucleic acid molecules with highly specific binding to target molecules as described in, e.g., U.S. Pat. Nos. 5,475,096, 5,580,737, 5,567,588, 5,707,796, 5,763,177, 6,011,577, and 6,699,843. Another screening method to identify aptamers is described in U.S. Pat. No. 5,270,163. The SELEX process is based on the capacity of nucleic acids for forming a variety of two- and three-dimensional structures, as well as the chemical versatility available within the nucleotide monomers to act as ligands (form specific binding pairs) with virtually any chemical compound, whether monomeric or polymeric, including other nucleic acid molecules and polypeptides. Molecules of any size or composition can serve as targets. The SELEX method involves selection from a mixture of candidate oligonucleotides and step-wise iterations of binding, partitioning and amplification, using the same general selection scheme, to achieve desired binding affinity and selectivity. Starting from a mixture of nucleic acids, which can comprise a segment of randomized sequence, the SELEX method includes steps of contacting the mixture with the target under conditions favorable for binding; partitioning unbound nucleic acids from those nucleic acids which have bound specifically to target molecules; dissociating the nucleic acid-target complexes; amplifying the nucleic acids dissociated from the nucleic acid-target complexes to yield a ligand enriched mixture of nucleic acids. The steps of binding, partitioning, dissociating and amplifying are repeated through as many cycles as desired to yield highly specific high affinity nucleic acid ligands to the target molecule.

Typically, such binding molecules are separately administered to the animal [see, e.g., O'Connor (1991) J. Neurochem. 56:560], but such binding molecules can also be expressed in vivo from polynucleotides taken up by a host cell and expressed in vivo [see, e.g., Oligodeoxynucleotides as Antisense Inhibitors of Gene Expression, CRC Press, Boca Raton, Fla. (1988)].

12. Screening Assays

In certain aspects, the present invention relates to the use of TβRII polypeptides (e.g., soluble TβRII polypeptides) to identify compounds (agents) which are agonist or antagonists of the TGFβ1, TGFβ3 and TβRII signaling pathway. Compounds identified through this screening can be tested to assess their ability to modulate TGFβ1 and TGFβ3 signaling activity in vitro. Specifically, compounds identified through this screening can be tested to assess their ability to treat SSc, including clinical complications of SSc (e.g., SSc-ILD), in a subject in need thereof. Accordingly, these compounds can further be tested in animal models to assess their ability to treat SSc, including complications of SSc (e.g., SSc-ILD).

There are numerous approaches to screening for therapeutic agents for treating SSc, including complications of SSc (e.g., SSc-ILD), by targeting TGFβ1, TGFβ3 and TβRII polypeptides. In certain embodiments, high-throughput screening of compounds can be carried out to identify agents that perturb TGFβ1, TGFβ3 or TβRII-mediated cell signaling. In certain embodiments, the assay is carried out to screen and identify compounds that specifically inhibit or reduce binding of a TβRII polypeptide to TGFβ1 or TGFβ3. Alternatively, the assay can be used to identify compounds that enhance binding of a TβRII polypeptide to TGFβ1 or TGFβ3. In a further embodiment, the compounds can be identified by their ability to interact with a TGFβ1, TGFβ3 or TβRII polypeptide.

A variety of assay formats will suffice, and, in light of the present disclosure, those not expressly described herein will nevertheless be comprehended by one of ordinary skill in the art. As described herein, the test compounds (agents) of the invention may be created by any combinatorial chemical method. Alternatively, the subject compounds may be naturally occurring biomolecules synthesized in vivo or in vitro. Compounds (agents) to be tested for their ability to act as therapeutic agents to treat SSc, including complications of SSc (e.g., SSc-ILD), can be produced, for example, by bacteria, yeast, plants or other organisms (e.g., natural products), produced chemically (e.g., small molecules, including peptidomimetics), or produced recombinantly. Test compounds contemplated by the present invention include non-peptidyl organic molecules, peptides, polypeptides, peptidomimetics, sugars, hormones, and nucleic acid molecules. In a specific embodiment, the test agent is a small organic molecule having a molecular weight of less than about 2,000 daltons.

The test compounds of the invention can be provided as single, discrete entities, or provided in libraries of greater complexity, such as made by combinatorial chemistry. These libraries can comprise, for example, alcohols, alkyl halides, amines, amides, esters, aldehydes, ethers and other classes of organic compounds. Presentation of test compounds to the test system can be in either an isolated form or as mixtures of compounds, especially in initial screening steps. Optionally, the compounds may be optionally derivatized with other compounds and have derivatizing groups that facilitate isolation of the compounds. Non-limiting examples of derivatizing groups include biotin, fluorescein, digoxygenin, green fluorescent protein, isotopes, polyhistidine, magnetic beads, glutathione S transferase (GST), photoactivatable crosslinkers or any combinations thereof.

In many drug screening programs, which test libraries of compounds and natural extracts, high throughput assays are desirable in order to maximize the number of compounds surveyed in a given period of time. Assays which are performed in cell-free systems, such as may be derived with purified or semi-purified proteins, are often preferred as "primary" screens in that they can be generated to permit rapid development and relatively easy detection of an alteration in a molecular target which is mediated by a test compound. Moreover, the effects of cellular toxicity or bioavailability of the test compound can be generally ignored in the in vitro system, the assay instead being focused primarily on the effect of the drug on the molecular target as may be manifest in an alteration of binding affinity between a TβRII polypeptide and TGFβ1 or TGFβ3.

Merely to illustrate, in an exemplary screening assay of the present invention, the compound of interest is contacted with an isolated and purified TβRII polypeptide which is ordinarily capable of binding to TGFβ1 or TGFβ3. To the mixture of the compound and TβRII polypeptide is then added a composition containing a TβRII ligand. Detection and quantification of TβRII/TGFβ1 or TβRII/TGFβ3 complexes provides a means for determining the compound's efficacy at inhibiting (or potentiating) complex formation between the TβRII polypeptide and TGFβ1 or TGFβ3. The efficacy of the compound can be assessed by generating dose response curves from data obtained using various concentrations of the test compound. Moreover, a control assay can also be performed to provide a baseline for comparison. For example, in a control assay, isolated and a purified TGFβ1 or TGFβ3 is added to a composition containing the TβRII polypeptide, and the formation of TβRII/TGFβ1 or TβRII/TGFβ3 complex is quantitated in the absence of the test compound. It will be understood that, in general, the order in which the reactants may be admixed can be varied, and can be admixed simultaneously. Moreover, in place of purified proteins, cellular extracts and lysates may be used to render a suitable cell-free assay system.

Complex formation between the TβRII polypeptide and TGFβ1 or TGFβ3 may be detected by a variety of techniques. For instance, modulation of the formation of complexes can be quantitated using, for example, detectably labeled proteins such as radiolabeled (e.g., $^{32}P$, $^{35}S$, $^{14}C$ or $^{3}H$), fluorescently labeled (e.g., FITC), or enzymatically labeled TβRII polypeptide or TGFβ1 or TGFβ3, by immunoassay, or by chromatographic detection.

In certain embodiments, the present invention contemplates the use of fluorescence polarization assays and fluorescence resonance energy transfer (FRET) assays in measuring, either directly or indirectly, the degree of interaction between a TβRII polypeptide and its binding protein. Further, other modes of detection, such as those based on optical waveguides (PCT Publication WO 96/26432 and U.S. Pat. No. 5,677,196), surface plasmon resonance (SPR), surface charge sensors, and surface force sensors, are compatible with many embodiments of the invention.

Moreover, the present invention contemplates the use of an interaction trap assay, also known as the "two hybrid assay," for identifying agents that disrupt or potentiate interaction between a TβRII polypeptide and its binding protein. See for example, U.S. Pat. No. 5,283,317; Zervos et al. (1993) Cell 72:223-232; Madura et al. (1993) J Biol Chem 268:12046-12054; Bartel et al. (1993) Biotechniques 14:920-924; and Iwabuchi et al. (1993) Oncogene 8:1693-1696). In a specific embodiment, the present invention contemplates the use of reverse two hybrid systems to identify compounds (e.g., small molecules or peptides) that dissociate interactions between a TβRII polypeptide and its binding protein. See for example, Vidal and Legrain, (1999) Nucleic Acids Res 27:919-29; Vidal and Legrain, (1999) Trends Biotechnol 17:374-81; and U.S. Pat. Nos. 5,525,490; 5,955,280; and 5,965,368.

In certain embodiments, the subject compounds are identified by their ability to interact with a TβRII or TGFβ1 or TGFβ3 polypeptide of the invention. The interaction between the compound and the TβRII or TGFβ1 or TGFβ3 polypeptide may be covalent or non-covalent. For example, such interaction can be identified at the protein level using in vitro biochemical methods, including photo-crosslinking, radiolabeled ligand binding, and affinity chromatography (Jakoby W B et al., 1974, Methods in Enzymology 46: 1). In certain cases, the compounds may be screened in a mechanism based assay, such as an assay to detect compounds which bind to a TGFβ1 or TGFβ3 or TβRII polypeptide. This may include a solid-phase or fluid-phase binding event. Alternatively, the gene encoding a TGFβ1 or TGFβ3 or TβRII polypeptide can be transfected with a reporter system (e.g., 0-galactosidase, luciferase, or green fluorescent protein) into a cell and screened against the library preferably by a high-throughput screening or with individual members of the library. Other mechanism-based binding assays may be used, for example, binding assays which detect changes in free energy. Binding assays can be performed with the target fixed to a well, bead or chip or captured by an immobilized antibody or resolved by capillary electrophoresis. The bound compounds may be detected usually using colorimetric or fluorescence or surface plasmon resonance.

In certain aspects, the present invention provides methods and agents for modulating (stimulating or inhibiting) TGFβ1- or TGFβ3-mediated cell signaling. Therefore, any compound identified can be tested in whole cells or tissues, in vitro or in vivo, to confirm their ability to modulate TGFβ1 or TGFβ3 signaling. Various methods known in the art can be utilized for this purpose.

13. Systemic Sclerosis Associated Complications

In part, the disclosure relates to TβRII antagonists that can be used to treat systemic sclerosis (SSc), particularly clinical complications of SSc including, for example, interstitial lung disease (ILD). Accordingly, the disclosure provides methods for treating SSc, or a complication thereof (e.g., SSc-ILD) comprising administering to a patient in need thereof one or more TβRII antagonist. In some embodiments, the disclosure provides methods of treating diffuse systemic sclerosis. In some embodiments, the disclosure provides methods of treating limited systemic sclerosis. Optionally, such methods further comprise administering to the patient one or more additional active agents and/or supportive therapies for treating SSc or a complication of SSc (e.g., SSc-ILD).

The terms "treatment", "treating", "alleviation" and the like are used herein to generally mean obtaining a desired pharmacologic and/or physiologic effect, and may also be used to refer to improving, alleviating, and/or decreasing the severity of one or more clinical complication of a condition being treated. The effect may be prophylactic in terms of completely or partially delaying the onset or recurrence of a disease, condition, or complications thereof, and/or may be therapeutic in terms of a partial or complete cure for a disease or condition and/or adverse effect attributable to the disease or condition. "Treatment" as used herein covers any treatment of a disease or condition of a mammal, particularly a human. As used herein, a therapeutic that "prevents" a disorder or condition refers to a compound that, in a statistical sample, reduces the occurrence of the disorder or condition in a treated sample relative to an untreated control sample, or delays the onset of the disease or condition, relative to an untreated control sample.

The terms "patient", "subject", or "individual" are used interchangeably herein and refer to either a human or a non-human animal. These terms include mammals, such as humans, non-human primates, laboratory animals, livestock animals (including bovines, porcines, camels, etc.), companion animals (e.g., canines, felines, other domesticated animals, etc.) and rodents (e.g., mice and rats). In particular embodiments, the patient, subject or individual is a human.

Overview of Systemic Sclerosis

Systemic sclerosis (SSc) is a chronic autoimmune disease usually marked by abnormal growth of fibrous connective tissue in skin and often in the internal organs. There are approximately 5,000 to 10,000 cases of SSc diagnosed every year in the United States, with an annual incidence of approximately 20 to 24 new cases per 1 million adults. Globally, the overall incidence rates range from 8 to 56 new cases per 1 million persons per year, and the prevalence rates fall between 38 and 341 cases per 1 million persons per year. SSc is typically characterized by immune dysfunction, vasculopathy, cellular inflammation, and fibrosis of the skin and internal organs.

The disclosure provides methods of treating or preventing a disease or condition associated with a TGFβ superfamily member by administering to a subject one or more TβRII antagonists, including a TβRII polypeptides and fusion proteins comprising the same as described herein. In some embodiments, the disease or condition is associated with dysregulated TGFβ1 or TGFβ3 signaling. In some embodiments, the disease or condition to be treated is systemic sclerosis. In some embodiments, a TβRII antagonist for use in treating systemic sclerosis is administered to a subject in need thereof. In some embodiments, systemic sclerosis is characterized as diffuse cutaneous systemic sclerosis (dcSSc) (e.g., diffuse systemic sclerosis). In some embodiments, systemic sclerosis is characterized as limited cutaneous systemic sclerosis (lcSSc) (e.g., limited systemic sclerosis). In some embodiments the disease or condition to be treated is diffuse systemic sclerosis. In some embodiments, a TβRII antagonist for use in treating diffuse systemic sclerosis is administered to a subject in need thereof. In some embodiments, the disease or condition to be treated is limited systemic sclerosis. In some embodiments, a TβRII antagonist for use in treating limited systemic sclerosis is administered to a subject in need thereof. In some embodiments, the disease or condition to be treated is systemic sclerosis associated with interstitial lung disease (SSc-ILD). In some embodiments, a TβRII antagonist for use in treating SSc-ILD is administered to a subject in need thereof. In some embodiments, the disclosure provides a method of treating SSc-ILD, comprising administering a TβRII antagonist to a subject in need thereof. In some embodiments, the disclosure provides methods of treating SSc-ILD, comprising administering a TβRII antagonist to a subject in need thereof, wherein the systemic sclerosis is diffuse systemic sclerosis.

In some embodiments, the disclosure provides methods of treating SSc (e.g., SSc-ILD), comprising administering a TβRII antagonist to a subject in need thereof, wherein the treatment increases the subject's length of life when compared to a reference subject that is not receiving treatment. In some embodiments, the disclosure provides methods of treating SSc (e.g., SSc-ILD), comprising administering a TβRII antagonist to a subject in need thereof, wherein the treatment reduces the subject's risk of death due to SSc (e.g., SSc-ILD) when compared to a reference subject that is not receiving treatment. In some embodiments, the disclosure provides methods of treating SSc (e.g., SSc-ILD), comprising administering a TβRII antagonist to a subject in need thereof, wherein the treatment reduces the subject's risk of hospitalization due to SSc (e.g., SSc-ILD) when compared to a reference subject that is not receiving treatment. In some embodiments, a reference subject that is not receiving treatment has similar characteristics to the subject (height, sex, age, race, weight) and is not receiving one or more of TβRII antagonists of the present disclosure.

In some embodiments, a subject of the present disclosure with SSc-ILD will have one or more additional complications of SSc. A common feature of SSc comprises presence of skin thickening in a subject, though there are subjects with SSc that have no detectable skin involvement (e.g., systemic sclerosis sine scleroderma). Subjects with systemic sclerosis sine scleroderma typically have vascular and/or fibrotic features of systemic disease. In some embodiments, a subject with SSc (e.g., SSc-ILD) has no observed clinical complications of the skin. In some embodiments, a subject has no observed clinical complication of the skin but does have presence of one or more of Raynaud's phenomenon, nailfold capillary alterations, gastrointestinal involvement, renal crisis, PAH, and/or ILD. In some embodiments, a subject has systemic sclerosis sine scleroderma. In some embodiments, the disease or condition to be treated with one or more TβRII antagonists of the present disclosure is systemic sclerosis sine scleroderma.

In some embodiments, a subject with SSc (e.g., SSc-ILD) has one or more clinical complications of the skin. In some embodiments, a clinical complication of the skin of a subject with SSc is selected from the group consisting of calcinosis cutis, capillary changes at the nail beds, depigmentation, digital tip ulcers and/or pitting at fingertips, dryness, edema, hyperpigmentation, lipoatrophy, loss of appendicular hair, pruritus, telangiectasia, and traumatic skin ulcerations over finger joints. In some embodiments, the disclosure provides methods of treating SSc (e.g., SSc-ILD) comprising administering a TβRII antagonist to a subject in need thereof, wherein the subject has one or more clinical complications of the skin selected from the group consisting of calcinosis cutis, capillary changes at the nail beds, depigmentation, digital tip ulcers and/or pitting at fingertips, dryness, edema, hyperpigmentation, lipoatrophy, loss of appendicular hair, pruritus, telangiectasia, and traumatic skin ulcerations over finger joints. Subjects with clinical complications of the skin are divided into two major classifications of systemic sclerosis, which are defined by areas and extensiveness of the skin involved. Limited cutaneous systemic sclerosis (lcSSc), or limited systemic sclerosis, is typically limited to hands, forearms, feet, and the face; while diffuse cutaneous systemic sclerosis (dcSSc), or diffuse systemic sclerosis, extends beyond these regions of the body. In some embodiments, a subject has limited systemic sclerosis (lcSSc). In some embodiments, the disease or condition to be treated is limited systemic sclerosis (lcSSc). In some embodiments, a subject has diffuse systemic sclerosis (dcSSc). In some embodiments, the disease or condition to be treated is diffuse systemic sclerosis (dcSSc). In some embodiments, a subject has diffuse systemic sclerosis (dcSSc) without interstitial lung disease (ILD). In some embodiments, the disease or condition to be treated is diffuse systemic sclerosis (dcSSc) without ILD. In some embodiments, a subject has diffuse systemic sclerosis (dcSSc) with interstitial lung disease (ILD). In some embodiments, the disease or condition to be treated is diffuse systemic sclerosis (dcSSc) with ILD.

In some embodiments, a subject with SSc (e.g., SSc-ILD) may have features of one or more other systemic diseases. In some embodiments, a subject with SSc may have features of systemic lupus erythematosus (SLE), rheumatoid arthritis, polymyositis, and/or Sjogren's syndrome. In some embodiments, the disclosure provides methods of treating SSc (e.g., SSc-ILD) comprising administering a TβRII antagonist to a subject in need thereof, wherein the subject has one or more features of other systemic diseases selected from the group consisting of systemic lupus erythematosus (SLE), rheumatoid arthritis, polymyositis, and Sjogren's syndrome. In some embodiments, a subject has systemic sclerosis with overlap syndrome. In some embodiments, the disease or condition to be treated is systemic sclerosis with overlap syndrome.

"The 2013 Classification Criteria" or "the Criteria", developed by the American College of Rheumatology (ACR) and the European League Against Rheumatism (EULAR), may be implemented to identify patients with SSc (e.g., SSc-ILD). In some embodiments, the disclosure provides methods of treating a subject that has SSc (e.g., SSc-ILD) according to the EULAR criteria. The Criteria comprises three hallmarks of SSc: fibrosis of the skin and/or other internal organs, production of specific autoantibodies (e.g., antinuclear antibody (ANA), anticentromere, anti-topoisomerase I, anti-RNA polymerase III), and/or evidence of vasculopathy. Presence of skin thickening of fingers extending proximal to metacarpophalangeal joints is sufficient for a patient to be classified as having SSc (e.g., SSc-ILD). If the Criteria are not present, additive items with varying weights may be used to identify SSc (e.g., SSc-ILD), including skin thickening of the fingers, fingertip lesions, telangiectasia, Raynaud's phenomenon, abnormal nailfold capillaroscopy, and/or presence of pulmonary arterial hypertension (PAH) and/or interstitial lung disease (ILD). In some embodiments, the disclosure provides methods of treating SSc (e.g., SSc-ILD) comprising administering a TβRII antagonist to a subject in need thereof, wherein the subject has one or more of fibrosis of the skin and/or other internal organs, production of specific autoantibodies (e.g., antinuclear antibody (ANA), anticentromere, anti-topoisomerase I, anti-RNA polymerase III), and/or evidence of vasculopathy. In some embodiments, the disclosure provides methods of treating SSc (e.g., SSc-ILD) comprising administering a TβRII antagonist to a subject in need thereof, wherein the subject has one or more of skin thickening of the fingers, fingertip lesions, telangiectasia, Raynaud's phenomenon, abnormal nailfold capillaroscopy, and/or presence of pulmonary arterial hypertension (PAH) and/or interstitial lung disease (ILD).

Other clinical complications of SSc (e.g., SSc-ILD) comprise heartburn, erectile dysfunction in men, and/or dyspnea, which is generally defined as dyspnea on exertion associated with restrictive change sin pulmonary function, evidence of pulmonary changes on radiography or HRCT scans, and/or dyspnea on exertion associate with evidence of PAH on Dopper echocardiography. In some embodiments, the disclosure provides methods of treating SSc (e.g., SSc-ILD) comprising administering a TβRII antagonist to a subject in need thereof, wherein the subject has one or more of heartburn, erectile dysfunction, and/or dyspnea.

Vasculopathy includes Raynaud's phenomenon and/or ischemic digital ulcers, which are both common in subjects with SSc (e.g., SSc-ILD). Raynaud's phenomenon is classically viewed as reversible vasospasm due to functional changes in the digital arteries of the hands and/or feet. Over time, many subjects with SSc (e.g., SSc-ILD) develop progressive structural changes in small blood vessels, with permanently impaired blood flow. In some embodiments, a subject has Raynaud's syndrome. In some embodiments, a subject has structural changes in the small blood vessels. In some embodiments, a subject with Raynaud's phenomenon has one or more of ischemic pain, digital ulceration, tophic changes, refractory or progressive ischemia and/or infarction. Early occurrence of digital ulcers can indicate diffuse systemic sclerosis and/or positive detection of antitopoisomerase I.

Approximately 80% of subjects diagnosed with SSc (e.g., SSc-ILD) will eventually develop some degree of a complication in the lungs. Examples of major types of lung complications associated with SSc (e.g., SSc-ILD) include alveolitis, interstitial pulmonary fibrosis or interstitial lung disease (TLD), recurrent aspiration, and/or pulmonary vasculopathy. In some embodiments, a subject with SSc (e.g., SSc-ILD) has one or more additional lung complications. In some embodiments, the disclosure provides methods of treating SSc (e.g., SSc-ILD) comprising administering a TβRII antagonist to a subject in need thereof, wherein the subject has one or more additional lung complications selected from the group consisting of alveolitis, recurrent aspiration, and/or pulmonary vasculopathy. In subjects with diffuse SSc (e.g., SSc-ILD) there is a high risk of having an inflammatory pulmonary process that resembles nonspecific interstitial pneumonitis and/or the early onset of interstitial fibrosis. Interstitial lung disease (ILD) is a leading cause of morbidity and/or mortality in subjects with SSc (e.g., SSc-ILD). Subjects with dcSSc are more likely to have rapid progression of skin thickening and/or early development of lung fibrosis, as well as an increased risk of renal and/or cardiac involvement. In some embodiments, the disclosure provides methods of treating SSc (e.g., SSc-ILD) comprising administering a TβRII antagonist to a subject in need thereof, wherein the subject has rapid progression of skin thickening and/or early development of lung fibrosis, as well as an increased risk of renal and/or cardiac involvement.

Risk factors that can indicate a possibly higher likelihood of developing ILD in SSc subjects includes, but is not limited to, presence of diffuse SSc, African-American ethnicity, older age at disease onset, and/or presence of SSc-related autoantibodies. However, all subjects suspected of having SSc (e.g., SSc-ILD) typically receive a comprehensive assessment which includes, but is not limited to, a physical assessment, assessment of respiratory symptoms, chest imaging with high resolution computed tomography (HRCT), and/or pulmonary function tests including spirometry.

Clinical complications that are most common in SSc-ILD are fatigue, breathlessness (e.g., exertional dyspnea), and/or dry cough. One of the most characteristic complications of interstitial lung disease (ILD) comprises bibasilar fine inspiratory crackles (e.g., "Velcro" rales). In some embodiments, a subject with SSc-ILD has bibasilar fine inspiratory crackles (e.g., "Velcro" rales) upon physical examination. In some embodiments, a subject has one or more symptoms including fatigue, breathlessness (e.g., exertional dyspnea), and/or dry cough. In some embodiments, a subject with SSc is suspected to have SSc-ILD when presenting with complications comprising one or more of dyspnea, cough, auscultatory crackles, and/or abnormalities on pulmonary function tests and/or a chest radiograph. In some embodiments, the disclosure provides methods of treating SSc-ILD comprising administering a TβRII antagonist to a subject in need thereof, wherein the subject has one or more clinical complications of ILD including fatigue, breathlessness, dry cough, and/or bibasilar fine respiratory crackles.

A subset of subjects with SSc (e.g., SSc-ILD) can develop rapidly progressive ILD during the first few years (e.g., approximately 2 years) of their diagnosis of ILD. This subset typically presents ground-glass opacities on high resolution computed tomography (HRCT), a neutrophilic or eosinophilic bronchioalveolar lavage (BAL), and/or declining spirometry (e.g., FVC) or diffusion capacity (DLCO) on pulmonary function tests (PFTs). Forced vital capacity (FVC) correlates well with tidal volumes and/or other resting lung volumes in ILD, which are typically reduced. Among static lung volume tests, FVC is reduced to a greater extent than the functional residual capacity. In some embodiments, the disclosure provides methods of treating SSc-ILD comprising administering a TβRII antagonist to a subject in need thereof, wherein the subject has one or more of ground glass opacities on HRCT, a neutrophilic or eosinophilic BAL, and/or declining FVC and/or DLCO scores.

Pulmonary vascular disease, namely Pulmonary Arterial Hypertension (PAH), can occur in a subject with SSc (e.g., SSc-ILD). Generally, PAH is a late complication of SSc (e.g., SSc-ILD). Approximately 10-40% of subjects with SSc (e.g., SSc-ILD) will develop PAH, and/or PAH is typically more commonly found in lcSSc subjects. PAH can occur with or without the presence of ILD in the subject. In some embodiments, a subject that has SSc-ILD does not have PAH. In some embodiments, a subject that has SSc-ILD has PAH. In some embodiments, the disclosure provides methods of treating SSc (e.g., SSc-ILD) comprising administering a TβRII antagonist to a subject in need thereof, wherein the subject also has PAH.

Other major contributors to a decrease in mortality in SSc (e.g., SSc-ILD) comprise arrythmia, kidney damage (scleroderma renal crisis), increased risk of cancers, myocardial disease (e.g., myocardial fibrosis, myocardial ischemia), muscle atrophy (e.g., sarcopenia), muscle weakness, myopathy, pericardial disease, and/or thromboembolic risk. In some embodiments, a subject with SSc (e.g., SSc-ILD) also has one or more of arrythmia, kidney damage (scleroderma renal crisis), increased risk of cancers, myocardial disease (e.g., myocardial fibrosis, myocardial ischemia), muscle atrophy (e.g., sarcopenia), muscle weakness, myopathy, pericardial disease, and/or thromboembolic risk. In some embodiments, the disclosure provides methods of treating SSc (e.g., SSc-ILD) comprising administering a TβRII antagonist to a subject in need thereof, wherein the subject has one or more of arrythmia, kidney damage (scleroderma renal crisis), increased risk of cancers, myocardial disease (e.g., myocardial fibrosis, myocardial ischemia), muscle atrophy (e.g., sarcopenia), muscle weakness, myopathy, pericardial disease, and/or thromboembolic risk.

Aside from vasculopathy and/or pulmonary complications, other clinical complications can be present in a subject with SSc (e.g., SSc-ILD). Musculoskeletal complications, gastrointestinal complications, cardiac complications, renal complications, neuromuscular complications (e.g., muscle atrophy, muscle weakness, myopathy), genitourinary complications (e.g., erectile dysfunction in men), increased risk of cancer (e.g., lung cancer), and/or increased risk of thromboembolic complications are possible, among other complications. In some embodiments, a subject has one or more clinical complications of SSc (e.g., SSc-ILD) selected from the group consisting of musculoskeletal complications, gastrointestinal complications, cardiac complications, renal complications, neuromuscular complications (e.g., muscle atrophy, muscle weakness, myopathy), genitourinary complications (e.g., erectile dysfunction in men), increased risk of cancer (e.g., lung cancer), and/or increased risk of thromboembolic complications. Musculoskeletal complications can include, but are not limited to arthritis, tendinitis, tendon friction rubs, and/or joint contractures. In some embodiments, a subject with SSc (e.g., SSc-ILD) has one or more musculoskeletal complications selected from the group consisting of arthritis, tendinitis, tendon friction rubs, and joint contractures. For subjects with dcSSc specifically, early musculoskeletal complications can include, but are not limited to, swelling of the hands, arthralgia, myalgia, and/or fatigue. In some embodiments, a subject with SSc (e.g., SSc-ILD) also has one or more of swelling of the hands, arthralgia, myalgia, and/or fatigue. Gastrointestinal complications can include, but are not limited to, dysphagia, choking, heartburn, hoarseness, cough after swallowing, early satiety, bloating, alternating constipation and/or diarrhea, episodic pseudo-obstruction and/or bacterial small bowel overgrowth with malabsorption, fecal incontinence, chronic gastroesophageal reflux, and/or recurrent episodes of microaspiration. In some embodiments, a subject with SSc (e.g., SSc-ILD) has one or more of gastrointestinal complications selected from the group consisting of dysphagia, choking, heartburn, hoarseness, cough after swallowing, early satiety, bloating, alternating constipation and/or diarrhea, episodic pseudo-obstruction and/or bacterial small bowel overgrowth with malabsorption, fecal incontinence, chronic gastroesophageal reflux, and/or recurrent episodes of microaspiration. Chronic gastroesophageal reflux and/or recurrent episodes of microaspiration may contribute to development of ILD in subjects with SSc (e.g., SSc-ILD). In some embodiments, a subject with SSC (e.g., SSc-ILD) also has one or more of chronic gastroesophageal reflux and/or recurrent episodes of microaspiration. Cardiac complications can include all domains of the heart, including myocardium, pericardium, and/or conduction system. In some embodiments, a subject with SSc (e.g., SSc-ILD) has one or more cardiac complications selected from the group consisting of complications in myocardium, pericardium, and conduction system. Cardiac complications can occur secondary to PAH and/or ILD or scleroderma renal crisis (SRC). In some embodiments, a subject with SSc (e.g., SSc-ILD) also has pericardial disease. In some embodiments, a subject with SSc (e.g., SSc-ILD) has myocardial disease. In some embodiments, a subject with SSc (e.g., SSc-ILD) also has arrythmia. Renal complications can include, but are not limited to, kidney damage, vascular fibrosis of the kidney, interstitial collagen accumulation of the kidney, glomerulonephritis, impaired renal reserve, microalbuminuria, and/or scleroderma renal crisis (SRC). In some embodiments, a subject with SSc (e.g., SSc-ILD) has one or more renal complications selected from the group consisting of kidney damage, vascular fibrosis of the kidney, interstitial collagen accumulation of the kidney, glomerulonephritis, impaired renal reserve, microalbuminuria, and SRC. In some embodiments, a subject with SSc (e.g., SSc-ILD) also has SRC. In some embodiments, a subject with diffuse systemic sclerosis has SRC. Scleroderma renal crisis is typically characterized by one or more of abrupt onset of marked or malignant hypertension, acute onset of oliguric renal failure, urinalysis that reveals only mild proteinuria with few cells or casts, and/or microangiopathic hemolysis anemia and/or thrombocytopenia.

In some embodiments, certain drugs can be linked to development of SSc (e.g., SSc-ILD) in subject. In some embodiments, a subject with SSc (e.g., SSc-ILD) has been administered one or more of cancer chemotherapeutic drugs, bleomycin, and/or docetaxel. In some embodiments, a subject has developed SSc-like complications at an injection site when administered an injection of vitamin K, vitamin B12, and/or analgesic pentazocine.

Pulmonary Function Tests

Pulmonary function tests (PFTs) are typically performed in SSc subjects at an initial time of diagnosis to determine if SSc has affected the lungs of the subject (e.g., SSc-ILD), and/or also to what extent. PFTs may be performed at least annually to evaluate any new onset of dyspnea, cough, or abnormalities found in radiography. A small portion of subjects with positive HRCT scans for SSc-ILD can have normal pulmonary function test results.

Spirometry and Forced Vital Capacity (FVC)

Spirometry, or measuring of breath, is a major pulmonary function test that can determine volume and/or speed (flow) of air that is inhaled and exhaled by a subject. A spirometer is used to measure forced vital capacity (FVC) (measured in liters, milliliters, and/or percentage of predicted) in a forced expiratory volume (FEV) test, among other characteristics. In an FEV test, a subject takes a deep breath, and exhales into a sensor as hard and for as long as possible (e.g., at least 6 seconds). Inhalation can also be tested using spirometry. An FEV test is typically repeated at least three times to ensure accuracy. "Normal" ranges for FVC are typically considered to be between 80% and 100% of predicted. "Of predicted" refers to reporting the subject's results as a percentage of the known predicted values for a healthy subject of similar characteristics (e.g., height, sex, age, race, weight). Other measurements that can be taken include, but are not limited to, $FEV_1$, wherein the FVC is measured within the first second of forced exhalation, and/or forced expiratory flow (FEF), which measures the flow of air coming out of the lung during the middle portion of forced expiration. An $FEV_1$/FVC ratio is also typically calculated.

In some embodiments, a subject of the present disclosure has an FVC of between about 100% and about 90% of predicted. In some embodiments, a subject of the present disclosure has an FVC of between about 90% and about 80% of predicted. In some embodiments, a subject of the present disclosure has an FVC of between about 80% and about 70% of predicted. In some embodiments, a subject of the present disclosure has an FVC of between about 70% and about 60% of predicted. In some embodiments, a subject of the present disclosure has an FVC of between about 60% and about 50% of predicted. In some embodiments, a subject of the present disclosure has an FVC of between about 50% and about 40% of predicted. In some embodiments, a subject of the present disclosure has an FVC of between about 40% and about 30% of predicted. In some embodiments, a subject of the present disclosure has an FVC of between about 30% and about 20% of predicted. In some embodiments, a subject of the present disclosure has an FVC of greater than or equal to 50% of predicted.

A general measurement of disease progression can be an annual rate of decline in FVC. In some embodiments, an annual rate of decline in forced vital capacity (FVC) of a subject is measured over a time period of at least one year after administration of one or more TβRII antagonists of the present disclosure. In some embodiments, an annual rate of decline in forced vital capacity (FVC) of a subject is measured over a time period of at least 52 weeks after administration of one or more TβRII antagonists of the present disclosure. In some embodiments, an annual rate of decline in forced vital capacity (FVC) of a subject is measured over a time period of at least one year after administration of one or more TβRII antagonists of the present disclosure and is compared to a baseline FVC measurement. In some embodiments, an annual rate of decline in forced vital capacity (FVC) of a subject is measured over a time period of at least 52 weeks after administration of one or more TβRII antagonists of the present disclosure and is compared to a baseline FVC measurement. In some embodiments, administration of one or more TβRII antagonists of the present disclosure results in a decline in an annual rate of forced vital capacity (FVC). In some embodiments, administration of one or more TβRII antagonists of the present disclosure results in a reduction in annual rate of decline of forced vital capacity (FVC). In some embodiments, an annual rate of decline in FVC has been slowed. In some embodiments, a subject is determined to have a slowing in the rate of decline in pulmonary function after administration of one or more TβRII antagonists of the present disclosure.

In some embodiments, administration of one or more TβRII antagonists of the present disclosure slows the annual rate of decline in FVC compared to a baseline measurement. In some embodiments, administration of one or more TβRII antagonists of the present disclosure slows the annual rate of decline in FVC compared to a subject administered standard of care (SOC). In some embodiments, standard of care comprises administration of an immunosuppressive therapy. In some embodiments, standard of care comprises administration of mycophenolate mofetil (MMF). In some embodiments, standard of care comprises administration of methotrexate. In some embodiments, standard of care comprises administration of cyclophosphamide. In some embodiments, standard of care comprises administration of nintedanib (Ofev). In some embodiments, standard of care comprises administration of rituximab. In some embodiments, standard of care comprises administration of one or more of mycophenolate mofetil (MMF), methotrexate, cyclophosphamide, nintedanib (Ofev), and rituximab. In some embodiments, standard of care comprises administration of at least one therapy selected from the group consisting of mycophenolate mofetil (MMF), methotrexate, cyclophosphamide, nintedanib (Ofev), and rituximab. In some embodiments, administration of one or more TβRII antagonists of the present disclosure slows the annual rate of decline in FVC compared to a subject who has had a lung transplant.

In some embodiments the present disclosure provides methods of treating systemic sclerosis with one or more pulmonary complications (e.g., SSc-ILD), steps comprising measuring at least one initial point of lung function in a subject; administering a Transforming Growth Factor-β Receptor II (TβRII) fusion polypeptide to the subject; re-measuring the at least one point of lung function in the subject; and based on the measuring, determining a change in the rate of decline in lung function of the subject.

In some embodiments the present disclosure provides methods of treating systemic sclerosis associated with interstitial lung disease (SSc-ILD), steps comprising measuring at least one initial point of lung function in a subject; administering a Transforming Growth Factor-β Receptor II (TβRII) fusion polypeptide to the subject; re-measuring the at least one point of lung function in the subject; and based on the measuring, determining a change in the rate of decline in lung function of the subject.

In some embodiments, the rate of decline in lung function is measured by Forced Vital Capacity (FVC) of the subject. In some embodiments, the rate of decline in lung function is measured as an annual rate of decline in Forced Vital Capacity (FVC) of the subject.

In some embodiments, a subject of the present disclosure has an initial point of lung function comprising an FVC of between about 100% and about 90% of predicted. In some embodiments, a subject of the present disclosure has an initial point of lung function comprising an FVC of between about 90% and about 80% of predicted. In some embodiments, a subject of the present disclosure has an initial point of lung function comprising an FVC of between about 80% and about 70% of predicted. In some embodiments, a subject of the present disclosure has an initial point of lung function comprising an FVC of between about 70% and about 60% of predicted. In some embodiments, a subject of the present disclosure has an initial point of lung function comprising an FVC of between about 60% and about 50% of predicted. In some embodiments, a subject of the present disclosure has an initial point of lung function comprising an FVC of between about 50% and about 40% of predicted. In some embodiments, a subject of the present disclosure has an initial point of lung function comprising an FVC of between about 40% and about 30% of predicted. In some embodiments, a subject of the present disclosure has an initial point of lung function comprising an FVC of between about 30% and about 20% of predicted.

In some embodiments, a subject of the present disclosure has an initial point of lung function comprising an FVC of greater than or equal to 50% of predicted. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject, wherein the subject has an FVC of greater than or equal to 50% of predicted at baseline.

In some embodiments, an annual rate of decline in FVC of a subject is between about 1% and about 10%. In some embodiments, an annual rate of decline in FVC of a subject is between about 5% and about 10%. In some embodiments, an annual rate of decline in FVC of a subject is between about 10% and about 15%. In some embodiments, an annual rate of decline in FVC of a subject is between about 15% and about 20%. In some embodiments, an annual rate of decline in FVC of a subject is between about 20% and about 25%. In some embodiments, an annual rate of decline in FVC of a subject is between about 25% and about 30%. In some embodiments, an annual rate of decline in FVC of a subject is between about 30% and about 35%. In some embodiments, an annual rate of decline in FVC of a subject is between about 35% and about 40%. In some embodiments, an annual rate of decline in FVC of a subject is between about 40% and about 45%. In some embodiments, an annual rate of decline in FVC of a subject is between about 45% and about 50%. In some embodiments, an annual rate of decline in FVC of a subject is between about 50% and about 55%. In some embodiments, an annual rate of decline in FVC of a subject is between about 55% and about 60%. In some embodiments, an annual rate of decline in FVC of a subject is between about 60% and about 65%. In some embodiments, an annual rate of decline in FVC of a subject is between about 65% and about 70%. In some embodiments, an annual rate of decline in FVC of a subject is between about 10% and about 20%. In some embodiments, an annual rate of decline in FVC of a subject is between about 20% and about 30%. In some embodiments, an annual rate of decline in FVC of a subject is between about 30% and about 40%. In some embodiments, an annual rate of decline in FVC of a subject is between about 40% and about 50%. In some embodiments, an annual rate of decline in FVC of a subject is between about 50% and about 60%. In some embodiments, an annual rate of decline in FVC of a subject is between about 60% and about 70%.

In some embodiments, the present disclosure provides methods of treating SSc-ILD, comprising administering a TβRII antagonist to a subject in need thereof, wherein an annual rate of decline of the subject is reduced. In some embodiments, an annual rate of decline in FVC of a subject is reduced by between about 1% and about 10%. In some embodiments, an annual rate of decline in FVC of a subject is reduced by between about 5% and about 10%. In some embodiments, an annual rate of decline in FVC of a subject is reduced by between about 10% and about 15%. In some embodiments, an annual rate of decline in FVC of a subject is reduced by between about 15% and about 20%. In some embodiments, an annual rate of decline in FVC of a subject is reduced by between about 20% and about 25%. In some embodiments, an annual rate of decline in FVC of a subject is reduced by between about 25% and about 30%. In some embodiments, an annual rate of decline in FVC of a subject is reduced by between about 30% and about 35%. In some embodiments, an annual rate of decline in FVC of a subject is reduced by between about 35% and about 40%. In some embodiments, an annual rate of decline in FVC of a subject is reduced by between about 40% and about 45%. In some embodiments, an annual rate of decline in FVC of a subject is reduced by between about 45% and about 50%. In some embodiments, an annual rate of decline in FVC of a subject is reduced by between about 50% and about 55%. In some embodiments, an annual rate of decline in FVC of a subject is reduced by between about 55% and about 60%. In some embodiments, an annual rate of decline in FVC of a subject is reduced by between about 60% and about 65%. In some embodiments, an annual rate of decline in FVC of a subject is reduced by between about 65% and about 70%. In some embodiments, an annual rate of decline in FVC of a subject is reduced by between about 10% and about 20%. In some embodiments, an annual rate of decline in FVC of a subject is reduced by between about 20% and about 30%. In some embodiments, an annual rate of decline in FVC of a subject is reduced by between about 30% and about 40%. In some embodiments, an annual rate of decline in FVC of a subject is reduced by between about 40% and about 50%. In some embodiments, an annual rate of decline in FVC of a subject is reduced by between about 50% and about 60%. In some embodiments, an annual rate of decline in FVC of a subject is reduced by between about 60% and about 70%.

In some embodiments, the present disclosure provides methods of treating SSc-ILD, comprising administering a TβRII antagonist to a subject in need thereof, wherein an annual rate of decline of the subject is reduced relative to a subject treated with standard of care (SOC). In some embodiments, an annual rate of decline in FVC of a subject is reduced by between about 1% and about 10% relative to a subject treated with SOC. In some embodiments, an annual rate of decline in FVC of a subject is reduced by between about 5% and about 10% relative to a subject treated with SOC. In some embodiments, an annual rate of decline in FVC of a subject is reduced by between about 10% and about 15% relative to a subject treated with SOC. In some embodiments, an annual rate of decline in FVC of a subject is reduced by between about 15% and about 20% relative to a subject treated with SOC. In some embodiments, an annual rate of decline in FVC of a subject is reduced by between about 20% and about 25% relative to a subject treated with SOC. In some embodiments, an annual rate of decline in FVC of a subject is reduced by between about 25% and about 30% relative to a subject treated with SOC. In some embodiments, an annual rate of decline in FVC of a subject is reduced by between about 30% and about 35% relative to a subject treated with SOC. In some embodiments, an annual rate of decline in FVC of a subject is reduced by between about 35% and about 40% relative to a subject treated with SOC. In some embodiments, an annual rate of decline in FVC of a subject is reduced by between about 40% and about 45% relative to a subject treated with SOC. In some embodiments, an annual rate of decline in FVC of a subject is reduced by between about 45% and about 50% relative to a subject treated with SOC. In some embodiments, an annual rate of decline in FVC of a subject is reduced by between about 50% and about 55% relative to a subject treated with SOC. In some embodiments, an annual rate of decline in FVC of a subject is reduced by between about 55% and about 60% relative to a subject treated with SOC. In some embodiments, an annual rate of decline in FVC of a subject is reduced by between about 60% and about 65% relative to a subject treated with SOC. In some embodiments, an annual rate of decline in FVC of a subject is reduced by between about 65% and about 70% relative to a subject treated with SOC. In some embodiments, an annual rate of decline in FVC of a subject is reduced by between about 10% and about 20% relative to a subject treated with SOC. In some embodiments, an annual rate of decline in FVC of a subject is reduced by between about 20% and about 30% relative to a subject treated with SOC. In some embodiments, an annual rate of decline in FVC of a subject is reduced by between about 30% and about 40% relative to a subject treated with SOC. In some embodiments, an annual rate of decline in FVC of a subject is reduced by between about 40% and about 50% relative to a subject treated with SOC. In some embodiments, an annual rate of decline in FVC of a subject is reduced by between about 50% and about 60% relative to a subject treated with SOC. In some embodiments, an annual rate of decline in FVC of a subject is reduced by between about 60% and about 70% relative to a subject treated with SOC. In some embodiments, annual rate of decline is measured in milliliters (mL). In some embodiments, an annual rate of decline in FVC of a subject is reduced by between about 1 mL and about 10 mL. In some embodiments, an annual rate of decline in FVC of a subject is reduced by between about 5 mL and about 10 mL. In some embodiments, an annual rate of decline in FVC of a subject is reduced by between about 10 mL and about 15 mL. In some embodiments, an annual rate of decline in FVC of a subject is reduced by between about 15 mL and about 20 mL. In some embodiments, an annual rate of decline in FVC of a subject is reduced by between about 20 mL and about 25 mL. In some embodiments, an annual rate of decline in FVC of a subject is reduced by between about 25 mL and about 30 mL. In some embodiments, an annual rate of decline in FVC of a subject is reduced by between about 30 mL and about 35 mL. In some embodiments, an annual rate of decline in FVC of a subject is reduced by between about 35 mL and about 40 mL. In some embodiments, an annual rate of decline in FVC of a subject is reduced by between about 40 mL and about 45 mL. In some embodiments, an annual rate of decline in FVC of a subject is reduced by between about 45 mL and about 50 mL. In some embodiments, an annual rate of decline in FVC of a subject is reduced by between about 50 mL and about 55 mL. In some embodiments, an annual rate of decline in FVC of a subject is reduced by between about 55 mL and about 60 mL. In some embodiments, an annual rate of decline in FVC of a subject is reduced by between about 60 mL and about 65 mL. In some embodiments, an annual rate of decline in FVC of a subject is reduced by between about 65 mL and about 70 mL. In some embodiments, an annual rate of decline in FVC of a subject is reduced by between about 70 mL and about 75 mL. In some embodiments, an annual rate of decline in FVC of a subject is reduced by between about 75 mL and about 80 mL. In some embodiments, an annual rate of decline in FVC of a subject is reduced by between about 85 mL and about 90 mL. In some embodiments, an annual rate of decline in FVC of a subject is reduced by between about 90 mL and about 95 mL. In some embodiments, an annual rate of decline in FVC of a subject is reduced by between about 95 mL and about 100 mL. In some embodiments, an annual rate of decline in FVC of a subject is reduced by between about 10 mL and about 20 mL. In some embodiments, an annual rate of decline in FVC of a subject is reduced by between about 20 mL and about 30 mL. In some embodiments, an annual rate of decline in FVC of a subject is reduced by between about 30 mL and about 40 mL. In some embodiments, an annual rate of decline in FVC of a subject is reduced by between about 40 mL and about 50 mL. In some embodiments, an annual rate of decline in FVC of a subject is reduced by between about 50 mL and about 60 mL. In some embodiments, an annual rate of decline in FVC of a subject is reduced by between about 60 mL and about 70 mL. In some embodiments, an annual rate of decline in FVC of a subject is reduced by between about 70 mL and about 80 mL. In some embodiments, an annual rate of decline in FVC of a subject is reduced by between about 80 mL and about 90 mL. In some embodiments, an annual rate of decline in FVC of a subject is reduced by between about 90 mL and about 100 mL. In some embodiments, an annual rate of decline in FVC of a subject is reduced by about 100 mL. In some embodiments, an annual rate of decline in FVC of a subject is reduced by more than about 100 mL.

In some embodiments, annual rate of decline is measured in milliliters (mL) relative to a subject treated with standard of care (SOC). In some embodiments, an annual rate of decline in FVC of a subject is reduced by between about 1 mL and about 10 mL relative to a subject treated with SOC. In some embodiments, an annual rate of decline in FVC of a subject is reduced by between about 5 mL and about 10 mL relative to a subject treated with SOC. In some embodiments, an annual rate of decline in FVC of a subject is reduced by between about 10 mL and about 15 mL relative to a subject treated with SOC. In some embodiments, an annual rate of decline in FVC of a subject is reduced by between about 15 mL and about 20 mL relative to a subject treated with SOC. In some embodiments, an annual rate of decline in FVC of a subject is reduced by between about 20 mL and about 25 mL relative to a subject treated with SOC. In some embodiments, an annual rate of decline in FVC of a subject is reduced by between about 25 mL and about 30 mL relative to a subject treated with SOC. In some embodiments, an annual rate of decline in FVC of a subject is reduced by between about 30 mL and about 35 mL relative to a subject treated with SOC. In some embodiments, an annual rate of decline in FVC of a subject is reduced by between about 35 mL and about 40 mL relative to a subject treated with SOC. In some embodiments, an annual rate of decline in FVC of a subject is reduced by between about 40 mL and about 45 mL relative to a subject treated with SOC. In some embodiments, an annual rate of decline in FVC of a subject is reduced by between about 45 mL and about 50 mL relative to a subject treated with SOC. In some embodiments, an annual rate of decline in FVC of a subject is reduced by between about 50 mL and about 55 mL relative to a subject treated with SOC. In some embodiments, an annual rate of decline in FVC of a subject is reduced by between about 55 mL and about 60 mL relative to a subject treated with SOC. In some embodiments, an annual rate of decline in FVC of a subject is reduced by between about 60 mL and about 65 mL relative to a subject treated with SOC. In some embodiments, an annual rate of decline in FVC of a subject is reduced by between about 65 mL and about 70 mL relative to a subject treated with SOC. In some embodiments, an annual rate of decline in FVC of a subject is reduced by between about 70 mL and about 75 mL relative to a subject treated with SOC. In some embodiments, an annual rate of decline in FVC of a subject is reduced by between about 75 mL and about 80 mL relative to a subject treated with SOC. In some embodiments, an annual rate of decline in FVC of a subject is reduced by between about 85 mL and about 90 mL relative to a subject treated with SOC. In some embodiments, an annual rate of decline in FVC of a subject is reduced by between about 90 mL and about 95 mL relative to a subject treated with SOC. In some embodiments, an annual rate of decline in FVC of a subject is reduced by between about 95 mL and about 100 mL relative to a subject treated with SOC. In some embodiments, an annual rate of decline in FVC of a subject is reduced by between about 10 mL and about 20 mL relative to a subject treated with SOC. In some embodiments, an annual rate of decline in FVC of a subject is reduced by between about 20 mL and about 30 mL relative to a subject treated with SOC. In some embodiments, an annual rate of decline in FVC of a subject is reduced by between about 30 mL and about 40 mL relative to a subject treated with SOC. In some embodiments, an annual rate of decline in FVC of a subject is reduced by between about 40 mL and about 50 mL relative to a subject treated with SOC. In some embodiments, an annual rate of decline in FVC of a subject is reduced by between about 50 mL and about 60 mL relative to a subject treated with SOC. In some embodiments, an annual rate of decline in FVC of a subject is reduced by between about 60 mL and about 70 mL relative to a subject treated with SOC. In some embodiments, an annual rate of decline in FVC of a subject is reduced by between about 70 mL and about 80 mL relative to a subject treated with SOC. In some embodiments, an annual rate of decline in FVC of a subject is reduced by between about 80 mL and about 90 mL relative to a subject treated with SOC. In some embodiments, an annual rate of decline in FVC of a subject is reduced by between about 90 mL and about 100 mL relative to a subject treated with SOC. In some embodiments, an annual rate of decline in FVC of a subject is reduced by about 100 mL relative to a subject treated with SOC. In some embodiments, an annual rate of decline in FVC of a subject is reduced by more than about 100 mL relative to a subject treated with SOC.

In some embodiments, administration of one or more TβRII antagonists of the present disclosure results in a reduction in annual rate of decline of forced vital capacity (FVC) relative to a subject treated with standard of care (SOC). In some embodiments, an annual rate of decline in FVC has been slowed relative to a subject treated with standard of care (SOC). In some embodiments, administration of one or more TβRII antagonists of the present disclosure slows the annual rate of decline in FVC relative to a subject treated with standard of care (SOC). In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein an annual rate of decline in FVC of a subject is reduced by about 100 mL relative to a subject treated with SOC.). In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein an annual rate of decline in FVC of a subject is reduced by 100 mL relative to a subject treated with SOC. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein an annual rate of decline in FVC of a subject is reduced by more than about 100 mL relative to a subject treated with SOC.

Diffusing Capacity for Carbon Monoxide (DLCO)

Measurement of diffusing capacity of the lungs for carbon monoxide (DLCO) is a medical test that determines how much oxygen travels from the alveoli of the lungs to the blood stream. Testing for DLCO involves measuring the partial pressure difference between inspired and expired carbon monoxide. A DLCO measurement relies on the strong affinity and/or large absorption capacity of red blood cells for carbon monoxide and thus demonstrates gas uptake by the capillaries that are less dependent on cardiac output. A measurement of DLCO can be affected by atmospheric pressure and/or altitude and correction factors can be calculated using the method recommended by the American Thoracic Society. Expected DLCO is also affected by the amount of hemoglobin, carboxyhemoglobin, age and/or sex of the subject. Generally, DLCO is measured in "mL/min/kPa" and can also be presented as a percentage of predicted. Of predicted" refers to reporting the subject's results as a percentage of the known predicted values for a healthy subject of similar characteristics (e.g., height, sex, age, race, and weight). DLCO can be measured by one or more of a rapidly responding gas analyzer (RGA), flow volume analyzer, and/or gas analyzer. Several factors can lead to a decrease in DLCO, which includes, but is not limited to, hindrance in the alveolar wall (e.g., fibrosis, alveolitis, vasculitis), decrease of total lung area (e.g., restrictive lung disease or lung resection (partial or total)), chronic obstructive pulmonary disease (COPD) due to decreased surface area in the alveoli as well as damage to the capillary bed, pulmonary embolism, cardiac insufficiency, pulmonary hypertension (PH), exposure to bleomycin (upon administration of at least about 200 units), chronic heart failure, anemia due to a decrease in blood volume, and/or amiodarone high cumulative dose (e.g., at least about 400 milligrams per day).

In some embodiments, DLCO is measured using a rapidly responding gas analyzer (RGA). In some embodiments, a subject has a DLCO of between about 90% and about 80% of predicted. In some embodiments, a subject has a DLCO of between about 80% and about 70% of predicted. In some embodiments, a subject has a DLCO of between about 70% and about 60% of predicted. In some embodiments, a subject has a DLCO of between about 60% and about 50% of predicted. In some embodiments, a subject has a DLCO of between about 50% and about 40% of predicted. In some embodiments, a subject has a DLCO of between about 40% and about 30% of predicted. In some embodiments, a subject has a DLCO of between about 30% and about 20% of predicted.

In some embodiments, a subject of the present disclosure has a DLCO of greater than or equal to 40% of predicted. In some embodiments, a subject of the present disclosure has a DLCO of greater than or equal to 40% of predicted, corrected by Hgb. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein the subject has a DLCO of greater than or equal to 40% of predicted at baseline. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein the subject has a DLCO of greater than or equal to 40% of predicted (corrected by Hgb) at baseline.

In some embodiments, a subject of the present disclosure has a DLCO of between about 40% and about 89% of predicted. In some embodiments, a subject of the present disclosure has a DLCO of between about 40% and about 89% of predicted, corrected by Hgb. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein the subject has a DLCO of between about 40% and about 89% of predicted at baseline. In some embodiments the present disclosure provides methods of treating systemic sclerosis with one or more pulmonary complications (e.g., SSc-ILD), comprising administering a Transforming Growth Factor-β Receptor II (TβRII) fusion polypeptide to the subject; wherein the subject has a DLCO of between about 40% and about 89% of predicted (corrected by Hgb) at baseline.

In some embodiments, an annual rate of decline in diffusing capacity of the lungs (DLCO) of a subject is measured over a time period of at least one year after administration of one or more TβRII antagonists of the present disclosure. In some embodiments, an annual rate of decline in diffusing capacity of the lungs (DLCO) of a subject is measured over a time period of at least one year after administration of one or more TβRII antagonists of the present disclosure and is compared to a baseline DLCO measurement. In some embodiments, the present disclosure provides methods of treating SSc-ILD, comprising administering a TβRII antagonist to a subject in need thereof, wherein an annual rate of DLCO of the subject is reduced.

In some embodiments, an annual rate of decline in DLCO of a subject is reduced by between about 1% and about 10%. In some embodiments, an annual rate of decline in DLCO of a subject is reduced by between about 5% and about 10%. In some embodiments, an annual rate of decline in DLCO of a subject is reduced by between about 10% and about 15%. In some embodiments, an annual rate of decline in DLCO of a subject is reduced by between about 15% and about 20%. In some embodiments, an annual rate of decline in DLCO of a subject is reduced by between about 20% and about 25%. In some embodiments, an annual rate of decline in DLCO of a subject is reduced by between about 25% and about 30%. In some embodiments, an annual rate of decline in DLCO of a subject is reduced by between about 30% and about 35%. In some embodiments, an annual rate of decline in DLCO of a subject is reduced by between about 35% and about 40%. In some embodiments, an annual rate of decline in DLCO of a subject is reduced by between about 40% and about 45%. In some embodiments, an annual rate of decline in DLCO of a subject is reduced by between about 45% and about 50%. In some embodiments, an annual rate of decline in DLCO of a subject is reduced by between about 50% and about 55%. In some embodiments, an annual rate of decline in DLCO of a subject is reduced by between about 55% and about 60%. In some embodiments, an annual rate of decline in DLCO of a subject is reduced by between about 60% and about 65%. In some embodiments, an annual rate of decline in DLCO of a subject is reduced by between about 65% and about 70%. In some embodiments, an annual rate of decline in DLCO of a subject is reduced by between about 10% and about 20%. In some embodiments, an annual rate of decline in DLCO of a subject is reduced by between about 20% and about 30%.

In some embodiments, an annual rate of decline in DLCO of a subject is reduced by between about 30% and about 40%. In some embodiments, an annual rate of decline in DLCO of a subject is reduced by between about 40% and about 50%. In some embodiments, an annual rate of decline in DLCO of a subject is reduced by between about 50% and about 60%. In some embodiments, an annual rate of decline in DLCO of a subject is reduced by between about 60% and about 70%.

In some embodiments, annual rate of decline is measured in mL/min/kPa per year. In some embodiments, an annual rate of decline in DLCO of a subject is reduced by between about 1 mL/min/kPa and about 10 mL/min/kPa per year. In some embodiments, an annual rate of decline in DLCO of a subject is reduced by between about 5 mL/min/kPa and about 10 mL/min/kPa per year. In some embodiments, an annual rate of decline in DLCO of a subject is reduced by between about 10 mL/min/kPa and about 15 mL/min/kPa per year. In some embodiments, an annual rate of decline in DLCO of a subject is reduced by between about 15 mL/min/kPa and about 20 mL/min/kPa per year. In some embodiments, an annual rate of decline in DLCO of a subject is reduced by between about 20 mL/min/kPa and about 25 mL/min/kPa per year. In some embodiments, an annual rate of decline in DLCO of a subject is reduced by between about 25 mL/min/kPa and about 30 mL/min/kPa per year. In some embodiments, an annual rate of decline in DLCO of a subject is reduced by between about 30 mL/min/kPa and about 35 mL/min/kPa per year. In some embodiments, an annual rate of decline in DLCO of a subject is reduced by between about 35 mL/min/kPa and about 40 mL/min/kPa per year. In some embodiments, an annual rate of decline in DLCO of a subject is reduced by between about 40 mL/min/kPa and about 45 mL/min/kPa per year. In some embodiments, an annual rate of decline in DLCO of a subject is reduced by between about 45 mL/min/kPa and about 50 mL/min/kPa per year. In some embodiments, an annual rate of decline in DLCO of a subject is reduced by between about 50 mL/min/kPa and about 55 mL/min/kPa per year. In some embodiments, an annual rate of decline in DLCO of a subject is reduced by between about 55 mL/min/kPa and about 60 mL/min/kPa per year. In some embodiments, an annual rate of decline in DLCO of a subject is reduced by between about 60 mL/min/kPa and about 65 mL/min/kPa per year. In some embodiments, an annual rate of decline in DLCO of a subject is reduced by between about 65 mL/min/kPa and about 70 mL/min/kPa per year. In some embodiments, an annual rate of decline in DLCO of a subject is reduced by between about 70 mL/min/kPa and about 75 mL/min/kPa per year. In some embodiments, an annual rate of decline in DLCO of a subject is reduced by between about 75 mL/min/kPa and about 80 mL/min/kPa per year. In some embodiments, an annual rate of decline in DLCO of a subject is reduced by between about 85 mL/min/kPa and about 90 mL/min/kPa per year. In some embodiments, an annual rate of decline in DLCO of a subject is reduced by between about 90 mL/min/kPa and about 95 mL/min/kPa per year. In some embodiments, an annual rate of decline in DLCO of a subject is reduced by between about 95 mL/min/kPa and about 100 mL/min/kPa per year. In some embodiments, an annual rate of decline in DLCO of a subject is reduced by between about 10 mL/min/kPa and about 20 mL/min/kPa per year. In some embodiments, an annual rate of decline in DLCO of a subject is reduced by between about 20 mL/min/kPa and about 30 mL/min/kPa per year. In some embodiments, an annual rate of decline in DLCO of a subject is reduced by between about 30 mL/min/kPa and about 40 mL/min/kPa per year. In some embodiments, an annual rate of decline in DLCO of a subject is reduced by between about 40 mL/min/kPa and about 50 mL/min/kPa per year. In some embodiments, an annual rate of decline in DLCO of a subject is reduced by between about 50 mL/min/kPa and about 60 mL/min/kPa per year. In some embodiments, an annual rate of decline in DLCO of a subject is reduced by between about 60 mL/min/kPa and about 70 mL/min/kPa per year. In some embodiments, an annual rate of decline in DLCO of a subject is reduced by between about 70 mL/min/kPa and about 80 mL/min/kPa per year. In some embodiments, an annual rate of decline in DLCO of a subject is reduced by between about 80 mL/min/kPa and about 90 mL/min/kPa per year. In some embodiments, an annual rate of decline in DLCO of a subject is reduced by between about 90 mL/min/kPa and about 100 mL/min/kPa per year. In some embodiments, an annual rate of decline in DLCO of a subject is reduced by more than about 100 mL/min/kPa per year.

Lung Volume

Measurement of lung volumes may be important when spirometry shows a decreased forced vital capacity. Body plethysmography is the typical way to measure lung volumes, particularly in the setting of significant airflow obstruction. Alternative methods to measure lung function include, but are not limited to, helium dilution, nitrogen washout, and/or measurements based on chest imaging.

Measurements of total lung capacity (TLC) using chest radiograph and/or high resolution computed tomography (HRCT) generally correlate within 15 percent of those obtained by body plethysmography.

Common lung volume measurements include vital capacity, total lung capacity, functional residual capacity, and/or residual volume. Vital capacity (VC) comprises maximum volume exhaled after maximum inspiration, and can be measured during forced exhalation (FVC) or slow exhalation (SVC). Functional residual capacity (FRC) comprises volume of air remaining in chest at the end of a tidal volume breath. Residual volume (RV) comprises volume of air remaining in chest after maximal exhalation. Expiratory reserve volume (ERV) comprises volume of air exhaled from end-tidal volume (FRC) to point of maximal exhalation (RV), therefore RV plus ERV=FRC. Inspiratory capacity (IC) comprises maximum inspiration from end-tidal volume (FRC) to total lung capacity. Total lung capacity (TLC) comprises volume of air in lungs at end of maximal inspiration (usually calculated by RV plus VC or FRC plus IC)

Combination of an FEV1/FVC and TLC both less than the fifth percentile lower limit of normal is considered a mixed defect. Combination of a normal FEV1/FVC and a normal TLC, and a low FEV1 or FVC, is considered a nonspecific pattern. A pattern in which an FVC is disproportionately reduced relative to TLC has been described as a complex restrictive pattern.

In some embodiments, a subject with SSc (e.g., SSc-ILD) has a decreased lung volume. In some embodiments, a subject with SSc (e.g., SSc-ILD) has a decreased total lung capacity (TLC).

In some embodiments, a subject has a TLC of between about 100% and about 90% of predicted. In some embodiments, a subject has a TLC of between about 90% and about 80% of predicted. In some embodiments, a subject has a TLC of between about 80% and about 70% of predicted. In some embodiments, a subject has a TLC of between about 70% and about 60% of predicted. In some embodiments, a subject has a TLC of between about 60% and about 50% of predicted. In some embodiments, a subject has a TLC of between about 50% and about 40% of predicted. In some embodiments, a subject has a TLC of between about 40% and about 30% of predicted. In some embodiments, a subject has a TLC of between about 30% and about 20% of predicted.

Six Minute Walk Test

A six-minute walk test (6MWT) assesses both distance walked (meters) and/or degree of oxygen desaturation of a subject. It can be used as a measure of submaximal exercise performance in a variety of pulmonary diseases (e.g., SSc-ILD, idiopathic pulmonary fibrosis (IPF) and/or pulmonary arterial hypertension (PAH)). Assessment of pulse oxygen desaturation can be problematic in patients with SSc due to Raynaud phenomenon and/or poor finger perfusion. If the appropriate attachment is available, measurement of pulse oxygen saturation using an earlobe clip may be more effective for subjects with SSc with a pulmonary complication (e.g., SSc-ILD). Desaturation on ambulation is common to both ILD and/or pulmonary hypertension. A healthy subject (e.g., a subject without SSc-ILD or any other respiratory disease) typically walks between about 400 to about 700 meters in a six minute walk test. Average distance walked may vary by characteristics such as sex, age, weight, or height, among others. A reference subject for a six minute walk test may be a healthy subject (e.g., no respiratory disease) of similar age, height, weight, and/or same sex. An improvement of at least about 30 meters in distance walked during a six minute walk test typically indicates an improvement in respiratory function.

In some embodiments, a subject of the present disclosure has a decrease in distance walked during a six minute walk test. In some embodiments, a subject has a decrease in oxygen desaturation. In some embodiments, administration of one or more TβRII antagonists of the present disclosure results in an increase in distance walked during a six minute walk test. In some embodiments, administration of one or more TβRII antagonists of the present disclosure results in an increase in oxygen desaturation during a six minute walk test.

In some embodiments, the present disclosure provides methods of treating SSc-ILD, comprising administering a Transforming Growth Factor-β Receptor II (TβRII) antagonist to a subject in need thereof, wherein the subject has an improved distance walked in a six minute walk test after the treatment. In some embodiments, a subject improves distance walked in a six minute walk test by at least about 30 meters compared to a reference subject. In some embodiments, a reference subject is a healthy person of similar characteristics (e.g., sex, age, height, weight).

In some embodiments, a subject improves distance walked in a six minute walk test by at least between about 10 meters and about 15 meters compared to a reference subject. In some embodiments, a subject improves distance walked in a six minute walk test by at least between about 15 meters and about 20 meters compared to a reference subject. In some embodiments, a subject improves distance walked in a six minute walk test by at least between about 20 meters and about 25 meters compared to a reference subject. In some embodiments, a subject improves distance walked in a six minute walk test by at least between about 25 meters and about 30 meters compared to a reference subject. In some embodiments, a subject improves distance walked in a six minute walk test by at least between about 30 meters and about 35 meters compared to a reference subject. In some embodiments, a subject improves distance walked in a six minute walk test by at least between about 35 meters and about 40 meters compared to a reference subject. In some embodiments, a subject improves distance walked in a six minute walk test by at least between about 40 meters and about 45 meters compared to a reference subject. In some embodiments, a subject improves distance walked in a six minute walk test by at least between about 45 meters and about 50 meters compared to a reference subject. In some embodiments, a subject improves distance walked in a six minute walk test by at least between about 50 meters and about 55 meters compared to a reference subject. In some embodiments, a subject improves distance walked in a six minute walk test by at least between about 55 meters and about 60 meters compared to a reference subject. In some embodiments, a subject improves distance walked in a six minute walk test by at least between about 60 meters and about 65 meters compared to a reference subject. In some embodiments, a subject improves distance walked in a six minute walk test by at least between about 65 meters and about 70 meters compared to a reference subject. In some embodiments, a subject improves distance walked in a six minute walk test by at least between about 70 meters and about 75 meters compared to a reference subject. In some embodiments, a subject improves distance walked in a six minute walk test by at least between about 75 meters and about 80 meters compared to a reference subject. In some embodiments, a subject improves distance walked in a six minute walk test by at least between about 80 meters and about 85 meters compared to a reference subject. In some embodiments, a subject improves distance walked in a six minute walk test by at least between about 85 meters and about 90 meters compared to a reference subject. In some embodiments, a subject improves distance walked in a six minute walk test by at least between about 90 meters and about 95 meters compared to a reference subject. In some embodiments, a subject improves distance walked in a six minute walk test by at least between about 95 meters and about 100 meters compared to a reference subject. In some embodiments, a subject improves distance walked in a six minute walk test by at least more than 100 meters compared to a reference subject.

In some embodiments, treatment of a subject with one or more of a TβRII antagonist of the present disclosure improves distance walked in a six minute walk test of a subject. In some embodiments, treatment of a subject with one or more of a TβRII antagonist of the present disclosure improves distance walked in a six minute walk test of a subject by between about 1% and about 3%. In some embodiments, treatment of a subject with one or more of a TβRII antagonist of the present disclosure improves distance walked in a six minute walk test of a subject by between about 1% and about 5%. In some embodiments, treatment of a subject with one or more of a TβRII antagonist of the present disclosure improves distance walked in a six minute walk test of a subject by between about 1% and about 8%. In some embodiments, treatment of a subject with one or more of a TβRII antagonist of the present disclosure improves distance walked in a six minute walk test of a subject by between about 1% and about 10%. In some embodiments, treatment of a subject with one or more of a TβRII antagonist of the present disclosure improves distance walked in a six minute walk test of a subject by between about 10% and about 15%. In some embodiments, treatment of a subject with one or more of a TβRII antagonist of the present disclosure improves distance walked in a six minute walk test of a subject by between about 15% and about 20%. In some embodiments, treatment of a subject with one or more of a TβRII antagonist of the present disclosure improves distance walked in a six minute walk test of a subject by between about 20% and about 25%. In some embodiments, treatment of a subject with one or more of a TβRII antagonist of the present disclosure improves distance walked in a six minute walk test of a subject by between about 25% and about 30%. In some embodiments, treatment of a subject with one or more of a TβRII antagonist of the present disclosure improves distance walked in a six minute walk test of a subject by between about 30% and about 35%. In some embodiments, treatment of a subject with one or more of a TβRII antagonist of the present disclosure improves distance walked in a six minute walk test of a subject by between about 35% and about 40%. In some embodiments, treatment of a subject with one or more of a TβRII antagonist of the present disclosure improves distance walked in a six minute walk test of a subject by between about 40% and about 45%. In some embodiments, treatment of a subject with one or more of a TβRII antagonist of the present disclosure improves distance walked in a six minute walk test of a subject by between about 45% and about 50%.

Pulmonary Imaging

Chest Radiography

Chest radiography can be used together with other methods of detection described herein to determine if a subject has SSc-ILD. The most common radiographic abnormality on a routine chest radiograph is a reticular pattern (e.g., fine or ground glass, medium or irregular, coarse or honeycomb), however, nodular or mixed patterns (e.g., alveolar filling and/or increased interstitial markings) are not unusual. Basic patterns of diffuse lung disease include, but are not limited to, nodular (including micronodular and/or military), reticular (fine or ground glass, medium or irregular, coarse or honeycomb), linear (interlobular septal or Kerley lines and/or intralobular septal lines), combined reticular and/or nodular, destructive, alveolar, bronchial, and/or vascular. Although a chest radiograph is useful in suggesting presence of interstitial lung disease (ILD), the correlation between the radiographic pattern and the stage of disease (clinical or histopathologic) is generally poor. A radiographic finding of honeycombing (small cystic spaces) may correlate with pathologic findings and, when present, can portend a poor prognosis. In evaluation of ILD, it is important to review all previous chest films to assess the rate of change in disease activity.

Honeycombing can be a feature of endstage interstitial lung disease. It represents restructuring of the lung parenchyma, with simplification of the lung architecture and subsequent small cyst formation surrounded by fibrotic tissue. Accompanying bronchiolectasis is regularly present. The small subpleural spaces, which usually measure between 3 and 10 mm in diameter may connect with small airway and some collapse on expiratory imaging. Honeycombs are usually stacked and are not separated by intervening normal lung. Bronchiolectases which can mimic honeycombing are usually separated by interposed lung parenchyma. The expiratory collapse of some of these spaces distinguishes them from the subpleural spaces formed by paraseptal emphysema, which do not decrease in size with expiration. In addition, honeycombs have slightly thicker walls than emphysematous spaces. Honeycombing forms an array of multilayered, stacked spaces, while paraseptal emphysematous spaces are single-layered (i.e., single-tiered). The differentiation of honeycombing, bronchiolectasis and paraseptal emphysema is typically achieved with additional analysis using high resolution computed tomography. Honeycombing can be seen in subjects suffering from, but not limited to IPF/UIP, other interstitial pneumonias, Langerhans cell histiocytosis (previously eosinophilic granuloma), collagen vascular diseases, healed necrotizing infections, endstage pneumoconiosis, and endstage hypersensitivity pneumonitis (i.e., extrinsic allergic alveolitis). Classic radiographic features of established SSc-ILD comprise symmetric, reticular (e.g., fine or ground glass, medium or irregular, coarse or honeycomb), opacities. Radiographic features are usually most pronounced at the lung bases.

In some embodiments, a subject has a chest radiograph with one or more radiographic abnormalities. In some embodiments, a subject has a chest radiograph with one or more of a reticular pattern, a modular pattern, or a mixed pattern. In some embodiments, a subject has a chest radiograph with one or more of a nodular pattern, reticular pattern, a linear pattern, a combined reticular and nodular pattern, a destructive pattern, an alveolar pattern, a bronchial pattern, and/or a vascular pattern. In some embodiments, a subject has a chest radiograph with a reticular pattern. In some embodiments, a subject has a chest radiograph with a honeycombing pattern.

A chest radiograph can be normal in as many as 10 percent of patients with some forms of ILD, particularly those with hypersensitivity pneumonitis. Thus, a complete evaluation is generally undertaken even if a patient has a normal chest radiograph or radiographic evidence of ILD.

High Resolution Computed Topography (HRCT)

A more sensitive alternative to chest radiography for diagnosing and/or evaluating SSc with a pulmonary complication (e.g., SSc-ILD) is High Resolution-Computer Topography (HRCT). HRCT scans thin sections (3 mm or less) of the lung. HRCT can demonstrate character and/or distribution of fine structural abnormalities that are not visible on chest radiographs. Prone (e.g., face down) images are often obtained in addition to the usual supine (e.g., face up) images to differentiate between increased density due to ILD and/or dependent atelectasis at the posterior lung bases.

HRCT is generally performed using a conventional CT scanner. However, imaging parameters are chosen to maximize spatial resolution, which include, but are not limited to, a narrow slice width (usually 1-2 mm), a high spatial resolution image reconstruction algorithm, field of view is minimization (e.g., to minimize the size of each pixel), and/or other scan factors (e.g., focal spot). Depending on the suspected diagnosis, an HRCT scan may be performed in both inspiration and expiration. HRCT is conventionally performed by taking thin sections (e.g., less than 3 mm) that are about 10-40 mm apart. The resulting scan is generally a few images that should be representative of the lungs in general, but that cover only approximately one tenth of the lungs.

HRCT patterns found in SSc-ILD, for example, may mirror common histopathological patterns of idiopathic interstitial pneumonias, which include but are not limited to fibrotic nonspecific interstitial pneumonia (NSIP), usual interstitial pneumonia (UIP), and/or centrilobular fibrosis. Among patients with SSc-ILD, the most common pathologic pattern is typically NSIP, which can be associated with an HRCT finding of ground glass opacities in a peripheral distribution and/or a lower proportion of coarse reticulation, but is not typically associated with a honeycomb pattern. Early HRCT changes are typically a narrow, often ill-defined, subpleural crescent of increased density in the posterior (dependent) segments of the lower lobes. As SSc-ILD progresses, there is usually volume loss associated with a reticular appearance and/or traction bronchiectasis. In a subset of patients with a histologic UIP pattern, the HRCT appearance is usually similar to that of fibrotic NSIP. However, sometimes the HRCT pattern is more consistent with that of UIP with bibasilar reticular opacities, associated with traction bronchiectasis and/or the development of subpleural honeycomb air spaces, which ultimately coalesce into large cystic air spaces. A honeycomb pattern can be indicative of a subject that is in advanced stages of disease and will not respond to immunosuppressive therapy. Centrilobular fibrosis is typically a rare pattern that may be associated with patchy ground glass or consolidative opacities with a central distribution on HRCT scanning. Centrilobular nodules and/or "tree-in-bud" patterns are other features of recurrent aspiration. In some embodiments, a subject with SSc-ILD has an HRCT scan that reveals lung parenchymal changes including any round glass opacity and fibrotic peripheral reticulations and honey combing without abnormalities. In some embodiments, a subject has undergone a High Resolution Computed Topography scan (HRCT) of the lungs prior to treatment. In some embodiments, a subject has undergone a HRCT scan of the lungs prior to treatment with one or more TβRII antagonists of the present disclosure. In some embodiments, a subject receives a HRCT scan of the lungs during treatment with one or more TβRII antagonists of the present disclosure. In some embodiments, a subject receives a HRCT scan of the lungs after treatment with one or more TβRII antagonists of the present disclosure. In some embodiments, the present disclosure provides methods of treating SSc-ILD, comprising administering a TβRII antagonist to a subject in need thereof, wherein an amount of fibrosis or pattern of interstitial pneumonia is determined by HRCT scan of the lungs of the subject.

In some embodiments, an HRCT scan of a subject has determined a presence of at least between about 1% and about 10% fibrosis of the lungs. In some embodiments, an HRCT scan of a subject has determined a presence of at least between about 5% and about 10% fibrosis of the lungs. In some embodiments, an HRCT scan of a subject has determined a presence of at least between about 10% and about 15% fibrosis of the lungs. In some embodiments, an HRCT scan of a subject has determined a presence of at least between about 15% and about 20% fibrosis of the lungs. In some embodiments, an HRCT scan of a subject has determined a presence of at least between about 20% and about 25% fibrosis of the lungs. In some embodiments, an HRCT scan of a subject has determined a presence of at least between about 25% and about 30% fibrosis of the lungs. In some embodiments, an HRCT scan of a subject has determined a presence of at least between about 30% and about 35% fibrosis of the lungs. In some embodiments, an HRCT scan of a subject has determined a presence of at least between about 35% and about 40% fibrosis of the lungs. In some embodiments, an HRCT scan of a subject has determined a presence of at least between about 40% and about 45% fibrosis of the lungs. In some embodiments, an HRCT scan of a subject has determined a presence of at least between about 45% and about 50% fibrosis of the lungs. In some embodiments, an HRCT scan of a subject has determined a presence of at least between about 1% and about 10% fibrosis of the lungs. In some embodiments, an HRCT scan of a subject has determined a presence of at least between about 10% and about 20% fibrosis of the lungs. In some embodiments, an HRCT scan of a subject has determined a presence of at least between about 20% and about 30% fibrosis of the lungs. In some embodiments, an HRCT scan of a subject has determined a presence of at least between about 30% and about 40% fibrosis of the lungs. In some embodiments, an HRCT scan of a subject has determined a presence of at least between about 40% and about 50% fibrosis of the lungs. In some embodiments, an HRCT scan of a subject has determined a presence of at least 10% fibrosis of the lungs. In some embodiments, an HRCT scan of a subject has determined a presence of greater than or equal to 10% fibrosis of the lungs.

In some embodiments, the present disclosure provides methods of treating SSc-ILD, comprising administering a TβRII antagonist to a subject in need thereof, wherein an amount of abnormalities is determined by HRCT scan of the lungs of the subject. In some embodiments, an HRCT scan of a subject has determined a presence of at least between about 1% and about 10% abnormalities in the lungs. In some embodiments, an HRCT scan of a subject has determined a presence of at least between about 5% and about 10% abnormalities in the lungs. In some embodiments, an HRCT scan of a subject has determined a presence of at least between about 10% and about 15% abnormalities in the lungs. In some embodiments, an HRCT scan of a subject has determined a presence of at least between about 15% and about 20% abnormalities in the lungs. In some embodiments, an HRCT scan of a subject has determined a presence of at least between about 20% and about 25% abnormalities in the lungs. In some embodiments, an HRCT scan of a subject has determined a presence of at least between about 25% and about 30% abnormalities in the lungs. In some embodiments, an HRCT scan of a subject has determined a presence of at least between about 30% and about 35% abnormalities in the lungs. In some embodiments, an HRCT scan of a subject has determined a presence of at least between about 35% and about 40% abnormalities in the lungs. In some embodiments, an HRCT scan of a subject has determined a presence of at least between about 40% and about 45% abnormalities in the lungs. In some embodiments, an HRCT scan of a subject has determined a presence of at least between about 45% and about 50% abnormalities in the lungs. In some embodiments, an HRCT scan of a subject has determined a presence of at least between about 1% and about 10% abnormalities in the lungs. In some embodiments, an HRCT scan of a subject has determined a presence of at least between about 10% and about 20% abnormalities in the lungs. In some embodiments, an HRCT scan of a subject has determined a presence of at least between about 20% and about 30% abnormalities in the lungs. In some embodiments, an HRCT scan of a subject has determined a presence of at least between about 30% and about 40% abnormalities in the lungs. In some embodiments, an HRCT scan of a subject has determined a presence of at least between about 40% and about 50% abnormalities in the lungs.

In some embodiments, the present disclosure provides methods of treating SSc-ILD, comprising administering a TβRII antagonist to a subject in need thereof, wherein an improvement in the amount of fibrosis in the lungs is determined by HRCT scan of the lungs of the subject. In some embodiments, an improvement in the amount of fibrosis in the lungs of a subject comprises a decrease in the amount of fibrosis in the lungs.

In some embodiments, an HRCT scan of a subject has determined an improvement of at least between about 1% and about 10% of fibrosis of the lungs. In some embodiments, an HRCT scan of a subject has determined an improvement of at least between about 5% and about 10% of fibrosis of the lungs. In some embodiments, an HRCT scan of a subject has determined an improvement of at least between about 10% and about 15% of fibrosis of the lungs. In some embodiments, an HRCT scan of a subject has determined an improvement of at least between about 15% and about 20% of fibrosis of the lungs. In some embodiments, an HRCT scan of a subject has determined an improvement of at least between about 20% and about 25% of fibrosis of the lungs. In some embodiments, an HRCT scan of a subject has determined an improvement of at least between about 25% and about 30% of fibrosis of the lungs. In some embodiments, an HRCT scan of a subject has determined an improvement of at least between about 30% and about 35% of fibrosis of the lungs. In some embodiments, an HRCT scan of a subject has determined an improvement of at least between about 35% and about 40% of fibrosis of the lungs. In some embodiments, an HRCT scan of a subject has determined an improvement of at least between about 40% and about 45% of fibrosis of the lungs. In some embodiments, an HRCT scan of a subject has determined an improvement of at least between about 45% and about 50% of fibrosis of the lungs. In some embodiments, an HRCT scan of a subject has determined an improvement of at least between about 1% and about 10% of fibrosis of the lungs. In some embodiments, an HRCT scan of a subject has determined an improvement of at least between about 10% and about 20% of fibrosis of the lungs. In some embodiments, an HRCT scan of a subject has determined an improvement of at least between about 20% and about 30% of fibrosis of the lungs. In some embodiments, an HRCT scan of a subject has determined an improvement of at least between about 30% and about 40% of fibrosis of the lungs. In some embodiments, an HRCT scan of a subject has determined an improvement of at least between about 40% and about 50% of fibrosis of the lungs.

In some embodiments, an HRCT scan of a subject has determined a decrease of at least between about 1% and about 10% of fibrosis of the lungs. In some embodiments, an HRCT scan of a subject has determined a decrease of at least between about 5% and about 10% of fibrosis of the lungs. In some embodiments, an HRCT scan of a subject has determined a decrease of at least between about 10% and about 15% of fibrosis of the lungs. In some embodiments, an HRCT scan of a subject has determined a decrease of at least between about 15% and about 20% of fibrosis of the lungs. In some embodiments, an HRCT scan of a subject has determined a decrease of at least between about 20% and about 25% of fibrosis of the lungs. In some embodiments, an HRCT scan of a subject has determined a decrease of at least between about 25% and about 30% of fibrosis of the lungs. In some embodiments, an HRCT scan of a subject has determined a decrease of at least between about 30% and about 35% of fibrosis of the lungs. In some embodiments, an HRCT scan of a subject has determined a decrease of at least between about 35% and about 40% of fibrosis of the lungs. In some embodiments, an HRCT scan of a subject has determined a decrease of at least between about 40% and about 45% of fibrosis of the lungs. In some embodiments, an HRCT scan of a subject has determined a decrease of at least between about 45% and about 50% of fibrosis of the lungs. In some embodiments, an HRCT scan of a subject has determined a decrease of at least between about 1% and about 10% of fibrosis of the lungs. In some embodiments, an HRCT scan of a subject has determined a decrease of at least between about 10% and about 20% of fibrosis of the lungs. In some embodiments, an HRCT scan of a subject has determined a decrease of at least between about 20% and about 30% of fibrosis of the lungs. In some embodiments, an HRCT scan of a subject has determined a decrease of at least between about 30% and about 40% of fibrosis of the lungs. In some embodiments, an HRCT scan of a subject has determined a decrease of at least between about 40% and about 50% of fibrosis of the lungs.

In some embodiments, an HRCT scan of a subject with SSc-ILD shows a pattern of nonspecific interstitial pneumonia (NSIP) in the lungs of the subject. In some embodiments, an HRCT scan of a subject with SSc-ILD shows a pattern of usual interstitial pneumonia (UIP) in the lungs of the subject. In some embodiments, an HRCT scan of a subject with SSc-ILD shows a honeycomb pattern. In some embodiments, a subject with an HRCT scan showing a honeycomb pattern does not respond to immunosuppressive therapy.

HRCT can be paired with a technology called Functional Respiratory Imaging (FRI). FRI is a non-invasive measurement of the patient-specific respiratory system. A set of distinct biomarkers analyzes exposure, structure and function of the lungs and airways. Phase 1 comprises medical imagine, typically using HRCT scans. Phase 2 comprises image processing and measurements. Phase 3 comprises flow simulation, where Computational Fluid Dynamics (CFD) is used to quantify airflow and exposure to inhaled particles. FRI provides regional information on airway resistance, air trapping, ventilation mapping, ventilation/perfusion reserve, lung and lobar volume, emphysema, internal airflow distribution, blood vessel volume, nodule volume, airway (wall) volume, and aerosol deposition. In some embodiments, a subject has undergone FRI of the lungs prior to treatment. In some embodiments, a subject has undergone an FRI analysis of the lungs prior to treatment with one or more TβRII antagonists of the present disclosure. In some embodiments, a subject receives an FRI analysis of the lungs during treatment with one or more TβRII antagonists of the present disclosure. In some embodiments, a subject receives an FRI analysis of the lungs after treatment with one or more TβRII antagonists of the present disclosure. In some embodiments, the present disclosure provides methods of treating SSc-ILD, comprising administering a TβRII antagonist to a subject in need thereof, wherein an amount of fibrosis or pattern of interstitial pneumonia is determined by FRI analysis of the lungs of the subject.

In some embodiments, the present disclosure provides methods of treating SSc-ILD, comprising administering a TβRII antagonist to a subject in need thereof, wherein an improvement in the amount of fibrosis in the lungs is determined by FRI analysis of the lungs of the subject. In some embodiments, an improvement in the amount of fibrosis in the lungs of a subject comprises a decrease in the amount of fibrosis in the lungs.

In some embodiments, FRI analysis of a subject has determined an improvement of at least between about 1% and about 10% of fibrosis of the lungs. In some embodiments, FRI analysis of a subject has determined an improvement of at least between about 5% and about 10% of fibrosis of the lungs. In some embodiments, FRI analysis of a subject has determined an improvement of at least between about 10% and about 15% of fibrosis of the lungs. In some embodiments, FRI analysis of a subject has determined an improvement of at least between about 15% and about 20% of fibrosis of the lungs. In some embodiments, FRI analysis of a subject has determined an improvement of at least between about 20% and about 25% of fibrosis of the lungs. In some embodiments, FRI analysis of a subject has determined an improvement of at least between about 25% and about 30% of fibrosis of the lungs. In some embodiments, FRI analysis of a subject has determined an improvement of at least between about 30% and about 35% of fibrosis of the lungs. In some embodiments, FRI analysis of a subject has determined an improvement of at least between about 35% and about 40% of fibrosis of the lungs. In some embodiments, FRI analysis of a subject has determined an improvement of at least between about 40% and about 45% of fibrosis of the lungs. In some embodiments, FRI analysis of a subject has determined an improvement of at least between about 45% and about 50% of fibrosis of the lungs. In some embodiments, FRI analysis of a subject has determined an improvement of at least between about 1% and about 10% of fibrosis of the lungs. In some embodiments, FRI analysis of a subject has determined an improvement of at least between about 10% and about 20% of fibrosis of the lungs. In some embodiments, FRI analysis of a subject has determined an improvement of at least between about 20% and about 30% of fibrosis of the lungs. In some embodiments, FRI analysis of a subject has determined an improvement of at least between about 30% and about 40% of fibrosis of the lungs. In some embodiments, FRI analysis of a subject has determined an improvement of at least between about 40% and about 50% of fibrosis of the lungs.

In some embodiments, FRI analysis of a subject has determined a decrease of at least between about 1% and about 10% of fibrosis of the lungs. In some embodiments, FRI analysis of a subject has determined a decrease of at least between about 5% and about 10% of fibrosis of the lungs. In some embodiments, FRI analysis of a subject has determined a decrease of at least between about 10% and about 15% of fibrosis of the lungs. In some embodiments, FRI analysis of a subject has determined a decrease of at least between about 15% and about 20% of fibrosis of the lungs. In some embodiments, FRI analysis of a subject has determined a decrease of at least between about 20% and about 25% of fibrosis of the lungs. In some embodiments, FRI analysis of a subject has determined a decrease of at least between about 25% and about 30% of fibrosis of the lungs. In some embodiments, FRI analysis of a subject has determined a decrease of at least between about 30% and about 35% of fibrosis of the lungs. In some embodiments, FRI analysis of a subject has determined a decrease of at least between about 35% and about 40% of fibrosis of the lungs. In some embodiments, FRI analysis of a subject has determined a decrease of at least between about 40% and about 45% of fibrosis of the lungs. In some embodiments, FRI analysis of a subject has determined a decrease of at least between about 45% and about 50% of fibrosis of the lungs. In some embodiments, FRI analysis of a subject has determined a decrease of at least between about 1% and about 10% of fibrosis of the lungs. In some embodiments, FRI analysis of a subject has determined a decrease of at least between about 10% and about 20% of fibrosis of the lungs. In some embodiments, FRI analysis of a subject has determined a decrease of at least between about 20% and about 30% of fibrosis of the lungs. In some embodiments, FRI analysis of a subject has determined a decrease of at least between about 30% and about 40% of fibrosis of the lungs. In some embodiments, FRI analysis of a subject has determined a decrease of at least between about 40% and about 50% of fibrosis of the lungs.

Laboratory Tests

Routine laboratory tests are typically run for subjects suspected of having SSc (e.g., SSc-ILD), as well as throughout treatment after diagnosis. In some embodiments, a routine laboratory test is selected from the group consisting of a complete blood count test, measurement of serum creatinine levels, measurement of creatine kinase levels, and/or urinalysis. In some embodiments, a complete blood count test of a subject with SSc (e.g., SSc-ILD) reveals one or more of anemia, iron deficiency, and/or gastrointestinal blood loss, among other complications. In some embodiments, serum creatinine levels in a subject with SSc (e.g., SSc-ILD) reveals renal dysfunction. In some embodiments, a test for creatine kinase levels in a subject with SSc (e.g., SSc-ILD) reveals myopathy and/or myositis. In some embodiments, a urinalysis test in a subject with SSc (e.g., SSc-ILD) reveals proteinuria and/or cellular casts.

Characteristic Autoantibodies

In some embodiments, serologic tests are performed in a subject that has SSc (e.g., SSc-ILD) or is suspected of having SSc (e.g., SSc-ILD). In some embodiments, autoantibodies (also referred to as antibodies herein) are detected in a serologic test. In some embodiments, detection of one or more antibodies indicates presence of SSc-ILD. In some embodiments, levels of one or more antibodies in a subject sample are increased relative to a reference sample. In some embodiments, levels of one or more antibodies in a subject sample are compared to reference levels of antibodies in an otherwise healthy population of similar characteristics to the subject (e.g., age, gender, etc.). In some embodiments, detection of antibodies indicates an increased percent chance of clinical complication. In some embodiments, levels of antibodies indicate an increased percent chance of clinical complication of ILD in a subject with SSc. In some embodiments, a subject has one or more of antinuclear antibody, anticentromere antibody, antitopoisomerase I antibody, and/or anti-RNA polymerase III antibody. In some embodiments, a subject with SSc-ILD has one or more of antinuclear antibody, anticentromere antibody, antitopoisomerase I antibody, and/or anti-RNA polymerase III antibody. In some embodiments, a subject with SSc-ILD has increased levels of one or more of antinuclear antibody, anticentromere antibody, antitopoisomerase I antibody, and/or anti-RNA polymerase III antibody. In some embodiments, a subject with SSc-ILD has increased levels of one or more of antinuclear antibody, anticentromere antibody, antitopoisomerase I antibody, and/or anti-RNA polymerase III antibody when compared to a subject that does not have SSc-ILD. In some embodiments, a subject without SSc-ILD does not have one or more of antinuclear antibody, anticentromere antibody, antitopoisomerase I antibody, and/or anti-RNA polymerase III antibody. In some embodiments, a subject has antinuclear antibody (ANA). In some embodiments, a subject has detectable antitopoisomerase I (anti-ScI-70). In some embodiments, a subject has detectable anticentromere antibody (ACA). In some embodiments, a subject has detectable anti-RNA polymerase III antibody. In some embodiments, a subject has an increased level of antinuclear antibody (ANA). In some embodiments, a subject has an increased level of antitopoisomerase I (anti-ScI-70). In some embodiments, a subject has an increased level of anticentromere antibody (ACA). In some embodiments, a subject has an increased level of anti-RNA polymerase III antibody.

Approximately 95% of patients with SSc-ILD test positive for antinuclear antibody (ANA). Antitopoisomerase I antibodies are generally associated with diffuse SSc (dcSSc) as well as a higher risk of the subject to develop ILD. Anticentromere antibodies are generally associated with limited SSc (lcSSc). In contrast, approximately 5% of subjects with dcSSc typically have detectable anticentromere antibodies. Anti-RNA polymerase III antibodies are generally found in subjects with dcSSc, and/or may be associated with rapid skin complication, as well as increased risk of scleroderma renal crisis (SRC), and/or cancers. In subjects with Raynaud's phenomenon, presence of anti-RNA polymerase III and/or antitopoisomerase I antibodies can present an increased risk of the subject developing SSc. Serum antibodies may also indicate probability of skin thickness.

Subjects with anti-RNA polymerase III may have more rapid progression of skin thickness than subjects with anti-Sc1-70 (topoisomerase I) antibody.

In some embodiments, a laboratory test is used to confirm that a subject has SSc (e.g., SSc-ILD). In some embodiments, a laboratory test is used to differentiate SSc (e.g., SSc-ILD) from other possible diagnoses. In some embodiments, a subject is administered a test to detect a rheumatoid factor. In some embodiments, a subject is administered a test to detect antibodies to citrullinated peptides (anti-CCP). In some embodiments, a subject is administered a test to detect systemic lupus erythematosus (SLE)-associated antibodies. In some embodiments, a subject is administered a test to detect antibodies associated with overlap connective tissue diseases (e.g., RNP antibodies).

Fibrosis Biomarkers

Biomarkers disclosed herein may be defined as characteristics that are objectively measured and/or evaluated as an indicator of normal biologic processes, pathogenic processes (e.g., SSc-ILD), or pharmacologic responses to a therapeutic intervention (e.g., treatment of SSc-ILD with one or more TβRII antagonists of the present disclosure). Biomarkers of respiratory disease (e.g., SSc-ILD) may be measured by way of one or more of imaging, lung function, genetic polymorphisms and/or biochemical molecules identifiable in lung tissue, BAL fluid and/or blood. Serum biomarkers of the present disclosure for SSc-ILD can be useful in all stages of clinical treatment, including, but not limited to, evaluation for predisposition (e.g., identify risk of a subject developing ILD or detect early disease), diagnosis SSc-ILD (e.g., identify presence of ILD and/or aide in classification, prognosis of SSc-ILD (e.g., predict disease progression and/or clinical events), therapeutic treatment of SSc-ILD (e.g., predict and/or quantify response to therapy), and/or research/clinical studies of SSc-ILD (e.g., act as a surrogate endpoint in research or clinical practice and/or identify novel treatment targets). In some embodiments, the disclosure provides a method of treating SSc-ILD, comprising administering a TβRII antagonist to a subject in need thereof, wherein the subject has an increased level of one or more biomarkers selected from the group consisting of αSMA, ADAM12, Anti-HSP70 IgG, BAFF, BLyS, C3M, C4M, C6M, Ca15.3, CC16, CCL2, CCL18, Col1a1, Col3a1, CTGF, CXCL4, E-selectin, ET-1, fibronectin, ICAM, IL-6, IL-8, KL-6, MCP-1, MMP7, MMP12, Muc5B, Osteopontin, PAI-1, periostin, pro-C3, pro-C4, pro-C6, SP-A, SP-D, Tnfa, VCAM, VEGF, WFDC2(HE4), and YKL-40.

In some embodiments, a biomarker for SSc-ILD is selected from the group consisting of KL-6/MUC1, surface protein A (SP-A), surface protein D (SP-D), CC16, and/or Ca15.3. In some embodiments, a biomarker for SSc-ILD may be involved in one or more alveolar epithelial cell damage pathways. In some embodiments, a subject of the present disclosure has an increased level of one or more biomarkers selected from the group consisting of Ca15.3, CC16, KL-6, SP-A, and SP-D. In some embodiments, a subject of the present disclosure has an increased level of one or more biomarkers selected from the group consisting of Ca15.3, CC16, KL-6, SP-A, and SP-D, when compared with a subject that does not have SSc-ILD. In some embodiments, the disclosure provides methods of treating SSc-ILD, comprising administering a TβRII antagonist to a subject in need thereof, wherein the subject has an increased level of one or more biomarkers selected from the group consisting of Ca15.3, CC16, KL-6, SP-A, and SP-D. In some aspects, levels of KL-6 (encoded by MUC1), a glycoprotein found predominantly on type II pneumocytes and/or alveolar macrophages, may be elevated in the serum of subjects with SSc-ILD. Levels of KL-6 may correlate with the presence of pneumonitis and/or a radiological fibrosis score in subjects with SSc. In some embodiments, levels of KL-6 are elevated in a subject that has SSc-ILD. In some embodiments, a subject of the present disclosure has an increased level of KL-6 when compared with a subject that does not have SSc-ILD.

Surfactant proteins A and/or D (SP-A and/or SP-D, respectively) are generally elevated in serum of subjects with SSc-ILD. Surfactant proteins comprise lipoprotein complexes contained within pulmonary surfactant, and/or are produced by type II AECs and/or Clara cells, which are generally important for innate immune defense mechanisms and/or modulating inflammatory response at the alveolar air-liquid interface. In SSc-ILD, studies have typically found serum SP-D to be more sensitive but less specific than KL-6 for detecting disease. Several studies have also demonstrated negative correlation between serum SP-D and/or lung function, and/or worsening complications and/or lung function in longitudinal measures. In some embodiments, levels of SP-A and/or SP-D are elevated in a subject that has SSc-ILD. In some embodiments, a subject of the present disclosure has an increased level of SP-A and/or SP-D when compared with a subject that does not have SSc-ILD.

Clara cells are typically multifunctional cells that are predominantly localized at terminal bronchioles that can secrete 16 kDa Clara cell protein (CC16). Clara cell protein (CC16) generally has important protective, immunosuppressive and/or anti-inflammatory functions. Serum CC16 has been shown to be elevated across several pulmonary conditions including SSc-ILD, compared with healthy controls and/or subjects with SSc but without ILD. In some embodiments, levels of CC16 are elevated in a subject that has SSc-ILD. In some embodiments, a subject of the present disclosure has an increased level of CC16 when compared with a subject that does not have SSc-ILD.

Cancer associated antigen carbohydrate antigen 15.3 (Ca15.3) is produced from the same MUC1 gene that encodes for KL-6 and/or is expressed on various epithelial cells, including type II AECs. Elevated Ca15.3 has been demonstrated in IPF and/or SSc-ILD. In a study comprising over 200 subjects, Ca15.3 level correlated strongly with HRCT scores. Furthermore, Ca15.3 has been shown to outperform FVC in predicting survival. In some embodiments, levels of Ca15.3 are elevated in a subject that has SSc-ILD. In some embodiments, a subject of the present disclosure has an increased level Ca115.3 when compared with a subject that does not have SSc-ILD.

In some embodiments, a biomarker for SSc-ILD is selected from the group consisting of MMP7, osteopontin, and/or ADAM12. In some embodiments, a biomarker for SSc-ILD may be involved in one or more aberrant fibrogenesis and/or matrix remodeling pathways. In some embodiments, a subject of the present disclosure has an increased level of one or more biomarkers selected from the group consisting of MMP7, osteopontin, and/or ADAM12. In some embodiments, a subject of the present disclosure has an increased level of one or more biomarkers selected from the group consisting of MMP7, osteopontin, and/or ADAM12, when compared with a subject that does not have SSc-ILD.

Matrix metalloproteinases (MMPs) and/or their inhibitors (tissue inhibitors of metalloproteinases, TIMPs) are proteases important in mediating ECM degradation, activity of inflammatory mediators and/or growth factors in the lung. In SSc-ILD, serum MMP7, MMP12 and/or TIMP1 have been shown to be elevated when compared with healthy controls and/or SSc without ILD, and/or have been shown to correlate inversely with pulmonary function. In some embodiments, levels of any one of MM7, MMP12, and/or TIMP1 are elevated in a subject that has SSc-ILD. In some embodiments, a subject of the present disclosure has an increased level of any one of MM7, MMP12, and/or TIMP1 when compared with a subject that does not have SSc-ILD.

ADAM proteins (a disintegrin and/or metalloproteinases) are a group of multifunctional proteins that share a metalloprotease domain with MMPs, and/or have a unique, multifunctional domain with both proteolytic and/or adhesive functions, and/or are known to play an important role in cell binding, migration and/or signaling. They are implicated in a variety of diseases including CTD, malignancy, Alzheimer's, Crohn's disease and/or possibly pulmonary fibrosis. Serum levels of ADAM12 have been shown to be elevated in subjects with SSc-ILD, compared to subjects that do not have SSc-ILD, and/or correlate positively with FVC and/or extent of ground glass opacities on HRCT, and/or correlate negatively with HRCT fibrosis score. In some embodiments, levels of ADAM12 are elevated in a subject that has SSc-ILD. In some embodiments, a subject of the present disclosure has an increased level of ADAM12 when compared with a subject that does not have SSc-ILD.

Osteopontin (OPN) is a multifunctional protein that is known to regulate inflammation, cellular immune response and/or T cell function, with a pro-fibrotic effect in ILD through mechanisms that are not well known. Serum OPN levels are elevated in IPF and/or SSc compared with subjects that do not have SSc-ILD, but may not differentiate well between ILD subtypes. In some embodiments, levels of OPN are elevated in a subject that has SSc-ILD. In some embodiments, a subject of the present disclosure has an increased level of OPN when compared with a subject that does not have SSc-ILD.

In some embodiments, a biomarker for SSc-ILD is selected from the group consisting of CCL18, YKL-40, ICAM, VCAM, E-selectin, Anti-HSP70 IgG, BLyS/BAFF, CCL2/MCP-1, IL-6, and/or CXCL4. In some embodiments, a biomarker for SSc-ILD may be involved in one or more immune dysregulation and/or inflammation pathways. In some embodiments, a subject of the present disclosure has an increased level of one or more biomarkers selected from the group consisting of CCL18, YKL-40, ICAM, VCAM, E-selectin, Anti-HSP70 IgG, BLyS/BAFF, CCL2/MCP-1, IL-6, and/or CXCL4. In some embodiments, a subject of the present disclosure has an increased level of one or more biomarkers selected from the group consisting of CCL18, YKL-40, ICAM, VCAM, E-selectin, Anti-HSP70 IgG, BLyS/BAFF, CCL2/MCP-1, IL-6, and/or CXCL4, when compared with a subject that does not have SSc-ILD.

C-C motif chemokine ligand 18 (CCL18) is primarily produced by alveolar macrophages with an important role in stimulating fibroblasts to synthesize collagen in fibrotic lung diseases. Although unable to differentiate between ILD subtypes, longitudinal CCL18 levels have demonstrated correlation with lung function and/or mortality in IPF and/or SSc-ILD subjects. In some embodiments, levels of CCL18 are elevated in a subject that has SSc-ILD. In some embodiments, a subject of the present disclosure has an increased level of CCL18 when compared with a subject that does not have SSc-ILD.

YKL-40 is a chitinase-like glycoprotein, thought to have a role in regulating connective tissue cell proliferation and/or angiogenesis. Serum YKL-40 may not be able to distinguish between ILD subtypes, however, elevated levels have been identified across a variety of inflammatory and/or fibrotic diseases including, but not limited to, ILD, liver fibrosis, inflammatory arthropathies, asthma and/or chronic obstructive pulmonary disease (COPD). In some embodiments, levels of YKL-40 are elevated in a subject that has SSc-ILD. In some embodiments, a subject of the present disclosure has an increased level of YKL-40 when compared with a subject that does not have SSc-ILD.

Adhesion molecules, including intercellular adhesion molecule (ICAM1), vascular cell adhesion molecule 1 (VCAM1), and/or E-selectin, are typically expressed on leucocytes and/or vascular endothelial cells, and are important in mediating adhesion and/or interaction of these cells. Elevated levels of ICAM1, VCAM1, and/or E-selectin are detectable across a number of inflammatory and/or fibrovascular conditions including SSc. Integrins interact with adhesion molecules such as VCAM and/or ICAM, and/or other growth-factor receptors and/or ECM components to activate downstream signaling pathways and/or TGF-β mediated pulmonary fibrosis. Elevated levels of ICAM, VCAM and/or E-selectin have been demonstrated in SSc, and ICAM has been associated with the combined presence of diffuse, rapidly progressive SSc, digital contractures, ILD and/or joint involvement. In some embodiments, levels of one or more of ICAM1, CAM1, and/or E-selectin are elevated in a subject that has SSc-ILD. In some embodiments, a subject of the present disclosure has an increased level of one or more of ICAM1, CAM1, and/or E-selectin when compared with a subject that does not have SSc-ILD.

Heat shock protein 70 (HSP70) typically induces T-cell proliferation and/or pro-fibrotic cytokine production. Autoantibodies to HSP70 may have pathogenic potential in ILD by augmenting neutrophil recruitment, complement activation and/or production of inflammatory mediators in target organs.

B lymphocyte stimulator (BLyS), also known as B-cell activating factor (BAFF), is a cytokine belonging to the tumor necrosis factor family, critical to B cell maturation and/or antibody production with a possible pathogenic role in several autoimmune diseases and/or IPF. In some embodiments, levels of BLyS are elevated in a subject that has SSc-ILD. In some embodiments, a subject of the present disclosure has an increased level of BLyS when compared with a subject that does not have SSc-ILD.

C-C motif chemokine 2 (CCL2), previously known as monocyte chemoattractant protein-1 (MCP-1), plays an important role in innate immunity and/or inflammation, with a potential pro-fibrotic effect in SSc, among other conditions. A study of SSc-ILD patients found that CCL2 was an independent predictor of progression-free survival in IPF. In some embodiments, levels of CCL2 are elevated in a subject that has SSc-ILD. In some embodiments, a subject of the present disclosure has an increased level of CCL2 when compared with a subject that does not have SSc-ILD.

Cytokine IL-6 is involved in the differentiation of CD4+ T cells to pro-fibrotic Th2 type cells, and implicated in the activation of fibroblasts. In SSc patients, a study has shown that IL-6 was associated with shorter survival and/or time to decline in FVC adjusted for age, smoking, composite physiologic index, pulmonary hypertension and/or skin disease. In some embodiments, levels of IL-6 are elevated in a subject that has SSc-ILD. In some embodiments, a subject of the present disclosure has an increased level of IL-6 when compared with a subject that does not have SSc-ILD.

CXCL4, also known as platelet factor 4, is a potent anti-angiogenic chemokine. One study determined that serum CXCL4 levels can be 270-times higher in SSc patients compared with healthy controls and/or an association with decline in DLCO. However, CXCL4 levels were noted to decline at 12 and/or 24 months after immunosuppressive therapy (e.g., cyclophosphamide and/or mycophenolate), and/or a fall in CXCL4 from baseline-to-12 months was associated with improvement of FVC from 12-to-24 months. In some embodiments, levels of CXCL4 are elevated in a subject that has SSc-ILD. In some embodiments, a subject of the present disclosure has an increased level of CXCL4 when compared with a subject that does not have SSc-ILD.

In some embodiments, a biomarker for SSc-ILD is selected from the group consisting of VEGF, ET-1, and/or IL-8. In some embodiments, a biomarker for SSc-ILD may be involved in one or more vascular and/or endothelium pathways. In some embodiments, a subject of the present disclosure has an increased level of one or more biomarkers selected from the group consisting of VEGF, ET-1, and IL-8. In some embodiments, a subject of the present disclosure has an increased level of one or more biomarkers selected from the group consisting of VEGF, ET-1, and/or IL-8, when compared with a subject that does not have SSc-ILD.

Aberrant angiogenesis is generally implicated in the pathogenesis of pulmonary fibrosis and/or fundamental mediators of this process include vascular endothelial growth factor (VEGF), endothelin 1 (ET-1) and/or interleukin-8 (IL-8). VEGF is a central cytokine and growth factor for endothelial and/or type II AECs. Nintedanib, a tyrosine kinase inhibitor that targets VEGF signaling slows disease progression in IPF. In a recent study of SSc patients, elevated VEGF correlated with disease severity measured by DLCO and/or HRCT involvement. IL-8 (also known as CXCL8) is produced by phagocytes when exposed to inflammatory stimuli and/or attracts neutrophils and/or promotes angiogenesis. Endothelin-1 (ET-1) is a potent vasoactive peptide with diverse properties including vasoconstriction, bronchoconstriction, cell growth, turnover and/or fibroblast activation. Both IL-8 and/or ET-1 are elevated in idiopathic ILD compared with controls and/or have demonstrated correlation with HRCT fibrosis scores, pulmonary function decline and/or reduced overall, transplant-free and/or progression-free survival. In SSc, studies have demonstrated correlation of ET-1 with vascular markers of disease severity including digital ulcers, renal vascular disease and/or pulmonary hypertension. In some embodiments, levels of one or more of VEGF, IL-8, and/or ET-1 are elevated in a subject that has SSc-TLD. In some embodiments, a subject of the present disclosure has an increased level of one or more of VEGF, IL-8, and/or ET-1 when compared with a subject that does not have SSc-ILD.

Other biomarkers used to determine if a subject has SSc-ILD include, but are not limited to Col1a1, Col3a1, CTGF, fibronectin, PAI-1, and/or Tnfa.

In some embodiments, the disclosure provides methods of treating SSc (e.g. SSc-ILD), comprising administering a TβRII antagonist to a subject in need thereof, wherein the subject has an increased level of one or more biomarkers selected from the group consisting of ADAM12, Anti-HSP70 IgG, BAFF, BLyS, Ca15.3, CC16, CCL2, CCL18, Col1a1, Col3a1, CTGF, CXCL4, E-selectin, ET-1, fibronectin, ICAM, IL-6, IL-8, KL-6, MCP-1, MMP7, Osteopontin, PAI-1, SP-A, SP-D, Tnfa, VCAM, VEGF, and YKL-40 when compared with a subject that does not have SSc-ILD.

In some embodiments, the disclosure provides methods of treating SSc (e.g. SSc-ILD), comprising administering a TβRII antagonist to a subject in need thereof, wherein the subject has an increased level of one or more biomarkers selected from the group consisting of Ca15.3, CC16, KL-6, SP-A, and SP-D when compared with a subject that does not have SSc-ILD.

In some embodiments, the disclosure provides methods of treating SSc (e.g. SSc-ILD), comprising administering a TβRII antagonist to a subject in need thereof, wherein the subject has an increased level of one or more biomarkers selected from the group consisting of Col1a1, Col3a1, CTGF, fibronectin, PAI-1, and Tnfa when compared with a subject that does not have SSc-ILD.

In some embodiments, the disclosure provides methods of treating SSc (e.g. SSc-ILD), comprising administering a TβRII antagonist to a subject in need thereof, wherein the subject has a change in level of one or more collagen biomarkers compared to a baseline measurement. In some embodiments, the disclosure provides methods of treating SSc (e.g. SSc-ILD), comprising administering a TβRII antagonist to a subject in need thereof, wherein the subject has an increase in levels of one or more collagen biomarkers compared to a baseline measurement. In some embodiments, the disclosure provides methods of treating SSc (e.g. SSc-ILD), comprising administering a TβRII antagonist to a subject in need thereof, wherein the subject has an increase in levels of one or more collagen biomarkers when compared with a subject that does not have SSc-ILD. In some embodiments, a collagen biomarker is selected from the group consisting of type I (C1M), type III (C3A, C3M), type IV (C4M), type V (C5M) and type VI (C6M) collagen degradation biomarkers. In some embodiments, a collagen biomarker is selected from the group consisting of type I (PRO-C1), II (PRO-C2), III (PRO-C3), IV (PRO-C4), V (PRO-C5) and VI (PRO-C6) collagen formation biomarkers. In some embodiments, the disclosure provides methods of treating SSc (e.g. SSc-ILD), comprising administering a TβRII antagonist to a subject in need thereof, wherein the subject has an increased level of one or more collagen degradation biomarkers selected from the group consisting of type I (C1M), type III (C3A, C3M), type IV (C4M), type V (C5M) and type VI (C6M), when compared with a subject that does not have SSc-ILD. In some embodiments, the disclosure provides methods of treating SSc (e.g. SSc-ILD), comprising administering a TβRII antagonist to a subject in need thereof, wherein the subject has an increased level of one or more collagen formation biomarkers selected from the group consisting of type I (PRO-C1), II (PRO-C2), III (PRO-C3), IV (PRO-C4), V (PRO-C5) and VI (PRO-C6), when compared with a subject that does not have SSc-ILD.

Alpha-smooth muscle actin (αSMA) is the actin isoform that predominates within vascular smooth-muscle cells and plays an important role in fibrogenesis. Myofibroblasts are metabolically and morphologically distinctive fibroblasts expressing αSMA, and their activation plays a key role in development of the fibrotic response. In some embodiments, the disclosure provides methods of treating SSc (e.g. SSc-ILD), comprising administering a TβRII antagonist to a subject in need thereof, wherein the subject has an increased level of αSMA when compared with a subject that does not have SSc-ILD.

The Muc5B promoter polymorphism is a known genetic risk factor for Idopathic Pulmonary Fibrosis (IPF), and is likely involved in disease pathogenesis through an increase in Muc5B expression in terminal bronchi and honeycombed cysts. Expression of MUC5B is also highly correlated with expression of cilium genes in IPF lung. Mucociliary dysfunction in the distal airway may play a role in the development of progressive fibroproliferative lung disease (Yang, I. V. et al., Ann Am Thorac Soc., 2015, S193-S199). In some embodiments, the disclosure provides methods of treating SSc (e.g. SSc-ILD), comprising administering a TβRII antagonist to a subject in need thereof, wherein the subject has an increased level of Muc5B when compared with a subject that does not have SSc-ILD.

Similarly, periostin has been shown to be a biomarker for IPF and related diseases. Monomeric periostin has been identified in diseases such as atopic dermatitis, systemic scleroderma, and asthma. Both monomeric and total periostin have been shown to be correlated with decline of % VC and % DLCO (Ohta, S. et al. PLOS One, 2017, 1-17). In some embodiments, the disclosure provides methods of treating SSc (e.g. SSc-ILD), comprising administering a TβRII antagonist to a subject in need thereof, wherein the subject has an increased level of periostin when compared with a subject that does not have SSc-ILD.

The Whey Acidic Protein domain (WFDC2 (HEA)) is an evolutionarily conserved motif found in a number of proteins, the best studied of which are antiproteinases involved in the innate immune defense of multiple epithelia. The WFDC2 gene encodes a two WAP domain-containing protein, initially suggested as a marker for epididymis, and it has been shown that it is highly expressed in the lung and salivary gland. In some embodiments, the disclosure provides methods of treating SSc (e.g. SSc-ILD), comprising administering a TβRII antagonist to a subject in need thereof, wherein the subject has an increased level of WFDC2 (HEA) when compared with a subject that does not have SSc-ILD.

C-Reactive Protein (CRP)

C-reactive protein (CRP) is an annular (ring-shaped), pentameric protein found in blood plasma, whose circulating concentrations rise in response to inflammation. CRP is an acute-phase protein of hepatic origin that increases following interleukin-6 secretion by macrophages and T cells. Its physiological role is to bind to lysophosphatidylcholine expressed on the surface of dead or dying cells (and some types of bacteria) in order to activate the complement system via C1q. CRP is synthesized by the liver in response to factors released by macrophages and fat cells (adipocytes).

In some embodiments, levels of CRP are elevated in a subject that has SSc. In some embodiments, levels of CRP are elevated in a subject that has SSc-TLD. In some embodiments, a subject of the present disclosure has an increased level of CRP when compared with a subject that does not have SSc (e.g., SSc-ILD). In some embodiments, a subject of the present disclosure has a CRP level of greater than or equal to 3 mg/L.

In some embodiments, the disclosure provides methods of treating SSc (e.g. SSc-ILD), comprising administering a TβRII antagonist to a subject in need thereof, wherein the subject has an increased level of CRP.

In some embodiments, a subject of the present disclosure has a CRP level of greater than or equal to 3 mg/L at baseline. In some embodiments, the disclosure provides methods of treating SSc (e.g. SSc-ILD), comprising administering a TβRII antagonist to a subject in need thereof, wherein the subject has a CRP level of greater than or equal to 3 mg/L at baseline.

Bronchoalveolar Lavage (BAL)

Bronchoalveolar lavage (BAL) is performed during flexible bronchoscopy to obtain samples of cells and/or fluid from distal airways and/or alveoli. Lavage fluid is sent for cell counts; cultures for mycobacterial, viral, and/or fungal pathogens; and/or cytologic analysis. BAL is particularly useful in the evaluation of patients with interstitial lung disease (ILD) that is associated with hemoptysis, is acute or rapidly progressive, or is likely caused by one or more of the following diseases: sarcoidosis, hypersensitivity pneumonitis, pulmonary Langerhans histiocytosis, or infection. Virtually all patients presenting with hemoptysis and/or radiographic ILD are recommended to undergo BAL with sequential lavages to confirm an alveolar source of bleeding and/or identify any infectious etiologies.

The majority of patients with an acute onset of ILD will undergo BAL to evaluate for acute eosinophilic pneumonia, alveolar hemorrhage, malignancy, and/or opportunistic or atypical infection, which can often be diagnosed on the basis of BAL findings. For patients with a subacute or chronic presentation of ILD, BAL is often performed when sarcoidosis, hypersensitivity pneumonitis, pulmonary Langerhans cell histiocytosis (PLCH), and/or infection are suspected based on the radiographic pattern (e.g., upper lobe predominance of reticular opacities, hilar lymphadenopathy, irregular cystic airspaces), history of exposure (e.g., bird keeping, farming), or concomitant clinical findings (e.g., hemoptysis, renal insufficiency). In these patients, the results of BAL analysis may be used to narrow the differential diagnostic possibilities between various types of ILD, but tissue confirmation is usually required.

One of the main roles of bronchoscopy and/or bronchoalveolar lavage (BAL) in subjects with SSc and/or suspected ILD is to exclude other causes of ILD. Thus, for most subjects, these tests are not necessary or ordered. However, for patients with atypical features as mentioned above, such as fever, productive cough, hemoptysis, peripheral blood eosinophilia, or focal consolidation on chest imaging, bronchoscopy with BAL may be indicated.

Patients with SSc-ILD typically have elevated numbers of granulocytes in their BAL fluid, particularly neutrophils and/or eosinophils, and/or may sometimes have an increase in lymphocytes and/or mast cells. BAL in SSc-ILD has sometimes been used to assess the degree of alveolitis and/or predict response to immunosuppressive therapy.

In some embodiments, a subject with SSc-ILD is tested using BAL. In some embodiments, SSc-ILD in a subject is confirmed using BAL. In some embodiments, a BAL exam of a subject is used to assess the degree of alveolitis and/or predict response to immunosuppressive therapy.

Lung Biopsy and Pathology

Skin biopsies of subjects suspected to have SSc (e.g. SSc-ILD) are not commonly utilized. However, skin biopsies can be useful in differentiating SSc (e.g. SSc-ILD) from other skin-related diseases or changes. SSc-ILD is characterized by excessive disposition of compact bundles of collagen in the dermal layers. Dermal expansion, edema, perivascular mononuclear inflammatory cell infiltration, and/or fibrosis can be seen histologically in a skin biopsy sample. Loss of intradermal fat can be seen, as well as displacement of white adipose by fibrotic tissue. Lung biopsies are typically obtained via video-assisted thoracoscopic surgery.

Radiologic pattern on HRCT is an important consideration when deciding whether a patient should undergo a surgical lung biopsy. Subjects with a UIP pattern on HRCT generally demonstrates basal predominant (occasionally diffuse) and/or subpleural predominant, often heterogeneous reticular opacities with peripheral traction bronchiectasis or bronchiolectasis, honeycombing, and/or absence of features to suggest an alternative diagnosis. Consistently, a UIP pattern on HRCT is very specific in predicting a UIP pattern on histopathology, and therefore a surgical lung biopsy is not recommended in subjects with a UIP pattern on HRCT.

A "probable" UIP pattern on HRCT is similar to that of a UIP pattern except honeycombing is absent; i.e., reticular opacities are predominantly basal and/or subpleural, with peripheral traction bronchiectasis or bronchiolectasis and/or a heterogeneous distribution. In this case, obtaining a surgical lung biopsy in subjects with a probable UIP radiologic pattern is recommended to further assist diagnosis.

Fibrotic NSIP is typically the most frequently noted histopathologic finding on lung biopsy in SSc-ILD. Within the classification of NSIP, variable amounts of mononuclear cell infiltration and/or alveolar septal fibrosis can be seen. In SSc-associated NSIP, the pattern is more fibrotic and less inflammatory, thus leading to the designation fibrotic NSIP, rather than cellular NSIP. Additional characteristics of NSIP are temporal homogeneity and/or absence of fibroblast foci.

A pattern consistent with UIP is occasionally seen in SSc-ILD. When compared with lung biopsies from patients with idiopathic pulmonary fibrosis, biopsies of SSc-associated UIP have a lower number of fibroblast foci and/or a higher number of germinal centers.

In some embodiments, a subject with SSc-ILD has a histologic pattern of fibrotic NSIP in a lung biopsy. In some embodiments, a subject with SSc-ILD has a histologic pattern of UIP in a lung biopsy. In some embodiments, a subject with a probable UIP pattern on HRCT is a candidate for a lung biopsy.

Composite Response Index in Systemic Sclerosis (CRISS)

The Composite Response Index in Systemic Sclerosis (CRISS) is a 2-step process for measuring the probability of improvement of patients typically with diffuse cutaneous systemic sclerosis (dcSSc), with values ranging from 0.0 (no improvement) to 1.0.

In step 1, patients who develop one of the following attributable to systemic sclerosis that require treatment: (1) new onset of renal crisis, (2) new onset or worsening of lung fibrosis, (3) new onset of pulmonary arterial hypertension (measured by right sided heart catherization), or (4) new onset of left ventricular failure (e.g., a left ventricular ejection fraction of $\leq 45\%$); during a clinical trial, are considered as not improved and assigned a probability of improving equal to 0.0. Specifically regarding lung fibrosis, if a subject has an FVC of less than 80% predicted and develops an annual rate of decline in FVC of $\geq 15\%$ of predicted, confirmed by a subsequent FVC test within a month, and further confirmed to have ILD by HRCT, then a subject is deemed to have no improvement and will have a CRISS score of 0.0.

For the remaining patients with complete data after a clinical trial is complete, step 2 involves computing the predicted probability of improving for each individual, using an equation that involves change in modified rodnan skin score (mRSS) from baseline, change in FVC % predicted from baseline, change in patient global assessment, change in physical/physician global assessment, and change in health assessment questionnaire-disability index (HAQ-DI). Subjects in step 2 for whom the predicted probability (CRISS score) is $\geq 0.60$ are considered improved, while subjects for whom the predicted probability (CRISS score) is <0.60 are considered not improved.

In some embodiments, a subject is evaluated using a patient global assessment. In some embodiments, a subject is evaluated using a physical/physician global assessment. In some embodiments, a patient is evaluated using a health assessment questionnaire-disability index (HAQ-DI). In some embodiments, the disclosure provides methods of treating SSc (e.g. SSc-ILD), comprising administering a TβRII antagonist to a subject in need thereof, wherein the antagonist improves the subject's patient global assessment score compared to a baseline measurement. In some embodiments, the disclosure provides methods of treating SSc (e.g. SSc-ILD), comprising administering a TβRII antagonist to a subject in need thereof, wherein the antagonist improves the subject's physical/physician global assessment score compared to a baseline measurement. In some embodiments, the disclosure provides methods of treating SSc (e.g. SSc-ILD), comprising administering a TβRII antagonist to a subject in need thereof, wherein the antagonist improves the subject's HAQ-DI score compared to a baseline measurement.

The 2 groups (study drug versus placebo or active comparator) can then be compared in a 2×2 table using appropriate significance tests. The predicted probabilities obtained using CRISS can also be assessed as a continuous variable, and the distributions of the probability of improving for patients receiving study drug versus placebo can be compared using nonparametric tests.

In some embodiments, a subject with SSc has a CRISS score of 0.0. In some embodiments, a subject with a CRISS score of 0.0 is considered not improved. In some embodiments, a subject with SSc has a CRISS score of 1.0. In some embodiments, a subject with a CRISS score of 1.0 compared to a baseline measurement is considered improved. In some embodiments, a subject with a predicted probability (CRISS score) in step 2 of $\geq 0.60$ compared to a baseline measurement is considered improved. In some embodiments, a subject with a CRISS score of about 0.60 to about 1.0 compared to a baseline measurement is considered improved. In some embodiments, a subject with a predicted probability (CRISS score) in step 2 of <0.60 compared to a baseline measurement is not improved. In some embodiments, a subject with a CRISS score of about 0.0 to about 0.60 compared to a baseline measurement is considered not improved.

In some embodiments, the disclosure provides methods of treating SSc (e.g. SSc-ILD), comprising administering a TβRII antagonist to a subject in need thereof, wherein the antagonist increases the subject's CRISS score compared to a baseline measurement. In some embodiments, the disclosure provides methods of treating SSc (e.g. SSc-ILD), comprising administering a TβRII antagonist to a subject in need thereof, wherein the antagonist increases the subject's CRISS score to between about 0.60 and about 1.0, compared to a baseline measurement.

St. George's Respiratory Questionnaire (SGRQ)

In some embodiments, a subject of the present disclosure may be evaluated using a respiratory questionnaire. In some embodiments, a subject of the present disclosure may be evaluated using a St. George's Respiratory Questionnaire (SGRQ). In some embodiments, an SGRQ evaluates one or more of overall health, daily life, and/or perceived well-being of a subject with one or more obstructive airway diseases (e.g., SSc-ILD). An SGRQ score ranges from 0 to 100 units, with higher scores indicating more limited respiratory function. Questions in an SGRQ are typically sorted into two categories comprising complications and activities that can cause and/or are limited by breathlessness. Categories can be split into multiple parts. Questions can have one or more methods of scoring, including but not limited to scaling, dichotomous true/false, and/or four-point Likert scale. In some embodiments, a subject's SGRQ score positively correlates with presence of cough, sputum and/or wheeze in a subject. In some embodiments, a subject's SGRQ score correlates with one or more measures of disease activity including but not limited to FEV1, FVC, SaO2 at rest, 6-MWD, MRC dyspnea grade, anxiety score, depression score, Sickness Impact Profile (SIP) total score, and SIP physical and/or psychosocial domains. Generally, a mean change in score of about 4 units indicates slightly efficacious treatment, a mean change in score of about 8 units indicates moderately efficacious treatment, and a mean change in score of about 12 units indicates very efficacious treatment. In some embodiments, efficacious treatment comprises a decrease in an SGRQ score of a subject. In some embodiments, treatment of a subject with one or more of a TβRII antagonist of the present disclosure changes a subject's SGRQ score by about 4 units. In some embodiments, treatment of a subject with one or more of a TβRII antagonist of the present disclosure changes a subject's SGRQ score by about 8 units. In some embodiments, treatment of a subject with one or more of a TβRII antagonist of the present disclosure changes a subject's SGRQ score by about 12 units. In some embodiments, treatment of a subject with one or more of a TβRII antagonist of the present disclosure changes a subject's SGRQ score by between about 0 and about 4 units. In some embodiments, treatment of a subject with one or more of a TβRII antagonist of the present disclosure changes a subject's SGRQ score by between about 1 and about 4 units. In some embodiments, treatment of a subject with one or more of a TβRII antagonist of the present disclosure changes a subject's SGRQ score by between about 5 and about 8 units. In some embodiments, treatment of a subject with one or more of a TβRII antagonist of the present disclosure changes a subject's SGRQ score by between about 9 and about 12 units. In some embodiments, treatment of a subject with one or more of a TβRII antagonist of the present disclosure changes a subject's SGRQ score by about more than 12 units.

In some embodiments, treatment of a subject with one or more of a TβRII antagonist of the present disclosure improves a St. George's Respiratory Questionnaire (SGRQ) score of a subject. In some embodiments, treatment of a subject with one or more of a TβRII antagonist of the present disclosure improves a St. George's Respiratory Questionnaire (SGRQ) score of a subject by between about 1% and about 3%. In some embodiments, treatment of a subject with one or more of a TβRII antagonist of the present disclosure improves a St. George's Respiratory Questionnaire (SGRQ) score of a subject by between about 1% and about 5%. In some embodiments, treatment of a subject with one or more of a TβRII antagonist of the present disclosure improves a St. George's Respiratory Questionnaire (SGRQ) score of a subject by between about 1% and about 8%. In some embodiments, treatment of a subject with one or more of a TβRII antagonist of the present disclosure improves a St. George's Respiratory Questionnaire (SGRQ) score of a subject by between about 1% and about 10%. In some embodiments, treatment of a subject with one or more of a TβRII antagonist of the present disclosure improves a St. George's Respiratory Questionnaire (SGRQ) score of a subject by between about 10% and about 15%. In some embodiments, treatment of a subject with one or more of a TβRII antagonist of the present disclosure improves a St. George's Respiratory Questionnaire (SGRQ) score of a subject by between about 15% and about 20%. In some embodiments, treatment of a subject with one or more of a TβRII antagonist of the present disclosure improves a St. George's Respiratory Questionnaire (SGRQ) score of a subject by between about 20% and about 25%. In some embodiments, treatment of a subject with one or more of a TβRII antagonist of the present disclosure improves a St. George's Respiratory Questionnaire (SGRQ) score of a subject by between about 25% and about 30%. In some embodiments, treatment of a subject with one or more of a TβRII antagonist of the present disclosure improves a St. George's Respiratory Questionnaire (SGRQ) score of a subject by between about 30% and about 35%. In some embodiments, treatment of a subject with one or more of a TβRII antagonist of the present disclosure improves a St. George's Respiratory Questionnaire (SGRQ) score of a subject by between about 35% and about 40%. In some embodiments, treatment of a subject with one or more of a TβRII antagonist of the present disclosure improves a St. George's Respiratory Questionnaire (SGRQ) score of a subject by between about 40% and about 45%. In some embodiments, treatment of a subject with one or more of a TβRII antagonist of the present disclosure improves a St. George's Respiratory Questionnaire (SGRQ) score of a subject by between about 45% and about 50%. In some embodiments, treatment of a subject with one or more of a TβRII antagonist of the present disclosure improves a St. George's Respiratory Questionnaire (SGRQ) score of a subject by between about 55% and about 60%. In some embodiments, treatment of a subject with one or more of a TβRII antagonist of the present disclosure improves a St. George's Respiratory Questionnaire (SGRQ) score of a subject by between about 60% and about 65%. In some embodiments, treatment of a subject with one or more of a TβRII antagonist of the present disclosure improves a St. George's Respiratory Questionnaire (SGRQ) score of a subject by between about 65% and about 70%. In some embodiments, treatment of a subject with one or more of a TβRII antagonist of the present disclosure improves a St. George's Respiratory Questionnaire (SGRQ) score of a subject by between about 10% and about 20%. In some embodiments, treatment of a subject with one or more of a TβRII antagonist of the present disclosure improves a St. George's Respiratory Questionnaire (SGRQ) score of a subject by between about 20% and about 30%. In some embodiments, treatment of a subject with one or more of a TβRII antagonist of the present disclosure improves a St. George's Respiratory Questionnaire (SGRQ) score of a subject by between about 30% and about 40%. In some embodiments, treatment of a subject with one or more of a TβRII antagonist of the present disclosure improves a St. George's Respiratory Questionnaire (SGRQ) score of a subject by between about 40% and about 50%. In some embodiments, treatment of a subject with one or more of a TβRII antagonist of the present disclosure improves a St. George's Respiratory Questionnaire (SGRQ) score of a subject by between about 60% and about 70%. In some embodiments, an SGRQ score is improved after the administering of one or more of a TβRII antagonists of the present disclosure, compared to a baseline measurement. In some embodiments, an SGRQ score is decreased after the administering of one or more of a TβRII antagonists of the present disclosure, compared to a baseline measurement.

King's Brief Interstitial Lung Disease (KBILD) Questionnaire

In some embodiments, the disclosure provides methods of treating SSc (e.g. SSc-ILD), comprising administering a TβRII antagonist to a subject in need thereof, wherein the subject is evaluated using the King's Brief Interstitial Lung Disease (KBILD) questionnaire. In some embodiments, the disclosure provides a method of treating SSc (e.g. SSc-ILD), comprising administering a TβRII antagonist to a subject in need thereof, wherein the administration improves subject's KBILD score.

The King's Brief Interstitial Lung Disease (KBILD) is a 15-item validated health-related quality of life (HRQOL)

questionnaire. The KBILD questionnaire consists of three domains (breathlessness and activities, chest symptoms and psychological). The method of scoring the KBILD has recently changed to incorporate a logit-scale transformation from one that used raw item responses, as this is potentially a more linear scale. The KBILD questionnaire help to measure the impact ILD has on a subject's wellbeing and daily life. KBILDs can be used to monitor and assess how well treatment for interstitial lung disease associated conditions (e.g., SSc-ILD) is working. Each question in the KBILD can be answered with a rank from 1 to 7, with 1 being "all of the time" and 7 being "none of the time". The lowest score a subject can obtain is 15 points. The highest score a subject can obtain is 105 points.

In some embodiments, a subject of the present disclosure may be evaluated using a respiratory questionnaire. In some embodiments, a subject of the present disclosure may be evaluated using a King's Brief Interstitial Lung Disease (KBILD) questionnaire. In some embodiments, an KBILD evaluates one or more of overall health, daily life, response to treatment and/or perceived well-being of a subject with interstitial lung disease (e.g., SSc-ILD).

In some embodiments, treatment of a subject with one or more of a TβRII antagonist of the present disclosure changes a subject's KBILD score by about 1 unit. In some embodiments, treatment of a subject with one or more of a TβRII antagonist of the present disclosure changes a subject's KBILD score by about 3 units. In some embodiments, treatment of a subject with one or more of a TβRII antagonist of the present disclosure changes a subject's KBILD score by about 7 units. In some embodiments, treatment of a subject with one or more of a TβRII antagonist of the present disclosure changes a subject's KBILD score by about 10 units. In some embodiments, treatment of a subject with one or more of a TβRII antagonist of the present disclosure changes a subject's KBILD score by about 14 units. In some embodiments, treatment of a subject with one or more of a TβRII antagonist of the present disclosure changes a subject's KBILD score by about 21 units. In some embodiments, treatment of a subject with one or more of a TβRII antagonist of the present disclosure changes a subject's KBILD score by about 28 units. In some embodiments, treatment of a subject with one or more of a TβRII antagonist of the present disclosure changes a subject's KBILD score by about 35 units. In some embodiments, treatment of a subject with one or more of a TβRII antagonist of the present disclosure changes a subject's KBILD score by about 42 units. In some embodiments, treatment of a subject with one or more of a TβRII antagonist of the present disclosure changes a subject's KBILD score by about 49 units. In some embodiments, treatment of a subject with one or more of a TβRII antagonist of the present disclosure changes a subject's KBILD score by about 56 units. In some embodiments, treatment of a subject with one or more of a TβRII antagonist of the present disclosure changes a subject's KBILD score by about 63 units. In some embodiments, treatment of a subject with one or more of a TβRII antagonist of the present disclosure changes a subject's KBILD score by about 70 units. In some embodiments, treatment of a subject with one or more of a TβRII antagonist of the present disclosure changes a subject's KBILD score by about 77 units. In some embodiments, treatment of a subject with one or more of a TβRII antagonist of the present disclosure changes a subject's KBILD score by about 84 units. In some embodiments, treatment of a subject with one or more of a TβRII antagonist of the present disclosure changes a subject's KBILD score by about 91 units. In some embodiments, treatment of a subject with one or more of a TβRII antagonist of the present disclosure changes a subject's KBILD score by about 98 units. In some embodiments, treatment of a subject with one or more of a TβRII antagonist of the present disclosure changes a subject's KBILD score by about 105 units.

In some embodiments, treatment of a subject with one or more of a TβRII antagonist of the present disclosure changes a subject's KBILD score by between about 0 and about 3 units. In some embodiments, treatment of a subject with one or more of a TβRII antagonist of the present disclosure changes a subject's KBILD score by between about 1 and about 7 units. In some embodiments, treatment of a subject with one or more of a TβRII antagonist of the present disclosure changes a subject's KBILD score by between about 7 and about 14 units. In some embodiments, treatment of a subject with one or more of a TβRII antagonist of the present disclosure changes a subject's KBILD score by between about 14 and about 21 units. In some embodiments, treatment of a subject with one or more of a TβRII antagonist of the present disclosure changes a subject's KBILD score by about more than 21 units.

In some embodiments, treatment of a subject with one or more of a TβRII antagonist of the present disclosure improves a KBILD score of a subject. In some embodiments, treatment of a subject with one or more of a TβRII antagonist of the present disclosure improves a KBILD score of a subject by between about 1% and about 3%. In some embodiments, treatment of a subject with one or more of a TβRII antagonist of the present disclosure improves a KBILD score of a subject by between about 1% and about 5%. In some embodiments, treatment of a subject with one or more of a TβRII antagonist of the present disclosure improves a KBILD score of a subject by between about 1% and about 8%. In some embodiments, treatment of a subject with one or more of a TβRII antagonist of the present disclosure improves a KBILD score of a subject by between about 1% and about 10%. In some embodiments, treatment of a subject with one or more of a TβRII antagonist of the present disclosure improves a KBILD score of a subject by between about 10% and about 15%. In some embodiments, treatment of a subject with one or more of a TβRII antagonist of the present disclosure improves a KBILD score of a subject by between about 15% and about 20%. In some embodiments, treatment of a subject with one or more of a TβRII antagonist of the present disclosure improves a KBILD score of a subject by between about 20% and about 25%. In some embodiments, treatment of a subject with one or more of a TβRII antagonist of the present disclosure improves a KBILD score of a subject by between about 25% and about 30%. In some embodiments, treatment of a subject with one or more of a TβRII antagonist of the present disclosure improves a KBILD score of a subject by between about 30% and about 35%. In some embodiments, treatment of a subject with one or more of a TβRII antagonist of the present disclosure improves a KBILD score of a subject by between about 35% and about 40%. In some embodiments, treatment of a subject with one or more of a TβRII antagonist of the present disclosure improves a KBILD score of a subject by between about 40% and about 45%. In some embodiments, treatment of a subject with one or more of a TβRII antagonist of the present disclosure improves a KBILD score of a subject by between about 45% and about 50%. In some embodiments, treatment of a subject with one or more of a TβRII antagonist of the present disclosure improves a KBILD score of a subject by between about 55% and about 60%. In some embodiments, treatment of a subject with one or more of a TβRII antagonist of the present disclosure improves a KBILD score of a subject by between about 60% and about 65%. In some embodiments, treatment of a subject with one or more of a TβRII antagonist of the present disclosure improves a KBILD score of a subject by between about 65% and about 70%. In some embodiments, treatment of a subject with one or more of a TβRII antagonist of the present disclosure improves a KBILD score of a subject by between about 10% and about 20%. In some embodiments, treatment of a subject with one or more of a TβRII antagonist of the present disclosure improves a KBILD score of a subject by between about 20% and about 30%. In some embodiments, treatment of a subject with one or more of a TβRII antagonist of the present disclosure improves a KBILD score of a subject by between about 30% and about 40%. In some embodiments, treatment of a subject with one or more of a TβRII antagonist of the present disclosure improves a KBILD score of a subject by between about 40% and about 50%. In some embodiments, treatment of a subject with one or more of a TβRII antagonist of the present disclosure improves a KBILD score of a subject by between about 60% and about 70%. In some embodiments, a KBILD score is improved after the administering of one or more of a TβRII antagonists of the present disclosure, compared to a baseline measurement. In some embodiments, an KBILD score is increased after the administering of one or more of a TβRII antagonists of the present disclosure, compared to a baseline measurement.

Modified Rodnan Skin Score (mRSS)

In some embodiments, the disclosure provides methods of treating SSc (e.g. SSc-ILD), comprising administering a TβRII antagonist to a subject in need thereof, wherein the subject is evaluated for skin thickness using a modified rodnan skin score (mRSS). In some embodiments, the disclosure provides a method of treating SSc (e.g. SSc-ILD), comprising administering a TβRII antagonist to a subject in need thereof, wherein the mRSS is an average of measurements of multiple areas on the subject.

A modified Rodnan Skin Score (mRSS) evaluates a subject for extent of skin thickness. In some embodiments, mRSS is measured by skin palpitation. In some embodiments, skin palpitation is performed by pinching skin with fingers. In some embodiments, mRSS is measured by a scale of 0 to 3 for each area of palpitation. In some embodiments, an mRSS of 0 comprises an indication of normal skin comprising appearance of fine wrinkles and not skin thickness. In some embodiments, an mRSS of 1 comprises an indication of mild skin thickness comprising skin folds easily made between two fingers. In some embodiments, an mRSS of 2 comprises an indication of moderate skin thickness comprising difficulty in making skin folds and no wrinkles are present. In some embodiments, an mRSS of 3 comprises an indication of severe thickness comprising an inability to make skin folds between 2 examining fingers. In some embodiments, several areas are evaluated for an mRSS. In some embodiments, 17 surface anatomic areas are evaluated for an mRSS. In some embodiments, a representative area (e.g., most representative score of a specific area) of a subject is evaluated for an mRSS. In some embodiments, a global average (e.g., score individual areas and take average of the area as a whole) is calculated for an mRSS.

In some embodiments, a subject of the present disclosure has a total mRSS baseline measurement of greater than or equal to 5. In some embodiments, a subject of the present disclosure has a total mRSS baseline measurement of greater than or equal to 10. In some embodiments, a subject of the present disclosure has a total mRSS baseline measurement of greater than or equal to 15. In some embodiments, a subject of the present disclosure has a total mRSS baseline measurement of greater than or equal to 20. In some embodiments, a subject of the present disclosure has a total mRSS baseline measurement of greater than or equal to 25. In some embodiments, a subject of the present disclosure has a total mRSS baseline measurement of greater than or equal to 30. In some embodiments, a subject of the present disclosure has a total mRSS baseline measurement of greater than or equal to 35. In some embodiments, a subject of the present disclosure has a total mRSS baseline measurement of greater than or equal to 40. In some embodiments, a subject of the present disclosure has a total mRSS baseline measurement of greater than or equal to 45. In some embodiments, a subject of the present disclosure has a total mRSS baseline measurement of greater than or equal to 50. In some embodiments, a subject of the present disclosure has a total mRSS of greater than or equal to 15 at baseline. In some embodiments, the disclosure provides methods of treating SSc (e.g. SSc-ILD), comprising administering a TβRII antagonist to a subject in need thereof, wherein the subject has an mRSS of greater than or equal to 15 at baseline.

In some embodiments, treatment of a subject with one or more of a TβRII antagonist of the present disclosure improves a modified rodnan skin score (mRSS) of the subject. In some embodiments, treatment of a subject with one or more of a TβRII antagonist of the present disclosure improves an mRSS of the subject. In some embodiments, treatment of a subject with one or more of a TβRII antagonist of the present disclosure improves an mRSS of the subject by between about 1% and about 3%. In some embodiments, treatment of a subject with one or more of a TβRII antagonist of the present disclosure improves an mRSS of the subject by between about 1% and about 5%. In some embodiments, treatment of a subject with one or more of a TβRII antagonist of the present disclosure improves an mRSS of the subject by between about 1% and about 8%. In some embodiments, treatment of a subject with one or more of a TβRII antagonist of the present disclosure improves an mRSS of the subject by between about 1% and about 10%. In some embodiments, treatment of a subject with one or more of a TβRII antagonist of the present disclosure improves an mRSS of the subject by between about 10% and about 15%. In some embodiments, treatment of a subject with one or more of a TβRII antagonist of the present disclosure improves an mRSS of the subject by between about 15% and about 20%. In some embodiments, treatment of a subject with one or more of a TβRII antagonist of the present disclosure improves an mRSS of the subject by between about 20% and about 25%. In some embodiments, treatment of a subject with one or more of a TβRII antagonist of the present disclosure improves an mRSS of the subject by between about 25% and about 30%. In some embodiments, treatment of a subject with one or more of a TβRII antagonist of the present disclosure improves an mRSS of the subject by between about 30% and about 35%. In some embodiments, treatment of a subject with one or more of a TβRII antagonist of the present disclosure improves an mRSS of the subject by between about 35% and about 40%. In some embodiments, treatment of a subject with one or more of a TβRII antagonist of the present disclosure improves an mRSS of the subject by between about 40% and about 45%. In some embodiments, treatment of a subject with one or more of a TβRII antagonist of the present disclosure improves an mRSS of the subject by between about 45% and about 50%. In some embodiments, treatment of a subject with one or more of a TβRII antagonist of the present disclosure improves an mRSS of the subject by between about 55% and about 60%. In some embodiments, treatment of a subject with one or more of a TβRII antagonist of the present disclosure improves an mRSS of the subject by between about 60% and about 65%. In some embodiments, treatment of a subject with one or more of a TβRII antagonist of the present disclosure improves an mRSS of the subject by between about 65% and about 70%. In some embodiments, treatment of a subject with one or more of a TβRII antagonist of the present disclosure improves an mRSS of the subject by between about 10% and about 20%. In some embodiments, treatment of a subject with one or more of a TβRII antagonist of the present disclosure improves an mRSS of the subject by between about 20% and about 30%. In some embodiments, treatment of a subject with one or more of a TβRII antagonist of the present disclosure improves an mRSS of the subject by between about 30% and about 40%. In some embodiments, treatment of a subject with one or more of a TβRII antagonist of the present disclosure improves an mRSS of the subject by between about 40% and about 50%. In some embodiments, treatment of a subject with one or more of a TβRII antagonist of the present disclosure improves an mRSS of the subject by between about 60% and about 70%. In some embodiments, a mRSS is improved after the administering of one or more of a TβRII antagonists of the present disclosure, compared to a baseline measurement. In some embodiments, an mRSS is decreased after the administering of one or more of a TβRII antagonists of the present disclosure, compared to a baseline measurement.

Health Assessment Questionnaire Disability Index (HAQ-DI)

In some embodiments, the disclosure provides methods of treating SSc (e.g. SSc-ILD), comprising administering a TβRII antagonist to a subject in need thereof, wherein the subject is evaluated using a Health Assessment Questionnaire Disability Index (HAQ-DI).

The Health Assessment Questionnaire-Disability (HAQ-DI) consists of 20 questions referring to eight component sets: dressing/grooming, arising, eating, walking, hygiene, reach, grip and activities. The total score indicates the patient's self-assessed level of disability. A negative change from baseline indicates improvement.

In some embodiments, the disclosure provides methods of treating SSc (e.g. SSc-ILD), comprising administering a TβRII antagonist to a subject in need thereof, wherein the antagonist improves the subject's HAQ-DI score compared to a baseline measurement. In some embodiments, the disclosure provides methods of treating SSc (e.g. SSc-ILD), comprising administering a TβRII antagonist to a subject in need thereof, wherein the antagonist imparts a negative change in HAQ-DI score of a subject compared to a baseline measurement.

Physical/Physician Global Assessment and Patient Global Assessment

In some embodiments, the disclosure provides methods of treating SSc (e.g. SSc-ILD), comprising administering a TβRII antagonist to a subject in need thereof, wherein the subject is evaluated using a physical/physician global assessment.

The physician's global assessment is to be completed on the basis of examination and overall assessment of the patient after all other trial procedures have been completed. The physician's assessment of the patient's SSc status will be scored on a 100-mm horizontal visual analog scale (VAS).

In some embodiments, the disclosure provides methods of treating SSc (e.g. SSc-ILD), comprising administering a TβRII antagonist to a subject in need thereof, wherein the antagonist improves the subject's physical/physician global assessment score compared to a baseline measurement.

In some embodiments, the disclosure provides methods of treating SSc (e.g. SSc-ILD), comprising administering a TβRII antagonist to a subject in need thereof, wherein the subject is evaluated using a patient global assessment.

The patient's global assessment represents the patient's (e.g., subject's) overall assessment of his or her current SSc status on a 100-mm horizontal visual analog scale (VAS). The patient's global assessment is self-administered by the patient.

In some embodiments, the disclosure provides methods of treating SSc (e.g. SSc-ILD), comprising administering a TβRII antagonist to a subject in need thereof, wherein the antagonist improves the subject's patient global assessment score compared to a baseline measurement.

Clinical Worsening

In some embodiments, the disclosure provides methods of treating SSc (e.g. SSc-ILD), comprising administering a TβRII antagonist to a subject in need thereof, wherein the antagonist improves the time to clinical worsening of the subject. In some embodiments, the disclosure provides methods of treating SSc (e.g. SSc-ILD), comprising administering a TβRII antagonist to a subject in need thereof, wherein the antagonist lengthens the time to clinical worsening of the subject. In some embodiments, the disclosure provides methods of treating SSc (e.g. SSc-ILD), comprising administering a TβRII antagonist to a subject in need thereof, wherein the antagonist slows the rate of decline of pulmonary function of the subject. In some embodiments, the disclosure provides methods of treating SSc (e.g. SSc-ILD), comprising administering a TβRII antagonist to a subject in need thereof, wherein the antagonist extends the subject's length of life compared to a baseline measurement prior to the administering. In some embodiments, the disclosure provides methods of treating SSc (e.g. SSc-ILD), comprising administering a TβRII antagonist to a subject in need thereof, wherein the antagonist prevents a decline in FVC of the subject of greater than 10% of predicted relative to a baseline measurement. In some embodiments, the disclosure provides methods of treating SSc (e.g. SSc-ILD), comprising administering a TβRII antagonist to a subject in need thereof, wherein the antagonist prevents at least a greater than 20% increase in mRSS of the subject. In some embodiments, the disclosure provides methods of treating SSc (e.g. SSc-ILD), comprising administering a TβRII antagonist to a subject in need thereof, wherein the antagonist prevents at least a greater than 5 point increase in total mRSS of the subject. In some embodiments, the disclosure provides methods of treating SSc (e.g. SSc-ILD), comprising administering a TβRII antagonist to a subject in need thereof, wherein the antagonist prevents an occurrence of an SSc-related complication in the subject.

Combination Therapies

In certain aspects, the disclosure contemplates the use of a TβRII antagonist in combination with one or more additional active agents or other supportive therapy for treating systemic sclerosis or a complication of SSc (e.g., SSc-ILD).

As used herein, "in combination with", "combinations of", "combined with", or "conjoint" administration refers to any form of administration such that additional active agents or supportive therapies (e.g., second, third, fourth, etc.) are still effective in the body (e.g., multiple compounds are simultaneously effective in the patient for some period of time, which may include synergistic effects of those compounds). Effectiveness may not correlate to measurable concentration of the agent in blood, serum, or plasma. For example, the different therapeutic compounds can be administered either in the same formulation or in separate formulations, either concomitantly or sequentially, and on different schedules. Thus, a subject who receives such treatment can benefit from a combined effect of different active agents or therapies. One or more TβRII antagonists of the disclosure can be administered concurrently with, prior to, or subsequent to, one or more other additional agents or supportive therapies, such as those disclosed herein. In general, each active agent or therapy will be administered at a dose and/or on a time schedule determined for that particular agent. The particular combination to employ in a regimen will take into account compatibility of the TβRII antagonist of the present disclosure with the additional active agent or therapy and/or the desired effect.

In some embodiments, a patient has been treated with one or more active agents, which is not a TβRII antagonist, or other supportive therapy for treating SSc, or a complication of SSc (e.g., SSc-ILD) prior to administration of a TβRII antagonist. In some embodiments, a patient was not previously taking one or more other active agents or supportive therapies for treating SSc, or a complication of SSc (e.g., SSc-ILD) prior to administration of a TβRII antagonist. In some embodiments a patient is administered a TβRII antagonist in combination with one or more additional active agents and/or supportive therapies for treating SSc, or a complication of SSc (e.g., SSc-ILD).

In some embodiments, a therapeutic agent for treating SSc, or a complication of SSc (e.g., SSc-ILD) comprises abatacept (e.g., orencia). In some embodiments, a therapeutic agent for treating SSc, or a complication of SSc (e.g., SSc-ILD) comprises abituzumab. In some embodiments, a therapeutic agent for treating SSc, or a complication of SSc (e.g., SSc-ILD) comprises ajulemic acid (e.g., anabasum or lenabasum or resunab). In some embodiments, a therapeutic agent for treating SSc, or a complication of SSc (e.g., SSc-ILD) comprises ambrisentan. In some embodiments, a therapeutic agent for treating SSc, or a complication of SSc (e.g., SSc-ILD) comprises AVID200. In some embodiments, a therapeutic agent for treating SSc, or a complication of SSc (e.g., SSc-ILD) comprises AVID300. In some embodiments, a therapeutic agent for treating SSc, or a complication of SSc (e.g., SSc-ILD) comprises azathioprine (e.g., imuran). In some embodiments, a therapeutic agent for treating SSc, or a complication of SSc (e.g., SSc-ILD) comprises BCD-089. In some embodiments, a therapeutic agent for treating SSc, or a complication of SSc (e.g., SSc-ILD) comprises belimumab (e.g., benlysta). In some embodiments, a therapeutic agent for treating SSc, or a complication of SSc (e.g., SSc-ILD) comprises BG00011. In some embodiments, a therapeutic agent for treating SSc, or a complication of SSc (e.g., SSc-ILD) comprises BMS-986020. In some embodiments, a therapeutic agent for treating SSc, or a complication of SSc (e.g., SSc-ILD) comprises bortezomib (e.g., velcade). In some embodiments, a therapeutic agent for treating SSc, or a complication of SSc (e.g., SSc-ILD) comprises bosentan. In some embodiments, a therapeutic agent for treating SSc, or a complication of SSc (e.g., SSc-ILD) comprises brentuximab (e.g., adcetris). In some embodiments, a therapeutic agent for treating SSc, or a complication of SSc (e.g., SSc-ILD) comprises carlumab. In some embodiments, a therapeutic agent for treating SSc, or a complication of SSc (e.g., SSc-ILD) comprises CC-90001. In some embodiments, a therapeutic agent for treating SSc, or a complication of SSc (e.g., SSc-ILD) comprises clazakizumab. In some embodiments, a therapeutic agent for treating SSc, or a complication of SSc (e.g., SSc-ILD) comprises COR-001. In some embodiments, a therapeutic agent for treating SSc, or a complication of SSc (e.g., SSc-ILD) comprises cyclophosphamide or CYC. In some embodiments, a therapeutic agent for treating SSc, or a complication of SSc (e.g., SSc-ILD) comprises cyclosporine A. In some embodiments, a therapeutic agent for treating SSc, or a complication of SSc (e.g., SSc-ILD) comprises dectrekumab. In some embodiments, a therapeutic agent for treating SSc, or a complication of SSc (e.g., SSc-ILD) comprises EHP-101. In some embodiments, a therapeutic agent for treating SSc, or a complication of SSc (e.g., SSc-ILD) comprises elzonris or SL-401. In some embodiments, a therapeutic agent for treating SSc, or a complication of SSc (e.g., SSc-ILD) comprises etanercept. In some embodiments, a therapeutic agent for treating SSc, or a complication of SSc (e.g., SSc-ILD) comprises FCX-013. In some embodiments, a therapeutic agent for treating SSc, or a complication of SSc (e.g., SSc-ILD) comprises fresolimumab. In some embodiments, a therapeutic agent for treating SSc, or a complication of SSc (e.g., SSc-ILD) comprises GLPG1690. In some embodiments, a therapeutic agent for treating SSc, or a complication of SSc (e.g., SSc-ILD) comprises GSK2126458. In some embodiments, a therapeutic agent for treating SSc, or a complication of SSc (e.g., SSc-ILD) comprises GSK2330811. In some embodiments, a therapeutic agent for treating SSc, or a complication of SSc (e.g., SSc-ILD) comprises GSK3008348. In some embodiments, a therapeutic agent for treating SSc, or a complication of SSc (e.g., SSc-ILD) comprises IBIO-CFB03. In some embodiments, a therapeutic agent for treating SSc, or a complication of SSc (e.g., SSc-ILD) comprises ifetroban (e.g., vasculan). In some embodiments, a therapeutic agent for treating SSc, or a complication of SSc (e.g., SSc-ILD) comprises IFNγ. In some embodiments, a therapeutic agent for treating SSc, or a complication of SSc (e.g., SSc-ILD) comprises imatinib. In some embodiments, a therapeutic agent for treating SSc, or a complication of SSc (e.g., SSc-ILD) comprises immune globulin (e.g., privigen). In some embodiments, a therapeutic agent for treating SSc, or a complication of SSc (e.g., SSc-ILD) comprises IW001. In some embodiments, a therapeutic agent for treating SSc, or a complication of SSc (e.g., SSc-ILD) comprises lanifibranor. In some embodiments, a therapeutic agent for treating SSc, or a complication of SSc (e.g., SSc-ILD) comprises lebrikizumab. In some embodiments, a therapeutic agent for treating SSc, or a complication of SSc (e.g., SSc-ILD) comprises levilimab. In some embodiments, a therapeutic agent for treating SSc, or a complication of SSc (e.g., SSc-ILD) comprises losartan. In some embodiments, a therapeutic agent for treating SSc, or a complication of SSc (e.g., SSc-ILD) comprises macitentan. In some embodiments, a therapeutic agent for treating SSc, or a complication of SSc (e.g., SSc-ILD) comprises MEDI-5117. In some embodiments, a therapeutic agent for treating SSc, or a complication of SSc (e.g., SSc-ILD) comprises methotrexate. In some embodiments, a therapeutic agent for treating SSc, or a complication of SSc (e.g., SSc-ILD) comprises MSCs. In some embodiments, a therapeutic agent for treating SSc, or a complication of SSc (e.g., SSc-ILD) comprises mycophenolate mofetil or MMF. In some embodiments, a therapeutic agent for treating SSc, or a complication of SSc (e.g., SSc-ILD) comprises NAC. In some embodiments, a therapeutic agent for treating SSc, or a complication of SSc (e.g., SSc-ILD) comprises nandrolone decanoate. In some embodiments, a therapeutic agent for treating SSc, or a complication of SSc (e.g., SSc-ILD) comprises nintedanib (e.g., ofev). In some embodiments, a therapeutic agent for treating SSc, or a complication of SSc (e.g., SSc-ILD) comprises olokizumab. In some embodiments, a therapeutic agent for treating SSc, or a complication of SSc (e.g., SSc-ILD) comprises pamrevlumab. In some embodiments, a therapeutic agent for treating SSc, or a complication of SSc (e.g., SSc-ILD) comprises pirfenidone (e.g., esbriet). In some embodiments, a therapeutic agent for treating SSc, or a complication of SSc (e.g., SSc-ILD) comprises pirfenidone and vismodegib. In some embodiments, a therapeutic agent for treating SSc, or a complication of SSc (e.g., SSc-ILD) comprises pomalidomide (e.g., pomalyst). In some embodiments, a therapeutic agent for treating SSc, or a complication of SSc (e.g., SSc-ILD) comprises PRM-151. In some embodiments, a therapeutic agent for treating SSc, or a complication of SSc (e.g., SSc-ILD) comprises riociguat (e.g., adempas). In some embodiments, a therapeutic agent for treating SSc, or a complication of SSc (e.g., SSc-ILD) comprises rituximab (e.g., rituxan). In some embodiments, a therapeutic agent for treating SSc, or a complication of SSc (e.g., SSc-ILD) comprises SAR156597. In some embodiments, a therapeutic agent for treating SSc, or a complication of SSc (e.g., SSc-ILD) comprises sildenafil. In some embodiments, a therapeutic agent for treating SSc, or a complication of SSc (e.g., SSc-ILD) comprises siltuximab (e.g., sylvant). In some embodiments, a therapeutic agent for treating SSc, or a complication of SSc (e.g., SSc-ILD) comprises simtuzumab. In some embodiments, a therapeutic agent for treating SSc, or a complication of SSc (e.g., SSc-ILD) comprises sirolimus. In some embodiments, a therapeutic agent for treating SSc, or a complication of SSc (e.g., SSc-ILD) comprises sirukumab. In some embodiments, a therapeutic agent for treating SSc, or a complication of SSc (e.g., SSc-ILD) comprises tacrolimus. In some embodiments, a therapeutic agent for treating SSc, or a complication of SSc (e.g., SSc-ILD) comprises tadalafil. In some embodiments, a therapeutic agent for treating SSc, or a complication of SSc (e.g., SSc-ILD) comprises tanzisertib. In some embodiments, a therapeutic agent for treating SSc, or a complication of SSc (e.g., SSc-ILD) comprises TD139. In some embodiments, a therapeutic agent for treating SSc, or a complication of SSc (e.g., SSc-ILD) comprises tetrathiomolybdate. In some embodiments, a therapeutic agent for treating SSc, or a complication of SSc (e.g., SSc-ILD) comprises tocilizumab (e.g., actemra). In some embodiments, a therapeutic agent for treating SSc, or a complication of SSc (e.g., SSc-ILD) comprises tralokinumab. In some embodiments, a therapeutic agent for treating SSc, or a complication of SSc (e.g., SSc-ILD) comprises treprostinil. In some embodiments, a therapeutic agent for treating SSc, or a complication of SSc (e.g., SSc-ILD) comprises vobarilizumab. In some embodiments, a therapeutic agent for treating SSc, or a complication of SSc (e.g., SSc-ILD) comprises warfarin. In some embodiments, a therapeutic agent for treating SSc, or a complication of SSc (e.g., SSc-ILD) comprises zileuton. In some embodiments, a therapeutic agent for treating SSc, or a complication of SSc (e.g., SSc-ILD) comprises ziltivekimab.

In some embodiments, a subject has been treated with a therapeutic agent for treating SSc, or a complication of SSc (e.g., SSc-ILD) comprising one or more of abatacept, abituzumab, ajulemic acid, ambrisentan, AVID200, AVID300, azathioprine, BCD-089, belimumab, BG00011, BMS-986020, bortezomib, bosentan, brentuximab, carlumab, CC-90001, clazakizumab, COR-001, cyclophosphamide (CYC), cyclosporine A, dectrekumab, EHP-101, elzonris/SL-401, etanercept, FCX-013, fresolimumab, GLPG1690, GASK2126458, GSK2330811, GSK3008348, IBIO-CFB03, ifetroban, IFNγ, imatinib, immune globulin, IW001, lanifibranor, lebrikizumab, levilimab, losartan, macitentan, MEDI-5117, methotrexate, MSCs, mycophenolate mofetil (MMF), NAC, nandrolone decanoate, nintedanib, olokizumab, pamrevlumab, pirfenidone, pirfenidone and vismodegib, pomalidomide, PRM-151. riociguat, rituximab, SAR156597, sildenafil, siltuximab, simtuzumab, sirolimus, sirukumab, tacrolimus, tadalafil, tanzisertib, TD139, tetrathiomolybdate, tocilizumab, tralokinumab, treprostinil, vobarilizumab, warfarin, zileuton, and ziltivekimab.

In some embodiments, a subject is further treated with a therapeutic agent for treating SSc, or a complication of SSc (e.g., SSc-ILD) comprising one or more of abatacept, abituzumab, ajulemic acid, AVID200, AVID300, azathioprine, BCD-089, belimumab, bortezomib, bosentan, brentuximab, clazakizumab, COR-001, cyclophosphamide (CYC), cyclosporine A, EHP-101, elzonris/SL-401, FCX-013, GLPG1690, GSK2330811, IBIO-CFB03, ifetroban, imatinib, immune globulin, lanifibranor, levilimab, MEDI-5117, mycophenolate mofetil (MMF), olokizumab, pirfenidone, pomalidomide, riociguat, rituximab, SAR156597, siltuximab, sirukumab, tacrolimus, tadalafil, tocilizumab, vobarilizumab, and/or ziltivekimab.

In some embodiments, a subject has been treated with a therapeutic agent for treating SSc, or a complication of SSc (e.g., SSc-ILD) comprising one or more of abatacept, abituzumab, ajulemic acid, AVID200, AVID300. azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and/or tocilizumab.

In some embodiments, a subject is further treated with a therapeutic agent for treating SSc, or a complication of SSc (e.g., SSc-ILD) comprising one or more of abatacept, abituzumab, ajulemic acid, AVID200, AVID300, azathioprine, belimumab, bortezomib, bosentan, brentuximab, cyclophosphamide (CYC), cyclosporine A, EHP-101, elzonris/SL-401, FCX-013, GLPG1690, GSK2330811, IBIO-CFB03, ifetroban, imatinib, lanifibranor, methotrexate, mycophenolate mofetil (MMF), nintedanib, pirfenidone, pomalidomide, privigen, riociguat, rituximab, SAR156597, tacrolimus, tadalafil, and/or tocilizumab.

In some embodiments, a subject has been treated with a therapeutic agent for treating SSc, or a complication of SSc (e.g., SSc-ILD) comprising one or more of azathioprine, cyclophosphamide (CYC), methotrexate, mycophenolate mofetil (MMF), and/or nintedanib. In some embodiments, the disclosure provides methods of treating SSc-ILD, comprising administering a TβRII antagonist to a subject in need thereof, wherein the method further comprises administration of one or more of azathioprine, cyclophosphamide (CYC), methotrexate, mycophenolate mofetil (MMF), and/or nintedanib.

In some embodiments, a subject is further treated with a therapeutic agent for treating SSc, or a complication of SSc (e.g., SSc-ILD) comprising one or more of azathioprine, cyclophosphamide (CYC), methotrexate, mycophenolate mofetil (MMF), and/or nintedanib. In some embodiments, the disclosure provides methods of treating SSc-ILD, comprising administering a TβRII antagonist to a subject in need thereof, wherein the method further comprises administration of one or more of azathioprine, cyclophosphamide (CYC), methotrexate, mycophenolate mofetil (MMF), and/or nintedanib.

In some embodiments, administration of one or more TβRII antagonists of the present disclosure slows the annual rate of decline in FVC compared to a subject administered standard of care (SOC). In some embodiments, standard of care comprises administration of an immunosuppressive therapy. In some embodiments, standard of care comprises administration of mycophenolate mofetil (MMF). In some embodiments, standard of care comprises administration of methotrexate. In some embodiments, standard of care comprises administration of cyclophosphamide. In some embodiments, standard of care comprises administration of nintedanib (Ofev). In some embodiments, standard of care comprises administration of rituximab. In some embodiments, standard of care comprises administration of one or more of mycophenolate mofetil (MMF), methotrexate, cyclophosphamide, nintedanib (Ofev), and rituximab. In some embodiments, standard of care comprises administration of at least one therapy selected from the group consisting of mycophenolate mofetil (MMF), methotrexate, cyclophosphamide, nintedanib (Ofev), and rituximab. In some embodiments, administration of one or more TβRII antagonists of the present disclosure slows the annual rate of decline in FVC compared to a subject who has had a lung transplant.

In some embodiments, a therapeutic agent for treating SSc, or a complication of SSc (e.g., SSc-ILD) comprises one or more of IL-6 and/or/or IL-6R antibodies. In some embodiments, IL-6 antibodies comprise one or more of clazakizumab, COR-001, MEDI-5117, olokizumab, siltuximab, sirukumab, and/or ziltivekimab. In some embodiments, IL-6R antibodies comprise one or more of BCD-089 (levilimab), tocilizumab, and/or vobarilizumab.

In some embodiments, a subject has been treated with a therapeutic agent for treating SSc, or a complication of SSc (e.g., SSc-ILD) comprising one or more of clazakizumab, COR-001, MEDI-5117, olokizumab, siltuximab, sirukumab, and/or ziltivekimab.

In some embodiments, a subject is further treated with a therapeutic agent for treating SSc, or a complication of SSc (e.g., SSc-ILD) comprising one or more of clazakizumab, COR-001, MEDI-5117, olokizumab, siltuximab, sirukumab, and/or ziltivekimab In some embodiments, a subject has been treated with a therapeutic agent for treating SSc, or a complication of SSc (e.g., SSc-ILD) comprising one or more of BCD-089 (levilimab), tocilizumab, and/or vobarilizumab.

In some embodiments, a subject is further treated with a therapeutic agent for treating SSc, or a complication of SSc (e.g., SSc-ILD) comprising one or more of BCD-089 (levilimab), tocilizumab, and/or vobarilizumab.

In some embodiments, a therapeutic agent for treating SSc, or a complication of SSc (e.g., SSc-ILD)) targets IL-3R. In some embodiments, a therapeutic agent for treating SSc, or a complication of SSc (e.g., SSc-ILD) comprises an endostatin. In some embodiments, a therapeutic agent for treating SSc, or a complication of SSc (e.g., SSc-ILD) targets PPARγ/CB2. In some embodiments, a therapeutic agent for treating SSc, or a complication of SSc (e.g., SSc-ILD) targets MMP-1 cells. In some embodiments, a therapeutic agent for treating SSc, or a complication of SSc (e.g., SSc-ILD) targets autotaxin. In some embodiments, a therapeutic agent for treating SSc, or a complication of SSc (e.g., SSc-ILD) targets sGC. In some embodiments, a therapeutic agent for treating SSc, or a complication of SSc (e.g., SSc-ILD) targets IL-4/IL-13. In some embodiments, a therapeutic agent for treating SSc, or a complication of SSc (e.g., SSc-ILD) targets IL-6/IL-6R. In some embodiments, a therapeutic agent for treating SSc, or a complication of SSc (e.g., SSc-ILD) targets TPR. In some embodiments, a therapeutic agent for treating SSc, or a complication of SSc (e.g., SSc-ILD) targets oncostatin M. In some embodiments, a therapeutic agent for treating SSc, or a complication of SSc (e.g., SSc-ILD) targets p38. In some embodiments, a therapeutic agent for treating SSc, or a complication of SSc (e.g., SSc-ILD) targets FGFR/PDGFR. In some embodiments, a therapeutic agent for treating SSc, or a complication of SSc (e.g., SSc-ILD) targets CB1/CB2.

The present disclosure contemplates the use of TβRII antagonists in combination with one or more supportive therapies for treating scleroderma and/or/or SSc-ILD. In some embodiments, a supportive therapy for treating SSc, or a complication of SSc (e.g., SSc-ILD) is a hematopoietic stem cell transplantation (HSCT). In some embodiments, one or more TβRII antagonists of the present disclosure are administered prior to a hematopoietic stem cell transplantation. In some embodiments, one or more TβRII antagonists of the present disclosure are administered during a hematopoietic stem cell transplantation. In some embodiments, one or more TβRII antagonists of the present disclosure are administered after a hematopoietic stem cell transplantation.

In some embodiments, a supportive therapy for treating SSc, or a complication of SSc (e.g., SSc-ILD) is a lung transplant. In some embodiments, one or more TβRII antagonists of the present disclosure are administered prior to a lung transplant. In some embodiments, one or more TβRII antagonists of the present disclosure are administered during a lung transplant. In some embodiments, one or more TβRII antagonists of the present disclosure are administered after a lung transplant.

In some embodiments, a subject with SSc (e.g., SSc-ILD) may have one or more additional fibrotic diseases or conditions. As used herein, the term "fibrosis" or "fibrotic" refers to the aberrant formation or development of excess fibrous connective tissue by cells in an organ or tissue. Although processes related to fibrosis can occur as part of normal tissue formation or repair, dysregulation of these processes can lead to altered cellular composition and/or excess connective tissue deposition that progressively impairs to tissue or organ function. The formation of fibrous tissue can result from a reparative or reactive process. As used herein, the terms "fibrotic disorder", "fibrotic condition," and/or "fibrotic disease," are used interchangeably to refer to a disorder, condition or disease characterized by fibrosis. Additional fibrotic diseases or conditions include, but are not limited to, fibroproliferative disorders associated with vascular diseases, such as cardiac disease, cerebral disease, and/or peripheral vascular disease, as well as tissues and/or organ systems including the heart, skin, kidney, peritoneum, gut, and/or liver (as disclosed in, e.g., Wynn, 2004, Nat Rev 4:583-594, incorporated herein by reference). Exemplary additional fibrotic diseases or conditions that can be treated include, but are not limited to, renal fibrosis, including nephropathies associated with injury/fibrosis, e.g., chronic nephropathies associated with diabetes (e.g., diabetic nephropathy), lupus, glomerular nephritis, focal segmental glomerular sclerosis, and/or IgA nephropathy; gut fibrosis, e.g., radiation-induced gut fibrosis; liver fibrosis, e.g., cirrhosis, alcohol-induced liver fibrosis, biliary duct injury, primary biliary cirrhosis, infection or viral-induced liver fibrosis, congenital hepatic fibrosis and/or autoimmune hepatitis; and/or other fibrotic conditions, such as cystic fibrosis, endomyocardial fibrosis, mediastinal fibrosis, sarcoidosis, spinal cord injury/fibrosis, myelofibrosis, vascular restenosis, atherosclerosis, injection fibrosis (which can occur as a complication of intramuscular injections, especially in children), endomyocardial fibrosis, retroperitoneal fibrosis, nephrogenic systemic fibrosis, vascular fibrosis, pancreatic fibrosis, liver fibrosis (e.g., cirrhosis), renal fibrosis, musculoskeletal fibrosis, cardiac fibrosis (e.g., endomyocardial fibrosis, idiopathic myocardiopathy), skin fibrosis (e.g., post-traumatic, operative cutaneous scarring, keloids and/or cutaneous keloid formation), eye fibrosis (e.g., glaucoma, sclerosis of the eyes, conjunctival and/or corneal scarring, and/or pterygium), myelofibrosis, chronic graft-versus-host disease, Peyronie's disease, post-cystoscopic urethral stenosis, idiopathic and/or pharmacologically induced retroperitoneal fibrosis, mediastinal fibrosis, proliferative fibrosis, neoplastic fibrosis, Dupuytren's disease, strictures, neural scarring, dermal scarring, idiopathic pulmonary fibrosis and/or radiation induced fibrosis.

In certain aspects, any of the TβRII antagonists disclosed herein may be used, alone or in combination with one or more supportive therapies or active agents, treat one or more additional diseases or conditions occurring in a subject with SSc (e.g. SSc-ILD), comprising myelofibrosis (e.g., primary myelofibrosis, post-polycythemia vera myelofibrosis, and/or post-essential thrombocythemia myelofibrosis). In particular, ActRIIB antagonists may be used, alone or in combination with one or more supportive therapies or active agents, to treat one or more complications of an additional diseases or conditions occurring in a subject with SSc (e.g SSc-ILD), myelofibrosis, wherein complications include, for example, ineffective hematopoiesis, anemia, inflammation, fibrosis (e.g., bone marrow fibrosis, spleen fibrosis, and/or liver fibrosis), pancytopenia, thrombocytopenia, extramedullary hematopoiesis (e.g., splenic extramedullary hematopoiesis, hepatic extramedullary hematopoiesis, pulmonary extramedullary hematopoiesis, and/or lymphatic extramedullary hematopoiesis), hepatomegaly, splenomegaly, osteosclerosis, osteomyelofibrosis, poikilocytosis, fatigue, weight loss, night sweats, fever, pruritus, bone pain, early satiety, abdominal pain or discomfort, arthralgias, myalgias, parasthesias, cachexia, splenic infarct, and/or bleeding.

As used herein, inhibition of the fibrotic response of a cell, includes, but is not limited to the inhibition of the fibrotic response of one or more cells within the liver (or liver tissue); one or more cells within the kidney (or renal tissue); one or more cells within muscle tissue; one or more cells within the heart (or cardiac tissue); one or more cells within the pancreas; one or more cells within the skin; one or more cells within the bone, one or more cells within the vasculature, one or more stem cells, or one or more cells within the eye.

In some embodiments, any of the TβRII antagonists of the disclosure may be used for treating one or more additional diseases or conditions occurring in a subject with SSc (e.g SSc-ILD), comprising chronic obstructive pulmonary disease (COPD), chronic obstructive airway disorder, idiopathic pulmonary fibrosis and/or asthma. In part, the disclosure also relates to methods of treating pulmonary hypertension (e.g., pulmonary arterial hypertension) comprising administering to a patient in need thereof an effective amount of a TβRII antagonist (e.g., a antagonist comprising the amino acid sequence of any one of SEQ ID NOs: 13, 50-56, 69, and 77-83). In some embodiments, the disclosure contemplates methods of treating one or more complications of pulmonary hypertension in a subject with SSc (e.g., SSc-ILD) (e.g., smooth muscle and/or endothelial cell proliferation in the pulmonary artery, angiogenesis in the pulmonary artery, dyspnea, chest pain, pulmonary vascular remodeling, right ventricular hypertrophy, and/or pulmonary fibrosis) comprising administering to a patient in need thereof an effective amount of a TβRII antagonist. In some embodiments, the disclosure contemplates methods of treating one or more complications of pulmonary hypertension in a subject with SSc (e.g., SSc-ILD) comprising administering to a patient in need thereof an effective amount of a TβRII antagonist.

The present invention contemplates the use of TβRII antagonists in combination with one or more other therapeutic modalities in a subject with SSc (e.g SSc-ILD). Thus, in addition to the use of TβRII antagonists, one may also administer to the subject one or more "standard" therapies for treating fibrotic disorders in a subject with SSc (e.g., SSc-ILD). For example, the TβRII antagonists can be administered to a subject with SSc (e.g., SSc-ILD) in combination with (i.e., together with) cytotoxins, immunosuppressive agents, radiotoxic agents, and/or therapeutic antibodies. Particular co-therapeutics contemplated by the present invention include, but are not limited to, steroids (e.g., corticosteroids, such as Prednisone), immune-suppressing and/or anti-inflammatory agents (e.g., gamma-interferon, cyclophosphamide, azathioprine, methotrexate, penicillamine, cyclosporine, colchicine, antithymocyte globulin, mycophenolate mofetil, and/or hydroxychloroquine), cytotoxic drugs, calcium channel blockers (e.g., nifedipine), angiotensin converting enzyme inhibitors (ACE) inhibitors, para-aminobenzoic acid (PABA), dimethyl sulfoxide, transforming growth factor beta (TGFβ) inhibitors, interleukin-5 (IL-5) inhibitors, and/or pan caspase inhibitors.

Additional anti-fibrotic agents that may be used in combination with TβRII antagonists and administered to a subject with SSc (e.g., SSc-ILD) include, but are not limited to, lectins (as described in, for example, U.S. Pat. No. 7,026,283, the entire contents of which is incorporated herein by reference), as well as the anti-fibrotic agents described by Wynn et al (2007, J Clin Invest 117:524-529, the entire contents of which is incorporated herein by reference). For example, additional anti-fibrotic agents and/or therapies include, but are not limited to, various anti-inflammatory/immunosuppressive/cytotoxic drugs (including colchicine, azathioprine, cyclophosphamide, prednisone, thalidomide, pentoxifylline and/or theophylline), TGFβ signaling modifiers (including relaxin, SMAD7, HGF, and/or BMP7, as well as TGFβ1, TPRI, TβRII, EGR-I, and/or CTGF inhibitors), cytokine and/or cytokine receptor antagonists (inhibitors of IL-10, IL-5, IL-6, IL-13, IL-21, IL-4R, IL-13Rα1, GM-CSF, TNF-α, oncostatin M, WISP-I, and/or PDGFs), cytokines and/or chemokines (IFN-γ, IFN-α/β, IL-12, IL-10, HGF, CXCL10, and/or CXCL11), chemokine antagonists (inhibitors of CXCL1, CXCL2, CXCL12, CCL2, CCL3, CCL6, CCL17, and/or CCL18), chemokine receptor antagonists (inhibitors of CCR2, CCR3, CCR5, CCR7, CXCR2, and/or CXCR4), TLR antagonists (inhibitors of TLR3, TLR4, and/or TLR9), angiogenesis antagonists (VEGF-specific antibodies and/or adenosine deaminase replacement therapy), antihypertensive drugs (beta blockers and/or inhibitors of ANG 11, ACE, and/or aldosterone), vasoactive substances (ET-1 receptor antagonists and/or bosentan), inhibitors of the enzymes that synthesize and/or process collagen (inhibitors of prolyl hydroxylase), B cell antagonists (rituximab), integrin/adhesion molecule antagonists (molecules that block α1β1 and/or αvβ6 integrins, as well as inhibitors of integrin-linked kinase, and/or antibodies specific for ICAM-I and/or VCAM-I), proapoptotic drugs that target myofibroblasts, MMP inhibitors (inhibitors of MMP2, MMP9, and/or MMP12), and/or T1MP inhibitors (antibodies specific for TIMP-1).

14. Pharmaceutical Compositions

The therapeutic agents described herein (e.g., TβRII fusion antagonists including but not limited to TβRII polypeptides) may be formulated into pharmaceutical compositions. Pharmaceutical compositions for use in accordance with the present disclosure may be formulated in conventional manner using one or more physiologically acceptable carriers or excipients. Such formulations will generally be substantially pyrogen-free, in compliance with most regulatory requirements.

In some embodiments, the therapeutic method of the disclosure includes reconstituting a lyophilized powder of a TβRII antagonist of the present disclosure. In some embodiments, the lyophilized TβRII antagonist is reconstituted in sterile water. In some embodiments, a single use vial of lyophilized TβRII antagonist comprises 50 mg of the TβRII antagonist. In some embodiments, the lyophilized TβRII antagonist is reconstituted for administration by subcutaneous injection.

In certain embodiments, the therapeutic method of the disclosure includes administering the composition systemically, or locally as an implant or device. When administered, the therapeutic composition for use in this disclosure is in a pyrogen-free, physiologically acceptable form. Therapeutically useful agents other than the TβRII antagonists which may also optionally be included in the composition as described above, may be administered simultaneously or sequentially with the subject compounds (e.g., TβRII antagonists) in the methods disclosed herein.

Typically, protein therapeutic agents disclosed herein will be administered parentally, and/or particularly intravenously or subcutaneously. In some embodiments, TβRII antagonists of the present disclosure are administered subcutaneously. Pharmaceutical compositions suitable for parenteral administration may comprise one or more TβRII antagonists in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents. Examples of suitable aqueous and/or nonaqueous carriers which may be employed in the pharmaceutical compositions of the disclosure include water, ethanol, polyols (such as glycerol, propylene glycol, polyethylene glycol, and the like), and suitable mixtures thereof, vegetable oils, such as olive oil, and/or injectable organic esters, such as ethyl oleate. Proper fluidity can be maintained, for example, by the use of coating materials, such as lecithin, by the maintenance of the required particle size in the case of dispersions, and by the use of surfactants.

The compositions and/or formulations may, if desired, be presented in a pack or dispenser device which may contain one or more unit dosage forms containing the active ingredient. The pack may for example comprise metal or plastic foil, such as a blister pack. The pack or dispenser device may be accompanied by instructions for administration.

Further, the composition may be encapsulated or injected in a form for delivery to a target tissue site. In certain embodiments, compositions of the present invention may include a matrix capable of delivering one or more therapeutic compounds (e.g., TβRII antagonists) to a target tissue site, providing a structure for the developing tissue and/or optimally capable of being resorbed into the body. For example, the matrix may provide slow release of the TβRII antagonists. Such matrices may be formed of materials presently in use for other implanted medical applications.

The choice of matrix material is based on biocompatibility, biodegradability, mechanical properties, cosmetic appearance and/or interface properties. The particular application of the subject compositions will define the appropriate formulation. Potential matrices for the compositions may be biodegradable and/or chemically defined calcium sulfate, tricalcium phosphate, hydroxyapatite, polylactic acid and/or polyanhydrides. Other potential materials are biodegradable and/or biologically well defined, such as bone or dermal collagen. Further matrices are comprised of pure proteins or extracellular matrix components. Other potential matrices are non-biodegradable and/or chemically defined, such as sintered hydroxyapatite, bioglass, aluminates, or other ceramics. Matrices may be comprised of combinations of any of the above mentioned types of material, such as polylactic acid and/or hydroxyapatite or collagen and/or tricalcium phosphate. The bioceramics may be altered in composition, such as in calcium-aluminate-phosphate and processing to alter pore size, particle size, particle shape, and/or biodegradability.

In certain embodiments, methods of the disclosure can be administered for orally, e.g., in the form of capsules, cachets, pills, tablets, lozenges (using a flavored basis, usually sucrose and/or acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and/or glycerin, or sucrose and/or acacia) and/or as mouth washes and the like, each containing a predetermined amount of an agent as an active ingredient. An agent may also be administered as a bolus, electuary or paste.

In solid dosage forms for oral administration (capsules, tablets, pills, dragees, powders, granules, and the like), one or more therapeutic compounds of the present disclosure may be mixed with one or more pharmaceutically acceptable carriers, such as sodium citrate or dicalcium phosphate, and/or/or any of the following: (1) fillers or extenders, such as starches, lactose, sucrose, glucose, mannitol, and/or/or silicic acid; (2) binders, such as, for example, carboxymethylcellulose, alginates, gelatin, polyvinyl pyrrolidone, sucrose, and/or/or acacia; (3) humectants, such as glycerol; (4) disintegrating agents, such as agar-agar, calcium carbonate, potato or tapioca starch, alginic acid, certain silicates, and/or sodium carbonate; (5) solution retarding agents, such as paraffin; (6) absorption accelerators, such as quaternary ammonium compounds; (7) wetting agents, such as, for example, cetyl alcohol and/or glycerol monostearate; (8) absorbents, such as kaolin and/or bentonite clay; (9) lubricants, such a talc, calcium stearate, magnesium stearate, solid polyethylene glycols, sodium lauryl sulfate, and/or mixtures thereof; and/or (10) coloring agents. In the case of capsules, tablets and/or pills, the pharmaceutical compositions may also comprise buffering agents. Solid compositions of a similar type may also be employed as fillers in soft and/or hard-filled gelatin capsules using such excipients as lactose or milk sugars, as well as high molecular weight polyethylene glycols and the like.

Liquid dosage forms for oral administration include pharmaceutically acceptable emulsions, microemulsions, solutions, suspensions, syrups, and/or elixirs. In addition to the active ingredient, the liquid dosage forms may contain inert diluents commonly used in the art, such as water or other solvents, solubilizing agents and/or emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor, and/or sesame oils), glycerol, tetrahydrofuryl alcohol, polyethylene glycols and/or fatty acid esters of sorbitan, and/or mixtures thereof. Besides inert diluents, the oral compositions can also include adjuvants such as wetting agents, emulsifying and/or suspending agents, sweetening, flavoring, coloring, perfuming, and/or preservative agents.

Suspensions, in addition to the active compounds, may contain suspending agents such as ethoxylated isostearyl alcohols, polyoxyethylene sorbitol, and/or sorbitan esters, microcrystalline cellulose, aluminum metahydroxide, bentonite, agar-agar and/or tragacanth, and/or mixtures thereof.

The compositions of the invention may also contain adjuvants, such as preservatives, wetting agents, emulsifying agents and/or dispersing agents. Prevention of the action of microorganisms may be ensured by the inclusion of various antibacterial and/or antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption, such as aluminum monostearate and/or gelatin.

It is understood that the dosage regimen will be determined by the attending physician considering various factors which modify the action of the subject compounds of the disclosure (e.g., TβRII antagonists). The various factors include, but are not limited to, the patient's age, sex, and/or diet, the severity disease, time of administration, and/or other clinical factors. Optionally, the dosage may vary with the type of matrix used in the reconstitution and/or the types of compounds in the composition. The addition of other known growth factors to the final composition, may also affect the dosage. Progress can be monitored by periodic assessment of bone growth and/or repair, for example, X-rays (including DEXA), histomorphometric determinations, and/or tetracycline labeling.

In some embodiments, one or more TβRII antagonists of the present disclosure are administered in one or more doses. In some embodiments, a dose of one or more TβRII antagonists comprises 0.05 mg/kg of the antagonists. In some embodiments, a dose of one or more TβRII antagonists comprises 0.10 mg/kg of the antagonists. In some embodiments, a dose of one or more TβRII antagonists comprises 0.15 mg/kg of the antagonists. In some embodiments, a dose of one or more TβRII antagonists comprises 0.20 mg/kg of the antagonists. In some embodiments, a dose of one or more TβRII antagonists comprises 0.25 mg/kg of the antagonists. In some embodiments, a dose of one or more TβRII antagonists comprises 0.50 mg/kg of the antagonists. In some embodiments, a dose of one or more TβRII antagonists comprises 0.75 mg/kg of the antagonists. In some embodiments, a dose of one or more TβRII antagonists comprises 1.00 mg/kg of the antagonists. In some embodiments, a dose of one or more TβRII antagonists comprises 1.25 mg/kg of the antagonists. In some embodiments, a dose of one or more TβRII antagonists comprises 1.50 mg/kg of the antagonists. In some embodiments, a dose of one or more TβRII antagonists comprises 1.75 mg/kg of the antagonists. In some embodiments, a dose of one or more TβRII antagonists comprises 2.00 mg/kg of the antagonists. In some embodiments, a dose of one or more TβRII antagonists comprises 2.25 mg/kg of the antagonists. In some embodiments, a dose of one or more TβRII antagonists comprises 2.50 mg/kg of the antagonists. In some embodiments, a dose of one or more TβRII antagonists comprises 2.75 mg/kg of the antagonists. In some embodiments, a dose of one or more TβRII antagonists comprises 3.00 mg/kg of the antagonists. In some embodiments, a dose of one or more TβRII antagonists comprises 3.25 mg/kg of the antagonists. In some embodiments, a dose of one or more TβRII antagonists comprises 3.50 mg/kg of the antagonists. In some embodiments, a dose of one or more TβRII antagonists comprises 3.75 mg/kg of the antagonists. In some embodiments, a dose of one or more TβRII antagonists comprises 4.00 mg/kg of the antagonists. In some embodiments, a dose of one or more TβRII antagonists comprises 4.25 mg/kg of the antagonists. In some embodiments, a dose of one or more TβRII antagonists comprises 4.50 mg/kg of the antagonists. In some embodiments, a dose of one or more TβRII antagonists comprises 4.75 mg/kg of the antagonists. In some embodiments, a dose of one or more TβRII antagonists comprises 5.00 mg/kg of the antagonists. In some embodiments, a dose of one or more TβRII antagonists comprises 5.25 mg/kg of the antagonists. In some embodiments, a dose of one or more TβRII antagonists comprises 5.50 mg/kg of the antagonists. In some embodiments, a dose of one or more TβRII antagonists comprises 5.75 mg/kg of the antagonists. In some embodiments, a dose of one or more TβRII antagonists comprises 6.0 mg/kg of the antagonists. In some embodiments, a dose of one or more TβRII antagonists comprises 6.25 mg/kg of the antagonists. In some embodiments, a dose of one or more TβRII antagonists comprises 6.50 mg/kg of the antagonists. In some embodiments, a dose of one or more TβRII antagonists comprises 6.75 mg/kg of the antagonists. In some embodiments, a dose of one or more TβRII antagonists comprises 7.0 mg/kg of the antagonists.

In some embodiments, a dose of one or more TβRII antagonists comprises no more than 0.05 mg/kg of the antagonists. In some embodiments, a dose of one or more TβRII antagonists comprises no more than 0.10 mg/kg of the antagonists. In some embodiments, a dose of one or more TβRII antagonists comprises no more than 0.15 mg/kg of the antagonists. In some embodiments, a dose of one or more TβRII antagonists comprises no more than 0.20 mg/kg of the antagonists. In some embodiments, a dose of one or more TβRII antagonists comprises no more than 0.25 mg/kg of the antagonists. In some embodiments, a dose of one or more TβRII antagonists comprises no more than 0.50 mg/kg of the antagonists. In some embodiments, a dose of one or more TβRII antagonists comprises no more than 0.75 mg/kg of the antagonists. In some embodiments, a dose of one or more TβRII antagonists comprises no more than 1.00 mg/kg of the antagonists. In some embodiments, a dose of one or more TβRII antagonists comprises no more than 1.25 mg/kg of the antagonists. In some embodiments, a dose of one or more TβRII antagonists comprises no more than 1.50 mg/kg of the antagonists. In some embodiments, a dose of one or more TβRII antagonists comprises no more than 1.75 mg/kg of the antagonists. In some embodiments, a dose of one or more TβRII antagonists comprises no more than 2.0 mg/kg of the antagonists. In some embodiments, a dose of one or more TβRII antagonists comprises no more than 2.25 mg/kg of the antagonists. In some embodiments, a dose of one or more TβRII antagonists comprises no more than 2.50 mg/kg of the antagonists. In some embodiments, a dose of one or more TβRII antagonists comprises no more than 2.75 mg/kg of the antagonists. In some embodiments, a dose of one or more TβRII antagonists comprises no more than 3.0 mg/kg of the antagonists. In some embodiments, a dose of one or more TβRII antagonists comprises no more than 3.5 mg/kg of the antagonists. In some embodiments, a dose of one or more TβRII antagonists comprises no more than 4.0 mg/kg of the antagonists. In some embodiments, a dose of one or more TβRII antagonists comprises no more than 4.50 mg/kg of the antagonists. In some embodiments, a dose of one or more TβRII antagonists comprises no more than 5.0 mg/kg of the antagonists. In some embodiments, a dose of one or more TβRII antagonists comprises no more than 5.50 mg/kg of the antagonists. In some embodiments, a dose of one or more TβRII antagonists comprises no more than 6.0 mg/kg of the antagonists. In some embodiments, a dose of one or more TβRII antagonists comprises no more than 6.50 mg/kg of the antagonists. In some embodiments, a dose of one or more TβRII antagonists comprises no more than 7.0 mg/kg of the antagonists.

In some embodiments, a dose of one or more TβRII antagonists comprises at least 0.05 mg/kg of the antagonists. In some embodiments, a dose of one or more TβRII antagonists comprises at least 0.10 mg/kg of the antagonists. In some embodiments, a dose of one or more TβRII antagonists comprises at least 0.15 mg/kg of the antagonists. In some embodiments, a dose of one or more TβRII antagonists comprises at least 0.20 mg/kg of the antagonists. In some embodiments, a dose of one or more TβRII antagonists comprises at least 0.25 mg/kg of the antagonists. In some embodiments, a dose of one or more TβRII fusion antagonists comprises between about 0.25 mg/to about 4.50 mg/kg of the antagonists. In some embodiments, a dose of one or more TβRII fusion antagonists comprises between about 0.05 mg/to about 6.0 mg/kg of the antagonists. In some embodiments, a dose of one or more TβRII fusion antagonists comprises between about 0.25 mg/to about 6.0 mg/kg of the antagonists. In some embodiments, a dose of one or more TβRII fusion antagonists comprises between about 0.75 mg/to about 6.0 mg/kg of the antagonists. In some embodiments, a dose of one or more TβRII fusion antagonists comprises between about 0.75 mg/to about 2.25 mg/kg of the antagonists. In some embodiments, a dose of one or more TβRII fusion antagonists comprises between about 1.25 mg/to about 6.0 mg/kg of the antagonists. In some embodiments, a dose of one or more TβRII fusion antagonists comprises between about 1.25 mg/to about 2.0 mg/kg of the antagonists. In some embodiments, a dose of one or more TβRII fusion antagonists comprises between about 1.50 mg/to about 4.50 mg/kg of the antagonists. In some embodiments, a dose of one or more TβRII fusion antagonists comprises between about 2.5 mg/to about 4.0 mg/kg of the antagonists. In some embodiments, a dose of one or more TβRII fusion antagonists comprises between about 3.0 mg/to about 6.0 mg/kg of the antagonists. In some embodiments, a dose of one or more TβRII fusion antagonists comprises between about 4.0 mg/to about 6.0 mg/kg of the antagonists.

In some embodiments, a dose of one or more TβRII antagonists of the present disclosure is administered once every day. In some embodiments, a dose of one or more TβRII antagonists of the present disclosure is administered once every two days. In some embodiments, a dose of one or more TβRII antagonists of the present disclosure is administered once every three days. In some embodiments, a dose of one or more TβRII antagonists of the present disclosure is administered once every four days. In some embodiments, a dose of one or more TβRII antagonists of the present disclosure is administered once every five days. In some embodiments, a dose of one or more TβRII antagonists of the present disclosure is administered once every six days. In some embodiments, a dose of one or more TβRII antagonists of the present disclosure is administered once every week. In some embodiments, a dose of one or more TβRII antagonists of the present disclosure is administered once every two weeks. In some embodiments, a dose of one or more TβRII antagonists of the present disclosure is administered once every three weeks. In some embodiments, a dose of one or more TβRII antagonists of the present disclosure is administered once every four weeks. In some embodiments, a dose of one or more TβRII antagonists of the present disclosure is administered once every five weeks. In some embodiments, a dose of one or more TβRII antagonists of the present disclosure is administered once every six weeks. In some embodiments, a dose of one or more TβRII antagonists of the present disclosure is administered once every seven weeks. In some embodiments, a dose of one or more TβRII antagonists of the present disclosure is administered once every eight weeks. In some embodiments, a dose of one or more TβRII antagonists of the present disclosure is administered once every other week. In some embodiments, a dose of one or more TβRII antagonists of the present disclosure is administered once every month. In some embodiments, a dose of one or more TβRII antagonists of the present disclosure is administered once every two months. In some embodiments, a dose of one or more TβRII antagonists of the present disclosure is administered once every three months. In some embodiments, a dose of one or more TβRII antagonists of the present disclosure is administered once every four months. In some embodiments, a dose of one or more TβRII antagonists of the present disclosure is administered once every five months. In some embodiments, a dose of one or more TβRII antagonists of the present disclosure is administered once every six months. In some embodiments, a dose of one or more TβRII antagonists of the present disclosure is administered once every year.

In some embodiments, a dose of one or more TβRII antagonists of the present disclosure is administered twice every day. In some embodiments, a dose of one or more TβRII antagonists of the present disclosure is administered twice every two days. In some embodiments, a dose of one or more TβRII antagonists of the present disclosure is administered twice every three days. In some embodiments, a dose of one or more TβRII antagonists of the present disclosure is administered twice every four days. In some embodiments, a dose of one or more TβRII antagonists of the present disclosure is administered twice every five days. In some embodiments, a dose of one or more TβRII antagonists of the present disclosure is administered twice every six days. In some embodiments, a dose of one or more TβRII antagonists of the present disclosure is administered twice every week. In some embodiments, a dose of one or more TβRII antagonists of the present disclosure is administered twice every two weeks. In some embodiments, a dose of one or more TβRII antagonists of the present disclosure is administered twice every three weeks. In some embodiments, a dose of one or more TβRII antagonists of the present disclosure is administered twice every four weeks. In some embodiments, a dose of one or more TβRII antagonists of the present disclosure is administered twice every five weeks. In some embodiments, a dose of one or more TβRII antagonists of the present disclosure is administered twice every six weeks. In some embodiments, a dose of one or more TβRII antagonists of the present disclosure is administered twice every seven weeks. In some embodiments, a dose of one or more TβRII antagonists of the present disclosure is administered twice every eight weeks. In some embodiments, a dose of one or more TβRII antagonists of the present disclosure is administered twice every other week. In some embodiments, a dose of one or more TβRII antagonists of the present disclosure is administered twice every month. In some embodiments, a dose of one or more TβRII antagonists of the present disclosure is administered twice every two months. In some embodiments, a dose of one or more TβRII antagonists of the present disclosure is administered twice every three months. In some embodiments, a dose of one or more TβRII antagonists of the present disclosure is administered twice every four months. In some embodiments, a dose of one or more TβRII antagonists of the present disclosure is administered twice every five months. In some embodiments, a dose of one or more TβRII antagonists of the present disclosure is administered twice every six months. In some embodiments, a dose of one or more TβRII antagonists of the present disclosure is administered twice every year.

In some embodiments, a dose of one or more TβRII antagonists of the present disclosure is administered three times every day. In some embodiments, a dose of one or more TβRII antagonists of the present disclosure is administered three times every two days. In some embodiments, a dose of one or more TβRII antagonists of the present disclosure is administered three times every three days. In some embodiments, a dose of one or more TβRII antagonists of the present disclosure is administered three times every four days. In some embodiments, a dose of one or more TβRII antagonists of the present disclosure is administered three times every five days. In some embodiments, a dose of one or more TβRII antagonists of the present disclosure is administered three times every six days. In some embodiments, a dose of one or more TβRII antagonists of the present disclosure is administered three times every week. In some embodiments, a dose of one or more TβRII antagonists of the present disclosure is administered three times every two weeks. In some embodiments, a dose of one or more TβRII antagonists of the present disclosure is administered three times every three weeks. In some embodiments, a dose of one or more TβRII antagonists of the present disclosure is administered three times every four weeks. In some embodiments, a dose of one or more TβRII antagonists of the present disclosure is administered three times every five weeks. In some embodiments, a dose of one or more TβRII antagonists of the present disclosure is administered three times every six weeks. In some embodiments, a dose of one or more TβRII antagonists of the present disclosure is administered three times every seven weeks. In some embodiments, a dose of one or more TβRII antagonists of the present disclosure is administered three times every eight weeks. In some embodiments, a dose of one or more TβRII antagonists of the present disclosure is administered three times every other week. In some embodiments, a dose of one or more TβRII antagonists of the present disclosure is administered three times every month. In some embodiments, a dose of one or more TβRII antagonists of the present disclosure is administered three times every two months. In some embodiments, a dose of one or more TβRII antagonists of the present disclosure is administered three times every three months. In some embodiments, a dose of one or more TβRII antagonists of the present disclosure is administered three times every four months. In some embodiments, a dose of one or more TβRII antagonists of the present disclosure is administered three times every five months. In some embodiments, a dose of one or more TβRII antagonists of the present disclosure is administered three times every six months. In some embodiments, a dose of one or more TβRII antagonists of the present disclosure is administered three times every year.

In some embodiments, a dose of 0.05 mg/kg of one or more TβRII antagonists is administered once every day. In some embodiments, a dose of 0.05 mg/kg of one or more TβRII antagonists is administered once every week. In some embodiments, a dose of 0.05 mg/kg of one or more TβRII antagonists is administered once every two weeks. In some embodiments, a dose of 0.05 mg/kg of one or more TβRII antagonists is administered once every three weeks. In some embodiments, a dose of 0.05 mg/kg of one or more TβRII antagonists is administered once every four weeks. In some embodiments, a dose of 0.05 mg/kg of one or more TβRII antagonists is administered once every five weeks. In some embodiments, a dose of 0.05 mg/kg of one or more TβRII antagonists is administered once every six weeks.

In some embodiments, a dose of 0.10 mg/kg of one or more TβRII antagonists is administered once every day. In some embodiments, a dose of 0.10 mg/kg of one or more TβRII antagonists is administered once every week. In some embodiments, a dose of 0.10 mg/kg of one or more TβRII antagonists is administered once every two weeks. In some embodiments, a dose of 0.10 mg/kg of one or more TβRII antagonists is administered once every three weeks. In some embodiments, a dose of 0.10 mg/kg of one or more TβRII antagonists is administered once every four weeks. In some embodiments, a dose of 0.10 mg/kg of one or more TβRII antagonists is administered once every five weeks. In some embodiments, a dose of 0.10 mg/kg of one or more TβRII antagonists is administered once every six weeks.

In some embodiments, a dose of 0.15 mg/kg of one or more TβRII antagonists is administered once every day. In some embodiments, a dose of 0.15 mg/kg of one or more TβRII antagonists is administered once every week. In some embodiments, a dose of 0.15 mg/kg of one or more TβRII antagonists is administered once every two weeks. In some embodiments, a dose of 0.15 mg/kg of one or more TβRII antagonists is administered once every three weeks. In some embodiments, a dose of 0.15 mg/kg of one or more TβRII antagonists is administered once every four weeks. In some embodiments, a dose of 0.15 mg/kg of one or more TβRII antagonists is administered once every five weeks. In some embodiments, a dose of 0.15 mg/kg of one or more TβRII antagonists is administered once every six weeks.

In some embodiments, a dose of 0.20 mg/kg of one or more TβRII antagonists is administered once every day. In some embodiments, a dose of 0.20 mg/kg of one or more TβRII antagonists is administered once every week. In some embodiments, a dose of 0.20 mg/kg of one or more TβRII antagonists is administered once every two weeks. In some embodiments, a dose of 0.20 mg/kg of one or more TβRII antagonists is administered once every three weeks. In some embodiments, a dose of 0.20 mg/kg of one or more TβRII antagonists is administered once every four weeks. In some embodiments, a dose of 0.20 mg/kg of one or more TβRII antagonists is administered once every five weeks. In some embodiments, a dose of 0.20 mg/kg of one or more TβRII antagonists is administered once every six weeks.

In some embodiments, a dose of 0.25 mg/kg of one or more TβRII antagonists is administered once every day. In some embodiments, a dose of 0.25 mg/kg of one or more TβRII antagonists is administered once every week. In some embodiments, a dose of 0.25 mg/kg of one or more TβRII antagonists is administered once every two weeks. In some embodiments, a dose of 0.25 mg/kg of one or more TβRII antagonists is administered once every three weeks. In some embodiments, a dose of 0.25 mg/kg of one or more TβRII antagonists is administered once every four weeks. In some embodiments, a dose of 0.25 mg/kg of one or more TβRII antagonists is administered once every five weeks. In some embodiments, a dose of 0.25 mg/kg of one or more TβRII antagonists is administered once every six weeks.

In some embodiments, a dose of 0.50 mg/kg of one or more TβRII antagonists is administered once every day. In some embodiments, a dose of 0.50 mg/kg of one or more TβRII antagonists is administered once every week. In some embodiments, a dose of 0.50 mg/kg of one or more TβRII antagonists is administered once every two weeks. In some embodiments, a dose of 0.50 mg/kg of one or more TβRII antagonists is administered once every three weeks. In some embodiments, a dose of 0.50 mg/kg of one or more TβRII antagonists is administered once every four weeks. In some embodiments, a dose of 0.50 mg/kg of one or more TβRII antagonists is administered once every five weeks. In some embodiments, a dose of 0.50 mg/kg of one or more TβRII antagonists is administered once every six weeks.

In some embodiments, a dose of 0.75 mg/kg of one or more TβRII antagonists is administered once every day. In some embodiments, a dose of 0.75 mg/kg of one or more TβRII antagonists is administered once every week. In some embodiments, a dose of 0.75 mg/kg of one or more TβRII antagonists is administered once every two weeks. In some embodiments, a dose of 0.75 mg/kg of one or more TβRII antagonists is administered once every three weeks. In some embodiments, a dose of 0.75 mg/kg of one or more TβRII antagonists is administered once every four weeks. In some embodiments, a dose of 0.75 mg/kg of one or more TβRII antagonists is administered once every five weeks. In some embodiments, a dose of 0.75 mg/kg of one or more TβRII antagonists is administered once every six weeks.

In some embodiments, a dose of 1.00 mg/kg of one or more TβRII antagonists is administered once every day. In some embodiments, a dose of 1.00 mg/kg of one or more TβRII antagonists is administered once every week. In some embodiments, a dose of 1.00 mg/kg of one or more TβRII antagonists is administered once every two weeks. In some embodiments, a dose of 1.00 mg/kg of one or more TβRII antagonists is administered once every three weeks. In some embodiments, a dose of 1.00 mg/kg of one or more TβRII antagonists is administered once every four weeks. In some embodiments, a dose of 1.00 mg/kg of one or more TβRII antagonists is administered once every five weeks. In some embodiments, a dose of 1.00 mg/kg of one or more TβRII antagonists is administered once every six weeks.

In some embodiments, a dose of 1.25 mg/kg of one or more TβRII antagonists is administered once every day. In some embodiments, a dose of 1.25 mg/kg of one or more TβRII antagonists is administered once every week. In some embodiments, a dose of 1.25 mg/kg of one or more TβRII antagonists is administered once every two weeks. In some embodiments, a dose of 1.25 mg/kg of one or more TβRII antagonists is administered once every three weeks. In some embodiments, a dose of 1.25 mg/kg of one or more TβRII antagonists is administered once every four weeks. In some embodiments, a dose of 1.25 mg/kg of one or more TβRII antagonists is administered once every five weeks. In some embodiments, a dose of 1.25 mg/kg of one or more TβRII antagonists is administered once every six weeks.

In some embodiments, a dose of 1.50 mg/kg of one or more TβRII antagonists is administered once every day. In some embodiments, a dose of 1.50 mg/kg of one or more TβRII antagonists is administered once every week. In some embodiments, a dose of 1.50 mg/kg of one or more TβRII antagonists is administered once every two weeks. In some embodiments, a dose of 1.50 mg/kg of one or more TβRII antagonists is administered once every three weeks. In some embodiments, a dose of 1.50 mg/kg of one or more TβRII antagonists is administered once every four weeks. In some embodiments, a dose of 1.50 mg/kg of one or more TβRII antagonists is administered once every five weeks. In some embodiments, a dose of 1.50 mg/kg of one or more TβRII antagonists is administered once every six weeks.

In some embodiments, a dose of 1.75 mg/kg of one or more TβRII antagonists is administered once every day. In some embodiments, a dose of 1.75 mg/kg of one or more TβRII antagonists is administered once every week. In some embodiments, a dose of 1.75 mg/kg of one or more TβRII antagonists is administered once every two weeks. In some embodiments, a dose of 1.75 mg/kg of one or more TβRII antagonists is administered once every three weeks. In some embodiments, a dose of 1.75 mg/kg of one or more TβRII antagonists is administered once every four weeks. In some embodiments, a dose of 1.75 mg/kg of one or more TβRII antagonists is administered once every five weeks. In some embodiments, a dose of 1.75 mg/kg of one or more TβRII antagonists is administered once every six weeks.

In some embodiments, a dose of 2.00 mg/kg of one or more TβRII antagonists is administered once every day. In some embodiments, a dose of 2.00 mg/kg of one or more TβRII antagonists is administered once every week. In some embodiments, a dose of 2.00 mg/kg of one or more TβRII antagonists is administered once every two weeks. In some embodiments, a dose of 2.00 mg/kg of one or more TβRII antagonists is administered once every three weeks. In some embodiments, a dose of 2.00 mg/kg of one or more TβRII antagonists is administered once every four weeks. In some embodiments, a dose of 2.00 mg/kg of one or more TβRII antagonists is administered once every five weeks. In some embodiments, a dose of 2.00 mg/kg of one or more TβRII antagonists is administered once every six weeks.

In some embodiments, a dose of 2.25 mg/kg of one or more TβRII antagonists is administered once every day. In some embodiments, a dose of 2.25 mg/kg of one or more TβRII antagonists is administered once every week. In some embodiments, a dose of 2.25 mg/kg of one or more TβRII antagonists is administered once every two weeks. In some embodiments, a dose of 2.25 mg/kg of one or more TβRII antagonists is administered once every three weeks. In some embodiments, a dose of 2.25 mg/kg of one or more TβRII antagonists is administered once every four weeks. In some embodiments, a dose of 2.25 mg/kg of one or more TβRII antagonists is administered once every five weeks. In some embodiments, a dose of 2.25 mg/kg of one or more TβRII antagonists is administered once every six weeks.

In some embodiments, a dose of 2.50 mg/kg of one or more TβRII antagonists is administered once every day. In some embodiments, a dose of 2.50 mg/kg of one or more TβRII antagonists is administered once every week. In some embodiments, a dose of 2.50 mg/kg of one or more TβRII antagonists is administered once every two weeks. In some embodiments, a dose of 2.50 mg/kg of one or more TβRII antagonists is administered once every three weeks. In some embodiments, a dose of 2.50 mg/kg of one or more TβRII antagonists is administered once every four weeks. In some embodiments, a dose of 2.50 mg/kg of one or more TβRII antagonists is administered once every five weeks. In some embodiments, a dose of 2.50 mg/kg of one or more TβRII antagonists is administered once every six weeks.

In some embodiments, a dose of 2.75 mg/kg of one or more TβRII antagonists is administered once every day. In some embodiments, a dose of 2.75 mg/kg of one or more TβRII antagonists is administered once every week. In some embodiments, a dose of 2.75 mg/kg of one or more TβRII antagonists is administered once every two weeks. In some embodiments, a dose of 2.75 mg/kg of one or more TβRII antagonists is administered once every three weeks. In some embodiments, a dose of 2.75 mg/kg of one or more TβRII antagonists is administered once every four weeks. In some embodiments, a dose of 2.75 mg/kg of one or more TβRII antagonists is administered once every five weeks. In some embodiments, a dose of 2.75 mg/kg of one or more TβRII antagonists is administered once every six weeks.

In some embodiments, a dose of 3.00 mg/kg of one or more TβRII antagonists is administered once every day. In some embodiments, a dose of 3.00 mg/kg of one or more TβRII antagonists is administered once every week. In some embodiments, a dose of 3.00 mg/kg of one or more TβRII antagonists is administered once every two weeks. In some embodiments, a dose of 3.00 mg/kg of one or more TβRII antagonists is administered once every three weeks. In some embodiments, a dose of 3.00 mg/kg of one or more TβRII antagonists is administered once every four weeks. In some embodiments, a dose of 3.00 mg/kg of one or more TβRII antagonists is administered once every five weeks. In some embodiments, a dose of 3.00 mg/kg of one or more TβRII antagonists is administered once every six weeks.

In some embodiments, a dose of 3.50 mg/kg of one or more TβRII antagonists is administered once every day. In some embodiments, a dose of 3.50 mg/kg of one or more TβRII antagonists is administered once every week. In some embodiments, a dose of 3.50 mg/kg of one or more TβRII antagonists is administered once every two weeks. In some embodiments, a dose of 3.50 mg/kg of one or more TβRII antagonists is administered once every three weeks. In some embodiments, a dose of 3.50 mg/kg of one or more TβRII antagonists is administered once every four weeks. In some embodiments, a dose of 3.50 mg/kg of one or more TβRII antagonists is administered once every five weeks. In some embodiments, a dose of 3.50 mg/kg of one or more TβRII antagonists is administered once every six weeks.

In some embodiments, a dose of 4.00 mg/kg of one or more TβRII antagonists is administered once every day. In some embodiments, a dose of 4.00 mg/kg of one or more TβRII antagonists is administered once every week. In some embodiments, a dose of 4.00 mg/kg of one or more TβRII antagonists is administered once every two weeks. In some embodiments, a dose of 4.00 mg/kg of one or more TβRII antagonists is administered once every three weeks. In some embodiments, a dose of 4.00 mg/kg of one or more TβRII antagonists is administered once every four weeks. In some embodiments, a dose of 4.00 mg/kg of one or more TβRII antagonists is administered once every five weeks. In some embodiments, a dose of 4.00 mg/kg of one or more TβRII antagonists is administered once every six weeks.

In some embodiments, a dose of no more than 4.50 mg/kg of one or more TβRII antagonists is administered once every day. In some embodiments, a dose of no more than 4.50 mg/kg of one or more TβRII antagonists is administered once every week. In some embodiments, a dose of no more than 4.50 mg/kg of one or more TβRII antagonists is administered once every two weeks. In some embodiments, a dose of no more than 4.50 mg/kg of one or more TβRII antagonists is administered once every three weeks. In some embodiments, a dose of 4.50 mg/kg of one or more TβRII antagonists is administered once every four weeks. In some embodiments, a dose of 4.50 mg/kg of one or more TβRII antagonists is administered once every five weeks. In some embodiments, a dose of 4.50 mg/kg of one or more TβRII antagonists is administered once every six weeks.

In some embodiments, a dose of 5.00 mg/kg of one or more TβRII antagonists is administered once every day. In some embodiments, a dose of 5.00 mg/kg of one or more TβRII antagonists is administered once every week. In some embodiments, a dose of 5.00 mg/kg of one or more TβRII antagonists is administered once every two weeks. In some embodiments, a dose of 5.00 mg/kg of one or more TβRII antagonists is administered once every three weeks. In some embodiments, a dose of 5.00 mg/kg of one or more TβRII antagonists is administered once every four weeks. In some embodiments, a dose of 5.00 mg/kg of one or more TβRII antagonists is administered once every five weeks. In some embodiments, a dose of 5.00 mg/kg of one or more TβRII antagonists is administered once every six weeks.

In some embodiments, a dose of no more than 5.50 mg/kg of one or more TβRII antagonists is administered once every day. In some embodiments, a dose of no more than 5.50 mg/kg of one or more TβRII antagonists is administered once every week. In some embodiments, a dose of no more than 5.50 mg/kg of one or more TβRII antagonists is administered once every two weeks. In some embodiments, a dose of no more than 5.50 mg/kg of one or more TβRII antagonists is administered once every three weeks. In some embodiments, a dose of 5.50 mg/kg of one or more TβRII antagonists is administered once every four weeks. In some embodiments, a dose of 5.50 mg/kg of one or more TβRII antagonists is administered once every five weeks. In some embodiments, a dose of 5.50 mg/kg of one or more TβRII antagonists is administered once every six weeks.

In some embodiments, a dose of 6.00 mg/kg of one or more TβRII antagonists is administered once every day. In some embodiments, a dose of 6.00 mg/kg of one or more TβRII antagonists is administered once every week. In some embodiments, a dose of 6.00 mg/kg of one or more TβRII antagonists is administered once every two weeks. In some embodiments, a dose of 6.00 mg/kg of one or more TβRII antagonists is administered once every three weeks. In some embodiments, a dose of 6.00 mg/kg of one or more TβRII antagonists is administered once every four weeks. In some embodiments, a dose of 6.00 mg/kg of one or more TβRII antagonists is administered once every five weeks. In some embodiments, a dose of 6.00 mg/kg of one or more TβRII antagonists is administered once every six weeks.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 0.05 mg/kg and about 6.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 0.25 mg/kg and about 4.50 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 0.75 mg/kg and about 6.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 0.75 mg/kg and about 2.25 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 1.25 mg/kg and about 6.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 1.25 mg/kg and about 2.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 1.50 mg/kg and about 4.50 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 2.50 mg/kg and about 4.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 3.00 mg/kg and about 6.00 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 4.00 mg/kg and about 6.0 mg/kg to a subject in need thereof. In some embodiments, the TβRII antagonist is administered at least once every week. In some embodiments, the TβRII antagonist is administered at least once every three weeks. In some embodiments, the TβRII antagonist is administered at least once every four weeks. In some embodiments, the TβRII antagonist is administered at least once every five weeks. In some embodiments, the TβRII antagonist is administered at least once every six weeks. In some embodiments, the TβRII antagonist is administered subcutaneously.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 0.75 mg/kg once every two weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 2.25 mg/kg once every four weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 1.50 mg/kg once every two weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 4.50 mg/kg once every four weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 3.00 mg/kg once every two weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 6.00 mg/kg once every four weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 1.25 mg/kg once every two weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 2.00 mg/kg once every four weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 2.50 mg/kg once every two weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 4.00 mg/kg once every four weeks to a subject in need thereof.

In some embodiments, the disclosure provides methods of treating SSc-ILD, comprising administering a Transforming Growth Factor-β Receptor II (TβRII) antagonist to a subject in need thereof, wherein the TβRII antagonist is administered in a dose of between about 4.00 mg/kg once every two weeks to a subject in need thereof.

In some embodiments, the TβRII antagonist is administered by a parenteral route of administration. In some embodiments, a parenteral route of administration is selected from the group consisting of intramuscular, intraperitoneal, intradermal, intravitreal, epidural, intracerebral, intra-arterial, intraarticular, intra-cavernous, intra-lesional, intraosseous, intraocular, intrathecal, intravenous, transdermal, trans-mucosal, extra-amniotic administration, subcutaneous, and combinations thereof. In some embodiments, a parenteral route of administration is subcutaneous. In some embodiments, a parenteral route of administration is a subcutaneous injection. In some embodiments, compositions of the present disclosure are administered by subcutaneous injection.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of at least between about 10 and about 20 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 10 and about 20 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 20 and about 30 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 30 and about 40 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 40 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 10 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 30 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 50 and about 60 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 60 and about 70 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 70 and about 80 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a serum concentration of antagonist of between about 10 and about 80 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of at least between about 30 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 30 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 10 and about 20 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 20 and about 30 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 30 and about 40 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 40 and about 50 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 50 and about 60 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 60 and about 70 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 70 and about 80 ug/mL in the subject.

In some embodiments, the disclosure provides methods of treating SSc-ILD, comprising administering a Transforming Growth Factor-β Receptor II (TβRII) antagonist to a subject in need thereof, wherein the TβRII antagonist is administered at a dose that achieves a concentration of antagonist in the lung of between about 10 and about 80 ug/mL in the subject.

In certain embodiments, the present invention also provides gene therapy for the in vivo production of TβRII antagonists. Such therapy would achieve its therapeutic effect by introduction of the TβRII antagonist polynucleotide sequences into cells or tissues having the disorders as listed above. Delivery of TβRII antagonist polynucleotide sequences can be achieved using a recombinant expression vector such as a chimeric virus or a colloidal dispersion system. Preferred for therapeutic delivery of TβRII antagonist polynucleotide sequences is the use of targeted liposomes.

Various viral vectors which can be utilized for gene therapy as taught herein include adenovirus, herpes virus, vaccinia, or, preferably, an RNA virus such as a retrovirus. Preferably, the retroviral vector is a derivative of a murine or avian retrovirus. Examples of retroviral vectors in which a single foreign gene can be inserted include but are not limited to: Moloney murine leukemia virus (MoMuLV), Harvey murine sarcoma virus (HaMuSV), murine mammary tumor virus (MuMTV), and/or Rous Sarcoma Virus (RSV). A number of additional retroviral vectors can incorporate multiple genes. All of these vectors can transfer or incorporate a gene for a selectable marker so that transduced cells can be identified and/or generated. Retroviral vectors can be made target-specific by attaching, for example, a sugar, a glycolipid, or a protein. Preferred targeting is accomplished by using an antibody. Those of skill in the art will recognize that specific polynucleotide sequences can be inserted into the retroviral genome or attached to a viral envelope to allow target specific delivery of the retroviral vector containing the TβRII antagonist polynucleotide. In a preferred embodiment, the vector is targeted to bone or cartilage.

Alternatively, tissue culture cells can be directly transfected with plasmids encoding the retroviral structural genes gag, pol and/or env, by conventional calcium phosphate transfection. These cells are then transfected with the vector plasmid containing the genes of interest. The resulting cells release the retroviral vector into the culture medium.

Another targeted delivery system for TβRII antagonist polynucleotides is a colloidal dispersion system. Colloidal dispersion systems include macromolecule complexes, nanocapsules, microspheres, beads, and/or lipid-based systems including oil-in-water emulsions, micelles, mixed micelles, and/or liposomes. The preferred colloidal system of this invention is a liposome. Liposomes are artificial membrane vesicles which are useful as delivery vehicles in vitro and/or in vivo. RNA, DNA and/or intact virions can be encapsulated within the aqueous interior and be delivered to cells in a biologically active form (see e.g., Fraley, et al., Trends Biochem. Sci., 6:77, 1981). Methods for efficient gene transfer using a liposome vehicle, are known in the art, see e.g., Mannino, et al., Biotechniques, 6:682, 1988. The composition of the liposome is usually a combination of phospholipids, usually in combination with steroids, especially cholesterol. Other phospholipids or other lipids may also be used. The physical characteristics of liposomes depend on pH, ionic strength, and/or the presence of divalent cations.

Examples of lipids useful in liposome production include phosphatidyl compounds, such as phosphatidylglycerol, phosphatidylcholine, phosphatidylserine, phosphatidylethanolamine, sphingolipids, cerebrosides, and/or gangliosides. Illustrative phospholipids include egg phosphatidylcholine, dipalmitoylphosphatidylcholine, and/or distearoylphosphatidylcholine. The targeting of liposomes is also possible based on, for example, organ-specificity, cell-specificity, and/or organelle-specificity and is known in the art.

The disclosure provides formulations that may be varied to include acids and/or bases to adjust the pH; and/or buffering agents to keep the pH within a narrow range.

EXEMPLIFICATION

The invention now being generally described, it will be more readily understood by reference to the following examples, which are included merely for purposes of illustration of certain embodiments of the present invention, and are not intended to limit the invention.

Example 1. Generation of Receptor Fusion Protein Variants

TβRII ECD Variants

TβRII fusion proteins comprising a soluble extracellular portion of human TβRII and a human Fc portion were generated. For each fusion protein, a TβRII amino acid sequence having the amino acid sequence of SEQ ID NO: 18 was fused to an IgG Fc portion having the amino acid sequence of SEQ ID NO: 20 by means of one of several different linkers. Each of the fusion proteins also included a TPA leader sequence having the amino acid sequence of SEQ ID NO: 23 (below).

Tissue plasminogen activator (TPA): MDAMKRGLCCVLLLCGAVFVSP (SEQ ID NO: 23)

An illustration summary of several of the constructs designed is provided as FIG. 3. A table detailing the sequences for the different constructs tested in the Exemplification section is provided below:

| Construct Name | Construct Amino Acid Sequence | Linker Sequence |
|---|---|---|
| hTβRII-hFc | SEQ ID NO: 9 or 88 | TGGG (SEQ ID NO: 3) |
| hTβRII (G4S)2-hFc | SEQ ID NO: 15 or 70 | TGGGGSGGGGS (SEQ ID NO: 4) |
| hTβRII (G4S)3-hFc | SEQ ID NO: 11 or 68 | TGGGGSGGGGSGGGGS (SEQ ID NO: 5) |
| hTβRII (G4S)4-hFc | SEQ ID NO: 13 or 69 | TGGGGSGGGGSGGGGSGGGGS (SEQ ID NO: 6) |
| hTβRII extended hinge-hFc | SEQ ID NO: 17 or 71 | TGGGPKSCDK (SEQ ID NO: 7) |
| hTβRII (G4S)5-hFc | SEQ ID NO: 44 or 75 | TGGGGSGGGGSGGGGSGGGGSGGGGS (SEQ ID NO: 25) |
| hTβRII (G4S)6-hFc | SEQ ID NO: 45 or 76 | TGGGGSGGGGSGGGGSGGGGSGGGGSGGGGS (SEQ ID NO: 26) |

The amino acid sequences for the construct components and each of the constructs, along with the nucleic acid sequence used to express these constructs, are provided below.

```
TβRII Portion: Amino Acid Sequence
                                          (SEQ ID NO: 18)
   1  TIPPHVQKSD VEMEAQKDEI ICPSCNRTAH PLRHINNDMI
      VTDNNGAVKF
  51  PQLCKFCDVR FSTCDNOKSC MSNCSITSIC EKPQEVCVAV
      WRKNDENITL
 101  ETVCHDPKLP YHDFILEDAA SPKCIMKEKK KPGETFFMCS
      CSSDECNDNI
 151  IFSEEYNTSN PD Fc Portion: Amino Acid Sequence
                                          (SEQ ID NO: 20)
   1  THTCPPCPAP ELLGGPSVFL FPPKPKDTLM ISRTPEVTCV
      VVDVSHEDPE
  51  VKFNWYVDGV EVHNAKTKPR EEQYNSTYRV VSVLTVLHQD
      WLNGKEYKCK
 101  VSNKALPAPI EKTISKAKGQ PREPQVYTLP PSREEMTKNQ
      VSLTCLVKGF
 151  YPSDIAVEWE SNGQPENNYK TTPPVLDSDG SFFLYSKLTV
      DKSRWQQGNV
 201  FSCSVMHEAL HNHYTQKSLS LSPGK
```

The C-terminal lysine residue of the Fc domain can be deleted. The amino acid sequence of SEQ ID NO: 20 may optionally be provided with the lysine removed from the C-terminus (SEQ ID NO: 72)

```
                                          (SEQ ID NO: 72)
   1  THTCPPCPAP ELLGGPSVFL FPPKPKDTLM ISRTPEVTCV
      VVDVSHEDPE
```

```
 51 VKFNWYVDGV EVHNAKTKPR EEQYNSTYRV VSVLTVLHQD
    WLNGKEYKCK
101 VSNKALPAPI EKTISKAKGQ PREPQVYTLP PSREEMTKNQ
    VSLTCLVKGF
151 YPSDIAVEWE SNGQPENNYK TTPPVLDSDG SFFLYSKLTV
    DKSRWQQGNV
201 FSCSVMHEAL HNHYTQKSLS LSPG
``` hTβRII-hFc: Nucleic Acid Sequence
(SEQ ID NO: 8)
```
  1 ATGGATGCAA TGAAGAGAGG GCTCTGCTGT GTGCTGCTGC
    TGTGTGGAGC
 51 AGTCTTCGTT TCGCCCGGCG CCACGATCCC ACCGCACGTT
    CAGAAGTCGG
101 ATGTGGAAAT GGAGGCCCAG AAAGATGAAA TCATCTGCCC
    CAGCTGTAAT
151 AGGACTGCCC ATCCACTGAG ACATATTAAT AACGACATGA
    TAGTCACTGA
201 CAACAACGGT GCAGTCAAGT TTCCACAACT GTGTAAATTT
    TGTGATGTGA
251 GATTTTCCAC CTGTGACAAC CAGAAATCCT GCATGAGCAA
    CTGCAGCATC
301 ACCTCCATCT GTGAGAAGCC ACAGGAAGTC TGTGTGGCTG
    TATGGAGAAA
351 GAATGACGAG AACATAACAC TAGAGACAGT TTGCCATGAC
    CCCAAGCTCC
401 CCTACCATGA CTTTATTCTG GAAGATGCTG CTTCTCCAAA
    GTGCATTATG
451 AAGGAAAAAA AAAAGCCTGG TGAGACTTTC TTCATGTGTT
    CCTGTAGCTC
501 TGATGAGTGC AATGACAACA TCATCTTCTC AGAAGAATAT
    AACACCAGCA
551 ATCCTGACAC CGGTGGTGGA ACTCACACAT GCCCACCGTG
    CCCAGCACCT
601 GAACTCCTGG GGGGACCGTC AGTCTTCCTC TTCCCCCCAA
    AACCCAAGGA
651 CACCCTCATG ATCTCCCGGA CCCCTGAGGT CACATGCGTG
    GTGGTGGACG
701 TGAGCCACGA AGACCCTGAG GTCAAGTTCA ACTGGTACGT
    GGACGGCGTG
751 GAGGTGCATA ATGCCAAGAC AAAGCCGCGG GAGGAGCAGT
    ACAACAGCAC
801 GTACCGTGTG GTCAGCGTCC TCACCGTCCT GCACCAGGAC
    TGGCTGAATG
851 GCAAGGAGTA CAAGTGCAAG GTCTCCAACA AAGCCCTCCC
    AGCCCCCATC
901 GAGAAAACCA TCTCCAAAGC CAAAGGGCAG CCCCGAGAAC
    CACAGGTGTA
951 CACCCTGCCC CCATCCCGGG AGGAGATGAC CAAGAACCAG
    GTCAGCCTGA
1001 CCTGCCTGGT CAAAGGCTTC TATCCCAGCG ACATCGCCGT
     GGAGTGGGAG
1051 AGCAATGGGC AGCCGGAGAA CAACTACAAG ACCACGCCTC
     CCGTGCTGGA
1101 CTCCGACGGC TCCTTCTTCC TCTATAGCAA GCTCACCGTG
     GACAAGAGCA
1151 GGTGGCAGCA GGGGAACGTC TTCTCATGCT CCGTGATGCA
     TGAGGCTCTG
1201 CACAACCACT ACACGCAGAA GAGCCTCTCC CTGTCTCCGG
     GTAAATGA
``` hTβRII-hFc: Amino Acid Sequence
(SEQ ID NO: 9)
```
  1 MDAMKRGLCC VLLLCGAVFV SPGATIPPHV QKSDVEMEAQ
    KDEIICPSCN
 51 RTAHPLRHIN NDMIVTDNNG AVKFPQLCKF CDVRFSTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    THTCPPCPAP
201 ELLGGPSVFL FPPKPKDTLM ISRTPEVTCV VVDVSHEDPE
    VKFNWYVDGV
251 EVHNAKTKPR EEQYNSTYRV VSVLTVLHQD WLNGKEYKCK
    VSNKALPAPI
301 EKTISKAKGQ PREPQVYTLP PSREEMTKNQ VSLTCLVKGF
    YPSDIAVEWE
351 SNGQPENNYK TTPPVLDSDG SFFLYSKLTV DKSRWQQGNV
    FSCSVMHEAL
401 HNHYTQKSLS LSPGK
```

The C-terminal lysine residue of the Fc domain can be deleted. The amino acid sequence of SEQ ID NO: 9 may optionally be provided with the lysine removed from the C-terminus (SEQ ID NO: 88):

(SEQ ID NO: 88)
```
  1 MDAMKRGLCC VLLLCGAVFV SPGATIPPHV QKSDVEMEAQ
    KDEIICPSCN
 51 RTAHPLRHIN NDMIVTDNNG AVKFPQLCKF CDVRESTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    THTCPPCPAP
201 ELLGGPSVEL FPPKPKDTLM ISRTPEVTCV VVDVSHEDPE
    VKFNWYVDGV
251 EVHNAKTKPR EEQYNSTYRV VSVLTVLHQD WINGKEYKCK
    VSNKALPAPI
301 EKTISKAKGQ PREPQVYTLP PSREEMTKNQ VSLTCLVKGF
    YPSDIAVEWE
351 SNGQPENNYK TTPPVLDSDG SFFLYSKLTV DKSRWQQGNV
    FSCSVMHEAL
401 HNHYTQKSLS LSPG
``` hTβRII (G4S)3-hFc: Nucleic Acid Sequence
(SEQ ID NO: 10)
```
   1 ATGGATGCAA TGAAGAGAGG GCTCTGCTGT GTGCTGCTGC
     TGTGTGGAGC
  51 AGTCTTCGTT TCGCCCGGCG CCACGATCCC ACCGCACGTT
     CAGAAGTCGG
 101 ATGTGGAAAT GGAGGCCCAG AAAGATGAAA TCATCTGCCC
     CAGCTGTAAT
 151 AGGACTGCCC ATCCACTGAG ACATATTAAT AACGACATGA
     TAGTCACTGA
 201 CAACAACGGT GCAGTCAAGT TTCCACAACT GTGTAAATTT
     TGTGATGTGA
 251 GATTTTCCAC CTGTGACAAC CAGAAATCCT GCATGAGCAA
     CTGCAGCATC
 301 ACCTCCATCT GTGAGAAGCC ACAGGAAGTC TGTGTGGCTG
     TATGGAGAAA
 351 GAATGACGAG AACATAACAC TAGAGACAGT TTGCCATGAC
     CCCAAGCTCC
 401 CCTACCATGA CTTTATTCTG GAAGATGCTG CTTCTCCAAA
     GTGCATTATG
 451 AAGGAAAAAA AAAAGCCTGG TGAGACTTTC TTCATGTGTT
     CCTGTAGCTC
 501 TGATGAGTGC AATGACAACA TCATCTTCTC AGAAGAATAT
     AACACCAGCA
 551 ATCCTGACAC CGGTGGTGGA GGAAGTGGTG GAGGTGGTTC
     TGGAGGTGGT
 601 GGAAGTACTC ACACATGCCC ACCGTGCCCA GCACCTGAAC
     TCCTGGGGGG
 651 ACCGTCAGTC TTCCTCTTCC CCCCAAAACC CAAGGACACC
     CTCATGATCT
 701 CCCGGACCCC TGAGGTCACA TGCGTGGTGG TGGACGTGAG
     CCACGAAGAC
 751 CCTGAGGTCA AGTTCAACTG GTACGTGGAC GGCGTGGAGG
     TGCATAATGC
 801 CAAGACAAAG CCGCGGGAGG AGCAGTACAA CAGCACGTAC
     CGTGTGGTCA
 851 GCGTCCTCAC CGTCCTGCAC CAGGACTGGC TGAATGGCAA
     GGAGTACAAG
 901 TGCAAGGTCT CCAACAAAGC CCTCCCAGCC CCCATCGAGA
     AAACCATCTC
 951 CAAAGCCAAA GGGCAGCCCC GAGAACCACA GGTGTACACC
     CTGCCCCCAT
1001 CCCGGGAGGA GATGACCAAG AACCAGGTCA GCCTGACCTG
     CCTGGTCAAA
1051 GGCTTCTATC CAAGCGACAT CGCCGTGGAG TGGGAGAGCA
     ATGGGCAGCC
1101 GGAGAACAAC TACAAGACCA CGCCTCCCGT GCTGGACTCC
     GACGGCTCCT
1151 TCTTCCTCTA TAGCAAGCTC ACCGTGGACA AGAGCAGGTG
     GCAGCAGGGG
1201 AACGTCTTCT CATGCTCCGT GATGCATGAG GCTCTGCACA
     ACCACTACAC
1251 GCAGAAGAGC CTCTCCCTGT CTCCGGGTAA ATGA
``` hTβRII (G4S)3-hFc: Amino Acid Sequence
(SEQ ID NO: 11)
```
  1 MDAMKRGLCC VLLLCGAVEV SPGATIPPHV QKSDVEMEAQ
    KDEIICPSCN
 51 RTAHPLRHIN NDMIVTDNNG AVKFPQLCKF CDVRESTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    GSGGGGSGGG
201 GSTHTCPPCP APELLGGPSV FLFPPKPKDT LMISRTPEVT
    CVVVDVSHED
```

```
251 PEVKENWYVD GVEVHNAKTK PREEQYNSTY RVVSVLTVLH
    QDWLNGKEYK
301 CKVSNKALPA PIEKTISKAK GQPREPQVYT LPPSREEMTK
    NQVSLTCLVK
351 GFYPSDIAVE WESNGQPENN YKTTPPVLDS DGSFFLYSKL
    TVDKSRWQQG
401 NVFSCSVMHE ALHNHYTQKS LSLSPGK
```

The C-terminal lysine residue of the Fc domain can be deleted. The amino acid sequence of SEQ ID NO: 11 may optionally be provided with the lysine removed from the C-terminus (SEQ ID NO: 68):

```
                                          (SEQ ID NO: 68)
  1 MDAMKRGLCC VLLLCGAVFV SPGATIPPHV QKSDVEMEAQ
    KDEIICPSCN
 51 RTAHPLRHIN NDMIVTDNNG AVKFPQLCKF CDVRFSTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    GSGGGGSGGG
201 GSTHTCPPCP APELLGGPSV FLFPPKPKDT LMISRTPEVT
    CVVVDVSHED
251 PEVKENWYVD GVEVHNAKTK PREEQYNSTY RVVSVLTVLH
    QDWLNGKEYK
301 CKVSNKALPA PIEKTISKAK GQPREPQVYT LPPSREEMTK
    NQVSLTCLVK
351 GFYPSDIAVE WESNGQPENN YKTTPPVLDS DGSFFLYSKL
    TVDKSRWQQG
401 NVFSCSVMHE ALHNHYTQKS LSLSPG
``` hTβRII (G4S)4-hFc: Nucleic Acid Sequence

```
                                          (SEQ ID NO: 12)
   1 ATGGATGCAA TGAAGAGAGG GCTCTGCTGT GTGCTGCTGC
     TGTGTGGAGC
  51 AGTCTTCGTT TCGCCCGGCG CCACGATCCC ACCGCACGTT
     CAGAAGTCGG
 101 ATGTGGAAAT GGAGGCCCAG AAAGATGAAA TCATCTGCCC
     CAGCTGTAAT
 151 AGGACTGCCC ATCCACTGAG ACATATTAAT AACGACATGA
     TAGTCACTGA
 201 CAACAACGGT GCAGTCAAGT TCCCACAACT GTGTAAATTT
     TGTGATGTGA
 251 GATTTTCCAC CTGTGACAAC CAGAAATCCT GCATGAGCAA
     CTGCAGCATC
 301 ACCTCCATCT GTGAGAAGCC ACAGGAAGTC TGTGTGGCTG
     TATGGAGAAA
 351 GAATGACGAG AACATAACAC TAGAGACAGT TTGCCATGAC
     CCCAAGCTCC
 401 CCTACCATGA CTTTATTCTG GAAGATGCTG CTTCTCCAAA
     GTGCATTATG
 451 AAGGAAAAAA AAAAGCCTGG TGAGACTTTC TTCATGTGTT
     CCTGTAGCTC
 501 TGATGAGTGC AATGACAACA TCATCTTCTC AGAAGAATAT
     AACACCAGCA
 551 ATCCTGACAC CGGTGGTGGA GGTTCTGGAG GTGGAGGAAG
     TGGTGGAGGT
 601 GGTTCTGGAG GTGGTGGAAG TACTCACACA TGCCCACCGT
     GCCCAGCACC
 651 TGAACTCCTG GGGGGACCGT CAGTCTTCCT CTTCCCCCCA
     AAACCCAAGG
 701 ACACCCTCAT GATCTCCCGG ACCCCTGAGG TCACATGCGT
     GGTGGTGGAC
 751 GTGAGCCACG AAGACCCTGA GGTCAAGTTC AACTGGTACG
     TGGACGGCGT
 801 GGAGGTGCAT AATGCCAAGA CAAAGCCGCG GGAGGAGCAG
     TACAACAGCA
 851 CGTACCGTGT GGTCAGCGTC CTCACCGTCC TGCACCAGGA
     CTGGCTGAAT
 901 GGCAAGGAGT ACAAGTGCAA GGTCTCCAAC AAAGCCCTCC
     CAGCCCCCAT
 951 CGAGAAAACC ATCTCCAAAG CCAAAGGGCA GCCCCGAGAA
     CCACAGGTGT
1001 ACACCCTGCC CCCATCCCGG GAGGAGATGA CCAAGAACCA
     GGTCAGCCTG
1051 ACCTGCCTGG TCAAAGGCTT CTATCCCAGC GACATCGCCG
     TGGAGTGGGA
1101 GAGCAATGGG CAGCCGGAGA ACAACTACAA GACCACGCCT
     CCCGTGCTGG
1151 ACTCCGACGG CTCCTTCTTC CTCTATAGCA AGCTCACCGT
     GGACAAGAGC
1201 AGGTGGCAGC AGGGGAACGT CTTCTCATGC TCCGTGATGC
     ATGAGGCTCT
``` hTβRII (G4S)4-hFc: Amino Acid Sequence
(SEQ ID NO: 13)

```
  1 MDAMKRGLCC VLLLCGAVFV SPGATIPPHV QKSDVEMEAQ
    KDEIICPSCN
 51 RTAHPLRHIN NDMIVTDNNG AVKFPQLCKF CDVRESTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    GSGGGGSGGG
201 GSGGGGSTHT CPPCPAPELL GGPSVELFPP KPKDTLMISR
    TPEVTCVVVD
251 VSHEDPEVKF NWYVDGVEVH NAKTKPREEQ YNSTYRVVSV
    LTVLHQDWLN
301 GKEYKCKVSN KALPAPIEKT ISKAKGQPRE PQVYTLPPSR
    EEMTKNQVSL
351 TCLVKGFYPS DIAVEWESNG QPENNYKTTP PVLDSDGSFF
    LYSKLTVDKS
401 RWQQGNVFSC SVMHEALHNH YTQKSLSLSP GK
```

The C-terminal lysine residue of the Fc domain can be deleted. The amino acid sequence of SEQ ID NO: 13 may optionally be provided with the lysine removed from the C-terminus (SEQ ID NO: 69):

```
                                    (SEQ ID NO: 69)
  1 MDAMKRGLCC VLLLCGAVFV SPGATIPPHV QKSDVEMEAQ
    KDEIICPSCN
 51 RTAHPLRHIN NDMIVTDNNG AVKFPQLCKF CDVRFSTCDN
    QKSCMSNCSI
101 TSICEKPQEV CVAVWRKNDE NITLETVCHD PKLPYHDFIL
    EDAASPKCIM
151 KEKKKPGETF FMCSCSSDEC NDNIIFSEEY NTSNPDTGGG
    GSGGGGSGGG
201 GSGGGGSTHT CPPCPAPELL GGPSVELFPP KPKDTLMISR
    TPEVTCVVVD
251 VSHEDPEVKF NWYVDGVEVH NAKTKPREEQ YNSTYRVVSV
    LTVLHQDWLN
301 GKEYKCKVSN KALPAPIEKT ISKAKGQPRE PQVYTLPPSR
    EEMTKNQVSL
351 TCLVKGFYPS DIAVEWESNG QPENNYKTTP PVLDSDGSFF
    LYSKLTVDKS
401 RWQQGNVFSC SVMHEALHNH YTQKSLSLSP G
``` hTβRII (G4S)4-hFc: Amino Acid Sequence lacking leader sequence
(SEQ ID NO: 50)

```
  1 GATIPPHVQK SDVEMEAQKD EIICPSCNRT AHPLRHINND
    MIVTDNNGAV
 51 KFPQLCKFCD VRESTCDNQK SCMSNCSITS ICEKPQEVCV
    AVWRKNDENI
101 TLETVCHDPK LPYHDFILED AASPKCIMKE KKKPGETFFM
    CSCSSDECND
151 NIIFSEEYNT SNPDTGGGGS GGGGSGGGGS GGGGSTHTCP
    PCPAPELLGG
201 PSVELFPPKP KDTLMISRTP EVTCVVVDVS HEDPEVKENW
    YVDGVEVHNA
251 KTKPREEQYN STYRVVSVLT VLHQDWLNGK EYKCKVSNKA
    LPAPIEKTIS
301 KAKGQPREPQ VYTLPPSREE MTKNQVSLTC LVKGFYPSDI
    AVEWESNGQP
351 ENNYKTTPPV LDSDGSFFLY SKLTVDKSRW QQGNVFSCSV
    MHEALHNHYT
401 QKSLSLSPGK
```

The C-terminal lysine residue of the Fc domain can be deleted. The amino acid sequence of SEQ ID NO: 50 may optionally be provided with the lysine removed from the C-terminus (SEQ ID NO: 77):

```
                                    (SEQ ID NO: 77)
  1 GATIPPHVQK SDVEMEAQKD EIICPSCNRT AHPLRHINND
    MIVTDNNGAV
 51 KFPQLCKFCD VRFSTCDNQK SCMSNCSITS ICEKPQEVCV
    AVWRKNDENI
101 TLETVCHDPK LPYHDFILED AASPKCIMKE KKKPGETFFM
    CSCSSDECND
151 NIIFSEEYNT SNPDTGGGGS GGGGSGGGGS GGGGSTHTCP
    PCPAPELLGG
201 PSVELFPPKP KDTLMISRTP EVTCVVVDVS HEDPEVKENW
    YVDGVEVHNA
251 KTKPREEQYN STYRVVSVLT VLHQDWLNGK EYKCKVSNKA
    LPAPIEKTIS
301 KAKGQPREPQ VYTLPPSREE MTKNQVSLTC LVKGFYPSDI
    AVEWESNGQP
351 ENNYKTTPPV LDSDGSFFLY SKLTVDKSRW QQGNVFSCSV
    MHEALHNHYT
401 QKSLSLSPG
```

Preceding the above:

```
1251 GCACAACCAC TACACGCAGA AGAGCCTCTC CCTGTCTCCG
     GGTAAATGA
``` hTβRII (G4S)4-hFc: Amino Acid Sequence lacking leader sequence and lacking glycine prior to hTβRII portion (SEQ ID NO: 52)

```
  1  ATIPPHVQKS DVEMEAQKDE IICPSCNRTA HPLRHINNDM
     IVTDNNGAVK
 51  FPQLCKFCDV RFSTCDNQKS CMSNCSITSI CEKPQEVCVA
     VWRKNDENIT
101  LETVCHDPKL PYHDFILEDA ASPKCIMKEK KKPGETFFMC
     SCSSDECNDN
151  IIFSEEYNTS NPDTGGGGSG GGGSGGGGSG GGGSTHTCPP
     CPAPELLGGP
201  SVELFPPKPK DTLMISRTPE VTCVVVDVSH EDPEVKFNWY
     VDGVEVHNAK
251  TKPREEQYNS TYRVVSVLTV LHQDWLNGKE YKCKVSNKAL
     PAPIEKTISK
301  AKGQPREPQV YTLPPSREEM TKNQVSLTCL VKGFYPSDIA
     VEWESNGQPE
351  NNYKTTPPVL DSDGSFFLYS KLTVDKSRWQ QGNVFSCSVM
     HEALHNHYTQ
401  KSLSLSPGK
```

The C-terminal lysine residue of the Fc domain can be deleted. The amino acid sequence of SEQ ID NO: 52 may optionally be provided with the lysine removed from the C-terminus (SEQ ID NO: 79):

(SEQ ID NO: 79)

```
  1  ATIPPHVQKS DVEMEAQKDE IICPSCNRTA HPLRHINNDM
     IVTDNNGAVK
 51  FPQLCKFCDV RFSTCDNQKS CMSNCSITSI CEKPQEVCVA
     VWRKNDENIT
101  LETVCHDPKL PYHDFILEDA ASPKCIMKEK KKPGETFFMC
     SCSSDECNDN
151  IIFSEEYNTS NPDTGGGGSG GGGSGGGGSG GGGSTHTCPP
     CPAPELLGGP
201  SVELFPPKPK DTLMISRTPE VTCVVVDVSH EDPEVKFNWY
     VDGVEVHNAK
251  TKPREEQYNS TYRVVSVLTV LHQDWLNGKE YKCKVSNKAL
     PAPIEKTISK
301  AKGQPREPQV YTLPPSREEM TKNQVSLTCL VKGFYPSDIA
     VEWESNGQPE
351  NNYKTTPPVL DSDGSFFLYS KLTVDKSRWQ QGNVFSCSVM
     HEALHNHYTQ
401  KSLSLSPG
``` hTβRII (G4S)4-hFc: Amino Acid Sequence lacking leader sequence and lacking and alanine prior to hTβRII portion (SEQ ID NO: 51)

```
  1  TIPPHVQKSD VEMEAQKDEI ICPSCNRTAH PLRHINNDMI
     VTDNNGAVKF
 51  PQLCKFCDVR FSTCDNQKSC MSNCSITSIC EKPQEVCVAV
     WRKNDENITL
101  ETVCHDPKLP YHDFILEDAA SPKCIMKEKK KPGETFFMCS
     CSSDECNDNI
151  IFSEEYNTSN PDTGGGGSGG GGSGGGGSGG GGSTHTCPPC
     PAPELLGGPS
201  VFLFPPKPKD TLMISRTPEV TCVVVDVSHE DPEVKFNWYV
     DGVEVHNAKT
251  KPREEQYNST YRVVSVLTVL HQDWLNGKEY KCKVSNKALP
     APIEKTISKA
301  KGQPREPQVY TLPPSREEMT KNQVSLTCLV KGFYPSDIAV
     EWESNGQPEN
351  NYKTTPPVLD SDGSFFLYSK LTVDKSRWQQ GNVFSCSVMH
     EALHNHYTQK
401  SLSLSPGK
```

The C-terminal lysine residue of the Fc domain can be deleted. The amino acid sequence of SEQ ID NO: 51 may optionally be provided with the lysine removed from the C-terminus (SE ID NO: 78):

(SEQ ID NO: 78)

```
  1  TIPPHVQKSD VEMEAQKDEI ICPSCNRTAH PLRHINNDMI
     VTDNNGAVKF
 51  PQLCKFCDVR FSTCDNQKSC MSNCSITSIC EKPQEVCVAV
     WRKNDENITL
101  ETVCHDPKLP YHDFILEDAA SPKCIMKEKK KPGETFFMCS
     CSSDECNDNI
151  IFSEEYNTSN PDTGGGGSGG GGSGGGGSGG GGSTHTCPPC
     PAPELLGGPS
201  VELFPPKPKD TLMISRTPEV TCVVVDVSHE DPEVKFNWYV
     DGVEVHNAKT
251  KPREEQYNST YRVVSVLTVL HQDWLNGKEY KCKVSNKALP
     APIEKTISKA
301  KGQPREPQVY TLPPSREEMT KNQVSLTCLV KGFYPSDIAV
     EWESNGQPEN
351  NYKTTPPVLD SDGSFFLYSK LTVDKSRWQQ GNVFSCSVMH
     EALHNHYTQK
401  SLSLSPG
``` hTβRII (G4S)4-hFc: Amino Acid Sequence lacking leader sequence and lacking alanine, and threonine prior to hTβRII portion glycine, alanine, and threonine prior to hTβRII portion (SEQ ID NO: 53)

```
  1 IPPHVQKSDV EMEAQKDEII CPSCNRTAHP LRHINNDMIV
    TDNNGAVKFP
 51 QLCKFCDVRF STCDNQKSCM SNCSITSICE KPQEVCVAVW
    RKNDENITLE
101 TVCHDPKLPY HDFILEDAAS PKCIMKEKKK PGETFFMCSC
    SSDECNDNII
151 FSEEYNTSNP DTGGGGSGGG GSGGGGSGGG GSTHTCPPCP
    APELLGGPSV
201 FLFPPKPKDT LMISRTPEVT CVVVDVSHED PEVKFNWYVD
    GVEVHNAKTK
251 PREEQYNSTY RVVSVLTVLH QDWLNGKEYK CKVSNKALPA
    PIEKTISKAK
301 GQPREPQVYT LPPSREEMTK NQVSLTCLVK GFYPSDIAVE
    WESNGQPENN
351 YKTTPPVLDS DGSFFLYSKL TVDKSRWQQG NVFSCSVMHE
    ALHNHYTQKS
401 LSLSPGK
```

The C-terminal lysine residue of the Fc domain can be deleted. The amino acid sequence of SEQ ID NO: 53 may optionally be provided with the lysine removed from the C-terminus (SEQ ID NO: 80):

(SEQ ID NO: 80)

```
  1 IPPHVQKSDV EMEAQKDEII CPSCNRTAHP LRHINNDMIV
    TDNNGAVKFP
 51 QLCKFCDVRF STCDNQKSCM SNCSITSICE KPQEVCVAVW
    RKNDENITLE
101 TVCHDPKLPY HDFILEDAAS PKCIMKEKKK PGETFFMCSC
    SSDECNDNII
151 FSEEYNTSNP DTGGGGSGGG GSGGGGSGGG GSTHTCPPCP
    APELLGGPSV
201 FLFPPKPKDT LMISRTPEVT CVVVDVSHED PEVKFNWYVD
    GVEVHNAKTK
251 PREEQYNSTY RVVSVLTVLH QDWLNGKEYK CKVSNKALPA
    PIEKTISKAK
301 GQPREPQVYT LPPSREEMTK NQVSLTCLVK GFYPSDIAVE
    WESNGQPENN
```

```
351 YKTTPPVLDS DGSFFLYSKL TVDKSRWQQG NVFSCSVMHE
    ALHNHYTQKS
401 LSLSPG
``` hTβRII (G4S)4-hFc: Amino Acid Sequence lacking leader sequence and lacking glycine, alanine, threonine, and isoleucine prior to hTβRII portion (SEQ ID NO: 54)

```
  1 PPHVQKSDVE MEAQKDEIIC PSCNRTAHPL RHINNDMIVT
    DNNGAVKFPQ
 51 LCKFCDVRFS TCDNQKSCMS NCSITSICEK PQEVCVAVWR
    KNDENITLET
101 VCHDPKLPYH DFILEDAASP KCIMKEKKKP GETFFMCSCS
    SDECNDNIIF
151 SEEYNTSNPD TGGGGSGGGG SGGGGSGGGG STHTCPPCPA
    PELLGGPSVF
201 LFPPKPKDTL MISRTPEVTC VVVDVSHEDP EVKFNWYVDG
    VEVHNAKTKP
251 REEQYNSTYR VVSVLTVLHQ DWLNGKEYKC KVSNKALPAP
    IEKTISKAKG
301 QPREPQVYTL PPSREEMTKN QVSLTCLVKG FYPSDIAVEW
    ESNGQPENNY
351 KTTPPVLDSD GSFFLYSKLT VDKSRWQQGN VFSCSVMHEA
    LHNHYTQKSL
401 SLSPGK
```

The C-terminal lysine residue of the Fc domain can be deleted. The amino acid sequence of SEQ ID NO: 54 may optionally be provided with the lysine removed from the C-terminus (SEQ ID NO: 81):

(SEQ ID NO: 81)

```
  1 PPHVQKSDVE MEAQKDEIIC PSCNRTAHPL RHINNDMIVT
    DNNGAVKFPQ
 51 LCKFCDVRFS TCDNQKSCMS NCSITSICEK PQEVCVAVWR
    KNDENITLET
101 VCHDPKLPYH DFILEDAASP KCIMKEKKKP GETFFMCSCS
    SDECNDNIIF
151 SEEYNTSNPD TGGGGSGGGG SGGGGSGGGG STHTCPPCPA
    PELLGGPSVF
201 LFPPKPKDTL MISRTPEVTC VVVDVSHEDP EVKFNWYVDG
    VEVHNAKTKP
251 REEQYNSTYR VVSVLTVLHQ DWLNGKEYKC KVSNKALPAP
    IEKTISKAKG
301 QPREPQVYTL PPSREEMTKN QVSLTCLVKG FYPSDIAVEW
    ESNGQPENNY
```

```
351  KTTPPVLDSD GSFFLYSKLT VDKSRWQQGN VFSCSVMHEA
     LHNHYTQKSL
401  SLSPG
``` hTβRII (G4S)4-hFc: Amino Acid Sequence lacking leader sequence and lacking glycine, alanine, threonine, isoleucine, and proline prior to hTβRII portion (SEQ ID NO: 55)

```
  1  PHVQKSDVEM EAQKDEIICP SCNRTAHPLR HINNDMIVTD
     NNGAVKEPQL
 51  CKFCDVRFST CDNQKSCMSN CSITSICEKP QEVCVAVWRK
     NDENITLETV
101  CHDPKLPYHD FILEDAASPK CIMKEKKKPG ETFFMCSCSS
     DECNDNIIFS
151  EEYNTSNPDT GGGGSGGGGS GGGGSGGGGS THTCPPCPAP
     ELLGGPSVFL
201  FPPKPKDTLM ISRTPEVTCV VVDVSHEDPE VKENWYVDGV
     EVHNAKTKPR
251  EEQYNSTYRV VSVLTVLHQD WLNGKEYKCK VSNKALPAPI
     EKTISKAKGQ
301  PREPQVYTLP PSREEMTKNQ VSLTCLVKGF YPSDIAVEWE
     SNGQPENNYK
351  TTPPVLDSDG SFFLYSKLTV DKSRWQQGNV FSCSVMHEAL
     HNHYTQKSLS
401  LSPGK
```

The C-terminal lysine residue of the Fc domain can be deleted. The amino acid sequence of SEQ ID NO: 55 may optionally be provided with the lysine removed from the C-terminus (SEQ ID NO: 82):

```
                                     (SEQ ID NO: 82)
  1  PHVQKSDVEM EAQKDEIICP SCNRTAHPLR HINNDMIVTD
     NNGAVKEPQL
 51  CKFCDVRFST CDNQKSCMSN CSITSICEKP QEVCVAVWRK
     NDENITLETV
101  CHDPKLPYHD FILEDAASPK CIMKEKKKPG ETFFMCSCSS
     DECNDNIIFS
151  EEYNTSNPDT GGGGSGGGGS GGGGSGGGGS THTCPPCPAP
     ELLGGPSVFL
201  FPPKPKDTLM ISRTPEVTCV VVDVSHEDPE VKENWYVDGV
     EVHNAKTKPR
251  EEQYNSTYRV VSVLTVLHQD WINGKEYKCK VSNKALPAPI
     EKTISKAKGQ
301  PREPQVYTLP PSREEMTKNQ VSLTCLVKGF YPSDIAVEWE
     SNGQPENNYK
351  TTPPVLDSDG SFFLYSKLTV DKSRWQQGNV FSCSVMHEAL
     HNHYTQKSLS
401  LSPG
``` hTβRII (G4S)4-hFc: Amino Acid Sequence lacking leader sequence and lacking glycine, alanine, threonine, isoleucine, proline, and proline prior to hTβRII portion (SEQ ID NO: 56)

```
  1  HVQKSDVEME AQKDEIICPS CNRTAHPLRH INNDMIVTDN
     NGAVKFPQLC
 51  KFCDVRFSTC DNQKSCMSNC SITSICEKPQ EVCVAVWRKN
     DENITLETVC
101  HDPKLPYHDF ILEDAASPKC IMKEKKKPGE TFFMCSCSSD
     ECNDNIIFSE
151  EYNTSNPDTG GGGSGGGGSG GGGSGGGGST HTCPPCPAPE
     LLGGPSVFLF
201  PPKPKDTLMI SRTPEVTCVV VDVSHEDPEV KENWYVDGVE
     VHNAKTKPRE
251  EQYNSTYRVV SVLTVLHQDW LNGKEYKCKV SNKALPAPIE
     KTISKAKGQP
301  REPQVYTLPP SREEMTKNQV SLTCLVKGFY PSDIAVEWES
     NGQPENNYKT
351  TPPVLDSDGS FFLYSKLTVD KSRWQQGNVF SCSVMHEALH
     NHYTQKSLSL
401  SPGK
```

The C-terminal lysine residue of the Fc domain can be deleted. The amino acid sequence of SEQ ID NO: 56 may optionally be provided with the lysine removed from the C-terminus (SEQ ID NO: 83):

```
                                     (SEQ ID NO: 83)
  1  HVQKSDVEME AQKDEIICPS CNRTAHPLRH INNDMIVTDN NGAVKFPQLC
 51  KFCDVRFSTC DNQKSCMSNC SITSICEKPQ EVCVAVWRKN DENITLETVC
101  HDPKLPYHDF ILEDAASPKC IMKEKKKPGE TFFMCSCSSD ECNDNIIFSE
151  EYNTSNPDTG GGGSGGGGSG GGGSGGGGST HTCPPCPAPE LLGGPSVFLF
201  PPKPKDTLMI SRTPEVTCVV VDVSHEDPEV KFNWYVDGVE VHNAKTKPRE
251  EQYNSTYRVV SVLTVLHQDW LNGKEYKCKV SNKALPAPIE KTISKAKGQP
```

```
301 REPQVYTLPP SREEMTKNQV SLTCLVKGFY PSDIAVEWES NGQPENNYKT

351 TPPVLDSDGS FFLYSKLTVD KSRWQQGNVF SCSVMHEALH NHYTQKSLSL

401 SPG
``` hTβRII (G4S)2-hFc: Nucleic Acid Sequence
(SEQ ID NO: 14)

```
   1 ATGGATGCAA TGAAGAGAGG GCTCTGCTGT GTGCTGCTGC TGTGTGGAGC

51 AGTCTTCGTT TCGCCCGGCG CCACGATCCC ACCGCACGTT CAGAAGTCGG

101 ATGTGGAAAT GGAGGCCCAG AAAGATGAAA TCATCTGCCC CAGCTGTAAT

151 AGGACTGCCC ATCCACTGAG ACATATTAAT AACGACATGA TAGTCACTGA

201 CAACAACGGT GCAGTCAAGT TTCCACAACT GTGTAAATTT TGTGATGTGA

251 GATTTTCCAC CTGTGACAAC CAGAAATCCT GCATGAGCAA CTGCAGCATC

301 ACCTCCATCT GTGAGAAGCC ACAGGAAGTC TGTGTGGCTG TATGGAGAAA

351 GAATGACGAG AACATAACAC TAGAGACAGT TTGCCATGAC CCCAAGCTCC

401 CCTACCATGA CTTTATTCTG GAAGATGCTG CTTCTCCAAA GTGCATTATG

451 AAGGAAAAAA AAAAGCCTGG TGAGACTTTC TTCATGTGTT CCTGTAGCTC

501 TGATGAGTGC AATGACAACA TCATCTTCTC AGAAGAATAT AACACCAGCA

551 ATCCTGACAC CGGTGGAGGT GGTTCTGGAG GTGGTGGAAG TACTCACACA

601 TGCCCACCGT GCCCAGCACC TGAACTCCTG GGGGGACCGT CAGTCTTCCT

651 CTTCCCCCCA AAACCCAAGG ACACCCTCAT GATCTCCCGG ACCCCTGAGG

701 TCACATGCGT GGTGGTGGAC GTGAGCCACG AAGACCCTGA GGTCAAGTTC

751 AACTGGTACG TGGACGGCGT GGAGGTGCAT AATGCCAAGA CAAAGCCGCG

801 GGAGGAGCAG TACAACAGCA CGTACCGTGT GGTCAGCGTC CTCACCGTCC

851 TGCACCAGGA CTGGCTGAAT GGCAAGGAGT ACAAGTGCAA GGTCTCCAAC

901 AAAGCCCTCC CAGCCCCCAT CGAGAAAACC ATCTCCAAAG CCAAAGGGCA

951 GCCCCGAGAA CCACAGGTGT ACACCCTGCC CCCATCCCGG GAGGAGATGA

1001 CCAAGAACCA GGTCAGCCTG ACCTGCCTGG TCAAAGGCTT CTATCCCAGC

1051 GACATCGCCG TGGAGTGGGA GAGCAATGGG CAGCCGGAGA ACAACTACAA

1101 GACCACGCCT CCCGTGCTGG ACTCCGACGG CTCCTTCTTC CTCTATAGCA

1151 AGCTCACCGT GGACAAGAGC AGGTGGCAGC AGGGGAACGT CTTCTCATGC

1201 TCCGTGATGC ATGAGGCTCT GCACAACCAC TACACGCAGA AGAGCCTCTC

1251 CCTGTCTCCG GGTAAATGA
``` hTβRII (G4S)2-hFc: Amino Acid Sequence
(SEQ ID NO: 15)

```
   1 MDAMKRGLCC VLLLCGAVFV SPGATIPPHV QKSDVEMEAQ KDEIICPSCN

51 RTAHPLRHIN NDMIVTDNNG AVKFPQLCKF CDVRFSTCDN QKSCMSNCSI

101 TSICEKPQEV CVAVWRKNDE NITLETVCHD PKLPYHDFIL EDAASPKCIM

151 KEKKKPGETF FMCSCSSDEC NDNIIFSEEY NTSNPDTGGG GSGGGGSTHT

201 CPPCPAPELL GGPSVFLFPP KPKDTLMISR TPEVTCVVVD VSHEDPEVKF

251 NWYVDGVEVH NAKTKPREEQ YNSTYRVVSV LTVLHQDWLN GKEYKCKVSN

301 KALPAPIEKT ISKAKGQPRE PQVYTLPPSR EEMTKNQVSL TCLVKGFYPS

351 DIAVEWESNG QPENNYKTTP PVLDSDGSFF LYSKLTVDKS RWQQGNVFSC

401 SVMHEALHNH YTQKSLSLSP GK
```

The C-terminal lysine residue of the Fc domain can be deleted. The amino acid sequence of SEQ ID NO: 15 may optionally be provided with the lysine removed from the C-terminus (SEQ ID NO: 70):

```
                                                      (SEQ ID NO: 70)
   1 MDAMKRGLCC VLLLCGAVFV SPGATIPPHV QKSDVEMEAQ KDEIICPSCN

51 RTAHPLRHIN NDMIVTDNNG AVKFPQLCKF CDVRFSTCDN QKSCMSNCSI

101 TSICEKPQEV CVAVWRKNDE NITLETVCHD PKLPYHDFIL EDAASPKCIM

151 KEKKKPGETF FMCSCSSDEC NDNIIFSEEY NTSNPDTGGG GSGGGGSTHT

201 CPPCPAPELL GGPSVFLFPP KPKDTLMISR TPEVTCVVVD VSHEDPEVKF

251 NWYVDGVEVH NAKTKPREEQ YNSTYRVVSV LTVLHQDWLN GKEYKCKVSN

301 KALPAPIEKT ISKAKGQPRE PQVYTLPPSR EEMTKNQVSL TCLVKGFYPS

351 DIAVEWESNG QPENNYKTTP PVLDSDGSFF LYSKLTVDKS RWQQGNVFSC

401 SVMHEALHNH YTQKSLSLSP G
``` hTβRII extended hinge-hFc: Nucleic Acid Sequence

```
                                                      (SEQ ID NO: 16)
    1 ATGGATGCAA TGAAGAGAGG GCTCTGCTGT GTGCTGCTGC TGTGTGGAGC

51 AGTCTTCGTT TCGCCCGGCG CCACGATCCC ACCGCACGTT CAGAAGTCGG

101 ATGTGGAAAT GGAGGCCCAG AAAGATGAAA TCATCTGCCC CAGCTGTAAT

151 AGGACTGCCC ATCCACTGAG ACATATTAAT AACGACATGA TAGTCACTGA

201 CAACAACGGT GCAGTCAAGT TTCCACAACT GTGTAAATTT TGTGATGTGA

251 GATTTTCCAC CTGTGACAAC CAGAAATCCT GCATGAGCAA CTGCAGCATC

301 ACCTCCATCT GTGAGAAGCC ACAGGAAGTC TGTGTGGCTG TATGGAGAAA

351 GAATGACGAG AACATAACAC TAGAGACAGT TTGCCATGAC CCCAAGCTCC

401 CCTACCATGA CTTTATTCTG GAAGATGCTG CTTCTCCAAA GTGCATTATG

451 AAGGAAAAAA AAAAGCCTGG TGAGACTTTC TTCATGTGTT CCTGTAGCTC

501 TGATGAGTGC AATGACAACA TCATCTTCTC AGAAGAATAT AACACCAGCA

551 ATCCTGACAC CGGTGGTGGA CCCAAATCTT GTGACAAAAC TCACACATGC

601 CCACCGTGCC CAGCACCTGA ACTCCTGGGG GGACCGTCAG TCTTCCTCTT

651 CCCCCCAAAA CCCAAGGACA CCCTCATGAT CTCCCGGACC CCTGAGGTCA

701 CATGCGTGGT GGTGGACGTG AGCCACGAAG ACCCTGAGGT CAAGTTCAAC

751 TGGTACGTGG ACGGCGTGGA GGTGCATAAT GCCAAGACAA AGCCGCGGGA

801 GGAGCAGTAC AACAGCACGT ACCGTGTGGT CAGCGTCCTC ACCGTCCTGC

851 ACCAGGACTG GCTGAATGGC AAGGAGTACA AGTGCAAGGT CTCCAACAAA

901 GCCCTCCCAG CCCCCATCGA GAAAACCATC TCCAAAGCCA AGGGCAGCC

951 CCGAGAACCA CAGGTGTACA CCCTGCCCCC ATCCCGGGAG GAGATGACCA

1001 AGAACCAGGT CAGCCTGACC TGCCTGGTCA AAGGCTTCTA TCCCAGCGAC

1051 ATCGCCGTGG AGTGGGAGAG CAATGGGCAG CCGGAGAACA ACTACAAGAC

1101 CACGCCTCCC GTGCTGGACT CCGACGGCTC CTTCTTCCTC TATAGCAAGC

1151 TCACCGTGGA CAAGAGCAGG TGGCAGCAGG GGAACGTCTT CTCATGCTCC

1201 GTGATGCATG AGGCTCTGCA CAACCACTAC ACGCAGAAGA GCCTCTCCCT

1251 GTCCCCGGGT AAATGA
``` hTβRII extended hinge-hFc: Amino Acid Sequence

```
                                                      (SEQ ID NO: 17)
   1 MDAMKRGLCC VLLLCGAVFV SPGATIPPHV QKSDVEMEAQ KDEIICPSCN

51 RTAHPLRHIN NDMIVTDNNG AVKFPQLCKF CDVRGSTCDN QKSCMSNCSI
```

```
101 TSICEKPQEV CVAVWRKNDE NITLETVCHD PKLPYHDFIL EDAASPKCIM
151 KEKKKPGETF FMCSCSSDEC NDNIIFSEEY NTSNPDTGGG PKSCDKTHTC
201 PPCPAPELLG GPSVGLFPPK PKDTLMISRT PEVTCVVVDV SHEDPEVKGN
251 WYVDGVEVHN AKTKPREEQY NSTYRVVSVL TVLHQDWLNG KEYKCKVSNK
301 ALPAPIEKTI SKAKGQPREP QVYTLPPSRE EMTKNQVSLT CLVKGFYPSD
351 IAVEWESNGQ PENNYKTTPP VLDSDGSFFL YSKLTVDKSR WQQGNVGSCS
401 VMHEALHNHY TQKSLSLSPG K
```

The C-terminal lysine residue of the Fc domain can be deleted. The amino acid sequence of SEQ ID NO: 17 may optionally be provided with the lysine removed from the C-terminus (SEQ ID NO: 71):

```
                                                     (SEQ ID NO: 71)
  1 MDAMKRGLCC VLLLCGAVGV SPGATIPPHV QKSDVEMEAQ KDEIICPSCN
 51 RTAHPLRHIN NDMIVTDNNG AVKFPQLCKF CDVRGSTCDN QKSCMSNCSI
101 TSICEKPQEV CVAVWRKNDE NITLETVCHD PKLPYHDFIL EDAASPKCIM
151 KEKKKPGETF FMCSCSSDEC NDNIIFSEEY NTSNPDTGGG PKSCDKTHTC
201 PPCPAPELLG GPSVELFPPK PKDTLMISRT PEVTCVVVDV SHEDPEVKFN
251 WYVDGVEVHN AKTKPREEQY NSTYRVVSVL TVLHQDWING KEYKCKVSNK
301 ALPAPIEKTI SKAKGQPREP QVYTLPPSRE EMTKNQVSLT CLVKGFYPSD
351 IAVEWESNGQ PENNYKTTPP VLDSDGSFFL YSKLTVDKSR WQQGNVFSCS
401 VMHEALHNHY TQKSLSLSPG
``` hTβRII (G4S)5-hFc: Amino Acid Sequence

```
                                                     (SEQ ID NO: 44)
  1 MDAMKRGLCC VLLLCGAVFV SPGATIPPHV QKSDVEMEAQ KDEIICPSCN
 51 RTAHPLRHIN NDMIVTDNNG AVKFPQLCKF CDVRESTCDN QKSCMSNCSI
101 TSICEKPQEV CVAVWRKNDE NITLETVCHD PKLPYHDFIL EDAASPKCIM
151 KEKKKPGETF FMCSCSSDEC NDNIIFSEEY NTSNPDTGGG GSGGGGSGGG
201 GSGGGGSGGG GSTHTCPPCP APELLGGPSV FLFPPKPKDT LMISRTPEVT
251 CVVVDVSHED PEVKENWYVD GVEVHNAKTK PREEQYNSTY RVVSVLTVLH
301 QDWLNGKEYK CKVSNKALPA PIEKTISKAK GQPREPQVYT LPPSREEMTK
351 NQVSLTCLVK GFYPSDIAVE WESNGQPENN YKTTPPVLDS DGSFFLYSKL
401 TVDKSRWQQG NVFSCSVMHE ALHNHYTQKS LSLSPGK
```

The C-terminal lysine residue of the Fc domain can be deleted. The amino acid sequence of SEQ ID NO: 44 may optionally be provided with the lysine removed from the C-terminus (SEQ ID NO: 75):

```
                                                     (SEQ ID NO: 75)
  1 MDAMKRGLCC VLLLCGAVEV SPGATIPPHV QKSDVEMEAQ KDEIICPSCN
 51 RTAHPLRHIN NDMIVTDNNG AVKFPQLCKF CDVRESTCDN QKSCMSNCSI
101 TSICEKPQEV CVAVWRKNDE NITLETVCHD PKLPYHDFIL EDAASPKCIM
151 KEKKKPGETF FMCSCSSDEC NDNIIFSEEY NTSNPDTGGG GSGGGGSGGG
201 GSGGGGSGGG GSTHTCPPCP APELLGGPSV FLFPPKPKDT LMISRTPEVT
251 CVVVDVSHED PEVKFNWYVD GVEVHNAKTK PREEQYNSTY RVVSVLTVLH
301 QDWLNGKEYK CKVSNKALPA PIEKTISKAK GQPREPQVYT LPPSREEMTK
```

```
351 NQVSLTCLVK GFYPSDIAVE WESNGQPENN YKTTPPVLDS DGSFFLYSKL

401 TVDKSRWQQG NVFSCSVMHE ALHNHYTQKS LSLSPG
``` hTβRII (G4S)6-hFc: Amino Acid Sequence (SEQ ID NO: 45)

```
  1 MDAMKRGLCC VLLLCGAVFV SPGATIPPHV QKSDVEMEAQ KDEIICPSCN

51 RTAHPLRHIN NDMIVTDNNG AVKFPQLCKF CDVRESTCDN QKSCMSNCSI

101 TSICEKPQEV CVAVWRKNDE NITLETVCHD PKLPYHDFIL EDAASPKCIM

151 KEKKKPGETF FMCSCSSDEC NDNIIFSEEY NTSNPDTGGG GSGGGGSGGG

201 GSGGGGSGGG GSGGGGSTHT CPPCPAPELL GGPSVFLFPP KPKDTLMISR

251 TPEVTCVVVD VSHEDPEVKF NWYVDGVEVH NAKTKPREEQ YNSTYRVVSV

301 LTVLHQDWLN GKEYKCKVSN KALPAPIEKT ISKAKGQPRE PQVYTLPPSR

351 EEMTKNQVSL TCLVKGFYPS DIAVEWESNG QPENNYKTTP PVLDSDGSFF

401 LYSKLTVDKS RWQQGNVFSC SVMHEALHNH YTQKSLSLSP GK
```

The C-terminal lysine residue of the Fe domain can be deleted. The amino acid sequence of SEQ ID NO: 45 may optionally be provided with the lysine removed from the C-terminus (SEQ TD NO: 76):

(SEQ ID NO: 76)

```
  1 MDAMKRGLCC VLLLCGAVFV SPGATIPPHV QKSDVEMEAQ KDEIICPSCN

51 RTAHPLRHIN NDMIVTDNNG AVKFPQLCKF CDVRFSTCDN QKSCMSNCSI

101 TSICEKPQEV CVAVWRKNDE NITLETVCHD PKLPYHDFIL EDAASPKCIM

151 KEKKKPGETF FMCSCSSDEC NDNIIFSEEY NTSNPDTGGG GSGGGGSGGG

201 GSGGGGSGGG GSGGGGSTHT CPPCPAPELL GGPSVFLFPP KPKDTLMISR

251 TPEVTCVVVD VSHEDPEVKF NWYVDGVEVH NAKTKPREEQ YNSTYRVVSV

301 LTVLHQDWLN GKEYKCKVSN KALPAPIEKT ISKAKGQPRE PQVYTLPPSR

351 EEMTKNQVSL TCLVKGFYPS DIAVEWESNG QPENNYKTTP PVLDSDGSFF

401 LYSKLTVDKS RWQQGNVFSC SVMHEALHNH YTQKSLSLSP G
``` hTβRII (G4S)5-hFc: Nucleotide Sequence (SEQ ID NO: 46)

```
  1 ATGGATGCAA TGAAGAGAGG GCTCTGCTGT GTGCTGCTGC TGTGTGGAGC

51 AGTCTTCGTT TCGCCCGGCG CCACGATCCC ACCGCACGTT CAGAAGTCGG

101 ATGTGGAAAT GGAGGCCCAG AAAGATGAAA TCATCTGCCC CAGCTGTAAT

151 AGGACTGCCC ATCCACTGAG ACATATTAAT AACGACATGA TAGTCACTGA

201 CAACAACGGT GCAGTCAAGT TTCCACAACT GTGTAAATTT TGTGATGTGA

251 GATTTTCCAC CTGTGACAAC CAGAAATCCT GCATGAGCAA CTGCAGCATC

301 ACCTCCATCT GTGAGAAGCC ACAGGAAGTC TGTGTGGCTG TATGGAGAAA

351 GAATGACGAG AACATAACAC TAGAGACAGT TTGCCATGAC CCCAAGCTCC

401 CCTACCATGA CTTTATTCTG GAAGATGCTG CTTCTCCAAA GTGCATTATG

451 AAGGAAAAAA AAAAGCCTGG TGAGACTTTC TTCATGTGTT CCTGTAGCTC

501 TGATGAGTGC AATGACAACA TCATCTTCTC AGAAGAATAT AACACCAGCA

551 ATCCTGACAC CGGTGGAGGA GGTTCTGGTG GTGGAGGTTC TGGAGGTGGA

601 GGAAGTGGTG GAGGTGGTTC TGGAGGTGGT GGAAGTACTC ACACATGCCC

651 ACCGTGCCCA GCACCTGAAC TCCTGGGGGG ACCGTCAGTC TTCCTCTTCC

701 CCCCAAAACC CAAGGACACC CTCATGATCT CCCGGACCCC TGAGGTCACA
```

```
 751 TGCGTGGTGG TGGACGTGAG CCACGAAGAC CCTGAGGTCA AGTTCAACTG
 801 GTACGTGGAC GGCGTGGAGG TGCATAATGC CAAGACAAAG CCGCGGGAGG
 851 AGCAGTACAA CAGCACGTAC CGTGTGGTCA GCGTCCTCAC CGTCCTGCAC
 901 CAGGACTGGC TGAATGGCAA GGAGTACAAG TGCAAGGTCT CCAACAAAGC
 951 CCTCCCAGCC CCCATCGAGA AAACCATCTC CAAAGCCAAA GGGCAGCCCC
1001 GAGAACCACA GGTGTACACC CTGCCCCCAT CCCGGGAGGA GATGACCAAG
1051 AACCAGGTCA GCCTGACCTG CCTGGTCAAA GGCTTCTATC CCAGCGACAT
1101 CGCCGTGGAG TGGGAGAGCA ATGGGCAGCC GGAGAACAAC TACAAGACCA
1151 CGCCTCCCGT GCTGGACTCC GACGGCTCCT TCTTCCTCTA TAGCAAGCTC
1201 ACCGTGGACA AGAGCAGGTG GCAGCAGGGG AACGTCTTCT CATGCTCCGT
1251 GATGCATGAG GCTCTGCACA ACCACTACAC GCAGAAGAGC CTCTCCCTGT
1301 CTCCGGGTAA ATGA
``` hTβRII (G4S)6-hFc: Nucleotide Sequence (SEQ ID NO: 47)
```
   1 ATGGATGCAA TGAAGAGAGG GCTCTGCTGT GTGCTGCTGC TGTGTGGAGC
  51 AGTCTTCGTT TCGCCCGGCG CCACGATCCC ACCGCACGTT CAGAAGTCGG
 101 ATGTGGAAAT GGAGGCCCAG AAAGATGAAA TCATCTGCCC CAGCTGTAAT
 151 AGGACTGCCC ATCCACTGAG ACATATTAAT AACGACATGA TAGTCACTGA
 201 CAACAACGGT GCAGTCAAGT TTCCACAACT GTGTAAATTT TGTGATGTGA
 251 GATTTTCCAC CTGTGACAAC CAGAAATCCT GCATGAGCAA CTGCAGCATC
 301 ACCTCCATCT GTGAGAAGCC ACAGGAAGTC TGTGTGGCTG TATGGAGAAA
 351 GAATGACGAG AACATAACAC TAGAGACAGT TTGCCATGAC CCCAAGCTCC
 401 CCTACCATGA CTTTATTCTG GAAGATGCTG CTTCTCCAAA GTGCATTATG
 451 AAGGAAAAAA AAAAGCCTGG TGAGACTTTC TTCATGTGTT CCTGTAGCTC
 501 TGATGAGTGC AATGACAACA TCATCTTCTC AGAAGAATAT AACACCAGCA
 551 ATCCTGACAC CGGTGGAGGT GGAAGTGGTG GAGGAGGTTC TGGTGGTGGA
 601 GGTTCTGGAG GTGGAGGAAG TGGTGGAGGT GGTTCTGGAG GTGGTGGAAG
 651 TACTCACACA TGCCCACCGT GCCCAGCACC TGAACTCCTG GGGGGACCGT
 701 CAGTCTTCCT CTTCCCCCCA AAACCCAAGG ACACCCTCAT GATCTCCCGG
 751 ACCCCTGAGG TCACATGCGT GGTGGTGGAC GTGAGCCACG AAGACCCTGA
 801 GGTCAAGTTC AACTGGTACG TGGACGGCGT GGAGGTGCAT AATGCCAAGA
 851 CAAAGCCGCG GGAGGAGCAG TACAACAGCA CGTACCGTGT GGTCAGCGTC
 901 CTCACCGTCC TGCACCAGGA CTGGCTGAAT GGCAAGGAGT ACAAGTGCAA
 951 GGTCTCCAAC AAAGCCCTCC CAGCCCCCAT CGAGAAAACC ATCTCCAAAG
1001 CCAAAGGGCA GCCCCGAGAA CCACAGGTGT ACACCCTGCC CCCATCCCGG
1051 GAGGAGATGA CCAAGAACCA GGTCAGCCTG ACCTGCCTGG TCAAAGGCTT
1101 CTATCCCAGC GACATCGCCG TGGAGTGGGA GAGCAATGGG CAGCCGGAGA
1151 ACAACTACAA GACCACGCCT CCCGTGCTGG ACTCCGACGG CTCCTTCTTC
1201 CTCTATAGCA AGCTCACCGT GGACAAGAGC AGGTGGCAGC AGGGGAACGT
1251 CTTCTCATGC TCCGTGATGC ATGAGGCTCT GCACAACCAC TACACGCAGA
1301 AGAGCCTCTC CCTGTCTCCG GGTAAATGA
```

The various constructs were successfully expressed in CHO cells and were purified to a high degree of purity as determined by analytical size-exclusion chromatography and SDS-PAGE. The hTβRII (G4S)2-hFc, hTβRII (G4S)3-hFc, hTβRII (G4S)4-hFc, hTβRII (G4S)5-hFc and hTβRII (G4S)6-hFc proteins displayed similarly strong stability as determined by SDS-PAGE analysis when maintained in PBS for 13 days at 37° C. The hTβRII (G4S)2-hFc, hTβRII (G4S)3-hFc, hTβRII (G4S)4-hFc proteins were also maintained in rat, mouse or human serum and displayed similarly strong stability.

TβRII ECD Variants

In addition to the TβRII domains included in the fusion proteins described above (e.g., SEQ ID NO: 18), the disclosure also contemplates fusion proteins comprising alternative TβRII domains. For example, the fusion protein may comprise the wild-type hTβRII$_{short}$(23-159) sequence shown below (SEQ ID NO: 27) or any of the other TβRII polypeptides disclosed below:

```
                                        (SEQ ID NO: 27)
  1 TIPPHVQKSV NNDMIVTDNN GAVKFPQLCK

FCDVRFSTCD NQKSCMSNCS

51 ITSICEKPQE VCVAVWRKND ENITLETVCH

DPKLPYHDFI LEDAASPKCI

101 MKEKKKPGET FEMCSCSSDE CNDNIIFSEE

YNTSNPD
```

(1) The hTβRII$_{short}$(23-159/D1110K) amino acid sequence shown below (SEQ ID NO: 36), in which the substituted residue is underlined.

```
                                        (SEQ ID NO: 36)
  1 TIPPHVQKSV NNDMIVTDNN GAVKFPQLCK

FCDVRESTCD NQKSCMSNCS

51 ITSICEKPQE VCVAVWRKND ENITLETVCH

DPKLPYHKFI LEDAASPKCI

101 MKEKKKPGET FFMCSCSSDE CNDNIIFSEE

YNTSNPD
```

(2) The N-terminally truncated hTβRII$_{short}$(29-159) amino acid sequence shown below (SEQ ID NO: 28).

```
                                        (SEQ ID NO: 28)
  1 QKSVNNDMIV TDNNGAVKFP QLCKFCDVRF

STCDNQKSCM SNCSITSICE

51 KPQEVCVAVW RKNDENITLE TVCHDPKLPY

HDFILEDAAS PKCIMKEKKK

101 PGETFFMCSC SSDECNDNII FSEEYNTSNP

D
```

(3) The N-terminally truncated hTβRII$_{short}$(35-159) amino acid sequence shown below (SEQ ID NO: 29).

```
                                        (SEQ ID NO: 29)
  1 DMIVTDNNGA VKFPQLCKFC DVRESTCDNQ

KSCMSNCSIT SICEKPQEVC

51 VAVWRKNDEN ITLETVCHDP KLPYHDFILE

DAASPKCIMK EKKKPGETFF

101 MCSCSSDECN DNIIFSEEYN TSNPD
```

(4) The C-terminally truncated hTβRII$_{short}$(23-153) amino acid sequence shown below (SEQ ID NO: 30).

```
                                        (SEQ ID NO: 30)
  1 TIPPHVQKSV NNDMIVTDNN GAVKFPQLCK

FCDVRFSTCD NQKSCMSNCS

51 ITSICEKPQE VCVAVWRKND ENITLETVCH

DPKLPYHDFI LEDAASPKCI

101 MKEKKKPGET FFMCSCSSDE CNDNIIFSEE Y
```

(5) The C-terminally truncated hTβRII$_{short}$(23-153/N70D) amino acid sequence shown below (SEQ ID NO: 38), in which the substituted residue is underlined.

```
                                        (SEQ ID NO: 38)
  1 TIPPHVQKSV NNDMIVTDNN GAVKFPQLCK

FCDVRESTCD NQKSCMSDCS

51 ITSICEKPQE VCVAVWRKND ENITLETVCH

DPKLPYHDFI LEDAASPKCI

101 MKEKKKPGET FFMCSCSSDE CNDNIIFSEE

Y
```

Applicants also envision five corresponding variants (SEQ ID NOs: 37, 33, 34, 39) based on the wild-type hTβRII$_{long}$(23-184) sequence shown above and below (SEQ ID NO: 49), in which the 25 amino-acid insertion is underlined. Note that splicing results in a conservative amino acid substitution (Val→Ile) at the flanking position C-terminal to the insertion.

```
                                        (SEQ ID NO: 49)
  1 TIPPHVQKSD VEMEAQKDEI ICPSCNRTAH

PLRHINNDMI VTDNNGAVKF

51 PQLCKFCDVR FSTCDNQKSC MSNCSITSIC

EKPQEVCVAV WRKNDENITL

101 ETVCHDPKLP YHDFILEDAA SPKCIMKEKK

KPGETFEMCS CSSDECNDNI

151 IFSEEYNTSN PD
```

(1) The hTβRII$_{long}$(23-184/D135K) amino acid sequence shown below (SEQ ID NO: 37), in which the substituted residue is double underlined.

```
                              (SEQ ID NO: 37)
  1 TIPPHVQKSD VEMEAQKDEI ICPSCNRTAH

PLRHINNDMI VTDNNGAVKF

51 PQLCKFCDVR FSTCDNQKSC MSNCSITSIC

EKPQEVCVAV WRKNDENITL

101 ETVCHDPKLP YHKFILEDAA SPKCIMKEKK

KPGETFFMCS CSSDECNDNI

151 IFSEEYNTSN PD
```

(2) The N-terminally truncated hTβRII$_{long}$(29-184) amino acid sequence shown below (SEQ ID NO: 33).

```
                              (SEQ ID NO: 33)
  1 QKSDVEMEAQ KDEIICPSCN RTAHPLRHIN

NDMIVTDNNG AVKFPQLCKF

51 CDVRESTCDN QKSCMSNCSI TSICEKPQEV

CVAVWRKNDE NITLETVCHD

101 PKLPYHDFIL EDAASPKCIM KEKKKPGETF

FMCSCSSDEC NDNIIFSEEY

151 NTSNPD
```

(3) The N-terminally truncated hTβRII$_{long}$(60-184) amino acid sequence shown below (same as SEQ ID NO: 29).

```
  1 DMIVTDNNGA VKFPQLCKFC DVRFSTCDNQ

KSCMSNCSIT SICEKPQEVC

51 VAVWRKNDEN ITLETVCHDP KLPYHDFILE

DAASPKCIMK EKKKPGETFF

101 MCSCSSDECN DNIIFSEEYN TSNPD
(same as SEQ ID NO: 29)
```

(4) The C-terminally truncated hTβRII$_{long}$(23-178) amino acid sequence shown below (SEQ ID NO: 34).

```
                              (SEQ ID NO: 34)
  1 TIPPHVQKSD VEMEAQKDEI ICPSCNRTAH

PLRHINNDMI VTDNNGAVKF

51 PQLCKFCDVR FSTCDNQKSC MSNCSITSIC

EKPQEVCVAV WRKNDENITL

101 ETVCHDPKLP YHDFILEDAA SPKCIMKEKK

KPGETFEMCS CSSDECNDNI

151 IFSEEY
```

(5) The C-terminally truncated hTβRII$_{long}$(23-178/N95D) amino acid sequence shown below (SEQ ID NO: 39), in which the substituted residue is double underlined.

```
                              (SEQ ID NO: 39)
  1 TIPPHVQKSD VEMEAQKDEI ICPSCNRTAH

PLRHINNDMI VTDNNGAVKF
```

```
 51 PQLCKFCDVR FSTCDNQKSC MSDCSITSIC

EKPQEVCVAV WRKNDENITL

101 ETVCHDPKLP YHDFILEDAA SPKCIMKEKK

KPGETFEMCS CSSDECNDNI

151 IFSEEY
```

Additional TβRII ECD variants include:

(A) The N- and C-terminally truncated hTβRII$_{short}$(35-153) or hTβRII$_{long}$(60-178) amino acid sequence shown below (SEQ ID NO: 32).

```
                              (SEQ ID NO: 32)
  1 DMIVTDNNGA VKFPQLCKFC DVRESTCDNQ

KSCMSNCSIT SICEKPQEVC

51 VAVWRKNDEN ITLETVCHDP KLPYHDFILE

DAASPKCIMK EKKKPGETFF

101 MCSCSSDECN DNIIFSEEY
```

(B) The N- and C-terminally truncated hTβRII$_{short}$(29-153) amino acid sequence shown below (SEQ ID NO: 31).

```
                              (SEQ ID NO: 31)
  1 QKSVNNDMIV TDNNGAVKFP QLCKFCDVRF

STCDNQKSCM SNCSITSICE

51 KPQEVCVAVW RKNDENITLE TVCHDPKLPY

HDFILEDAAS PKCIMKEKKK

101 PGETFEMCSC SSDECNDNII FSEEY
```

(C) The N- and C-terminally truncated hTβRII$_{long}$(29-178) amino acid sequence shown below (SEQ ID NO: 35).

```
                              (SEQ ID NO: 35)
  1 QKSDVEMEAQ KDEIICPSCN RTAHPLRHIN

NDMIVTDNNG AVKFPQLCKF

51 CDVRFSTCDN QKSCMSNCSI TSICEKPQEV

CVAVWRKNDE NITLETVCHD

101 PKLPYHDFIL EDAASPKCIM KEKKKPGETF

FMCSCSSDEC NDNIIFSEEY
```

Any of the above variants (SEQ ID NO: 36, 28, 29, 30, 38, 37, 33, 34, 39, 32, 31, and 35) could incorporate an insertion of 36 amino acids (SEQ ID NO: 41) between the pair of glutamate residues (positions 151 and 152 of SEQ ID NO: 1, or positions 176 and 177 of SEQ ID NO: 2) located near the C-terminus of the hTβRII ECD, as occurs naturally in the hTβRII isoform C (Konrad et al., BMC Genomics 8:318, 2007).

```
                              (SEQ ID NO: 41)
    GRCKIRHIGS NNRLQRSTCQ NTGWESAHVM KTPGFR
```

As an example, the paired glutamate residues flanking the optional insertion site are denoted below (underlined) for the hTβRII$_{short}$(29-159) variant (SEQ ID NO: 28).

```
                                   (SEQ ID NO: 28)
  1 QKSVNNDMIV TDNNGAVKFP QLCKFCDVRF

STCDNQKSCM SNCSITSICE

51 KPQEVCVAVW RKNDENITLE TVCHDPKLPY

HDFILEDAAS PKCIMKEKKK

101 PGETFEMCSC SSDECNDNII FSEEYNTSNP D
```

Fc Domain Variants

While the constructs described above were generated with an Fc domain having the amino acid sequence of SEQ ID NO: 20, the disclosure contemplates hTRII-hFc fusion proteins comprising alternative Fc domains, including a human IgG2 Fc domain (SEQ ID NO: 42, below) or full-length human IgG1 Fc (hG1Fc) (SEQ ID NO: 43, below). Optionally, a polypeptide unrelated to an Fc domain could be attached in place of the Fc domain.

```
                                   (SEQ ID NO: 42)
  1 VECPPCPAPP VAGPSVFLFP PKPKDTLMIS

RTPEVTCVVV DVSHEDPEVQ

51 FNWYVDGVEV HNAKTKPREE QFNSTFRVVS

VLIVVHQDWL NGKEYKCKVS

101 NKGLPAPIEK TISKTKGQPR EPQVYTLPPS

REEMTKNQVS LTCLVKGFYP

151 SDIAVEWESN GQPENNYKTT PPMLDSDGSF

FLYSKLTVDK SRWQQGNVFS

201 CSVMHEALHN HYTQKSLSLS PGK
```

The C-terminal lysine residue of the Fe domain can be deleted. The amino acid sequence of SEQ ID NO: 42 may optionally be provided with the lysine removed from the C-terminus (SEQ ID NO: 73):

```
                                   (SEQ ID NO: 43)
  1 VECPPCPAPP VAGPSVFLFP PKPKDTLMIS

RTPEVTCVVV DVSHEDPEVQ

51 FNWYVDGVEV HNAKTKPREE QFNSTFRVVS

VLTVVHQDWL NGKEYKCKVS

101 NKGLPAPIEK TISKTKGQPR EPQVYTLPPS

REEMTKNQVS LTCLVKGFYP

151 SDIAVEWESN GQPENNYKTT PPMLDSDGSF

FLYSKLTVDK SRWQQGNVFS

201 CSVMHEALHN HYTQKSLSLS PG (SEQ ID NO: 73)
  1 GGPKSCDKTH TCPPCPAPEL LGGPSVELFP

PKPKDTLMIS RTPEVTCVVV

51 DVSHEDPEVK FNWYVDGVEV HNAKTKPREE

QYNSTYRVVS VLTVLHQDWL

101 NGKEYKCKVS NKALPAPIEK TISKAKGQPR

EPQVYTLPPS REEMTKNQVS

151 LTCLVKGFYP SDIAVEWESN GQPENNYKTT

PPVLDSDGSF FLYSKLTVDK

201 SRWQQGNVFS CSVMHEALHN HYTQKSLSLS

PGK
```

The C-terminal lysine residue of the Fc domain can be deleted. The amino acid sequence of SEQ ID NO: 43 may optionally be provided with the lysine removed from the C-terminus (SEQ ID NO: 74):

```
                                   (SEQ ID NO: 74)
  1 GGPKSCDKTH TCPPCPAPEL LGGPSVFLFP

PKPKDTLMIS RTPEVTCVVV

51 DVSHEDPEVK FNWYVDGVEV HNAKTKPREE

QYNSTYRVVS VLTVLHQDWL

101 NGKEYKCKVS NKALPAPIEK TISKAKGQPR

EPQVYTLPPS REEMTKNQVS

151 LTCLVKGFYP SDIAVEWESN GQPENNYKTT

PPVLDSDGSF FLYSKLTVDK

201 SRWQQGNVFS CSVMHEALHN HYTQKSLSLS

PG
```

Leader Sequence Variants

While the generated constructs described above included the TPA leader sequence, alternative leader sequences may be used, such as the native leader sequence (SEQ ID NO: 22-below) or the honey bee melittin (SEQ ID NO: 24—below) leader sequences.

```
Native:
                                   (SEQ ID NO: 22)
    MGRGLLRGLWPLHIVLWTRIAS Honey bee melittin (HBML):
                                   (SEQ ID NO: 24)
    MKFLVNVALVEMVVYISYIYA
``` mTβRII-mFc mTβRII-mFc comprises murine TβRII extracellular domain and murine IgG2a Fc. The signal sequence is underlined. The linker in mTβRII-mFc is TGGG (SEQ ID NO: 9), bolded and underlined below. The human version (SEQ ID NO: 48) has a longer linker (SEQ ID NO: 6). The unprocessed sequence (SEQ ID NO: 84) is below:

```
                                   (SEQ ID NO: 84)
  1 MDAMKRGLCC VLLLCGAVFV SPGAIPPHVP

KSDVEMEAQK DASIHLSCNR

51 TIHPLKHFNS DVMASDNGGA VKLPQLCKFC

DVRLSTCDNQ KSCMSNCSIT
```

```
101 AICEKPHEVC VAVWRKNDKN ITLETVCHDP
    KLTYHGFTLE DAASPKCVMK
151 EKKRAGETFF MCACNMEECN DYIIFSEEYT
    TSSPDTGGGE PRVPITQNPC
201 PPLKECPPCA APDLLGGPSV FIFPPKIKDV
    LMISLSPMVT CVVVDVSEDD
251 PDVQISWFVN NVEVHTAQTQ THREDYNSTL
    RVVSALPIQH QDWMSGKEFK
301 CKVNNRALPS PIEKTISKPR GPVRAPQVYV
    LPPPAEEMTK KEFSLTCMIT
351 GFLPAEIAVD WTSNGRTEQN YKNTATVLDS
    DGSYFMYSKL RVQKSTWERG
401 SLFACSVVHE GLHNHLTTKT ISRSLGK*
```

The mature version of mTβRII-mFc is shown as SEQ ID NO: 85:

```
                                  (SEQ ID NO: 85)
  1 IPPHVPKSDV EMEAQKDASI HLSCNRTIHP
    LKHENSDVMA SDNGGAVKLP
 51 QLCKFCDVRL STCDNQKSCM SNCSITAICE
    KPHEVCVAVW RKNDKNITLE
101 TVCHDPKLTY HGFTLEDAAS PKCVMKEKKR
    AGETFFMCAC NMEECNDYII
151 FSEEYTTSSP DTGGGEPRVP ITQNPCPPLK
    ECPPCAAPDL LGGPSVFIFP
201 PKIKDVLMIS LSPMVTCVVV DVSEDDPDVQ
    ISWFVNNVEV HTAQTQTHRE
251 DYNSTLRVVS ALPIQHQDWM SGKEFKCKVN
    NRALPSPIEK TISKPRGPVR
301 APQVYVLPPP AEEMTKKEFS LTCMITGFLP
    AEIAVDWTSN GRTEQNYKNT
351 ATVLDSDGSY FMYSKLRVQK STWERGSLFA
    CSVVHEGLHN HLTTKTISRS
401 LGK
```

Furthermore, the C-terminal lysine residue of the Fc domain can be deleted. The amino acid sequence of SEQ ID NO: 84 may optionally be provided with the lysine removed from the C-terminus (SEQ ID NO: 86)

```
                                  (SEQ ID NO: 86)
  1 IPPHVPKSDV EMEAQKDASI HLSCNRTIHP
    LKHFNSDVMA SDNGGAVKLP
 51 QLCKFCDVRL STCDNQKSCM SNCSITAICE
    KPHEVCVAVW RKNDKNITLE
101 TVCHDPKLTY HGFTLEDAAS PKCVMKEKKR
    AGETFFMCAC NMEECNDYII
151 FSEEYTTSSP DTGGGEPRVP ITQNPCPPLK
    ECPPCAAPDL LGGPSVFIFP
201 PKIKDVLMIS LSPMVTCVVV DVSEDDPDVQ
    ISWFVNNVEV HTAQTQTHRE
251 DYNSTLRVVS ALPIQHQDWM SGKEFKCKVN
    NRALPSPIEK TISKPRGPVR
301 APQVYVLPPP AEEMTKKEFS LTCMITGFLP
    AEIAVDWTSN GRTEQNYKNT
351 ATVLDSDGSY FMYSKLRVQK STWERGSLFA
    CSVVHEGLHN HLTTKTISRS
401 LG
``` mTβRII-mFc Nucleic Acid Sequence (SEQ ID NO: 87):

```
                                  (SEQ ID NO: 87)
  1 ATGGATGCAA TGAAGAGAGG GCTCTGCTGT
    GTGCTGCTGC TGTGTGGAGC
 51 AGTCTTCGTT TCGCCCGGCG CCATCCCGCC
    GCACGTTCCC AAGTCGGATG
101 TGGAAATGGA AGCCCAGAAA GATGCATCCA
    TCCACCTAAG CTGTAATAGG
151 ACCATCCATC CACTGAAACA TTTTAACAGT
    GATGTCATGG CCAGCGACAA
201 TGGCGGTGCG GTCAAGCTTC CACAGCTGTG
    CAAGTTTTGC GATGTGAGAC
251 TGTCCACTTG CGACAACCAG AAGTCCTGCA
    TGAGCAACTG CAGCATCACG
301 GCCATCTGTG AGAAGCCGCA TGAAGTCTGC
    GTGGCCGTGT GGAGGAAGAA
351 CGACAAGAAC ATTACTCTGG AGACGGTTTG
    CCACGACCCC AAGCTCACCT
401 ACCACGGCTT CACTCTGGAA GATGCCGCTT
    CTCCCAAGTG TGTCATGAAG
451 GAAAAGAAAA GGGCGGGCGA GACTTTCTTC
    ATGTGTGCCT GTAACATGGA
501 AGAGTGCAAC GATTACATCA TCTTTTCGGA
    AGAATACACC ACCAGCAGTC
```

-continued

```
 551 CCGACACCGG TGGGGGTGAG CCCAGAGTGC
     CCATAACACA GAACCCCTGT
 601 CCTCCACTCA AAGAGTGTCC CCCATGCGCA
     GCTCCAGACC TCTTGGGTGG
 651 ACCATCCGTC TTCATCTTCC CTCCAAAGAT
     CAAGGATGTA CTCATGATCT
 701 CCCTGAGCCC CATGGTCACA TGTGTGGTGG
     TGGATGTGAG CGAGGATGAC
 751 CCAGACGTCC AGATCAGCTG GTTTGTGAAC
     AACGTGGAAG TACACACAGC
 801 TCAGACACAA ACCCATAGAG AGGATTACAA
     CAGTACTCTC CGGGTGGTCA
 851 GTGCCCTCCC CATCCAGCAC CAGGACTGGA
     TGAGTGGCAA GGAGTTCAAA
 901 TGCAAGGTCA ACAACAGAGC CCTCCCATCC
     CCCATCGAGA AAACCATCTC
 951 AAAACCCAGA GGGCCAGTAA GAGCTCCACA
     GGTATATGTC TTGCCTCCAC
1001 CAGCAGAAGA GATGACTAAG AAAGAGTTCA
     GTCTGACCTG CATGATCACA
1051 GGCTTCTTAC CTGCCGAAAT TGCTGTGGAC
     TGGACCAGCA ATGGGCGTAC
1101 AGAGCAAAAC TACAAGAACA CCGCAACAGT
     CCTGGACTCT GATGGTTCTT
1151 ACTTCATGTA CAGCAAGCTC AGAGTACAAA
     AGAGCACTTG GGAAAGAGGA
1201 AGTCTTTTCG CCTGCTCAGT GGTCCACGAG
     GGTCTGCACA ATCACCTTAC
1251 GACTAAGACC ATCTCCCGGT CTCTGGGTAA
     ATGA
```

Example 2. Differential Ligand Inhibition by Receptor Fusion Protein Variants in Cell-Based Assay Affinities of TGFβ1, TGFβ2 and TGFβ3 for hTβRII (G4S)2-hFc; hTβRII (G4S)3-hFc; hTβRII (G4S)4-hFc; hTβRII-hFc; and hTβRII extended hinge-hFc proteins were evaluated in vitro with a Biacore™ instrument, and the results are summarized in FIGS. 4A and 4B. Each of the fusion proteins was capable of binding TGFβ1 and TGFβ3 with high affinity, but the constructs having linker lengths longer than or equal to (G4S)4 (SEQ ID NO: 59) were surprisingly capable of binding to both TGFβ1 and TGFβ3 with higher affinity than constructs having linker lengths shorter than (G4S)4 (SEQ ID NO: 59). Binding between TGFβ2 and any of the constructs was low or transient. Deglycosylation of the constructs did not change binding.

A reporter gene assay in A549 cells was used to determine the ability of hTβRII-hFc variants to inhibit activity of TGFβ1, TGFβ2 and TGFβ3. This assay is based on a human lung carcinoma cell line transfected with a pGL3(CAGA)$_{12}$ reporter plasmid (Dennler et al, 1998, EMBO 17: 3091-3100) as well as a Renilla reporter plasmid (pRLCMV) to control for transfection efficiency. The CAGA motif is present in the promoters of TGFβ-responsive genes (for example, PAI-1), so this vector is of general use for factors signaling through SMAD2 and SMAD3.

On the first day of the assay, A549 cells (ATCC®: CCL-185™) were distributed in 48-well plates. On the second day, a solution containing pGL3(CAGA)$_{12}$, pRLCMV, X-tremeGENE 9 (Roche Applied Science), and OptiMEM (Invitrogen) was preincubated, then added to Eagle's minimum essential medium (EMEM, ATCC®) supplemented with 0.1% BSA, which was applied to the plated cells for incubation overnight at 37° C., 5% CO$_2$. On the third day, medium was removed, and cells were incubated overnight at 37° C., 5% CO$_2$ with a mixture of ligands and inhibitors prepared as described below.

Serial dilutions of test articles were made in a 48-well plate in assay buffer (EMEM+0.1% BSA). An equal volume of assay buffer containing the test ligand was added to obtain a final ligand concentration equal to the EC50 determined previously. Human TGFβ1, human TGFβ2, and human TGFβ3 were obtained from PeproTech. Test solutions were incubated at 37° C. for 30 minutes, then a portion of the mixture was added to all wells. After incubation with test solutions overnight, cells were rinsed with phosphate-buffered saline, then lysed with passive lysis buffer (Promega E1941) and stored overnight at −70° C. On the fourth and final day, plates were warmed to room temperature with gentle shaking. Cell lysates were transferred in duplicate to a chemiluminescence plate (96-well) and analyzed in a luminometer with reagents from a Dual-Luciferase Reporter Assay system (Promega E1980) to determine normalized luciferase activity.

Figure 5A:
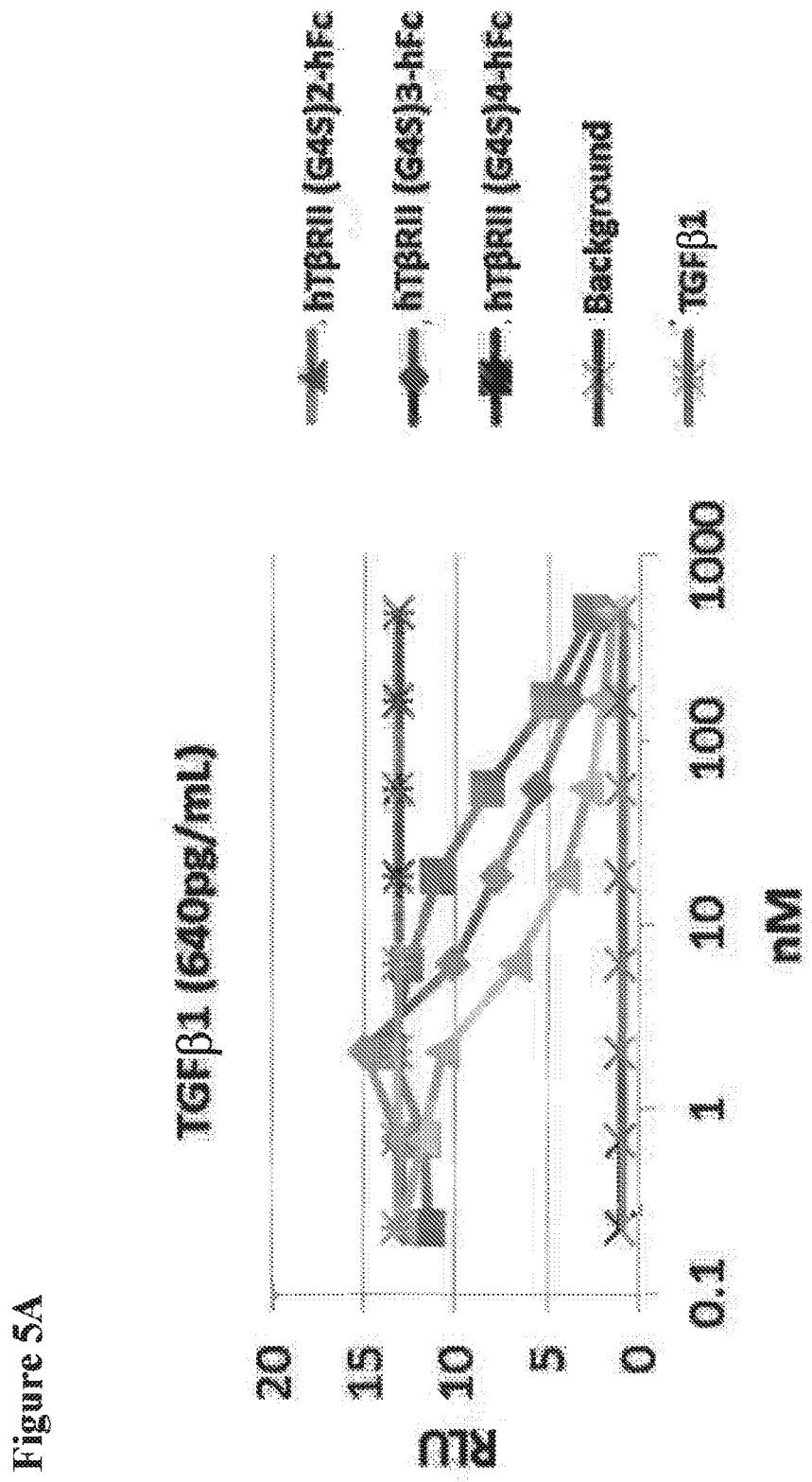
FIGS. 5A and 5C graph the results from reporter gene assays testing the affinity of TGFβ1 for one of several different TβRII-Fc fusion protein constructs.
Figure 5B:
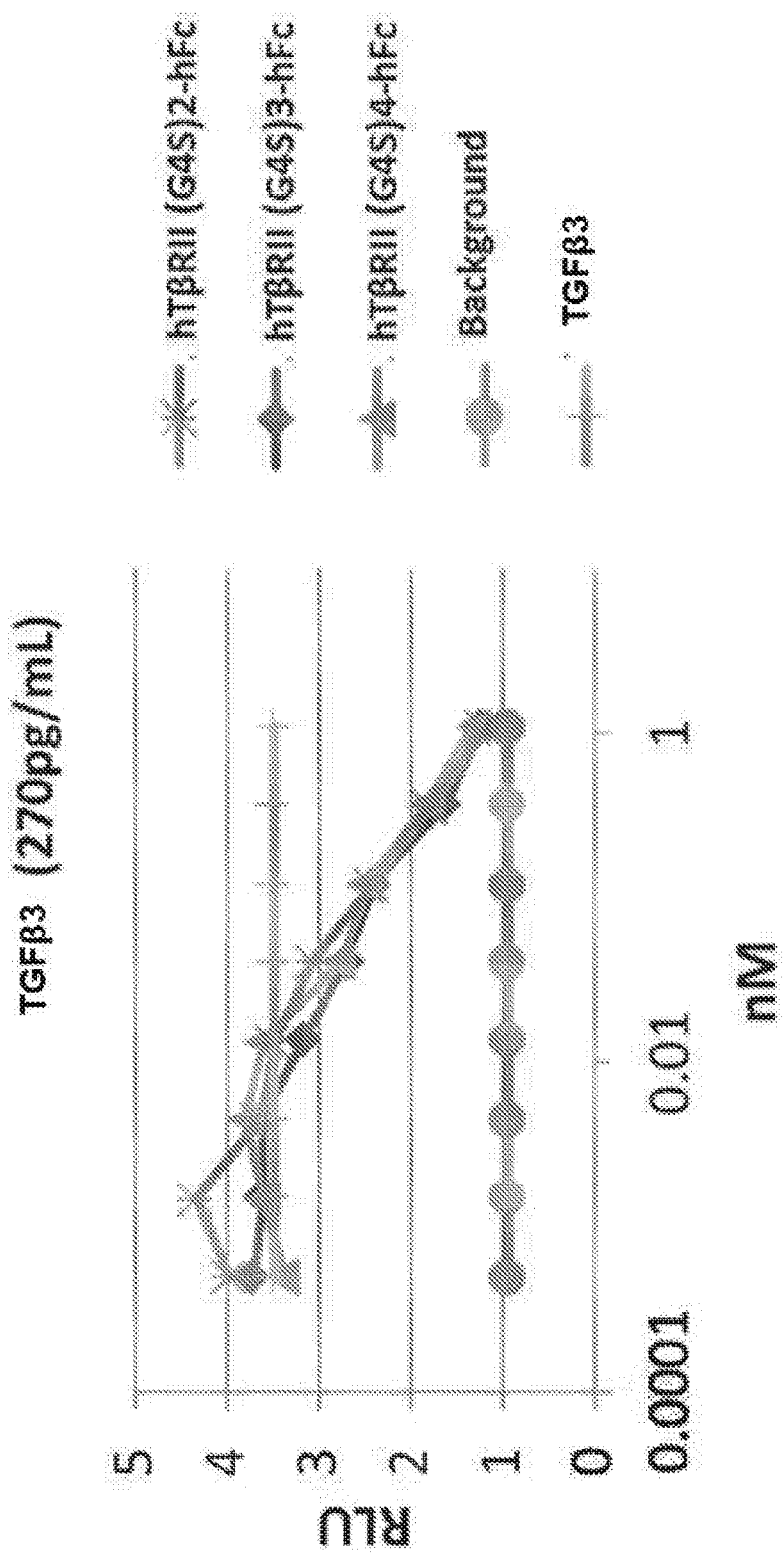
FIGS. 5B and 5D graph the results from reporter gene assays testing the affinity of the TGFβ3 for one of several different TβRII-Fc fusion protein constructs.
Figure 5C:
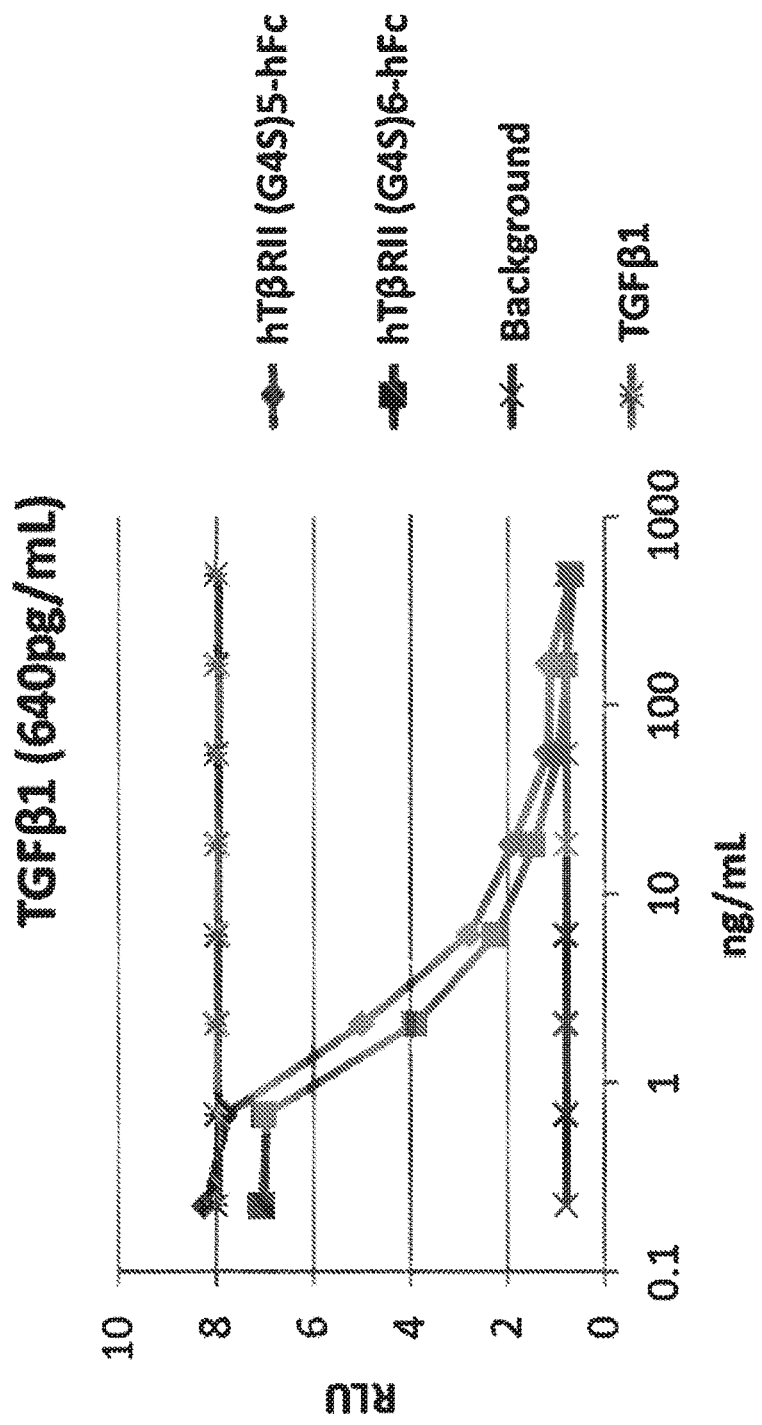
Figure 5D:
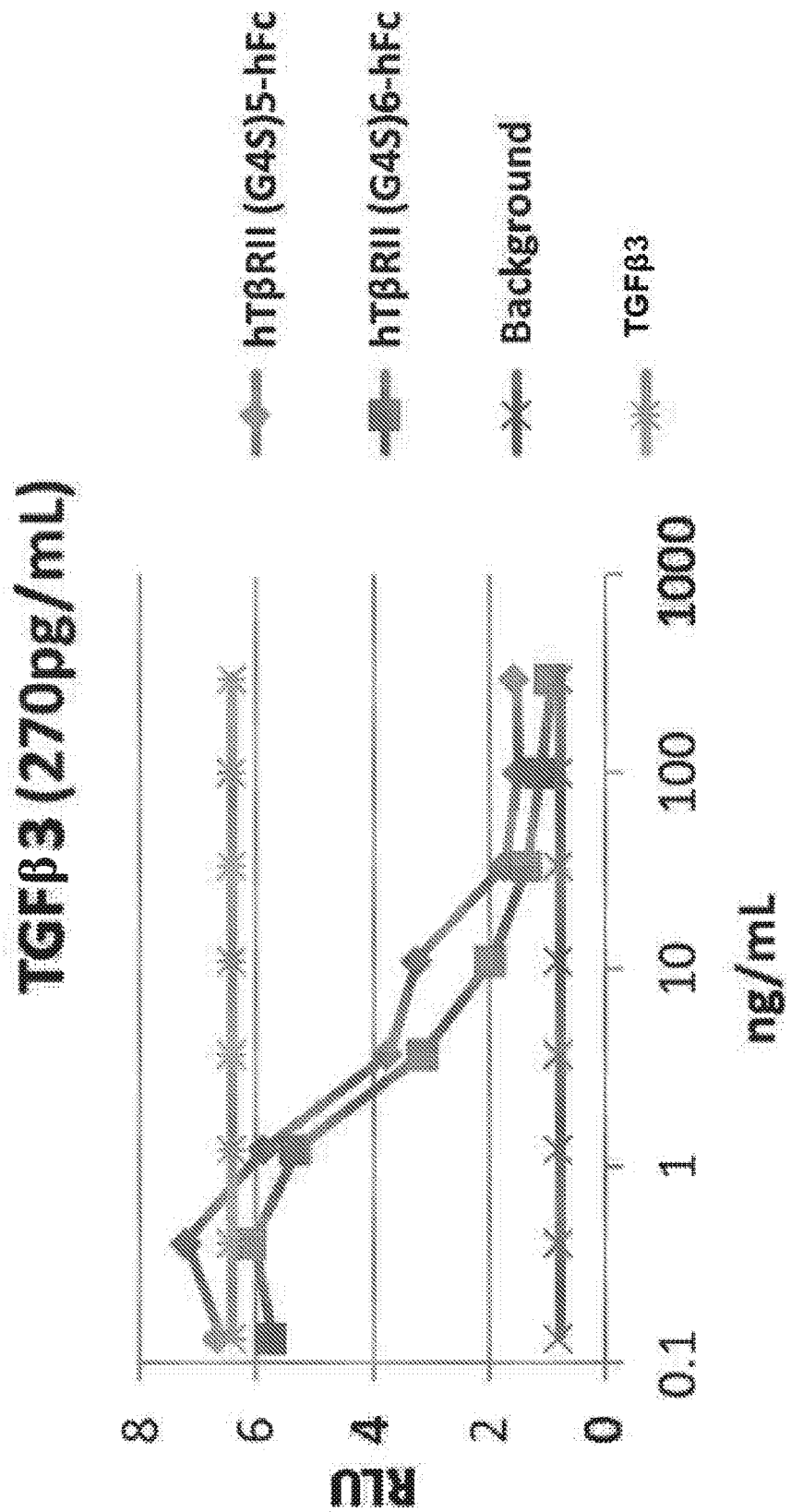

As illustrated in FIGS. 5A-5F, the hTβRII (G4S)2-hFc; hTβRII (G4S)3-hFc; hTβRII (G4S)4-hFc; hTβRII (G4S)5-hFc; hTβRII (G4S)6-hFc; hTβRII-hFc; and hTβRII extended hinge-hFc proteins all were capable of inhibiting both TGFβ1 and TGFβ3. Interestingly, while there was a correlation between improved TGFβ1 and TGFβ3 inhibition and linker length for the hTβRII (G4S)2-hFc; hTβRII (G4S) 3-hFc and hTβRII (G4S)4-hFc constructs (FIG. 5E), this improvement trend appeared to have plateaued for hTβRII (G4S)5-hFc and hTβRII (G4S)6-hFc constructs (FIG. 5F).

Example 3. Clinical Testing and Evaluation in SSc-ILD

TGF-β Receptor Type II (TβRII) polypeptides and/or pharmaceutical compositions comprising TGF-β Receptor Type II (TβRII) polypeptides of the present disclosure may be tested clinically for success in treatment of the disease, tolerability, safety, and efficacy, among other possible endpoints.

Study Design 1
Inclusion Criteria
A study comprising healthy volunteers, male or female, aged 18 and older is conducted.
Study Design
In this study, single ascending doses (SAD) of one or more pharmaceutical compositions comprising TβRII polypeptides of the present disclosure are administered to approximately 40 subjects. The subjects are divided into five cohorts of eight subjects each. Within each cohort, six subjects receive active drug (e.g. compositions comprising one or more TβRII polypeptides of the present disclosure), and two subjects receive a placebo. Cohorts are distinguished by dose level, with a six week interval between each cohort, assessing for safety between each cohort. There is an eight week interval for cohort 3, giving time to review and assess pharmacokinetics (PK) data. At the 4$^{th}$ cohort level, a decision is made to determine if multiple ascending doses (MAD) should be considered.

Study Endpoints

Primary endpoints comprise safety and tolerability evaluations of the administered drug.

Secondary endpoints comprise pharmacokinetics (PK) parameters and/or serum TGF-β measurement.

Analysis

Pharmacokinetics (PK) is the determination of the fate of a substance in a living organism. Specifically, a substance is followed through liberation (release of a drug from a pharmaceutical formulation), absorption (process of a substance entering blood circulation), distribution (dispersion/dissemination of substances through fluids and/or tissues in the body), metabolism (irreversible transformation of parent compounds into daughter metabolites), and excretion (removal of substances from a body).

Common pharmacokinetic metrics are shown in Table 1 below. All or some of these metrics, among others, are determined and analyzed as a secondary endpoint of the study.

TABLE 1

Common Pharmacokinetic Metrics

| Characteristic | Description | Symbol | Unit | Formula |
|---|---|---|---|---|
| Dose | Amount of drug administered | D | mol | Study design parameter |
| Dosing interval | Time between drug dose administrations | τ | s | Study design parameter |
| $C_{max}$ | Peak plasma concentration of a drug after administration | $C_{max}$ | M | Direct measurement |
| $t_{max}$ | Time to reach Cmax | $t_{max}$ | s | Direct measurement |
| $C_{min}$ | Lowest concentration that a drug reaches before the next dose is administered | $C_{min,ss}$ | M | Direct measurement |
| Volume of distribution | Apparent volume in which a drug is distributed | $V_d$ | m$^3$ | $\dfrac{D}{C_0}$ |
| Concentration | Amount of drug in a given volume of plasma | $C_0, C_{ss}$ | M | $\dfrac{D}{V_d}$ |
| Elimination half-life | Time required for concentration of drug to reach half of its original value | $t_{1/2}$ | s | $\dfrac{\ln(2)}{k_e}$ |
| Elimination rate constant | Rate at which a drug is removed from the body | $k_e$ | s$^{-1}$ | $\dfrac{\ln(2)}{t_{1/2}} = \dfrac{CL}{V_d}$ |
| Infusion rate | Rate of infusion required to balance elimination | $k_{in}$ | mol/s | $C_{ss} \cdot CL$ |
| Area under the curve | Integral of concentration-time curve | $AUC_{0-\infty}$ | M · s | $\int_0^\infty C dt$ |
| | | $AUC_{\tau,ss}$ | M · s | $\int_t^{t+\tau} C dt$ |
| Clearance | Volume of plasma cleared of drug per unit of time | CL | m$^3$/s | $V_d \cdot k_e = \dfrac{D}{AUC}$ |
| Bioavailability | Systemically available fraction of a drug | f | Unitless | $\dfrac{AUC_{po} \cdot D_{iv}}{AUC_{iv} \cdot D_{po}}$ |
| Fluctuation | Peak trough fluctuation within one dosing interval at steady state | % PTF | % | $\dfrac{C_{max,ss} - C_{min,ss}}{C_{av,ss}} \cdot 100\%$ where $C_{av} = \dfrac{1}{\tau} AUC_{\tau,ss}$ |

Bioanalytical methods known to one of skill in the art can be used to determine and map a concentration vs. time profile. Concentrations of a substance are typically measured in a patient's plasma sample. For complicated biomatrices such as plasma, for example, analysis may be done using mass spectrometry.

Other patient characteristics may also be monitored to determine any correlation to drug performance. Patient demographics, body weight, excretory and metabolic system functions, presence/absence of other medications, among other aspects, may be determined and monitored throughout a study.

Study Design 2
Inclusion Criteria

A study comprising male or female patients who have been diagnosed with systemic sclerosis, and are aged 18 and older, is conducted. Patient forced vital capacity (FVC) should be between about 40% and about 80% at baseline, and the patient should have at least 10% fibrosis present on a high-resolution computed topography (HRCT) scan of the lungs to be eligible for the study.

Exclusion Criteria

Patients with systemic sclerosis and pulmonary arterial hypertension (PAH) are excluded from the study.

Study Design

In this study, one or more pharmaceutical compositions comprising TβRII polypeptides of the present disclosure are administered to approximately 132 subjects, accounting for an approximate 15% drop out rate. The subjects are divided into three cohorts. Cohort 1 comprises 8 patients in a 3:1 ratio—6 patients receive active drug (e.g. compositions comprising one or more TβRII polypeptides of the present disclosure), and two patients receive a placebo. Cohort 2 comprises 62 patients in a 1:1 ratio—31 patients receive active drug (e.g. compositions comprising one or more TβRII polypeptides of the present disclosure) and 31 patients receive a placebo. A total of 12 patients with 3 complete cycles will then escalate to the next dose level. In this group, 6 patients receive active drug (e.g. compositions comprising one or more TβRII polypeptides of the present disclosure), and 6 patients receive a placebo. Cohort 3 comprises 62 patients in a 1:1 ratio—31 patients receive active drug (e.g. compositions comprising one or more TβRII polypeptides of the present disclosure) and 31 patients receive a placebo.

Study Endpoints

Primary endpoints comprise safety and tolerability evaluations of the administered drug. Further, a primary endpoint is a predicted percentage of FVC at 52 weeks post-treatment (e.g. annual rate of decline in FVC): a treatment effect of 4.2%, SD=6%, over placebo.

Secondary endpoints comprise pharmacokinetics (PK) parameters as described above, as well as Modified Rodnan Skin Score (mRSS), fibrosis biomarkers (e.g. serum levels of KL-6, SP-D, CCL18, etc.), time to event of clinical worsening or death, and quality of life.

Analysis

Spirometry, or the measuring of breath, is a major pulmonary function test that can determine the volume and/or speed (flow) of air that is inhaled and exhaled. A spirometer is used to measure forced vital capacity (FVC) (measured in liters) in a forced expiratory volume (FEV) test. In the test, a patient takes a deep breath, and exhales into the sensor as hard and as long as possible (at least 6 seconds). Inhalation can also be tested. An FEV test is typically repeated three times to ensure accuracy. Normal ranges for FVC are between 80% and 100% predicted. Other typical measurements are FEV1, wherein the FVC is measured within the first second of forced exhalation, and also forced expiratory flow (FEF), which is the flow of air coming out of the lung during the middle portion of forced expiration.

Modified Rodnan Skin Score (mRSS) is a measure of skin thickness and is commonly used to analyze systemic sclerosis outcomes.

Study Design 3
Inclusion Criteria

In this study, one or more pharmaceutical compositions comprising TβRII polypeptides of the present disclosure are administered to approximately 600 subjects, with approximately 300 subjects per arm (one arm is active drug, and the second arm is a placebo). Treatment will last for approximately 48 weeks.

Study Endpoints

Primary endpoints comprise an improved percentage of FVC at 52 weeks post-treatment (e.g. annual rate of decline in FVC).

Secondary endpoints comprise Modified Rodnan Skin Score (mRSS), fibrosis biomarkers (e.g. serum levels of KL-6, SP-D, CCL18, etc.), and time to event of clinical worsening or death.

Analysis

FVC, mRSS, and/or biomarker levels can be analyzed using methods as described herein.

Example 4. Dose Schedule Testing of mTβRII-mFc in a Mouse Model of SSc-ILD

Anti-fibrotic effects of mTβRII-mFc, a murine version of a fusion protein that selectively binds to TGF-β1 and TGF-β3, were assessed using different dosing regimens in a mouse bleomycin model of SSc-ILD. Lung fibrosis in this model was induced by bleomycin infused through subcutaneously implanted mini-pumps (Liang, M. et al., Laboratory Investigation, 2015, 95, pp. 342-350).

Male 6-8-week old C57BL/6 mice were obtained from Jackson Laboratories and divided into study groups (Table 2). Mice were administered saline (Group 1, Control) or bleomycin (Groups 2-9) by osmotic mini-pumps implanted subcutaneously (s.c.) under the back skin. Bleomycin was dosed at 100 U/kg and infused at 0.25 uL/hr over a period of 28 days.

Control mice were given subcutaneous injections of PBS (10 uL/g; "Control") twice per week over a 28 day period. Bleomycin treated mice were given subcutaneous injections of either PBS (10 uL/g; "Vehicle"), Pan TGFβ1-3 antibody (10 mg/kg; "Pan TGFβ1-3 Ab"), or a specified dose and frequency of mTβRII-mFc. Both the Vehicle and Pan TGFβ1-3 Ab groups were administered PBS and Pan TGFβ1-3 Ab, respectively, twice per week over a 28 day period Mice given mTβRII-mFc were subcutaneously injected with either 3 mg/kg mTβRII-mFc, 10 mg/kg mTβRII-mFc, or 100 mg/kg mTβRII-mFc on two different dosing schedules. One subset was dosed with mTβRII-mFc once every two weeks over a 28 day period and a second subset was dosed with mTβRII-mFc twice per week over a 28 day period. The two different dosing schedules are denoted in FIG. 6 by white bars (e.g., twice per week, on day 7, day 10, day 14, day 17, day 21, day 24, and day 28) or grey bars (e.g., once every two weeks, on day 7 and day 21). At the completion of the study, mice were euthanized for blood and lung tissue collection.

TABLE 2

Mouse SSc-ILD Study Design

| Group | N | Injury | Treatment | Dosing schedule | Dose | Dosing Conc. | Route |
|---|---|---|---|---|---|---|---|
| 1 "Control" | 10 | Saline | PBS | D 7, D 10, D 14, D 17, D 21, D 24, D 28 | 10 uL/g (equivolume to treatment groups) | — | s.c. |
| 2 "Vehicle" | 10 | Bleo | PBS | D 7, D 10, D 14, D 17, D 21, D 24, D 28 | 10 uL/g (equivolume to treatment groups) | — | s.c. |
| 3 "Pan TGFβ1-3 Ab" | 10 | Bleo | Pan TGFβ1-3 Ab | D 7, D 10, D 14, D 17, D 21, D 24, D 28 | 10 mg/kg | 2 mg/mL | s.c. |
| 4 "mTBβII-mFc (3 mg/kg)" grey bars | 10 | Bleo | mTβRII-mFc | D 7, D 21 | 3 mg/kg | 0.6 mg/mL | s.c. |
| 5 "mTβRII-mFc (10 mg/kg)" grey bars | 10 | Bleo | mTβRII-mFc | D 7, D 21 | 10 mg/kg | 2 mg/mL | s.c. |
| 6 "mTβRII-mFc (100 mg/kg)" grey bars | 10 | Bleo | mTβRII-mFc | D 7, D 21 | 100 mg/kg | 20 mg/mL | s.c. |
| 7 "mTβRII-mFc (3 mg/kg)" white bars | 10 | Bleo | mTβRII-mFc | D 7, D 10, D 14, D 17, D 21, D 24, D 28 | 3 mg/kg | 0.6 mg/mL | s.c. |
| 8 "mTβRII-mFc (10 mg/kg)" white bars | 10 | Bleo | mTβRII-mFc | D 7, D 10, D 14, D 17, D 21, D 24, D 28 | 10 mg/kg | 2 mg/mL | s.c. |
| 9 "mTβRII-mFc (100 mg/kg)" white bars | 10 | Bleo | mTβRII-mFc | D 7, D 10, D 14, D 17, D 21, D 24, D 28 | 100 mg/kg | 20 mg/mL | s.c. |

Figure 6:
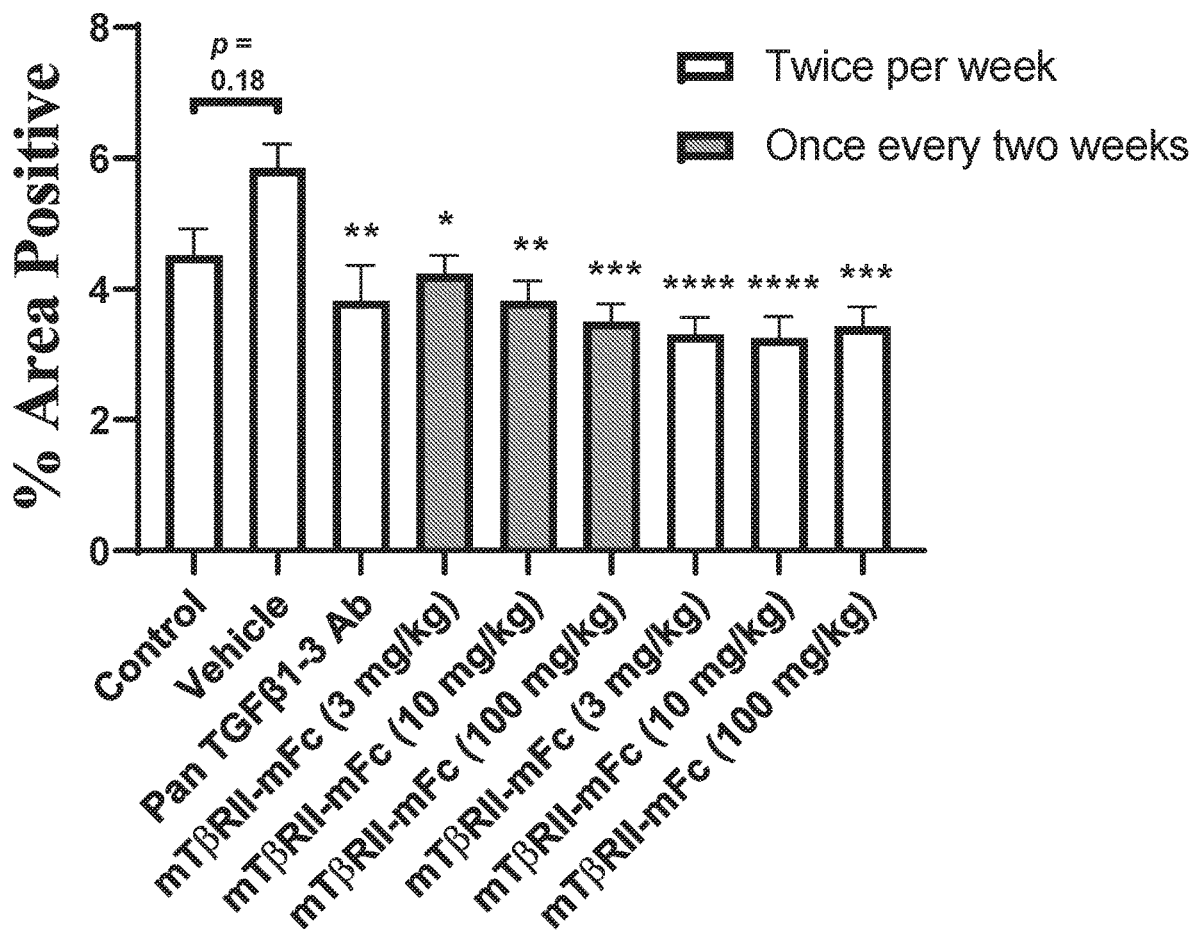
FIG. 6 shows anti-fibrotic effects of mTβRII-mFc, a murine fusion protein that selectively binds to TGF-β1 and TGF-β3, in a mouse model of SSc-ILD induced by bleomycin infusion. mTβRII-mFc is administered at different doses under different dosing schedules. Control mice were given subcutaneous injections of PBS (10 uL/g; "Control") twice per week over a 28 day period. Bleomycin treated mice were given subcutaneous injections of either PBS (10 uL/g; "Vehicle"), Pan TGFβ1-3 antibody (10 mg/kg; "Pan TGFβ1-3 Ab"), or a specified dose and frequency of mTβRII-mFc. Both the Vehicle and Pan TGFβ1-3 Ab groups were administered PBS and Pan TGFβ1-3 Ab, respectively, twice per week over a 28 day period Mice given mTβRII-mFc were subcutaneously injected with either 3 mg/kg mTβRII-mFc, 10 mg/kg mTβRII-mFc, or 100 mg/kg mTβRII-mFc on two different dosing schedules. One subset was dosed with mTβRII-mFc once every two weeks over a 28 day period and a second group was dosed with mTβRII-mFc twice per week over a 28 day period. The two different dosing schedules are denoted by white bars (e.g., twice per week, on day 7, day 10, day 14, day 17, day 21, day 24, and day 28) or grey bars (e.g., once every two weeks, on day 7 and day 21). Lung fibrosis was assessed by picrosirius red collagen staining with quantitative image analysis. Bleomycin vehicle-treated mice ("Vehicle") showed an increasing trend in picrosirius red staining relative to saline-infused controls ("Control"). This increasing trend was significantly inhibited by mTβRII-mFc at all doses and all dosing frequencies tested. Statistical analysis (One way ANOVA with Dunnett's post hoc tests): *$p \leq 0.05$, $p \leq 0.01$, *$p \leq 0.001$, ****$p \leq 0.0001$ vs "Vehicle".

The extent of lung fibrosis was assessed using picrosirius red collagen stain (PSR) with quantitative image analysis using HALO software (Indica Lab Albuquerque, NM). Bleomycin vehicle-treated mice ("Vehicle") showed an increasing trend in picrosirius red staining relative to saline-infused controls ("Control"). This increasing trend was significantly inhibited by mTβRII-mFc at all doses and all dosing frequencies tested. Bleomycin infusion resulted in an increase in the percent of lung tissue area staining with picrosirius red (e.g., more collagen was present). Administration of mTβRII-mFc prevented an increase in picrosirius red staining in bleomycin treated mice at all doses of mTβRII-mFc tested (e.g., 3 mg/kg, 10 mg/kg, and 100 mg/kg of mTβRII-mFc) at all frequencies tested (FIG. 6, white bars and grey bars) in comparison to the Vehicle group. Dosing of mTβRII-mFc on a schedule of day 7, day 10, day 14, day 17, day 21, day 24, and day 28 (FIG. 6, white bars) reduced picrosirius red staining to a similar extent as dosing of mTβRII-mFc on a dosing schedule of only day 7 and day 21 (FIG. 6, grey bars).

This data demonstrates that mTβRII-mFc has anti-fibrotic effects in a bleomycin mouse model of SSc-ILD with using multiple dosing schedules. This data suggests that other TP3RII antagonists, particularly those that inhibit at least TGFβ1 and TGFβ3, may be useful in the treatment of SSc and specific pulmonary complications associated with SSc-ILD.

INCORPORATION BY REFERENCE

All publications and patents mentioned herein are hereby incorporated by reference in their entirety as if each individual publication or patent was specifically and individually indicated to be incorporated by reference.

While specific embodiments of the subject matter have been discussed, the above specification is illustrative and not restrictive. Many variations will become apparent to those skilled in the art upon review of this specification and the claims below. The full scope of the invention should be determined by reference to the claims, along with their full scope of equivalents, and the specification, along with such variations.

We claim:

1. A method of treating systemic sclerosis, comprising administering a Transforming Growth Factor-β Receptor II (TβRII) antagonist consisting of the amino acid sequence of SEQ ID NO: 67 to a subject in need thereof.

2. The method of claim 1, wherein the systemic sclerosis is systemic sclerosis associated with interstitial lung disease (SSc-ILD).

3. The method of claim 1, wherein the systemic sclerosis is diffuse systemic sclerosis (dcSSc).

4. The method of claim 1, wherein the subject has a forced vital capacity (FVC) of greater than or equal to 50% of predicted as measured by spirometry, and wherein the administration slows the annual rate of decline in FVC.

5. The method of claim 1, wherein the subject has at least 10% fibrosis of the lungs as determined by HRCT, or wherein the subject has a diffusing capacity for carbon monoxide (DLCO) of greater than or equal to 40% of predicted as measured by a rapidly responding gas analyzer (RGA).

6. The method of claim 1, wherein the administration improves a modified rodnan skin score (mRSS) of the subject, wherein the administration improves a St. George's Respiratory Questionnaire (SGRQ) score of the subject, wherein the administration improves a Composite Response Index in Systemic Sclerosis (CRISS) score of the subject, wherein the administration improves a King's Brief Interstitial Lung Disease (KBILD) score of the subject, wherein the administration improves a Health Assessment Questionnaire-Diability Index (HAQ-DI) score of the subject, or wherein the administration improves a physical/physician global assessment score of the subject.

7. The method of claim 1, wherein the subject has an increased level of one or more biomarkers selected from the group consisting of αSMA, ADAM12, Anti-HSP70 IgG, BAFF, BLyS, C3M, C4M, C6M, Ca15.3, CC16, CCL2, CCL18, Col1a1, Col3a1, CTGF, CXCL4, E-selectin, ET-1, fibronectin, ICAM, IL-6, IL-8, KL-6, MCP-1, MMP7, MMP12, Muc5B, Osteopontin, PAI-1, periostin, pro-C3, pro-C4, pro-C6, SP-A, SP-D, Tnfa, VCAM, VEGF, WFDC2 (HE4), C-reactive protein (CRP), and YKL-40.

8. The method of claim 1, wherein a dose of the TβRII antagonist comprises between about 0.75 mg/kg to about 6.0 mg/kg of the antagonist.

9. The method of claim 1, wherein the TβRII antagonist is administered subcutaneously.

10. The method of claim 1, wherein the method further comprises administration of one or more of abatacept, abituzumab, ajulemic acid, ambrisentan, AVID200, AVID300, azathioprine, BCD-089, belimumab, BG00011, BMS-986020, bortezomib, bosentan, brentuximab, carlumab, CC-90001, clazakizumab, COR-001, cyclophosphamide (CYC), cyclosporine A, dectrekumab, EHP-101, elzonris/SL-401, etanercept, FCX-013, fresolimumab, GLPG1690, GASK2126458, GSK2330811, GSK3008348, IBIO-CFB03, ifetroban, IFNγ, imatinib, immune globulin, IW001, lanifibranor, lebrikizumab, levilimab, losartan, macitentan, MEDI-5117, MSCs, mycophenolate mofetil (MMF), NAC, nandrolone decanoate, olokizumab, pamrevlumab, pirfenidone, pirfenidone and vismodegib, pomalidomide, PRM-151, riociguat, rituximab, SAR156597, sildenafil, siltuximab, simtuzumab, sirolimus, sirukumab, tacrolimus, tadalafil, tanzisertib, TD139, tetrathiomolybdate, tocilizumab, tralokinumab, treprostinil, vobarilizumab, warfarin, zileuton, and ziltivekimab.

11. The method of claim 1, wherein the antagonist is glycosylated.

* * * * *

SEQUENCE LISTING

<160> NUMBER OF SEQ ID NOS: 90

<210> SEQ ID NO 1
<211> LENGTH: 567
<212> TYPE: PRT
<213> ORGANISM: Homo sapiens

<400> SEQUENCE: 1

```
Met Gly Arg Gly Leu Leu Arg Gly Leu Trp Pro Leu His Ile Val Leu
1               5                   10                  15

Trp Thr Arg Ile Ala Ser Thr Ile Pro Pro His Val Gln Lys Ser Val
                20                  25                  30

Asn Asn Asp Met Ile Val Thr Asp Asn Asn Gly Ala Val Lys Phe Pro
            35                  40                  45

Gln Leu Cys Lys Phe Cys Asp Val Arg Phe Ser Thr Cys Asp Asn Gln
        50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Gly Lys Lys Lys
        115                 120                 125

Pro Gly Glu Thr Phe Phe Met Cys Ser Cys Ser Ser Asp Glu Cys Asn
130                 135                 140

Asp Asn Ile Ile Phe Ser Glu Glu Tyr Asn Thr Ser Asn Pro Asp Leu
145                 150                 155                 160

Leu Leu Val Ile Phe Gln Val Thr Gly Ile Ser Leu Leu Pro Pro Leu
                165                 170                 175

Gly Val Ala Ile Ser Val Ile Ile Ile Phe Tyr Cys Tyr Arg Val Asn
            180                 185                 190

Arg Gln Gln Lys Leu Ser Ser Thr Trp Glu Thr Gly Lys Thr Arg Lys
        195                 200                 205

Leu Met Glu Phe Ser Glu His Cys Ala Ile Ile Leu Glu Asp Asp Arg
210                 215                 220

Ser Asp Ile Ser Ser Thr Cys Ala Asn Asn Ile Asn His Asn Thr Glu
225                 230                 235                 240

Leu Leu Pro Ile Glu Leu Asp Thr Leu Val Gly Lys Gly Arg Phe Ala
                245                 250                 255

Glu Val Tyr Lys Ala Lys Leu Lys Gln Asn Thr Ser Glu Gln Phe Glu
            260                 265                 270

Thr Val Ala Val Lys Ile Phe Pro Tyr Glu Glu Tyr Ala Ser Trp Lys
        275                 280                 285

Thr Glu Lys Asp Ile Phe Ser Asp Ile Asn Leu Lys His Glu Asn Ile
290                 295                 300

Leu Gln Phe Leu Thr Ala Glu Glu Arg Lys Thr Glu Leu Gly Lys Gln
305                 310                 315                 320

Tyr Trp Leu Ile Thr Ala Phe His Ala Lys Gly Asn Leu Gln Glu Tyr
                325                 330                 335

Leu Thr Arg His Val Ile Ser Trp Glu Asp Leu Arg Lys Leu Gly Ser
            340                 345                 350

Ser Leu Ala Arg Gly Ile Ala His Leu His Ser Asp His Thr Pro Cys
        355                 360                 365

Gly Arg Pro Lys Met Pro Ile Val His Arg Asp Leu Lys Ser Ser Asn
370                 375                 380

Ile Leu Val Lys Asn Asp Leu Thr Cys Cys Leu Cys Asp Phe Gly Leu
385                 390                 395                 400
```

```
Ser Leu Arg Leu Asp Pro Thr Leu Ser Val Asp Asp Leu Ala Asn Ser
                405                 410                 415

Gly Gln Val Gly Thr Ala Arg Tyr Met Ala Pro Glu Val Leu Glu Ser
            420                 425                 430

Arg Met Asn Leu Glu Asn Val Glu Ser Phe Lys Gln Thr Asp Val Tyr
        435                 440                 445

Ser Met Ala Leu Val Leu Trp Glu Met Thr Ser Arg Cys Asn Ala Val
    450                 455                 460

Gly Glu Val Lys Asp Tyr Glu Pro Pro Phe Gly Ser Lys Val Arg Glu
465                 470                 475                 480

His Pro Cys Val Glu Ser Met Lys Asp Asn Val Leu Arg Asp Arg Gly
            485                 490                 495

Arg Pro Glu Ile Pro Ser Phe Trp Leu Asn His Gln Gly Ile Gln Met
        500                 505                 510

Val Cys Glu Thr Leu Thr Glu Cys Trp Asp His Asp Pro Glu Ala Arg
    515                 520                 525

Leu Thr Ala Gln Cys Val Ala Glu Arg Phe Ser Glu Leu Glu His Leu
    530                 535                 540

Asp Arg Leu Ser Gly Arg Ser Cys Ser Glu Glu Lys Ile Pro Glu Asp
545                 550                 555                 560

Gly Ser Leu Asn Thr Thr Lys
                565

<210> SEQ ID NO 2
<211> LENGTH: 592
<212> TYPE: PRT
<213> ORGANISM: Homo sapiens

<400> SEQUENCE: 2

Met Gly Arg Gly Leu Leu Arg Gly Leu Trp Pro Leu His Ile Val Leu
1               5                   10                  15

Trp Thr Arg Ile Ala Ser Thr Ile Pro Pro His Val Gln Lys Ser Asp
            20                  25                  30

Val Glu Met Glu Ala Gln Lys Asp Glu Ile Ile Cys Pro Ser Cys Asn
        35                  40                  45

Arg Thr Ala His Pro Leu Arg His Ile Asn Asn Asp Met Ile Val Thr
    50                  55                  60

Asp Asn Asn Gly Ala Val Lys Phe Pro Gln Leu Cys Lys Phe Cys Asp
65                  70                  75                  80

Val Arg Phe Ser Thr Cys Asp Asn Gln Lys Ser Cys Met Ser Asn Cys
                85                  90                  95

Ser Ile Thr Ser Ile Cys Glu Lys Pro Gln Glu Val Cys Val Ala Val
            100                 105                 110

Trp Arg Lys Asn Asp Glu Asn Ile Thr Leu Glu Thr Val Cys His Asp
        115                 120                 125

Pro Lys Leu Pro Tyr His Asp Phe Ile Leu Glu Asp Ala Ala Ser Pro
    130                 135                 140

Lys Cys Ile Met Lys Glu Lys Lys Lys Pro Gly Glu Thr Phe Phe Met
145                 150                 155                 160

Cys Ser Cys Ser Ser Asp Glu Cys Asn Asp Asn Ile Ile Phe Ser Glu
                165                 170                 175

Glu Tyr Asn Thr Ser Asn Pro Asp Leu Leu Leu Val Ile Phe Gln Val
            180                 185                 190
```

```
Thr Gly Ile Ser Leu Leu Pro Pro Leu Gly Val Ala Ile Ser Val Ile
            195                 200                 205
Ile Ile Phe Tyr Cys Tyr Arg Val Asn Arg Gln Gln Lys Leu Ser Ser
    210                 215                 220
Thr Trp Glu Thr Gly Lys Thr Arg Lys Leu Met Glu Phe Ser Glu His
225                 230                 235                 240
Cys Ala Ile Ile Leu Glu Asp Asp Arg Ser Asp Ile Ser Ser Thr Cys
                245                 250                 255
Ala Asn Asn Ile Asn His Asn Thr Glu Leu Leu Pro Ile Glu Leu Asp
            260                 265                 270
Thr Leu Val Gly Lys Gly Arg Phe Ala Glu Val Tyr Lys Ala Lys Leu
        275                 280                 285
Lys Gln Asn Thr Ser Glu Gln Phe Glu Thr Val Ala Val Lys Ile Phe
    290                 295                 300
Pro Tyr Glu Glu Tyr Ala Ser Trp Lys Thr Glu Lys Asp Ile Phe Ser
305                 310                 315                 320
Asp Ile Asn Leu Lys His Glu Asn Ile Leu Gln Phe Leu Thr Ala Glu
                325                 330                 335
Glu Arg Lys Thr Glu Leu Gly Lys Gln Tyr Trp Leu Ile Thr Ala Phe
            340                 345                 350
His Ala Lys Gly Asn Leu Gln Glu Tyr Leu Thr Arg His Val Ile Ser
        355                 360                 365
Trp Glu Asp Leu Arg Lys Leu Gly Ser Ser Leu Ala Arg Gly Ile Ala
    370                 375                 380
His Leu His Ser Asp His Thr Pro Cys Gly Arg Pro Lys Met Pro Ile
385                 390                 395                 400
Val His Arg Asp Leu Lys Ser Ser Asn Ile Leu Val Lys Asn Asp Leu
                405                 410                 415
Thr Cys Cys Leu Cys Asp Phe Gly Leu Ser Leu Arg Leu Asp Pro Thr
            420                 425                 430
Leu Ser Val Asp Asp Leu Ala Asn Ser Gly Gln Val Gly Thr Ala Arg
        435                 440                 445
Tyr Met Ala Pro Glu Val Leu Glu Ser Arg Met Asn Leu Glu Asn Val
    450                 455                 460
Glu Ser Phe Lys Gln Thr Asp Val Tyr Ser Met Ala Leu Val Leu Trp
465                 470                 475                 480
Glu Met Thr Ser Arg Cys Asn Ala Val Gly Glu Val Lys Asp Tyr Glu
                485                 490                 495
Pro Pro Phe Gly Ser Lys Val Arg Glu His Pro Cys Val Glu Ser Met
            500                 505                 510
Lys Asp Asn Val Leu Arg Asp Arg Gly Arg Pro Glu Ile Pro Ser Phe
        515                 520                 525
Trp Leu Asn His Gln Gly Ile Gln Met Val Cys Glu Thr Leu Thr Glu
    530                 535                 540
Cys Trp Asp His Asp Pro Glu Ala Arg Leu Thr Ala Gln Cys Val Ala
545                 550                 555                 560
Glu Arg Phe Ser Glu Leu Glu His Leu Asp Arg Leu Ser Gly Arg Ser
                565                 570                 575
Cys Ser Glu Glu Lys Ile Pro Glu Asp Gly Ser Leu Asn Thr Thr Lys
            580                 585                 590

<210> SEQ ID NO 3
<211> LENGTH: 4
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Thr Gly Gly Gly
1

<210> SEQ ID NO 4
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Thr Gly Gly Gly Gly Ser Gly Gly Gly Gly Ser
1               5                   10

<210> SEQ ID NO 5
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Thr Gly Gly Gly Gly Ser Gly Gly Gly Gly Ser Gly Gly Gly Gly Ser
1               5                   10                  15

<210> SEQ ID NO 6
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Thr Gly Gly Gly Gly Ser Gly Gly Gly Gly Ser Gly Gly Gly Gly Ser
1               5                   10                  15

Gly Gly Gly Gly Ser
            20

<210> SEQ ID NO 7
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Thr Gly Gly Gly Pro Lys Ser Cys Asp Lys
1               5                   10

<210> SEQ ID NO 8
<211> LENGTH: 1248
<212> TYPE: DNA
<213> ORGANISM: Artificial Sequence
<220> FEATURE:
<223> OTHER INFORMATION: Description of Artificial Sequence: Synthetic
      polynucleotide
```

<400> SEQUENCE: 8

```
atggatgcaa tgaagagagg gctctgctgt gtgctgctgc tgtgtggagc agtcttcgtt      60
tcgcccggcg ccacgatccc accgcacgtt cagaagtcgg atgtggaaat ggaggcccag     120
aaagatgaaa tcatctgccc cagctgtaat aggactgccc atccactgag acatattaat     180
aacgacatga tagtcactga caacaacggt gcagtcaagt tccacaact gtgtaaattt      240
tgtgatgtga gattttccac ctgtgacaac cagaaatcct gcatgagcaa ctgcagcatc     300
acctccatct gtgagaagcc acaggaagtc tgtgtggctg tatggagaaa gaatgacgag     360
aacataacac tagagacagt ttgccatgac cccaagctcc cctaccatga ctttattctg     420
gaagatgctg cttctccaaa gtgcattatg aaggaaaaaa aaaagcctgg tgagactttc     480
ttcatgtgtt cctgtagctc tgatgagtgc aatgacaaca tcatcttctc agaagaatat     540
aacaccagca atcctgacac cggtggtgga actcacacat gcccaccgtg cccagcacct     600
gaactcctgg ggggaccgtc agtcttcctc ttccccccaa acccaaggga caccctcatg     660
atctcccgga cccctgaggt cacatgcgtg gtggtggacg tgagccacga agaccctgag     720
gtcaagttca actggtacgt ggacggcgtg gaggtgcata atgccaagac aaagccgcgg     780
gaggagcagt acaacagcac gtaccgtgtg gtcagcgtcc tcaccgtcct gcaccaggac     840
tggctgaatg gcaaggagta caagtgcaag gtctccaaca aagccctccc agcccccatc     900
gagaaaacca tctccaaagc caagggcag ccccgagaac cacaggtgta caccctgccc      960
ccatcccggg aggagatgac caagaaccag gtcagcctga cctgcctggt caaaggcttc    1020
tatcccagcg acatcgccgt ggagtgggag agcaatgggc agccggagaa caactacaag    1080
accacgcctc ccgtgctgga ctccgacggc tccttcttcc tctatagcaa gctcaccgtg    1140
gacaagagca ggtggcagca ggggaacgtc ttctcatgct ccgtgatgca tgaggctctg    1200
cacaaccact acacgcagaa gagcctctcc ctgtctccgg gtaaatga               1248
```

<210> SEQ ID NO 9
<211> LENGTH: 415
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 9

```
Met Asp Ala Met Lys Arg Gly Leu Cys Cys Val Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125
```

```
His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Thr His
            180                 185                 190

Thr Cys Pro Pro Cys Pro Ala Pro Glu Leu Leu Gly Gly Pro Ser Val
            195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Pro Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Ser Arg Glu Glu Met Thr Lys Asn Gln Val Ser Leu Thr Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 10
<211> LENGTH: 1284
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 10
atggatgcaa tgaagagagg gctctgctgt gtgctgctgc tgtgtggagc agtcttcgtt      60
tcgcccggcg ccacgatccc accgcacgtt cagaagtcgg atgtggaaat ggaggcccag     120
aaagatgaaa tcatctgccc cagctgtaat aggactgccc atccactgag acatattaat     180
aacgacatga tagtcactga caacaacggt gcagtcaagt tccacaact gtgtaaattt      240 tgtgatgtga gattttccac ctgtgacaac cagaaatcct gcatgagcaa ctgcagcatc      300
acctccatct gtgagaagcc acaggaagtc tgtgtggctg tatggagaaa gaatgacgag      360
aacataacac tagagacagt ttgccatgac cccaagctcc cctaccatga ctttattctg      420
```

```
gaagatgctg cttctccaaa gtgcattatg aaggaaaaaa aaaagcctgg tgagactttc      480
ttcatgtgtt cctgtagctc tgatgagtgc aatgacaaca tcatcttctc agaagaatat      540
aacaccagca atcctgacac cggtggtgga ggaagtggtg gaggtggttc tggaggtggt      600
ggaagtactc acacatgccc accgtgccca gcacctgaac tcctgggggg accgtcagtc      660
ttcctcttcc ccccaaaacc caaggacacc ctcatgatct cccggacccc tgaggtcaca      720
tgcgtggtgg tggacgtgag ccacgaagac cctgaggtca agttcaactg gtacgtggac      780
ggcgtggagg tgcataatgc caagacaaag ccgcgggagg agcagtacaa cagcacgtac      840
cgtgtggtca gcgtcctcac cgtcctgcac caggactggc tgaatggcaa ggagtacaag      900
tgcaaggtct ccaacaaagc cctcccagcc cccatcgaga aaaccatctc caaagccaaa      960
gggcagcccc gagaaccaca ggtgtacacc ctgcccccat cccgggagga gatgaccaag     1020
aaccaggtca gcctgacctg cctggtcaaa ggcttctatc ccagcgacat cgccgtggag     1080
tgggagagca atgggcagcc ggagaacaac tacaagacca cgcctcccgt gctggactcc     1140
gacggctcct tcttcctcta tagcaagctc accgtggaca agagcaggtg gcagcagggg     1200
aacgtcttct catgctccgt gatgcatgag gctctgcaca accactacac gcagaagagc     1260
ctctccctgt ctccgggtaa atga                                            1284
```

<210> SEQ ID NO 11
<211> LENGTH: 427
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

```
Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Gly Gly Gly Gly Ser Thr His Thr Cys Pro Pro
        195                 200                 205
```

Cys Pro Ala Pro Glu Leu Leu Gly Gly Pro Ser Val Phe Leu Phe Pro
            210                 215                 220

Pro Lys Pro Lys Asp Thr Leu Met Ile Ser Arg Thr Pro Glu Val Thr
225                 230                 235                 240

Cys Val Val Val Asp Val Ser His Glu Asp Pro Glu Val Lys Phe Asn
                245                 250                 255

Trp Tyr Val Asp Gly Val Glu Val His Asn Ala Lys Thr Lys Pro Arg
            260                 265                 270

Glu Glu Gln Tyr Asn Ser Thr Tyr Arg Val Val Ser Val Leu Thr Val
        275                 280                 285

Leu His Gln Asp Trp Leu Asn Gly Lys Glu Tyr Lys Cys Lys Val Ser
    290                 295                 300

Asn Lys Ala Leu Pro Ala Pro Ile Glu Lys Thr Ile Ser Lys Ala Lys
305                 310                 315                 320

Gly Gln Pro Arg Glu Pro Gln Val Tyr Thr Leu Pro Pro Ser Arg Glu
                325                 330                 335

Glu Met Thr Lys Asn Gln Val Ser Leu Thr Cys Leu Val Lys Gly Phe
            340                 345                 350

Tyr Pro Ser Asp Ile Ala Val Glu Trp Glu Ser Asn Gly Gln Pro Glu
        355                 360                 365

Asn Asn Tyr Lys Thr Thr Pro Pro Val Leu Asp Ser Asp Gly Ser Phe
370                 375                 380

Phe Leu Tyr Ser Lys Leu Thr Val Asp Lys Ser Arg Trp Gln Gln Gly
385                 390                 395                 400

Asn Val Phe Ser Cys Ser Val Met His Glu Ala Leu His Asn His Tyr
                405                 410                 415

Thr Gln Lys Ser Leu Ser Leu Ser Pro Gly Lys
            420                 425

<210> SEQ ID NO 12
<211> LENGTH: 1299
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 12
atggatgcaa tgaagagagg gctctgctgt gtgctgctgc tgtgtggagc agtcttcgtt      60
tcgcccggcg ccacgatccc accgcacgtt cagaagtcgg atgtggaaat ggaggcccag     120
aaagatgaaa tcatctgccc cagctgtaat aggactgccc atccactgag acatattaat     180
aacgacatga tagtcactga caacaacggt gcagtcaagt tccacaact gtgtaaattt      240 tgtgatgtga gattttccac ctgtgacaac cagaaatcct gcatgagcaa ctgcagcatc     300
acctccatct gtgagaagcc acaggaagtc tgtgtggctg tatggagaaa gaatgacgag     360
aacataacac tagagacagt ttgccatgac cccaagctcc cctaccatga cttattctg      420 gaagatgctg cttctccaaa gtgcattatg aaggaaaaaa aaaagcctgg tgagactttc     480
ttcatgtgtt cctgtagctc tgatgagtgc aatgacaaca tcatcttctc agaagaatat     540
aacaccagca atcctgacac cggtggtgga ggttctggag tggaggaag tggtggaggt     600 ggttctggag tggtggaag tactcacaca tgcccaccgt gcccagcacc tgaactcctg     660
gggggaccgt cagtcttcct cttccccca aaacccaagg acaccctcat gatctcccgg     720
acccctgagg tcacatgcgt ggtggtggac gtgagccacg aagaccctga ggtcaagttc     780

```
aactggtacg tggacggcgt ggaggtgcat aatgccaaga caaagccgcg ggaggagcag    840
tacaacagca cgtaccgtgt ggtcagcgtc ctcaccgtcc tgcaccagga ctggctgaat    900
ggcaaggagt acaagtgcaa ggtctccaac aaagccctcc cagcccccat cgagaaaacc    960
atctccaaag ccaagggca gccccgagaa ccacaggtgt acaccctgcc cccatcccgg   1020
gaggagatga ccaagaacca ggtcagcctg acctgcctgg tcaaaggctt ctatcccagc   1080
gacatcgccg tggagtggga gagcaatggg cagccggaga caactacaa gaccacgcct   1140 cccgtgctgg actccgacgg ctccttcttc ctctatagca agctcaccgt ggacaagagc   1200
aggtggcagc aggggaacgt cttctcatgc tccgtgatgc atgaggctct gcacaaccac   1260
tacacgcaga agagcctctc cctgtctccg ggtaaatga                          1299
```

<210> SEQ ID NO 13
<211> LENGTH: 432
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

```
Met Asp Ala Met Lys Arg Gly Leu Cys Cys Val Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Ser
            180                 185                 190

Gly Gly Gly Gly Ser Gly Gly Gly Ser Gly Gly Gly Ser Thr
        195                 200                 205

His Thr Cys Pro Pro Cys Pro Ala Pro Glu Leu Leu Gly Gly Pro Ser
    210                 215                 220

Val Phe Leu Phe Pro Pro Lys Pro Lys Asp Thr Leu Met Ile Ser Arg
225                 230                 235                 240

Thr Pro Glu Val Thr Cys Val Val Val Asp Val Ser His Glu Asp Pro
                245                 250                 255
```

```
Glu Val Lys Phe Asn Trp Tyr Val Asp Gly Val Val His Asn Ala
            260                 265                 270
Lys Thr Lys Pro Arg Glu Glu Gln Tyr Asn Ser Thr Tyr Arg Val Val
        275                 280                 285
Ser Val Leu Thr Val Leu His Gln Asp Trp Leu Asn Gly Lys Glu Tyr
    290                 295                 300
Lys Cys Lys Val Ser Asn Lys Ala Leu Pro Ala Pro Ile Glu Lys Thr
305                 310                 315                 320
Ile Ser Lys Ala Lys Gly Gln Pro Arg Glu Pro Gln Val Tyr Thr Leu
                325                 330                 335
Pro Pro Ser Arg Glu Glu Met Thr Lys Asn Gln Val Ser Leu Thr Cys
            340                 345                 350
Leu Val Lys Gly Phe Tyr Pro Ser Asp Ile Ala Val Glu Trp Glu Ser
        355                 360                 365
Asn Gly Gln Pro Glu Asn Asn Tyr Lys Thr Thr Pro Pro Val Leu Asp
    370                 375                 380
Ser Asp Gly Ser Phe Phe Leu Tyr Ser Lys Leu Thr Val Asp Lys Ser
385                 390                 395                 400
Arg Trp Gln Gln Gly Asn Val Phe Ser Cys Ser Val Met His Glu Ala
                405                 410                 415
Leu His Asn His Tyr Thr Gln Lys Ser Leu Ser Leu Ser Pro Gly Lys
            420                 425                 430

<210> SEQ ID NO 14
<211> LENGTH: 1269
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 14
atggatgcaa tgaagagagg gctctgctgt gtgctgctgc tgtgtggagc agtcttcgtt      60
tcgcccggcg ccacgatccc accgcacgtt cagaagtcgg atgtggaaat ggaggcccag     120
aaagatgaaa tcatctgccc cagctgtaat aggactgccc atccactgag acatattaat     180
aacgacatga tagtcactga caacaacggt gcagtcaagt ttccacaact gtgtaaattt     240
tgtgatgtga gattttccac ctgtgacaac cagaaatcct gcatgagcaa ctgcagcatc     300
acctccatct gtgagaagcc acaggaagtc tgtgtggctg tatggagaaa gaatgacgag     360
aacataacac tagagacagt ttgccatgac cccaagctcc cctaccatga ctttattctg     420
gaagatgctg cttctccaaa gtgcattatg aaggaaaaaa aaaagcctgg tgagactttc     480
ttcatgtgtt cctgtagctc tgatgagtgc aatgacaaca tcatcttctc agaagaatat     540
aacaccagca atcctgacac cggtggaggt ggttctggag gtggtggaag tactcacaca     600
tgcccaccgt gcccagcacc tgaactcctg ggggaccgt cagtcttcct cttccccca      660
aaacccaagg acaccctcat gatctcccgg acccctgagg tcacatgcgt ggtggtggac     720
gtgagccacg aagaccctga ggtcaagttc aactggtacg tggacggcgt ggaggtgcat     780
aatgccaaga caaagccgcg ggaggagcag tacaacagca cgtaccgtgt ggtcagcgtc     840
ctcaccgtcc tgcaccagga ctggctgaat ggcaaggagt acaagtgcaa ggtctccaac     900
aaagccctcc cagcccccat cgagaaaacc atctccaaag ccaagggca gccccgagaa      960
ccacaggtgt acaccctgcc cccatcccgg gaggagatga ccaagaacca ggtcagcctg    1020
```

-continued

```
acctgcctgg tcaaaggctt ctatcccagc gacatcgccg tggagtggga gagcaatggg    1080
cagccggaga caactacaa gaccacgcct cccgtgctgg actccgacgg ctccttcttc     1140
ctctatagca agctcaccgt ggacaagagc aggtggcagc aggggaacgt cttctcatgc    1200
tccgtgatgc atgaggctct gcacaaccac tacacgcaga gagcctctc cctgtctccg     1260 ggtaaatga                                                             1269

<210> SEQ ID NO 15
<211> LENGTH: 422
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Met Asp Ala Met Lys Arg Gly Leu Cys Cys Val Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Ser
            180                 185                 190

Gly Gly Gly Gly Ser Thr His Thr Cys Pro Pro Cys Pro Ala Pro Glu
        195                 200                 205

Leu Leu Gly Gly Pro Ser Val Phe Leu Phe Pro Pro Lys Pro Lys Asp
    210                 215                 220

Thr Leu Met Ile Ser Arg Thr Pro Glu Val Thr Cys Val Val Val Asp
225                 230                 235                 240

Val Ser His Glu Asp Pro Glu Val Lys Phe Asn Trp Tyr Val Asp Gly
                245                 250                 255

Val Glu Val His Asn Ala Lys Thr Lys Pro Arg Glu Glu Gln Tyr Asn
            260                 265                 270

Ser Thr Tyr Arg Val Val Ser Val Leu Thr Val Leu His Gln Asp Trp
        275                 280                 285

Leu Asn Gly Lys Glu Tyr Lys Cys Lys Val Ser Asn Lys Ala Leu Pro
    290                 295                 300
```

```
Ala Pro Ile Glu Lys Thr Ile Ser Lys Ala Lys Gly Gln Pro Arg Glu
305                 310                 315                 320

Pro Gln Val Tyr Thr Leu Pro Pro Ser Arg Glu Met Thr Lys Asn
            325                 330                 335

Gln Val Ser Leu Thr Cys Leu Val Lys Gly Phe Tyr Pro Ser Asp Ile
            340                 345                 350

Ala Val Glu Trp Glu Ser Asn Gly Gln Pro Glu Asn Asn Tyr Lys Thr
            355                 360                 365

Thr Pro Pro Val Leu Asp Ser Asp Gly Ser Phe Phe Leu Tyr Ser Lys
    370                 375                 380

Leu Thr Val Asp Lys Ser Arg Trp Gln Gln Gly Asn Val Phe Ser Cys
385                 390                 395                 400

Ser Val Met His Glu Ala Leu His Asn His Tyr Thr Gln Lys Ser Leu
                405                 410                 415

Ser Leu Ser Pro Gly Lys
            420
```

<210> SEQ ID NO 16
<211> LENGTH: 1266
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 16

| | | |
|---|---|---|
| atggatgcaa tgaagagagg gctctgctgt gtgctgctgc tgtgtggagc agtcttcgtt | 60 |
| tcgcccggcg ccacgatccc accgcacgtt cagaagtcgg atgtggaaat ggaggcccag | 120 |
| aaagatgaaa tcatctgccc cagctgtaat aggactgccc atccactgag acatattaat | 180 |
| aacgacatga tagtcactga caacaacggt gcagtcaagt ttccacaact gtgtaaattt | 240 |
| tgtgatgtga gattttccac ctgtgacaac cagaaatcct gcatgagcaa ctgcagcatc | 300 |
| acctccatct gtgagaagcc acaggaagtc tgtgtggctg tatggagaaa gaatgacgag | 360 |
| aacataacac tagagacagt ttgccatgac cccaagctcc cctaccatga ctttattctg | 420 |
| gaagatgctg cttctccaaa gtgcattatg aaggaaaaaa aaaagcctgg tgagactttc | 480 |
| ttcatgtgtt cctgtagctc tgatgagtgc aatgacaaca tcatcttctc agaagaatat | 540 |
| aacaccagca atcctgacac cggtggtgga cccaaatctt gtgacaaaac tcacacatgc | 600 |
| ccaccgtgcc cagcacctga actcctgggg ggaccgtcag tcttcctctt ccccccaaaa | 660 |
| cccaaggaca ccctcatgat ctcccggacc cctgaggtca catgcgtggt ggtggacgtg | 720 |
| agccacgaag accctgaggt caagttcaac tggtacgtgg acggcgtgga ggtgcataat | 780 |
| gccaagacaa agccgcggga ggagcagtac aacagcacgt accgtgtggt cagcgtcctc | 840 |
| accgtcctgc accaggactg gctgaatggc aaggagtaca agtgcaaggt ctccaacaaa | 900 |
| gccctcccag cccccatcga gaaaaccatc tccaaagcca agggcagccc cgagaacca | 960 |
| caggtgtaca ccctgccccc atcccgggag gagatgacca agaaccaggt cagcctgacc | 1020 |
| tgcctggtca aaggcttcta tcccagcgac atcgccgtgg agtgggagag caatgggcag | 1080 |
| ccggagaaca actacaagac cacgcctccc gtgctggact ccgacggctc cttcttcctc | 1140 |
| tatagcaagc tcaccgtgga caagagcagg tggcagcagg gaacgtcttc tcatgctcc | 1200 |
| gtgatgcatg aggctctgca caaccactac acgcagaaga gcctctccct gtccccgggt | 1260 |
| aaatga | 1266 |

```
<210> SEQ ID NO 17
<211> LENGTH: 421
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Pro Lys
            180                 185                 190

Ser Cys Asp Lys Thr His Thr Cys Pro Pro Cys Pro Ala Pro Glu Leu
        195                 200                 205

Leu Gly Gly Pro Ser Val Phe Leu Phe Pro Pro Lys Pro Lys Asp Thr
    210                 215                 220

Leu Met Ile Ser Arg Thr Pro Glu Val Thr Cys Val Val Val Asp Val
225                 230                 235                 240

Ser His Glu Asp Pro Glu Val Lys Phe Asn Trp Tyr Val Asp Gly Val
                245                 250                 255

Glu Val His Asn Ala Lys Thr Lys Pro Arg Glu Glu Gln Tyr Asn Ser
            260                 265                 270

Thr Tyr Arg Val Val Ser Val Leu Thr Val Leu His Gln Asp Trp Leu
        275                 280                 285

Asn Gly Lys Glu Tyr Lys Cys Lys Val Ser Asn Lys Ala Leu Pro Ala
    290                 295                 300

Pro Ile Glu Lys Thr Ile Ser Lys Ala Lys Gly Gln Pro Arg Glu Pro
305                 310                 315                 320

Gln Val Tyr Thr Leu Pro Pro Ser Arg Glu Glu Met Thr Lys Asn Gln
                325                 330                 335

Val Ser Leu Thr Cys Leu Val Lys Gly Phe Tyr Pro Ser Asp Ile Ala
            340                 345                 350
```

```
Val Glu Trp Glu Ser Asn Gly Gln Pro Glu Asn Asn Tyr Lys Thr Thr
            355                 360                 365

Pro Pro Val Leu Asp Ser Asp Gly Ser Phe Phe Leu Tyr Ser Lys Leu
        370                 375                 380

Thr Val Asp Lys Ser Arg Trp Gln Gln Gly Asn Val Phe Ser Cys Ser
385                 390                 395                 400

Val Met His Glu Ala Leu His Asn His Tyr Thr Gln Lys Ser Leu Ser
                405                 410                 415

Leu Ser Pro Gly Lys
            420

<210> SEQ ID NO 18
<211> LENGTH: 162
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
            20                  25                  30

Arg His Ile Asn Asn Asp Met Ile Val Thr Asp Asn Asn Gly Ala Val
        35                  40                  45

Lys Phe Pro Gln Leu Cys Lys Phe Cys Asp Val Arg Phe Ser Thr Cys
    50                  55                  60

Asp Asn Gln Lys Ser Cys Met Ser Asn Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr Asn Thr Ser Asn
145                 150                 155                 160

Pro Asp

<210> SEQ ID NO 19
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Gly Gly Gly Gly Ser
1               5

<210> SEQ ID NO 20
<211> LENGTH: 225
<212> TYPE: PRT
<213> ORGANISM: Artificial Sequence
<220> FEATURE:
```

<223> OTHER INFORMATION: Description of Artificial Sequence: Synthetic
      polypeptide

<400> SEQUENCE: 20

Thr His Thr Cys Pro Pro Cys Pro Ala Pro Glu Leu Leu Gly Gly Pro
1               5                   10                  15

Ser Val Phe Leu Phe Pro Pro Lys Pro Lys Asp Thr Leu Met Ile Ser
            20                  25                  30

Arg Thr Pro Glu Val Thr Cys Val Val Val Asp Val Ser His Glu Asp
        35                  40                  45

Pro Glu Val Lys Phe Asn Trp Tyr Val Asp Gly Val Glu Val His Asn
    50                  55                  60

Ala Lys Thr Lys Pro Arg Glu Glu Gln Tyr Asn Ser Thr Tyr Arg Val
65              70                  75                  80

Val Ser Val Leu Thr Val Leu His Gln Asp Trp Leu Asn Gly Lys Glu
            85                  90                  95

Tyr Lys Cys Lys Val Ser Asn Lys Ala Leu Pro Ala Pro Ile Glu Lys
            100                 105                 110

Thr Ile Ser Lys Ala Lys Gly Gln Pro Arg Glu Pro Gln Val Tyr Thr
        115                 120                 125

Leu Pro Pro Ser Arg Glu Glu Met Thr Lys Asn Gln Val Ser Leu Thr
    130                 135                 140

Cys Leu Val Lys Gly Phe Tyr Pro Ser Asp Ile Ala Val Glu Trp Glu
145             150                 155                 160

Ser Asn Gly Gln Pro Glu Asn Asn Tyr Lys Thr Thr Pro Pro Val Leu
            165                 170                 175

Asp Ser Asp Gly Ser Phe Phe Leu Tyr Ser Lys Leu Thr Val Asp Lys
            180                 185                 190

Ser Arg Trp Gln Gln Gly Asn Val Phe Ser Cys Ser Val Met His Glu
        195                 200                 205

Ala Leu His Asn His Tyr Thr Gln Lys Ser Leu Ser Leu Ser Pro Gly
    210                 215                 220

Lys
225

<210> SEQ ID NO 21
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Gly Gly Gly Gly Ser Gly Gly Gly Gly Ser
1               5                   10

<210> SEQ ID NO 22
<211> LENGTH: 22
<212> TYPE: PRT
<213> ORGANISM: Unknown
<220> FEATURE:
<223> OTHER INFORMATION: Description of Unknown:
      Native leader sequence

```
<400> SEQUENCE: 22

Met Gly Arg Gly Leu Leu Arg Gly Leu Trp Pro Leu His Ile Val Leu
1               5                   10                  15

Trp Thr Arg Ile Ala Ser
            20

<210> SEQ ID NO 23
<211> LENGTH: 22
<212> TYPE: PRT
<213> ORGANISM: Unknown
<220> FEATURE:
<223> OTHER INFORMATION: Description of Unknown:
      Tissue plasminogen activator sequence

<400> SEQUENCE: 23

Met Asp Ala Met Lys Arg Gly Leu Cys Cys Val Leu Leu Leu Cys Gly
1               5                   10                  15

Ala Val Phe Val Ser Pro
            20

<210> SEQ ID NO 24
<211> LENGTH: 21
<212> TYPE: PRT
<213> ORGANISM: Apis cerana

<400> SEQUENCE: 24

Met Lys Phe Leu Val Asn Val Ala Leu Val Phe Met Val Val Tyr Ile
1               5                   10                  15

Ser Tyr Ile Tyr Ala
            20

<210> SEQ ID NO 25
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Thr Gly Gly Gly Gly Ser Gly Gly Gly Ser Gly Gly Gly Gly Ser
1               5                   10                  15

Gly Gly Gly Gly Ser Gly Gly Gly Gly Ser
            20                  25

<210> SEQ ID NO 26
<211> LENGTH: 31
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Thr Gly Gly Gly Gly Ser Gly Gly Gly Gly Ser Gly Gly Gly Gly Ser
1               5                   10                  15

Gly Gly Gly Gly Ser Gly Gly Gly Gly Ser Gly Gly Gly Gly Ser
            20                  25                  30

<210> SEQ ID NO 27
<211> LENGTH: 137
<212> TYPE: PRT
<213> ORGANISM: Artificial Sequence
```

<220> FEATURE:
<223> OTHER INFORMATION: Description of Artificial Sequence: Synthetic
     polypeptide

<400> SEQUENCE: 27

```
Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp
    130                 135
```

<210> SEQ ID NO 28
<211> LENGTH: 131
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 28

```
Gln Lys Ser Val Asn Asn Asp Met Ile Val Thr Asp Asn Asn Gly Ala
1               5                   10                  15

Val Lys Phe Pro Gln Leu Cys Lys Phe Cys Asp Val Arg Phe Ser Thr
            20                  25                  30

Cys Asp Asn Gln Lys Ser Cys Met Ser Asn Cys Ser Ile Thr Ser Ile
        35                  40                  45

Cys Glu Lys Pro Gln Glu Val Cys Val Ala Val Trp Arg Lys Asn Asp
    50                  55                  60

Glu Asn Ile Thr Leu Glu Thr Val Cys His Asp Pro Lys Leu Pro Tyr
65                  70                  75                  80

His Asp Phe Ile Leu Glu Asp Ala Ala Ser Pro Lys Cys Ile Met Lys
                85                  90                  95

Glu Lys Lys Pro Gly Glu Thr Phe Phe Met Cys Ser Cys Ser Ser
            100                 105                 110

Asp Glu Cys Asn Asp Asn Ile Ile Phe Ser Glu Glu Tyr Asn Thr Ser
        115                 120                 125

Asn Pro Asp
    130
```

<210> SEQ ID NO 29
<211> LENGTH: 125
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 29

Asp Met Ile Val Thr Asp Asn Asn Gly Ala Val Lys Phe Pro Gln Leu
1               5                   10                  15

Cys Lys Phe Cys Asp Val Arg Phe Ser Thr Cys Asp Asn Gln Lys Ser
            20                  25                  30

Cys Met Ser Asn Cys Ser Ile Thr Ser Ile Cys Glu Lys Pro Gln Glu
        35                  40                  45

Val Cys Val Ala Val Trp Arg Lys Asn Asp Glu Asn Ile Thr Leu Glu
50                  55                  60

Thr Val Cys His Asp Pro Lys Leu Pro Tyr His Asp Phe Ile Leu Glu
65                  70                  75                  80

Asp Ala Ala Ser Pro Lys Cys Ile Met Lys Glu Lys Lys Pro Gly
                85                  90                  95

Glu Thr Phe Phe Met Cys Ser Cys Ser Ser Asp Glu Cys Asn Asp Asn
            100                 105                 110

Ile Ile Phe Ser Glu Glu Tyr Asn Thr Ser Asn Pro Asp
            115                 120                 125

<210> SEQ ID NO 30
<211> LENGTH: 131
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
            115                 120                 125

Glu Glu Tyr
        130

<210> SEQ ID NO 31
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Gln Lys Ser Val Asn Asn Asp Met Ile Val Thr Asp Asn Asn Gly Ala
1               5                   10                  15

Val Lys Phe Pro Gln Leu Cys Lys Phe Cys Asp Val Arg Phe Ser Thr
            20                  25                  30

Cys Asp Asn Gln Lys Ser Cys Met Ser Asn Cys Ser Ile Thr Ser Ile
            35                  40                  45

Cys Glu Lys Pro Gln Glu Val Cys Val Ala Val Trp Arg Lys Asn Asp
50                      55                  60

Glu Asn Ile Thr Leu Glu Thr Val Cys His Asp Pro Lys Leu Pro Tyr
65                  70                  75                  80

His Asp Phe Ile Leu Glu Asp Ala Ala Ser Pro Lys Cys Ile Met Lys
                85                  90                  95

Glu Lys Lys Lys Pro Gly Glu Thr Phe Phe Met Cys Ser Cys Ser Ser
            100                 105                 110

Asp Glu Cys Asn Asp Asn Ile Ile Phe Ser Glu Glu Tyr
            115                 120                 125

<210> SEQ ID NO 32
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Asp Met Ile Val Thr Asp Asn Asn Gly Ala Val Lys Phe Pro Gln Leu
1               5                   10                  15

Cys Lys Phe Cys Asp Val Arg Phe Ser Thr Cys Asp Asn Gln Lys Ser
            20                  25                  30

Cys Met Ser Asn Cys Ser Ile Thr Ser Ile Cys Glu Lys Pro Gln Glu
            35                  40                  45

Val Cys Val Ala Val Trp Arg Lys Asn Asp Glu Asn Ile Thr Leu Glu
50                  55                  60

Thr Val Cys His Asp Pro Lys Leu Pro Tyr His Asp Phe Ile Leu Glu
65                  70                  75                  80

Asp Ala Ala Ser Pro Lys Cys Ile Met Lys Glu Lys Lys Lys Pro Gly
                85                  90                  95

Glu Thr Phe Phe Met Cys Ser Cys Ser Ser Asp Glu Cys Asn Asp Asn
            100                 105                 110

Ile Ile Phe Ser Glu Glu Tyr
            115

<210> SEQ ID NO 33
<211> LENGTH: 156
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Gln Lys Ser Asp Val Glu Met Glu Ala Gln Lys Asp Glu Ile Ile Cys
1               5                   10                  15

Pro Ser Cys Asn Arg Thr Ala His Pro Leu Arg His Ile Asn Asn Asp
            20                  25                  30

Met Ile Val Thr Asp Asn Asn Gly Ala Val Lys Phe Pro Gln Leu Cys
            35                  40                  45

Lys Phe Cys Asp Val Arg Phe Ser Thr Cys Asp Asn Gln Lys Ser Cys
50                  55                  60

```
Met Ser Asn Cys Ser Ile Thr Ser Ile Cys Glu Lys Pro Gln Glu Val
 65                  70                  75                  80

Cys Val Ala Val Trp Arg Lys Asn Asp Glu Asn Ile Thr Leu Glu Thr
                 85                  90                  95

Val Cys His Asp Pro Lys Leu Pro Tyr His Asp Phe Ile Leu Glu Asp
            100                 105                 110

Ala Ala Ser Pro Lys Cys Ile Met Lys Glu Lys Lys Pro Gly Glu
        115                 120                 125

Thr Phe Phe Met Cys Ser Cys Ser Ser Asp Glu Cys Asn Asp Asn Ile
    130                 135                 140

Ile Phe Ser Glu Glu Tyr Asn Thr Ser Asn Pro Asp
145                 150                 155
```

<210> SEQ ID NO 34
<211> LENGTH: 156
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

```
Thr Ile Pro Pro His Val Gln Lys Ser Asp Val Glu Met Glu Ala Gln
  1               5                  10                  15

Lys Asp Glu Ile Ile Cys Pro Ser Cys Asn Arg Thr Ala His Pro Leu
                 20                  25                  30

Arg His Ile Asn Asn Asp Met Ile Val Thr Asp Asn Asn Gly Ala Val
             35                  40                  45

Lys Phe Pro Gln Leu Cys Lys Phe Cys Asp Val Arg Phe Ser Thr Cys
 50                  55                  60

Asp Asn Gln Lys Ser Cys Met Ser Asn Cys Ser Ile Thr Ser Ile Cys
 65                  70                  75                  80

Glu Lys Pro Gln Glu Val Cys Val Ala Val Trp Arg Lys Asn Asp Glu
                 85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr
145                 150                 155
```

<210> SEQ ID NO 35
<211> LENGTH: 150
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

```
Gln Lys Ser Asp Val Glu Met Glu Ala Gln Lys Asp Glu Ile Ile Cys
  1               5                  10                  15

Pro Ser Cys Asn Arg Thr Ala His Pro Leu Arg His Ile Asn Asn Asp
                 20                  25                  30

Met Ile Val Thr Asp Asn Asn Gly Ala Val Lys Phe Pro Gln Leu Cys
             35                  40                  45
```

```
Lys Phe Cys Asp Val Arg Phe Ser Thr Cys Asp Asn Gln Lys Ser Cys
 50                  55                  60

Met Ser Asn Cys Ser Ile Thr Ser Ile Cys Glu Lys Pro Gln Glu Val
 65                  70                  75                  80

Cys Val Ala Val Trp Arg Lys Asn Asp Glu Asn Ile Thr Leu Glu Thr
                 85                  90                  95

Val Cys His Asp Pro Lys Leu Pro Tyr His Asp Phe Ile Leu Glu Asp
            100                 105                 110

Ala Ala Ser Pro Lys Cys Ile Met Lys Glu Lys Lys Pro Gly Glu
        115                 120                 125

Thr Phe Phe Met Cys Ser Cys Ser Ser Asp Glu Cys Asn Asp Asn Ile
130                 135                 140

Ile Phe Ser Glu Glu Tyr
145                 150

<210> SEQ ID NO 36
<211> LENGTH: 137
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Thr Ile Pro Pro His Val Gln Lys Ser Val Asn Asn Asp Met Ile Val
 1               5                  10                  15

Thr Asp Asn Asn Gly Ala Val Lys Phe Pro Gln Leu Cys Lys Phe Cys
                 20                  25                  30

Asp Val Arg Phe Ser Thr Cys Asp Asn Gln Lys Ser Cys Met Ser Asn
            35                  40                  45

Cys Ser Ile Thr Ser Ile Cys Glu Lys Pro Gln Glu Val Cys Val Ala
 50                  55                  60

Val Trp Arg Lys Asn Asp Glu Asn Ile Thr Leu Glu Thr Val Cys His
 65                  70                  75                  80

Asp Pro Lys Leu Pro Tyr His Lys Phe Ile Leu Glu Asp Ala Ala Ser
                 85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp
130                 135

<210> SEQ ID NO 37
<211> LENGTH: 162
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Thr Ile Pro Pro His Val Gln Lys Ser Asp Val Glu Met Glu Ala Gln
 1               5                  10                  15

Lys Asp Glu Ile Ile Cys Pro Ser Cys Asn Arg Thr Ala His Pro Leu
                 20                  25                  30

Arg His Ile Asn Asn Asp Met Ile Val Thr Asp Asn Asn Gly Ala Val
            35                  40                  45
```

```
Lys Phe Pro Gln Leu Cys Lys Phe Cys Asp Val Arg Phe Ser Thr Cys
        50                  55                  60

Asp Asn Gln Lys Ser Cys Met Ser Asn Cys Ser Ile Thr Ser Ile Cys
 65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Lys Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
130                 135                 140

Glu Cys Asn Asp Asn Ile Ile Phe Ser Glu Gly Tyr Asn Thr Ser Asn
145                 150                 155                 160

Pro Asp

<210> SEQ ID NO 38
<211> LENGTH: 131
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Thr Ile Pro Pro His Val Gln Lys Ser Val Asn Asn Asp Met Ile Val
 1               5                  10                  15

Thr Asp Asn Asn Gly Ala Val Lys Phe Pro Gln Leu Cys Lys Phe Cys
                20                  25                  30

Asp Val Arg Phe Ser Thr Cys Asp Asn Gln Lys Ser Cys Met Ser Asp
            35                  40                  45

Cys Ser Ile Thr Ser Ile Cys Glu Lys Pro Gln Glu Val Cys Val Ala
        50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr
    130

<210> SEQ ID NO 39
<211> LENGTH: 156
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

Thr Ile Pro Pro His Val Gln Lys Ser Asp Val Glu Met Glu Ala Gln
 1               5                  10                  15

Lys Asp Glu Ile Ile Cys Pro Ser Cys Asn Arg Thr Ala His Pro Leu
                20                  25                  30
```

```
Arg His Ile Asn Asn Asp Met Ile Val Thr Asp Asn Asn Gly Ala Val
        35                  40                  45

Lys Phe Pro Gln Leu Cys Lys Phe Cys Asp Val Arg Phe Ser Thr Cys
    50                  55                  60

Asp Asn Gln Lys Ser Cys Met Ser Asp Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr
145                 150                 155

<210> SEQ ID NO 40
<211> LENGTH: 36
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

Thr Gly Gly Gly Gly Ser Gly Gly Gly Ser Gly Gly Gly Gly Ser
1               5                   10                  15

Gly Gly Gly Gly Ser Gly Gly Gly Gly Ser Gly Gly Gly Gly Ser Gly
                20                  25                  30

Gly Gly Gly Ser
        35

<210> SEQ ID NO 41
<211> LENGTH: 36
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Gly Arg Cys Lys Ile Arg His Ile Gly Ser Asn Asn Arg Leu Gln Arg
1               5                   10                  15

Ser Thr Cys Gln Asn Thr Gly Trp Glu Ser Ala His Val Met Lys Thr
                20                  25                  30

Pro Gly Phe Arg
        35

<210> SEQ ID NO 42
<211> LENGTH: 223
<212> TYPE: PRT
<213> ORGANISM: Homo sapiens

<400> SEQUENCE: 42

Val Glu Cys Pro Pro Cys Pro Ala Pro Pro Val Ala Gly Pro Ser Val
1               5                   10                  15

Phe Leu Phe Pro Pro Lys Pro Lys Asp Thr Leu Met Ile Ser Arg Thr
                20                  25                  30
```

-continued

```
Pro Glu Val Thr Cys Val Val Asp Val Ser His Glu Asp Pro Glu
            35                  40                  45

Val Gln Phe Asn Trp Tyr Val Asp Gly Val Glu Val His Asn Ala Lys
 50                  55                  60

Thr Lys Pro Arg Glu Glu Gln Phe Asn Ser Thr Phe Arg Val Val Ser
 65                  70                  75                  80

Val Leu Thr Val Val His Gln Asp Trp Leu Asn Gly Lys Glu Tyr Lys
                 85                  90                  95

Cys Lys Val Ser Asn Lys Gly Leu Pro Ala Pro Ile Glu Lys Thr Ile
            100                 105                 110

Ser Lys Thr Lys Gly Gln Pro Arg Glu Pro Gln Val Tyr Thr Leu Pro
            115                 120                 125

Pro Ser Arg Glu Glu Met Thr Lys Asn Gln Val Ser Leu Thr Cys Leu
130                 135                 140

Val Lys Gly Phe Tyr Pro Ser Asp Ile Ala Val Glu Trp Glu Ser Asn
145                 150                 155                 160

Gly Gln Pro Glu Asn Asn Tyr Lys Thr Thr Pro Pro Met Leu Asp Ser
                165                 170                 175

Asp Gly Ser Phe Phe Leu Tyr Ser Lys Leu Thr Val Asp Lys Ser Arg
            180                 185                 190

Trp Gln Gln Gly Asn Val Phe Ser Cys Ser Val Met His Glu Ala Leu
            195                 200                 205

His Asn His Tyr Thr Gln Lys Ser Leu Ser Leu Ser Pro Gly Lys
            210                 215                 220

<210> SEQ ID NO 43
<211> LENGTH: 233
<212> TYPE: PRT
<213> ORGANISM: Homo sapiens

<400> SEQUENCE: 43

Gly Gly Pro Lys Ser Cys Asp Lys Thr His Thr Cys Pro Pro Cys Pro
 1               5                  10                  15

Ala Pro Glu Leu Leu Gly Gly Pro Ser Val Phe Leu Phe Pro Pro Lys
             20                  25                  30

Pro Lys Asp Thr Leu Met Ile Ser Arg Thr Pro Glu Val Thr Cys Val
            35                  40                  45

Val Val Asp Val Ser His Glu Asp Pro Glu Val Lys Phe Asn Trp Tyr
 50                  55                  60

Val Asp Gly Val Glu Val His Asn Ala Lys Thr Lys Pro Arg Glu Glu
 65                  70                  75                  80

Gln Tyr Asn Ser Thr Tyr Arg Val Val Ser Val Leu Thr Val Leu His
                 85                  90                  95

Gln Asp Trp Leu Asn Gly Lys Glu Tyr Lys Cys Lys Val Ser Asn Lys
            100                 105                 110

Ala Leu Pro Ala Pro Ile Glu Lys Thr Ile Ser Lys Ala Lys Gly Gln
            115                 120                 125

Pro Arg Glu Pro Gln Val Tyr Thr Leu Pro Pro Ser Arg Glu Glu Met
130                 135                 140

Thr Lys Asn Gln Val Ser Leu Thr Cys Leu Val Lys Gly Phe Tyr Pro
145                 150                 155                 160

Ser Asp Ile Ala Val Glu Trp Glu Ser Asn Gly Gln Pro Glu Asn Asn
                165                 170                 175

Tyr Lys Thr Thr Pro Pro Val Leu Asp Ser Asp Gly Ser Phe Phe Leu
            180                 185                 190
```

```
Tyr Ser Lys Leu Thr Val Asp Lys Ser Arg Trp Gln Gln Gly Asn Val
        195                 200                 205

Phe Ser Cys Ser Val Met His Glu Ala Leu His Asn His Tyr Thr Gln
        210                 215                 220

Lys Ser Leu Ser Leu Ser Pro Gly Lys
225                 230

<210> SEQ ID NO 44
<211> LENGTH: 437
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Gly Gly Gly Ser Gly Gly Gly Gly Ser Gly
        195                 200                 205

Gly Gly Gly Ser Thr His Thr Cys Pro Pro Cys Pro Ala Pro Glu Leu
    210                 215                 220

Leu Gly Gly Pro Ser Val Phe Leu Phe Pro Pro Lys Pro Lys Asp Thr
225                 230                 235                 240

Leu Met Ile Ser Arg Thr Pro Glu Val Thr Cys Val Val Val Asp Val
                245                 250                 255

Ser His Glu Asp Pro Glu Val Lys Phe Asn Trp Tyr Val Asp Gly Val
            260                 265                 270

Glu Val His Asn Ala Lys Thr Lys Pro Arg Glu Glu Gln Tyr Asn Ser
        275                 280                 285

Thr Tyr Arg Val Val Ser Val Leu Thr Val Leu His Gln Asp Trp Leu
    290                 295                 300
```

```
Asn Gly Lys Glu Tyr Lys Cys Lys Val Ser Asn Lys Ala Leu Pro Ala
305                 310                 315                 320

Pro Ile Glu Lys Thr Ile Ser Lys Ala Lys Gly Gln Pro Arg Glu Pro
            325                 330                 335

Gln Val Tyr Thr Leu Pro Pro Ser Arg Glu Glu Met Thr Lys Asn Gln
            340                 345                 350

Val Ser Leu Thr Cys Leu Val Lys Gly Phe Tyr Pro Ser Asp Ile Ala
            355                 360                 365

Val Glu Trp Glu Ser Asn Gly Gln Pro Glu Asn Asn Tyr Lys Thr Thr
370                 375                 380

Pro Pro Val Leu Asp Ser Asp Gly Ser Phe Phe Leu Tyr Ser Lys Leu
385                 390                 395                 400

Thr Val Asp Lys Ser Arg Trp Gln Gln Gly Asn Val Phe Ser Cys Ser
                405                 410                 415

Val Met His Glu Ala Leu His Asn His Tyr Thr Gln Lys Ser Leu Ser
            420                 425                 430

Leu Ser Pro Gly Lys
            435

<210> SEQ ID NO 45
<211> LENGTH: 442
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
            115                 120                 125

His Asp Pro Lys Leu Pro Tyr His Asp Phe Ile Leu Glu Asp Ala Ala
        130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Gly Gly Gly Gly Ser Gly Gly Gly Gly Ser Gly
            195                 200                 205
```

Gly Gly Gly Ser Gly Gly Gly Ser Thr His Thr Cys Pro Pro Cys
            210                 215                 220

Pro Ala Pro Glu Leu Leu Gly Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser His Glu Asp Pro Glu Val Lys Phe Asn Trp
            260                 265                 270

Tyr Val Asp Gly Val Glu Val His Asn Ala Lys Thr Lys Pro Arg Glu
        275                 280                 285

Glu Gln Tyr Asn Ser Thr Tyr Arg Val Val Ser Val Leu Thr Val Leu
    290                 295                 300

His Gln Asp Trp Leu Asn Gly Lys Glu Tyr Lys Cys Lys Val Ser Asn
305                 310                 315                 320

Lys Ala Leu Pro Ala Pro Ile Glu Lys Thr Ile Ser Lys Ala Lys Gly
                325                 330                 335

Gln Pro Arg Glu Pro Gln Val Tyr Thr Leu Pro Pro Ser Arg Glu Glu
            340                 345                 350

Met Thr Lys Asn Gln Val Ser Leu Thr Cys Leu Val Lys Gly Phe Tyr
        355                 360                 365

Pro Ser Asp Ile Ala Val Glu Trp Glu Ser Asn Gly Gln Pro Glu Asn
370                 375                 380

Asn Tyr Lys Thr Thr Pro Pro Val Leu Asp Ser Asp Gly Ser Phe Phe
385                 390                 395                 400

Leu Tyr Ser Lys Leu Thr Val Asp Lys Ser Arg Trp Gln Gln Gly Asn
                405                 410                 415

Val Phe Ser Cys Ser Val Met His Glu Ala Leu His Asn His Tyr Thr
            420                 425                 430

Gln Lys Ser Leu Ser Leu Ser Pro Gly Lys
        435                 440

<210> SEQ ID NO 46
<211> LENGTH: 1314
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 46
atggatgcaa tgaagagagg gctctgctgt gtgctgctgc tgtgtggagc agtcttcgtt      60
tcgcccggcg ccacgatccc accgcacgtt cagaagtcgg atgtggaaat ggaggcccag    120
aaagatgaaa tcatctgccc cagctgtaat aggactgccc atccactgag acatattaat    180
aacgacatga tagtcactga caacaacggt gcagtcaagt tccacaact gtgtaaattt    240 tgtgatgtga gattttccac ctgtgacaac cagaaatcct gcatgagcaa ctgcagcatc    300
acctccatct gtgagaagcc acaggaagtc tgtgtggctg tatggagaaa gaatgacgag    360
aacataacac tagagacagt ttgccatgac cccaagctcc cctaccatga ctttattctg    420
gaagatgctg cttctccaaa gtgcattatg aaggaaaaaa aaaagcctgg tgagactttc    480
ttcatgtgtt cctgtagctc tgatgagtgc aatgacaaca tcatcttctc agaagaatat    540
aacaccagca atcctgacac cggtggagga ggttctggtg gtggaggttc tggaggtgga    600
ggaagtggtg gaggtggttc tggaggtggt ggaagtactc acacatgccc accgtgccca    660

| | |
|---|---|
| gcacctgaac tcctgggggg accgtcagtc ttcctcttcc ccccaaaacc caaggacacc | 720 |
| ctcatgatct cccggacccc tgaggtcaca tgcgtggtgg tggacgtgag ccacgaagac | 780 |
| cctgaggtca agttcaactg gtacgtggac ggcgtggagg tgcataatgc caagacaaag | 840 |
| ccgcgggagg agcagtacaa cagcacgtac cgtgtggtca gcgtcctcac cgtcctgcac | 900 |
| caggactggc tgaatggcaa ggagtacaag tgcaaggtct ccaacaaagc cctcccagcc | 960 |
| cccatcgaga aaaccatctc caaagccaaa gggcagcccc gagaaccaca ggtgtacacc | 1020 |
| ctgcccccat cccgggagga gatgaccaag aaccaggtca gcctgacctg cctggtcaaa | 1080 |
| ggcttctatc ccagcgacat cgccgtggag tgggagagca atgggcagcc ggagaacaac | 1140 |
| tacaagacca cgcctcccgt gctggactcc gacggctcct tcttcctcta tagcaagctc | 1200 |
| accgtggaca gagcaggtg gcagcagggg aacgtcttct catgctccgt gatgcatgag | 1260 |
| gctctgcaca accactacac gcagaagagc ctctccctgt ctccgggtaa atga | 1314 |

<210> SEQ ID NO 47
<211> LENGTH: 1329
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 47

| | |
|---|---|
| atggatgcaa tgaagagagg gctctgctgt gtgctgctgc tgtgtggagc agtcttcgtt | 60 |
| tcgcccggcg ccacgatccc accgcacgtt cagaagtcgg atgtggaaat ggaggcccag | 120 |
| aaagatgaaa tcatctgccc cagctgtaat aggactgccc atccactgag acatattaat | 180 |
| aacgacatga tagtcactga caacaacggt gcagtcaagt ttccacaact gtgtaaattt | 240 |
| tgtgatgtga gatttccac ctgtgacaac cagaaatcct gcatgagcaa ctgcagcatc | 300 |
| acctccatct gtgagaagcc acaggaagtc tgtgtggctg tatggagaaa gaatgacgag | 360 |
| aacataacac tagagacagt ttgccatgac cccaagctcc cctaccatga ctttattctg | 420 |
| gaagatgctg cttctccaaa gtgcattatg aaggaaaaaa aaaagcctgg tgagactttc | 480 |
| ttcatgtgtt cctgtagctc tgatgagtgc aatgacaaca tcatcttctc agaagaatat | 540 |
| aacaccagca atcctgacac cggtggaggt ggaagtggtg gaggaggttc tggtggtgga | 600 |
| ggttctggag gtggaggaag tggtggaggt ggttctggag gtggtggaag tactcacaca | 660 |
| tgcccaccgt gcccagcacc tgaactcctg ggggaccgt cagtcttcct cttcccccca | 720 |
| aaacccaagg acaccctcat gatctcccgg acccctgagg tcacatgcgt ggtggtggac | 780 |
| gtgagccacg aagaccctga ggtcaagttc aactggtacg tggacggcgt ggaggtgcat | 840 |
| aatgccaaga caaagccgcg ggaggagcag tacaacagca cgtaccgtgt ggtcagcgtc | 900 |
| ctcaccgtcc tgcaccagga ctggctgaat ggcaaggagt acaagtgcaa ggtctccaac | 960 |
| aaagccctcc cagcccccat cgagaaaacc atctccaaag ccaagggca gccccgagaa | 1020 |
| ccacaggtgt acaccctgcc cccatcccgg gaggagatga ccaagaacca ggtcagcctg | 1080 |
| acctgcctgg tcaaaggctt ctatcccagc gacatcgccg tggagtggga gagcaatggg | 1140 |
| cagccggaga caactacaa gaccacgcct cccgtgctgg actccgacgg ctccttcttc | 1200 |
| ctctatagca agctcaccgt ggacaagagc aggtggcagc aggggaacgt cttctcatgc | 1260 |
| tccgtgatgc atgaggctct gcacaaccac tacacgcaga agagcctctc cctgtctccg | 1320 |
| ggtaaatga | 1329 |

<210> SEQ ID NO 48
<211> LENGTH: 408
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
            20                  25                  30

Arg His Ile Asn Asn Asp Met Ile Val Thr Asp Asn Asn Gly Ala Val
        35                  40                  45

Lys Phe Pro Gln Leu Cys Lys Phe Cys Asp Val Arg Phe Ser Thr Cys
50                  55                  60

Asp Asn Gln Lys Ser Cys Met Ser Asn Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
130                 135                 140

Glu Cys Asn Asp Asn Ile Ile Phe Ser Glu Glu Tyr Asn Thr Ser Asn
145                 150                 155                 160

Pro Asp Thr Gly Gly Gly Ser Gly Gly Gly Ser Gly Gly Gly
                165                 170                 175

Gly Ser Gly Gly Gly Gly Ser Thr His Thr Cys Pro Pro Cys Pro Ala
            180                 185                 190

Pro Glu Leu Leu Gly Gly Pro Ser Val Phe Leu Phe Pro Pro Lys Pro
        195                 200                 205

Lys Asp Thr Leu Met Ile Ser Arg Thr Pro Glu Val Thr Cys Val Val
210                 215                 220

Val Asp Val Ser His Glu Asp Pro Glu Val Lys Phe Asn Trp Tyr Val
225                 230                 235                 240

Asp Gly Val Glu Val His Asn Ala Lys Thr Lys Pro Arg Glu Glu Gln
                245                 250                 255

Tyr Asn Ser Thr Tyr Arg Val Val Ser Val Leu Thr Val Leu His Gln
            260                 265                 270

Asp Trp Leu Asn Gly Lys Glu Tyr Lys Cys Lys Val Ser Asn Lys Ala
        275                 280                 285

Leu Pro Ala Pro Ile Glu Lys Thr Ile Ser Lys Ala Lys Gly Gln Pro
290                 295                 300

Arg Glu Pro Gln Val Tyr Thr Leu Pro Pro Ser Arg Glu Glu Met Thr
305                 310                 315                 320

Lys Asn Gln Val Ser Leu Thr Cys Leu Val Lys Gly Phe Tyr Pro Ser
                325                 330                 335

Asp Ile Ala Val Glu Trp Glu Ser Asn Gly Gln Pro Glu Asn Asn Tyr
            340                 345                 350

Lys Thr Thr Pro Pro Val Leu Asp Ser Asp Gly Ser Phe Phe Leu Tyr
        355                 360                 365

```
Ser Lys Leu Thr Val Asp Lys Ser Arg Trp Gln Gln Gly Asn Val Phe
    370                 375                 380

Ser Cys Ser Val Met His Glu Ala Leu His Asn His Tyr Thr Gln Lys
385                 390                 395                 400

Ser Leu Ser Leu Ser Pro Gly Lys
                405

<210> SEQ ID NO 49
<211> LENGTH: 162
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
            20                  25                  30

Arg His Ile Asn Asn Asp Met Ile Val Thr Asp Asn Asn Gly Ala Val
        35                  40                  45

Lys Phe Pro Gln Leu Cys Lys Phe Cys Asp Val Arg Phe Ser Thr Cys
    50                  55                  60

Asp Asn Gln Lys Ser Cys Met Ser Asn Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr Asn Thr Ser Asn
145                 150                 155                 160

Pro Asp

<210> SEQ ID NO 50
<211> LENGTH: 410
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gly Ala Thr Ile Pro Pro His Val Gln Lys Ser Asp Val Glu Met Glu
1               5                   10                  15

Ala Gln Lys Asp Glu Ile Ile Cys Pro Ser Cys Asn Arg Thr Ala His
            20                  25                  30

Pro Leu Arg His Ile Asn Asn Asp Met Ile Val Thr Asp Asn Asn Gly
        35                  40                  45

Ala Val Lys Phe Pro Gln Leu Cys Lys Phe Cys Asp Val Arg Phe Ser
    50                  55                  60

Thr Cys Asp Asn Gln Lys Ser Cys Met Ser Asn Cys Ser Ile Thr Ser
65                  70                  75                  80
```

Ile Cys Glu Lys Pro Gln Glu Val Cys Val Ala Val Trp Arg Lys Asn
            85                  90                  95

Asp Glu Asn Ile Thr Leu Glu Thr Val Cys His Asp Pro Lys Leu Pro
        100                 105                 110

Tyr His Asp Phe Ile Leu Glu Asp Ala Ala Ser Pro Lys Cys Ile Met
    115                 120                 125

Lys Glu Lys Lys Pro Gly Glu Thr Phe Phe Met Cys Ser Cys Ser
130                 135                 140

Ser Asp Glu Cys Asn Asp Asn Ile Ile Phe Ser Glu Gly Tyr Asn Thr
145                 150                 155                 160

Ser Asn Pro Asp Thr Gly Gly Gly Ser Gly Gly Gly Ser Gly
                165                 170                 175

Gly Gly Ser Gly Gly Gly Ser Thr His Thr Cys Pro Pro Cys
            180                 185                 190

Pro Ala Pro Glu Leu Leu Gly Gly Pro Ser Val Phe Leu Phe Pro Pro
        195                 200                 205

Lys Pro Lys Asp Thr Leu Met Ile Ser Arg Thr Pro Glu Val Thr Cys
    210                 215                 220

Val Val Val Asp Val Ser His Glu Asp Pro Glu Val Lys Phe Asn Trp
225                 230                 235                 240

Tyr Val Asp Gly Val Glu Val His Asn Ala Lys Thr Lys Pro Arg Glu
                245                 250                 255

Glu Gln Tyr Asn Ser Thr Tyr Arg Val Val Ser Val Leu Thr Val Leu
            260                 265                 270

His Gln Asp Trp Leu Asn Gly Lys Glu Tyr Lys Cys Lys Val Ser Asn
        275                 280                 285

Lys Ala Leu Pro Ala Pro Ile Glu Lys Thr Ile Ser Lys Ala Lys Gly
    290                 295                 300

Gln Pro Arg Glu Pro Gln Val Tyr Thr Leu Pro Pro Ser Arg Glu Glu
305                 310                 315                 320

Met Thr Lys Asn Gln Val Ser Leu Thr Cys Leu Val Lys Gly Phe Tyr
                325                 330                 335

Pro Ser Asp Ile Ala Val Glu Trp Glu Ser Asn Gly Gln Pro Glu Asn
            340                 345                 350

Asn Tyr Lys Thr Thr Pro Pro Val Leu Asp Ser Asp Gly Ser Phe Phe
        355                 360                 365

Leu Tyr Ser Lys Leu Thr Val Asp Lys Ser Arg Trp Gln Gln Gly Asn
    370                 375                 380

Val Phe Ser Cys Ser Val Met His Glu Ala Leu His Asn His Tyr Thr
385                 390                 395                 400

Gln Lys Ser Leu Ser Leu Ser Pro Gly Lys
                405                 410

<210> SEQ ID NO 51
<211> LENGTH: 408
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
            20                  25                  30

Arg His Ile Asn Asn Asp Met Ile Val Thr Asp Asn Gly Ala Val
         35                  40                  45

Lys Phe Pro Gln Leu Cys Lys Phe Cys Asp Val Arg Phe Ser Thr Cys
 50                  55                  60

Asp Asn Gln Lys Ser Cys Met Ser Asn Cys Ser Ile Thr Ser Ile Cys
 65                  70                  75                  80

Glu Lys Pro Gln Glu Val Cys Val Ala Val Trp Arg Lys Asn Asp Glu
                 85                  90                  95

Asn Ile Thr Leu Glu Thr Val Cys His Asp Pro Lys Leu Pro Tyr His
             100                 105                 110

Asp Phe Ile Leu Glu Asp Ala Ala Ser Pro Lys Cys Ile Met Lys Glu
         115                 120                 125

Lys Lys Lys Pro Gly Glu Thr Phe Phe Met Cys Ser Cys Ser Ser Asp
130                 135                 140

Glu Cys Asn Asp Asn Ile Ile Phe Ser Glu Glu Tyr Asn Thr Ser Asn
145                 150                 155                 160

Pro Asp Thr Gly Gly Gly Ser Gly Gly Gly Ser Gly Gly Gly
                 165                 170                 175

Gly Ser Gly Gly Gly Ser Thr His Thr Cys Pro Pro Cys Pro Ala
             180                 185                 190

Pro Glu Leu Leu Gly Gly Pro Ser Val Phe Leu Phe Pro Pro Lys Pro
         195                 200                 205

Lys Asp Thr Leu Met Ile Ser Arg Thr Pro Glu Val Thr Cys Val Val
 210                 215                 220

Val Asp Val Ser His Glu Asp Pro Glu Val Lys Phe Asn Trp Tyr Val
225                 230                 235                 240

Asp Gly Val Glu Val His Asn Ala Lys Thr Lys Pro Arg Glu Glu Gln
                 245                 250                 255

Tyr Asn Ser Thr Tyr Arg Val Val Ser Val Leu Thr Val Leu His Gln
             260                 265                 270

Asp Trp Leu Asn Gly Lys Glu Tyr Lys Cys Lys Val Ser Asn Lys Ala
         275                 280                 285

Leu Pro Ala Pro Ile Glu Lys Thr Ile Ser Lys Ala Lys Gly Gln Pro
 290                 295                 300

Arg Glu Pro Gln Val Tyr Thr Leu Pro Pro Ser Arg Glu Glu Met Thr
305                 310                 315                 320

Lys Asn Gln Val Ser Leu Thr Cys Leu Val Lys Gly Phe Tyr Pro Ser
                 325                 330                 335

Asp Ile Ala Val Glu Trp Glu Ser Asn Gly Gln Pro Glu Asn Asn Tyr
             340                 345                 350

Lys Thr Thr Pro Pro Val Leu Asp Ser Asp Gly Ser Phe Phe Leu Tyr
         355                 360                 365

Ser Lys Leu Thr Val Asp Lys Ser Arg Trp Gln Gln Gly Asn Val Phe
370                 375                 380

Ser Cys Ser Val Met His Glu Ala Leu His Asn His Tyr Thr Gln Lys
385                 390                 395                 400

Ser Leu Ser Leu Ser Pro Gly Lys
                405

<210> SEQ ID NO 52
<211> LENGTH: 409
<212> TYPE: PRT
<213> ORGANISM: Artificial Sequence
<220> FEATURE:

<223> OTHER INFORMATION: Description of Artificial Sequence: Synthetic
polypeptide

<400> SEQUENCE: 52

```
Ala Thr Ile Pro Pro His Val Gln Lys Ser Asp Val Glu Met Glu Ala
1               5                   10                  15

Gln Lys Asp Glu Ile Ile Cys Pro Ser Cys Asn Arg Thr Ala His Pro
            20                  25                  30

Leu Arg His Ile Asn Asn Asp Met Ile Val Thr Asp Asn Asn Gly Ala
        35                  40                  45

Val Lys Phe Pro Gln Leu Cys Lys Phe Cys Asp Val Arg Phe Ser Thr
    50                  55                  60

Cys Asp Asn Gln Lys Ser Cys Met Ser Asn Cys Ser Ile Thr Ser Ile
65                  70                  75                  80

Cys Glu Lys Pro Gln Glu Val Cys Val Ala Val Trp Arg Lys Asn Asp
                85                  90                  95

Glu Asn Ile Thr Leu Glu Thr Val Cys His Asp Pro Lys Leu Pro Tyr
            100                 105                 110

His Asp Phe Ile Leu Glu Asp Ala Ala Ser Pro Lys Cys Ile Met Lys
        115                 120                 125

Glu Lys Lys Pro Gly Glu Thr Phe Phe Met Cys Ser Cys Ser Ser
130                 135                 140

Asp Glu Cys Asn Asp Asn Ile Ile Phe Ser Glu Glu Tyr Asn Thr Ser
145                 150                 155                 160

Asn Pro Asp Thr Gly Gly Gly Ser Gly Gly Gly Ser Gly Gly
            165                 170                 175

Gly Gly Ser Gly Gly Gly Ser Thr His Thr Cys Pro Pro Cys Pro
            180                 185                 190

Ala Pro Glu Leu Leu Gly Gly Pro Ser Val Phe Leu Phe Pro Pro Lys
            195                 200                 205

Pro Lys Asp Thr Leu Met Ile Ser Arg Thr Pro Glu Val Thr Cys Val
        210                 215                 220

Val Val Asp Val Ser His Glu Asp Pro Glu Val Lys Phe Asn Trp Tyr
225                 230                 235                 240

Val Asp Gly Val Glu Val His Asn Ala Lys Thr Lys Pro Arg Glu Glu
                245                 250                 255

Gln Tyr Asn Ser Thr Tyr Arg Val Val Ser Val Leu Thr Val Leu His
            260                 265                 270

Gln Asp Trp Leu Asn Gly Lys Glu Tyr Lys Cys Lys Val Ser Asn Lys
        275                 280                 285

Ala Leu Pro Ala Pro Ile Glu Lys Thr Ile Ser Lys Ala Lys Gly Gln
290                 295                 300

Pro Arg Glu Pro Gln Val Tyr Thr Leu Pro Pro Ser Arg Glu Glu Met
305                 310                 315                 320

Thr Lys Asn Gln Val Ser Leu Thr Cys Leu Val Lys Gly Phe Tyr Pro
                325                 330                 335

Ser Asp Ile Ala Val Glu Trp Glu Ser Asn Gly Gln Pro Glu Asn Asn
            340                 345                 350

Tyr Lys Thr Thr Pro Pro Val Leu Asp Ser Asp Gly Ser Phe Phe Leu
        355                 360                 365

Tyr Ser Lys Leu Thr Val Asp Lys Ser Arg Trp Gln Gln Gly Asn Val
370                 375                 380

Phe Ser Cys Ser Val Met His Glu Ala Leu His Asn His Tyr Thr Gln
385                 390                 395                 400
```

Lys Ser Leu Ser Leu Ser Pro Gly Lys
                405

<210> SEQ ID NO 53
<211> LENGTH: 407
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

Ile Pro Pro His Val Gln Lys Ser Asp Val Glu Met Glu Ala Gln Lys
1               5                   10                  15

Asp Glu Ile Ile Cys Pro Ser Cys Asn Arg Thr Ala His Pro Leu Arg
            20                  25                  30

His Ile Asn Asn Asp Met Ile Val Thr Asp Asn Asn Gly Ala Val Lys
        35                  40                  45

Phe Pro Gln Leu Cys Lys Phe Cys Asp Val Arg Phe Ser Thr Cys Asp
    50                  55                  60

Asn Gln Lys Ser Cys Met Ser Asn Cys Ser Ile Thr Ser Ile Cys Glu
65                  70                  75                  80

Lys Pro Gln Glu Val Cys Val Ala Val Trp Arg Lys Asn Asp Glu Asn
                85                  90                  95

Ile Thr Leu Glu Thr Val Cys His Asp Pro Lys Leu Pro Tyr His Asp
            100                 105                 110

Phe Ile Leu Glu Asp Ala Ala Ser Pro Lys Cys Ile Met Lys Glu Lys
        115                 120                 125

Lys Lys Pro Gly Glu Thr Phe Phe Met Cys Ser Cys Ser Ser Asp Glu
    130                 135                 140

Cys Asn Asp Asn Ile Ile Phe Ser Glu Glu Tyr Asn Thr Ser Asn Pro
145                 150                 155                 160

Asp Thr Gly Gly Gly Ser Gly Gly Gly Ser Gly Gly Gly Gly Gly Gly
                165                 170                 175

Ser Gly Gly Gly Ser Thr His Thr Cys Pro Pro Cys Pro Ala Pro
            180                 185                 190

Glu Leu Leu Gly Gly Pro Ser Val Phe Leu Phe Pro Pro Lys Pro Lys
            195                 200                 205

Asp Thr Leu Met Ile Ser Arg Thr Pro Glu Val Thr Cys Val Val Val
    210                 215                 220

Asp Val Ser His Glu Asp Pro Glu Val Lys Phe Asn Trp Tyr Val Asp
225                 230                 235                 240

Gly Val Glu Val His Asn Ala Lys Thr Lys Pro Arg Glu Glu Gln Tyr
                245                 250                 255

Asn Ser Thr Tyr Arg Val Val Ser Val Leu Thr Val Leu His Gln Asp
            260                 265                 270

Trp Leu Asn Gly Lys Glu Tyr Lys Cys Lys Val Ser Asn Lys Ala Leu
        275                 280                 285

Pro Ala Pro Ile Glu Lys Thr Ile Ser Lys Ala Lys Gly Gln Pro Arg
    290                 295                 300

Glu Pro Gln Val Tyr Thr Leu Pro Pro Ser Arg Glu Glu Met Thr Lys
305                 310                 315                 320

Asn Gln Val Ser Leu Thr Cys Leu Val Lys Gly Phe Tyr Pro Ser Asp
                325                 330                 335

```
Ile Ala Val Glu Trp Glu Ser Asn Gly Gln Pro Asn Asn Tyr Lys
                340             345             350

Thr Thr Pro Pro Val Leu Asp Ser Asp Gly Ser Phe Phe Leu Tyr Ser
            355             360             365

Lys Leu Thr Val Asp Lys Ser Arg Trp Gln Gln Gly Asn Val Phe Ser
        370             375             380

Cys Ser Val Met His Glu Ala Leu His Asn His Tyr Thr Gln Lys Ser
385             390             395             400

Leu Ser Leu Ser Pro Gly Lys
                405

<210> SEQ ID NO 54
<211> LENGTH: 406
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 54

Pro Pro His Val Gln Lys Ser Asp Val Glu Met Glu Ala Gln Lys Asp
1               5                   10                  15

Glu Ile Ile Cys Pro Ser Cys Asn Arg Thr Ala His Pro Leu Arg His
                20                  25                  30

Ile Asn Asn Asp Met Ile Val Thr Asp Asn Asn Gly Ala Val Lys Phe
            35                  40                  45

Pro Gln Leu Cys Lys Phe Cys Asp Val Arg Phe Ser Thr Cys Asp Asn
    50                  55                  60

Gln Lys Ser Cys Met Ser Asn Cys Ser Ile Thr Ser Ile Cys Glu Lys
65                  70                  75                  80

Pro Gln Glu Val Cys Val Ala Val Trp Arg Lys Asn Asp Glu Asn Ile
                85                  90                  95

Thr Leu Glu Thr Val Cys His Asp Pro Lys Leu Pro Tyr His Asp Phe
                100                 105                 110

Ile Leu Glu Asp Ala Ala Ser Pro Lys Cys Ile Met Lys Glu Lys Lys
            115                 120                 125

Lys Pro Gly Glu Thr Phe Phe Met Cys Ser Cys Ser Ser Asp Glu Cys
    130                 135                 140

Asn Asp Asn Ile Ile Phe Ser Glu Glu Tyr Asn Thr Ser Asn Pro Asp
145                 150                 155                 160

Thr Gly Gly Gly Gly Ser Gly Gly Gly Gly Ser Gly Gly Gly Gly Ser
                165                 170                 175

Gly Gly Gly Gly Ser Thr His Thr Cys Pro Pro Cys Pro Ala Pro Glu
            180                 185                 190

Leu Leu Gly Gly Pro Ser Val Phe Leu Phe Pro Pro Lys Pro Lys Asp
        195                 200                 205

Thr Leu Met Ile Ser Arg Thr Pro Glu Val Thr Cys Val Val Val Asp
    210                 215                 220

Val Ser His Glu Asp Pro Glu Val Lys Phe Asn Trp Tyr Val Asp Gly
225                 230                 235                 240

Val Glu Val His Asn Ala Lys Thr Lys Pro Arg Glu Glu Gln Tyr Asn
                245                 250                 255

Ser Thr Tyr Arg Val Val Ser Val Leu Thr Val Leu His Gln Asp Trp
            260                 265                 270
```

-continued

```
Leu Asn Gly Lys Glu Tyr Lys Cys Lys Val Ser Asn Lys Ala Leu Pro
            275                 280                 285

Ala Pro Ile Glu Lys Thr Ile Ser Lys Ala Lys Gly Gln Pro Arg Glu
    290                 295                 300

Pro Gln Val Tyr Thr Leu Pro Pro Ser Arg Glu Glu Met Thr Lys Asn
305                 310                 315                 320

Gln Val Ser Leu Thr Cys Leu Val Lys Gly Phe Tyr Pro Ser Asp Ile
                325                 330                 335

Ala Val Glu Trp Glu Ser Asn Gly Gln Pro Glu Asn Asn Tyr Lys Thr
            340                 345                 350

Thr Pro Pro Val Leu Asp Ser Asp Gly Ser Phe Phe Leu Tyr Ser Lys
        355                 360                 365

Leu Thr Val Asp Lys Ser Arg Trp Gln Gln Gly Asn Val Phe Ser Cys
    370                 375                 380

Ser Val Met His Glu Ala Leu His Asn His Tyr Thr Gln Lys Ser Leu
385                 390                 395                 400

Ser Leu Ser Pro Gly Lys
                405

<210> SEQ ID NO 55
<211> LENGTH: 405
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 55

Pro His Val Gln Lys Ser Asp Val Glu Met Glu Ala Gln Lys Asp Glu
1               5                   10                  15

Ile Ile Cys Pro Ser Cys Asn Arg Thr Ala His Pro Leu Arg His Ile
            20                  25                  30

Asn Asn Asp Met Ile Val Thr Asp Asn Asn Gly Ala Val Lys Phe Pro
        35                  40                  45

Gln Leu Cys Lys Phe Cys Asp Val Arg Phe Ser Thr Cys Asp Asn Gln
    50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Glu Lys Lys Lys
        115                 120                 125

Pro Gly Glu Thr Phe Phe Met Cys Ser Cys Ser Ser Asp Glu Cys Asn
    130                 135                 140

Asp Asn Ile Ile Phe Ser Glu Glu Tyr Asn Thr Ser Asn Pro Asp Thr
145                 150                 155                 160

Gly Gly Gly Gly Ser Gly Gly Gly Ser Gly Gly Gly Gly Ser
                165                 170                 175

Gly Gly Gly Ser Thr His Thr Cys Pro Pro Cys Pro Ala Pro Glu Leu
            180                 185                 190

Leu Gly Gly Pro Ser Val Phe Leu Phe Pro Pro Lys Pro Lys Asp Thr
        195                 200                 205
```

-continued

```
Leu Met Ile Ser Arg Thr Pro Glu Val Thr Cys Val Val Asp Val
        210                 215                 220

Ser His Glu Asp Pro Glu Val Lys Phe Asn Trp Tyr Val Asp Gly Val
225                 230                 235                 240

Glu Val His Asn Ala Lys Thr Lys Pro Arg Glu Glu Gln Tyr Asn Ser
                245                 250                 255

Thr Tyr Arg Val Val Ser Val Leu Thr Val Leu His Gln Asp Trp Leu
            260                 265                 270

Asn Gly Lys Glu Tyr Lys Cys Lys Val Ser Asn Lys Ala Leu Pro Ala
        275                 280                 285

Pro Ile Glu Lys Thr Ile Ser Lys Ala Lys Gly Gln Pro Arg Glu Pro
    290                 295                 300

Gln Val Tyr Thr Leu Pro Pro Ser Arg Glu Glu Met Thr Lys Asn Gln
305                 310                 315                 320

Val Ser Leu Thr Cys Leu Val Lys Gly Phe Tyr Pro Ser Asp Ile Ala
                325                 330                 335

Val Glu Trp Glu Ser Asn Gly Gln Pro Glu Asn Asn Tyr Lys Thr Thr
            340                 345                 350

Pro Pro Val Leu Asp Ser Asp Gly Ser Phe Phe Leu Tyr Ser Lys Leu
        355                 360                 365

Thr Val Asp Lys Ser Arg Trp Gln Gln Gly Asn Val Phe Ser Cys Ser
    370                 375                 380

Val Met His Glu Ala Leu His Asn His Tyr Thr Gln Lys Ser Leu Ser
385                 390                 395                 400

Leu Ser Pro Gly Lys
                405

<210> SEQ ID NO 56
<211> LENGTH: 404
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 56

His Val Gln Lys Ser Asp Val Glu Met Glu Ala Gln Lys Asp Glu Ile
1               5                   10                  15

Ile Cys Pro Ser Cys Asn Arg Thr Ala His Pro Leu Arg His Ile Asn
            20                  25                  30

Asn Asp Met Ile Val Thr Asp Asn Gly Ala Val Lys Phe Pro Gln
        35                  40                  45

Leu Cys Lys Phe Cys Asp Val Arg Phe Ser Thr Cys Asp Asn Gln Lys
    50                  55                  60

Ser Cys Met Ser Asn Cys Ser Ile Thr Ser Ile Cys Glu Lys Pro Gln
65                  70                  75                  80

Glu Val Cys Val Ala Val Trp Arg Lys Asn Asp Glu Asn Ile Thr Leu
                85                  90                  95

Glu Thr Val Cys His Asp Pro Lys Leu Pro Tyr His Asp Phe Ile Leu
            100                 105                 110

Glu Asp Ala Ala Ser Pro Lys Cys Ile Met Lys Glu Lys Lys Pro
        115                 120                 125

Gly Glu Thr Phe Phe Met Cys Ser Cys Ser Ser Asp Glu Cys Asn Asp
    130                 135                 140
```

```
Asn Ile Ile Phe Ser Glu Glu Tyr Asn Thr Ser Asn Pro Asp Thr Gly
145                 150                 155                 160

Gly Gly Gly Ser Gly Gly Gly Ser Gly Gly Gly Ser Gly Gly
            165                 170                 175

Gly Gly Ser Thr His Thr Cys Pro Pro Cys Pro Ala Pro Glu Leu Leu
        180                 185                 190

Gly Gly Pro Ser Val Phe Leu Phe Pro Pro Lys Pro Lys Asp Thr Leu
            195                 200                 205

Met Ile Ser Arg Thr Pro Glu Val Thr Cys Val Val Val Asp Val Ser
210                 215                 220

His Glu Asp Pro Glu Val Lys Phe Asn Trp Tyr Val Asp Gly Val Glu
225                 230                 235                 240

Val His Asn Ala Lys Thr Lys Pro Arg Glu Glu Gln Tyr Asn Ser Thr
            245                 250                 255

Tyr Arg Val Val Ser Val Leu Thr Val Leu His Gln Asp Trp Leu Asn
            260                 265                 270

Gly Lys Glu Tyr Lys Cys Lys Val Ser Asn Lys Ala Leu Pro Ala Pro
        275                 280                 285

Ile Glu Lys Thr Ile Ser Lys Ala Lys Gly Gln Pro Arg Glu Pro Gln
290                 295                 300

Val Tyr Thr Leu Pro Pro Ser Arg Glu Glu Met Thr Lys Asn Gln Val
305                 310                 315                 320

Ser Leu Thr Cys Leu Val Lys Gly Phe Tyr Pro Ser Asp Ile Ala Val
            325                 330                 335

Glu Trp Glu Ser Asn Gly Gln Pro Glu Asn Asn Tyr Lys Thr Thr Pro
            340                 345                 350

Pro Val Leu Asp Ser Asp Gly Ser Phe Phe Leu Tyr Ser Lys Leu Thr
            355                 360                 365

Val Asp Lys Ser Arg Trp Gln Gln Gly Asn Val Phe Ser Cys Ser Val
            370                 375                 380

Met His Glu Ala Leu His Asn His Tyr Thr Gln Lys Ser Leu Ser Leu
385                 390                 395                 400

Ser Pro Gly Lys

<210> SEQ ID NO 57
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: See specification as filed for detailed
      description of substitutions and preferred embodiments

<400> SEQUENCE: 57

Gly Gly Gly Gly Ser Gly Gly Gly Ser
1               5                   10

<210> SEQ ID NO 58

<400> SEQUENCE: 58

000

<210> SEQ ID NO 59
<211> LENGTH: 20
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 59

Gly Gly Gly Gly Ser Gly Gly Gly Ser Gly Gly Gly Gly Ser Gly
1               5                   10                  15

Gly Gly Gly Ser
            20

<210> SEQ ID NO 60

<400> SEQUENCE: 60

000

<210> SEQ ID NO 61
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 61

His His His His His His
1               5

<210> SEQ ID NO 62
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 62

Asn Thr Ser Asn Pro Asp Thr Gly Gly Gly Thr His Thr Cys Pro Pro
1               5                   10                  15

Cys

<210> SEQ ID NO 63
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 63

Asn Thr Ser Asn Pro Asp Thr Gly Gly Gly Gly Ser Gly Gly Gly Gly
1               5                   10                  15

Ser Thr His Thr Cys Pro Pro Cys
            20

<210> SEQ ID NO 64
<211> LENGTH: 29
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 64

Asn Thr Ser Asn Pro Asp Thr Gly Gly Gly Ser Gly Gly Gly Gly
1               5                   10                  15

Ser Gly Gly Gly Gly Ser Thr His Thr Cys Pro Pro Cys
                20                  25

<210> SEQ ID NO 65
<211> LENGTH: 34
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 65

Asn Thr Ser Asn Pro Asp Thr Gly Gly Gly Ser Gly Gly Gly Gly
1               5                   10                  15

Ser Gly Gly Gly Gly Ser Gly Gly Gly Ser Thr His Thr Cys Pro
                20                  25                  30

Pro Cys

<210> SEQ ID NO 66
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Asn Thr Ser Asn Pro Asp Thr Gly Gly Gly Pro Lys Ser Cys Asp Lys
1               5                   10                  15

Thr His Thr Cys Pro Pro Cys
                20

<210> SEQ ID NO 67
<211> LENGTH: 407
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
                20                  25                  30

Arg His Ile Asn Asn Asp Met Ile Val Thr Asp Asn Gly Ala Val
                35                  40                  45

Lys Phe Pro Gln Leu Cys Lys Phe Cys Asp Val Arg Phe Ser Thr Cys
            50                  55                  60

Asp Asn Gln Lys Ser Cys Met Ser Asn Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
                100                 105                 110

Asp Phe Ile Leu Glu Asp Ala Ala Ser Pro Lys Cys Ile Met Lys Glu
            115                 120                 125
```

```
Lys Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr Asn Thr Ser Asn
145                 150                 155                 160

Pro Asp Thr Gly Gly Gly Ser Gly Gly Gly Ser Gly Gly Gly
                165                 170                 175

Gly Ser Gly Gly Gly Gly Ser Thr His Thr Cys Pro Pro Cys Pro Ala
            180                 185                 190

Pro Glu Leu Leu Gly Gly Pro Ser Val Phe Leu Phe Pro Pro Lys Pro
            195                 200                 205

Lys Asp Thr Leu Met Ile Ser Arg Thr Pro Glu Val Thr Cys Val Val
    210                 215                 220

Val Asp Val Ser His Glu Asp Pro Glu Val Lys Phe Asn Trp Tyr Val
225                 230                 235                 240

Asp Gly Val Glu Val His Asn Ala Lys Thr Lys Pro Arg Glu Glu Gln
                245                 250                 255

Tyr Asn Ser Thr Tyr Arg Val Val Ser Val Leu Thr Val Leu His Gln
            260                 265                 270

Asp Trp Leu Asn Gly Lys Glu Tyr Lys Cys Lys Val Ser Asn Lys Ala
    275                 280                 285

Leu Pro Ala Pro Ile Glu Lys Thr Ile Ser Lys Ala Lys Gly Gln Pro
290                 295                 300

Arg Glu Pro Gln Val Tyr Thr Leu Pro Pro Ser Arg Glu Glu Met Thr
305                 310                 315                 320

Lys Asn Gln Val Ser Leu Thr Cys Leu Val Lys Gly Phe Tyr Pro Ser
                325                 330                 335

Asp Ile Ala Val Glu Trp Glu Ser Asn Gly Gln Pro Glu Asn Asn Tyr
            340                 345                 350

Lys Thr Thr Pro Pro Val Leu Asp Ser Asp Gly Ser Phe Phe Leu Tyr
        355                 360                 365

Ser Lys Leu Thr Val Asp Lys Ser Arg Trp Gln Gln Gly Asn Val Phe
    370                 375                 380

Ser Cys Ser Val Met His Glu Ala Leu His Asn His Tyr Thr Gln Lys
385                 390                 395                 400

Ser Leu Ser Leu Ser Pro Gly
                405

<210> SEQ ID NO 68
<211> LENGTH: 426
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60
```

Val Thr Asp Asn Asn Gly Ala Val Lys Phe Pro Gln Leu Cys Lys Phe
 65                  70                  75                  80

Cys Asp Val Arg Phe Ser Thr Cys Asp Asn Gln Lys Ser Cys Met Ser
                 85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Gly Gly Gly Ser Thr His Thr Cys Pro Pro
        195                 200                 205

Cys Pro Ala Pro Glu Leu Leu Gly Gly Pro Ser Val Phe Leu Phe Pro
210                 215                 220

Pro Lys Pro Lys Asp Thr Leu Met Ile Ser Arg Thr Pro Glu Val Thr
225                 230                 235                 240

Cys Val Val Val Asp Val Ser His Glu Asp Pro Glu Val Lys Phe Asn
                245                 250                 255

Trp Tyr Val Asp Gly Val Glu Val His Asn Ala Lys Thr Lys Pro Arg
            260                 265                 270

Glu Glu Gln Tyr Asn Ser Thr Tyr Arg Val Val Ser Val Leu Thr Val
        275                 280                 285

Leu His Gln Asp Trp Leu Asn Gly Lys Glu Tyr Lys Cys Lys Val Ser
290                 295                 300

Asn Lys Ala Leu Pro Ala Pro Ile Glu Lys Thr Ile Ser Lys Ala Lys
305                 310                 315                 320

Gly Gln Pro Arg Glu Pro Gln Val Tyr Thr Leu Pro Pro Ser Arg Glu
                325                 330                 335

Glu Met Thr Lys Asn Gln Val Ser Leu Thr Cys Leu Val Lys Gly Phe
            340                 345                 350

Tyr Pro Ser Asp Ile Ala Val Glu Trp Glu Ser Asn Gly Gln Pro Glu
        355                 360                 365

Asn Asn Tyr Lys Thr Thr Pro Pro Val Leu Asp Ser Asp Gly Ser Phe
370                 375                 380

Phe Leu Tyr Ser Lys Leu Thr Val Asp Lys Ser Arg Trp Gln Gln Gly
385                 390                 395                 400

Asn Val Phe Ser Cys Ser Val Met His Glu Ala Leu His Asn His Tyr
                405                 410                 415

Thr Gln Lys Ser Leu Ser Leu Ser Pro Gly
            420                 425

<210> SEQ ID NO 69
<211> LENGTH: 431
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

```
Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Ser
            180                 185                 190

Gly Gly Gly Gly Ser Gly Gly Gly Ser Gly Gly Gly Ser Thr
        195                 200                 205

His Thr Cys Pro Pro Cys Pro Ala Pro Glu Leu Leu Gly Gly Pro Ser
    210                 215                 220

Val Phe Leu Phe Pro Pro Lys Pro Lys Asp Thr Leu Met Ile Ser Arg
225                 230                 235                 240

Thr Pro Glu Val Thr Cys Val Val Val Asp Val Ser His Glu Asp Pro
                245                 250                 255

Glu Val Lys Phe Asn Trp Tyr Val Asp Gly Val Glu Val His Asn Ala
            260                 265                 270

Lys Thr Lys Pro Arg Glu Glu Gln Tyr Asn Ser Thr Tyr Arg Val Val
        275                 280                 285

Ser Val Leu Thr Val Leu His Gln Asp Trp Leu Asn Gly Lys Glu Tyr
    290                 295                 300

Lys Cys Lys Val Ser Asn Lys Ala Leu Pro Ala Pro Ile Glu Lys Thr
305                 310                 315                 320

Ile Ser Lys Ala Lys Gly Gln Pro Arg Glu Pro Gln Val Tyr Thr Leu
                325                 330                 335

Pro Pro Ser Arg Glu Glu Met Thr Lys Asn Gln Val Ser Leu Thr Cys
            340                 345                 350

Leu Val Lys Gly Phe Tyr Pro Ser Asp Ile Ala Val Glu Trp Glu Ser
        355                 360                 365

Asn Gly Gln Pro Glu Asn Asn Tyr Lys Thr Thr Pro Pro Val Leu Asp
    370                 375                 380

Ser Asp Gly Ser Phe Phe Leu Tyr Ser Lys Leu Thr Val Asp Lys Ser
385                 390                 395                 400

Arg Trp Gln Gln Gly Asn Val Phe Ser Cys Ser Val Met His Glu Ala
                405                 410                 415
```

Leu His Asn His Tyr Thr Gln Lys Ser Leu Ser Leu Ser Pro Gly
            420                 425                 430

<210> SEQ ID NO 70
<211> LENGTH: 421
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Thr His Thr Cys Pro Pro Cys Pro Ala Pro Glu
        195                 200                 205

Leu Leu Gly Gly Pro Ser Val Phe Leu Phe Pro Pro Lys Pro Lys Asp
    210                 215                 220

Thr Leu Met Ile Ser Arg Thr Pro Glu Val Thr Cys Val Val Val Asp
225                 230                 235                 240

Val Ser His Glu Asp Pro Glu Val Lys Phe Asn Trp Tyr Val Asp Gly
                245                 250                 255

Val Glu Val His Asn Ala Lys Thr Lys Pro Arg Glu Glu Gln Tyr Asn
            260                 265                 270

Ser Thr Tyr Arg Val Val Ser Val Leu Thr Val Leu His Gln Asp Trp
        275                 280                 285

Leu Asn Gly Lys Glu Tyr Lys Cys Lys Val Ser Asn Lys Ala Leu Pro
    290                 295                 300

Ala Pro Ile Glu Lys Thr Ile Ser Lys Ala Lys Gly Gln Pro Arg Glu
305                 310                 315                 320

Pro Gln Val Tyr Thr Leu Pro Pro Ser Arg Glu Glu Met Thr Lys Asn
                325                 330                 335

```
Gln Val Ser Leu Thr Cys Leu Val Lys Gly Phe Tyr Pro Ser Asp Ile
            340                 345                 350

Ala Val Glu Trp Glu Ser Asn Gly Gln Pro Glu Asn Asn Tyr Lys Thr
            355                 360                 365

Thr Pro Pro Val Leu Asp Ser Asp Gly Ser Phe Phe Leu Tyr Ser Lys
    370                 375                 380

Leu Thr Val Asp Lys Ser Arg Trp Gln Gln Gly Asn Val Phe Ser Cys
385                 390                 395                 400

Ser Val Met His Glu Ala Leu His Asn His Tyr Thr Gln Lys Ser Leu
                405                 410                 415

Ser Leu Ser Pro Gly
            420

<210> SEQ ID NO 71
<211> LENGTH: 420
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 71

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
            85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Lys Pro Gly Glu Thr Phe
145                 150                 155                 160

Phe Met Cys Ser Cys Ser Ser Asp Glu Cys Asn Asp Asn Ile Ile Phe
            165                 170                 175

Ser Glu Glu Tyr Asn Thr Ser Asn Pro Asp Thr Gly Gly Gly Pro Lys
            180                 185                 190

Ser Cys Asp Lys Thr His Thr Cys Pro Pro Cys Pro Ala Pro Glu Leu
        195                 200                 205

Leu Gly Gly Pro Ser Val Phe Leu Phe Pro Pro Lys Pro Lys Asp Thr
    210                 215                 220

Leu Met Ile Ser Arg Thr Pro Glu Val Thr Cys Val Val Val Asp Val
225                 230                 235                 240

Ser His Glu Asp Pro Glu Val Lys Phe Asn Trp Tyr Val Asp Gly Val
            245                 250                 255
```

```
Glu Val His Asn Ala Lys Thr Lys Pro Arg Glu Glu Gln Tyr Asn Ser
                260                 265                 270

Thr Tyr Arg Val Val Ser Val Leu Thr Val Leu His Gln Asp Trp Leu
            275                 280                 285

Asn Gly Lys Glu Tyr Lys Cys Lys Val Ser Asn Lys Ala Leu Pro Ala
        290                 295                 300

Pro Ile Glu Lys Thr Ile Ser Lys Ala Lys Gly Gln Pro Arg Glu Pro
305                 310                 315                 320

Gln Val Tyr Thr Leu Pro Pro Ser Arg Glu Glu Met Thr Lys Asn Gln
                325                 330                 335

Val Ser Leu Thr Cys Leu Val Lys Gly Phe Tyr Pro Ser Asp Ile Ala
            340                 345                 350

Val Glu Trp Glu Ser Asn Gly Gln Pro Glu Asn Asn Tyr Lys Thr Thr
        355                 360                 365

Pro Pro Val Leu Asp Ser Asp Gly Ser Phe Phe Leu Tyr Ser Lys Leu
370                 375                 380

Thr Val Asp Lys Ser Arg Trp Gln Gln Gly Asn Val Phe Ser Cys Ser
385                 390                 395                 400

Val Met His Glu Ala Leu His Asn His Tyr Thr Gln Lys Ser Leu Ser
                405                 410                 415

Leu Ser Pro Gly
            420

<210> SEQ ID NO 72
<211> LENGTH: 224
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 72

Thr His Thr Cys Pro Pro Cys Pro Ala Pro Glu Leu Leu Gly Gly Pro
1               5                   10                  15

Ser Val Phe Leu Phe Pro Pro Lys Pro Lys Asp Thr Leu Met Ile Ser
            20                  25                  30

Arg Thr Pro Glu Val Thr Cys Val Val Val Asp Val Ser His Glu Asp
        35                  40                  45

Pro Glu Val Lys Phe Asn Trp Tyr Val Asp Gly Val Glu Val His Asn
    50                  55                  60

Ala Lys Thr Lys Pro Arg Glu Glu Gln Tyr Asn Ser Thr Tyr Arg Val
65                  70                  75                  80

Val Ser Val Leu Thr Val Leu His Gln Asp Trp Leu Asn Gly Lys Glu
                85                  90                  95

Tyr Lys Cys Lys Val Ser Asn Lys Ala Leu Pro Ala Pro Ile Glu Lys
            100                 105                 110

Thr Ile Ser Lys Ala Lys Gly Gln Pro Arg Glu Pro Gln Val Tyr Thr
        115                 120                 125

Leu Pro Pro Ser Arg Glu Glu Met Thr Lys Asn Gln Val Ser Leu Thr
    130                 135                 140

Cys Leu Val Lys Gly Phe Tyr Pro Ser Asp Ile Ala Val Glu Trp Glu
145                 150                 155                 160

Ser Asn Gly Gln Pro Glu Asn Asn Tyr Lys Thr Thr Pro Pro Val Leu
                165                 170                 175
```

```
Asp Ser Asp Gly Ser Phe Phe Leu Tyr Ser Lys Leu Thr Val Asp Lys
            180                 185                 190

Ser Arg Trp Gln Gln Gly Asn Val Phe Ser Cys Ser Val Met His Glu
        195                 200                 205

Ala Leu His Asn His Tyr Thr Gln Lys Ser Leu Ser Leu Ser Pro Gly
    210                 215                 220

<210> SEQ ID NO 73
<211> LENGTH: 222
<212> TYPE: PRT
<213> ORGANISM: Homo sapiens

<400> SEQUENCE: 73

Val Glu Cys Pro Pro Cys Pro Ala Pro Pro Val Ala Gly Pro Ser Val
1               5                   10                  15

Phe Leu Phe Pro Pro Lys Pro Lys Asp Thr Leu Met Ile Ser Arg Thr
            20                  25                  30

Pro Glu Val Thr Cys Val Val Asp Val Ser His Glu Asp Pro Glu
        35                  40                  45

Val Gln Phe Asn Trp Tyr Val Asp Gly Val Glu Val His Asn Ala Lys
    50                  55                  60

Thr Lys Pro Arg Glu Glu Gln Phe Asn Ser Thr Phe Arg Val Val Ser
65                  70                  75                  80

Val Leu Thr Val Val His Gln Asp Trp Leu Asn Gly Lys Glu Tyr Lys
                85                  90                  95

Cys Lys Val Ser Asn Lys Gly Leu Pro Ala Pro Ile Glu Lys Thr Ile
            100                 105                 110

Ser Lys Thr Lys Gly Gln Pro Arg Glu Pro Gln Val Tyr Thr Leu Pro
        115                 120                 125

Pro Ser Arg Glu Glu Met Thr Lys Asn Gln Val Ser Leu Thr Cys Leu
    130                 135                 140

Val Lys Gly Phe Tyr Pro Ser Asp Ile Ala Val Glu Trp Glu Ser Asn
145                 150                 155                 160

Gly Gln Pro Glu Asn Asn Tyr Lys Thr Thr Pro Pro Met Leu Asp Ser
                165                 170                 175

Asp Gly Ser Phe Phe Leu Tyr Ser Lys Leu Thr Val Asp Lys Ser Arg
            180                 185                 190

Trp Gln Gln Gly Asn Val Phe Ser Cys Ser Val Met His Glu Ala Leu
        195                 200                 205

His Asn His Tyr Thr Gln Lys Ser Leu Ser Leu Ser Pro Gly
    210                 215                 220

<210> SEQ ID NO 74
<211> LENGTH: 232
<212> TYPE: PRT
<213> ORGANISM: Homo sapiens

<400> SEQUENCE: 74

Gly Gly Pro Lys Ser Cys Asp Lys Thr His Thr Cys Pro Pro Cys Pro
1               5                   10                  15

Ala Pro Glu Leu Leu Gly Gly Pro Ser Val Phe Leu Phe Pro Pro Lys
            20                  25                  30

Pro Lys Asp Thr Leu Met Ile Ser Arg Thr Pro Glu Val Thr Cys Val
        35                  40                  45

Val Val Asp Val Ser His Glu Asp Pro Glu Val Lys Phe Asn Trp Tyr
    50                  55                  60
```

```
Val Asp Gly Val Glu Val His Asn Ala Lys Thr Lys Pro Arg Glu Glu
 65                  70                  75                  80

Gln Tyr Asn Ser Thr Tyr Arg Val Val Ser Val Leu Thr Val Leu His
                 85                  90                  95

Gln Asp Trp Leu Asn Gly Lys Glu Tyr Lys Cys Lys Val Ser Asn Lys
             100                 105                 110

Ala Leu Pro Ala Pro Ile Glu Lys Thr Ile Ser Lys Ala Lys Gly Gln
         115                 120                 125

Pro Arg Glu Pro Gln Val Tyr Thr Leu Pro Pro Ser Arg Glu Glu Met
130                 135                 140

Thr Lys Asn Gln Val Ser Leu Thr Cys Leu Val Lys Gly Phe Tyr Pro
145                 150                 155                 160

Ser Asp Ile Ala Val Glu Trp Glu Ser Asn Gly Gln Pro Glu Asn Asn
                165                 170                 175

Tyr Lys Thr Thr Pro Pro Val Leu Asp Ser Asp Gly Ser Phe Phe Leu
            180                 185                 190

Tyr Ser Lys Leu Thr Val Asp Lys Ser Arg Trp Gln Gln Gly Asn Val
        195                 200                 205

Phe Ser Cys Ser Val Met His Glu Ala Leu His Asn His Tyr Thr Gln
    210                 215                 220

Lys Ser Leu Ser Leu Ser Pro Gly
225                 230

<210> SEQ ID NO 75
<211> LENGTH: 436
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175
```

```
Ser Glu Glu Tyr Asn Thr Ser Asn Pro Asp Thr Gly Gly Gly Ser
            180                 185                 190

Gly Gly Gly Gly Ser Gly Gly Gly Ser Gly Gly Gly Gly Ser Gly
        195                 200                 205

Gly Gly Gly Ser Thr His Thr Cys Pro Pro Cys Pro Ala Pro Glu Leu
    210                 215                 220

Leu Gly Gly Pro Ser Val Phe Leu Phe Pro Pro Lys Pro Lys Asp Thr
225                 230                 235                 240

Leu Met Ile Ser Arg Thr Pro Glu Val Thr Cys Val Val Val Asp Val
                245                 250                 255

Ser His Glu Asp Pro Glu Val Lys Phe Asn Trp Tyr Val Asp Gly Val
            260                 265                 270

Glu Val His Asn Ala Lys Thr Lys Pro Arg Glu Glu Gln Tyr Asn Ser
        275                 280                 285

Thr Tyr Arg Val Val Ser Val Leu Thr Val Leu His Gln Asp Trp Leu
    290                 295                 300

Asn Gly Lys Glu Tyr Lys Cys Lys Val Ser Asn Lys Ala Leu Pro Ala
305                 310                 315                 320

Pro Ile Glu Lys Thr Ile Ser Lys Ala Lys Gly Gln Pro Arg Glu Pro
                325                 330                 335

Gln Val Tyr Thr Leu Pro Pro Ser Arg Glu Glu Met Thr Lys Asn Gln
            340                 345                 350

Val Ser Leu Thr Cys Leu Val Lys Gly Phe Tyr Pro Ser Asp Ile Ala
        355                 360                 365

Val Glu Trp Glu Ser Asn Gly Gln Pro Glu Asn Asn Tyr Lys Thr Thr
    370                 375                 380

Pro Pro Val Leu Asp Ser Asp Gly Ser Phe Phe Leu Tyr Ser Lys Leu
385                 390                 395                 400

Thr Val Asp Lys Ser Arg Trp Gln Gln Gly Asn Val Phe Ser Cys Ser
                405                 410                 415

Val Met His Glu Ala Leu His Asn His Tyr Thr Gln Lys Ser Leu Ser
            420                 425                 430

Leu Ser Pro Gly
        435

<210> SEQ ID NO 76
<211> LENGTH: 441
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 76

Met Asp Ala Met Lys Arg Gly Leu Cys Cys Val Leu Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80
```

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Gly Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Gly Ser
            180                 185                 190

Gly Gly Gly Gly Ser Gly Gly Gly Ser Gly Gly Gly Ser Gly
        195                 200                 205

Gly Gly Gly Ser Gly Gly Gly Gly Ser Thr His Thr Cys Pro Pro Cys
    210                 215                 220

Pro Ala Pro Glu Leu Leu Gly Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser His Glu Asp Pro Glu Val Lys Phe Asn Trp
            260                 265                 270

Tyr Val Asp Gly Val Glu Val His Asn Ala Lys Thr Lys Pro Arg Glu
        275                 280                 285

Glu Gln Tyr Asn Ser Thr Tyr Arg Val Val Ser Val Leu Thr Val Leu
    290                 295                 300

His Gln Asp Trp Leu Asn Gly Lys Glu Tyr Lys Cys Lys Val Ser Asn
305                 310                 315                 320

Lys Ala Leu Pro Ala Pro Ile Glu Lys Thr Ile Ser Lys Ala Lys Gly
                325                 330                 335

Gln Pro Arg Glu Pro Gln Val Tyr Thr Leu Pro Pro Ser Arg Glu Glu
            340                 345                 350

Met Thr Lys Asn Gln Val Ser Leu Thr Cys Leu Val Lys Gly Phe Tyr
        355                 360                 365

Pro Ser Asp Ile Ala Val Glu Trp Glu Ser Asn Gly Gln Pro Glu Asn
    370                 375                 380

Asn Tyr Lys Thr Thr Pro Pro Val Leu Asp Ser Asp Gly Ser Phe Phe
385                 390                 395                 400

Leu Tyr Ser Lys Leu Thr Val Asp Lys Ser Arg Trp Gln Gln Gly Asn
                405                 410                 415

Val Phe Ser Cys Ser Val Met His Glu Ala Leu His Asn His Tyr Thr
            420                 425                 430

Gln Lys Ser Leu Ser Leu Ser Pro Gly
        435                 440

<210> SEQ ID NO 77
<211> LENGTH: 409
<212> TYPE: PRT
<213> ORGANISM: Artificial Sequence
<220> FEATURE:
<223> OTHER INFORMATION: Description of Artificial Sequence: Synthetic
      polypeptide

```
<400> SEQUENCE: 77

Gly Ala Thr Ile Pro Pro His Val Gln Lys Ser Asp Val Glu Met Glu
1               5                   10                  15

Ala Gln Lys Asp Glu Ile Ile Cys Pro Ser Cys Asn Arg Thr Ala His
            20                  25                  30

Pro Leu Arg His Ile Asn Asn Asp Met Ile Val Thr Asp Asn Asn Gly
        35                  40                  45

Ala Val Lys Phe Pro Gln Leu Cys Lys Phe Cys Asp Val Arg Phe Ser
50                  55                  60

Thr Cys Asp Asn Gln Lys Ser Cys Met Ser Asn Cys Ser Ile Thr Ser
65                  70                  75                  80

Ile Cys Glu Lys Pro Gln Glu Val Cys Val Ala Val Trp Arg Lys Asn
                85                  90                  95

Asp Glu Asn Ile Thr Leu Glu Thr Val Cys His Asp Pro Lys Leu Pro
            100                 105                 110

Tyr His Asp Phe Ile Leu Glu Asp Ala Ala Ser Pro Lys Cys Ile Met
        115                 120                 125

Lys Glu Lys Lys Lys Pro Gly Glu Thr Phe Phe Met Cys Ser Cys Ser
130                 135                 140

Ser Asp Glu Cys Asn Asp Asn Ile Ile Phe Ser Glu Glu Tyr Asn Thr
145                 150                 155                 160

Ser Asn Pro Asp Thr Gly Gly Gly Ser Gly Gly Gly Ser Gly
                165                 170                 175

Gly Gly Gly Ser Gly Gly Gly Ser Thr His Thr Cys Pro Pro Cys
            180                 185                 190

Pro Ala Pro Glu Leu Leu Gly Gly Pro Ser Val Phe Leu Phe Pro Pro
        195                 200                 205

Lys Pro Lys Asp Thr Leu Met Ile Ser Arg Thr Pro Glu Val Thr Cys
210                 215                 220

Val Val Val Asp Val Ser His Glu Asp Pro Glu Val Lys Phe Asn Trp
225                 230                 235                 240

Tyr Val Asp Gly Val Glu Val His Asn Ala Lys Thr Lys Pro Arg Glu
                245                 250                 255

Glu Gln Tyr Asn Ser Thr Tyr Arg Val Val Ser Val Leu Thr Val Leu
            260                 265                 270

His Gln Asp Trp Leu Asn Gly Lys Glu Tyr Lys Cys Lys Val Ser Asn
        275                 280                 285

Lys Ala Leu Pro Ala Pro Ile Glu Lys Thr Ile Ser Lys Ala Lys Gly
290                 295                 300

Gln Pro Arg Glu Pro Gln Val Tyr Thr Leu Pro Pro Ser Arg Glu Glu
305                 310                 315                 320

Met Thr Lys Asn Gln Val Ser Leu Thr Cys Leu Val Lys Gly Phe Tyr
                325                 330                 335

Pro Ser Asp Ile Ala Val Glu Trp Glu Ser Asn Gly Gln Pro Glu Asn
            340                 345                 350

Asn Tyr Lys Thr Thr Pro Pro Val Leu Asp Ser Asp Gly Ser Phe Phe
        355                 360                 365

Leu Tyr Ser Lys Leu Thr Val Asp Lys Ser Arg Trp Gln Gln Gly Asn
370                 375                 380

Val Phe Ser Cys Ser Val Met His Glu Ala Leu His Asn His Tyr Thr
385                 390                 395                 400

Gln Lys Ser Leu Ser Leu Ser Pro Gly
                405
```

<210> SEQ ID NO 78
<211> LENGTH: 407
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 78

Thr Ile Pro Pro His Val Gln Lys Ser Asp Val Glu Met Glu Ala Gln
1               5                   10                  15

Lys Asp Glu Ile Ile Cys Pro Ser Cys Asn Arg Thr Ala His Pro Leu
            20                  25                  30

Arg His Ile Asn Asn Asp Met Ile Val Thr Asp Asn Asn Gly Ala Val
        35                  40                  45

Lys Phe Pro Gln Leu Cys Lys Phe Cys Asp Val Arg Phe Ser Thr Cys
    50                  55                  60

Asp Asn Gln Lys Ser Cys Met Ser Asn Cys Ser Ile Thr Ser Ile Cys
65                  70                  75                  80

Glu Lys Pro Gln Glu Val Cys Val Ala Val Trp Arg Lys Asn Asp Glu
                85                  90                  95

Asn Ile Thr Leu Glu Thr Val Cys His Asp Pro Lys Leu Pro Tyr His
            100                 105                 110

Asp Phe Ile Leu Glu Asp Ala Ala Ser Pro Lys Cys Ile Met Lys Glu
        115                 120                 125

Lys Lys Lys Pro Gly Glu Thr Phe Phe Met Cys Ser Cys Ser Ser Asp
    130                 135                 140

Glu Cys Asn Asp Asn Ile Ile Phe Ser Glu Glu Tyr Asn Thr Ser Asn
145                 150                 155                 160

Pro Asp Thr Gly Gly Gly Gly Ser Gly Gly Gly Ser Gly Gly Gly
                165                 170                 175

Gly Ser Gly Gly Gly Gly Ser Thr His Thr Cys Pro Pro Cys Pro Ala
            180                 185                 190

Pro Glu Leu Leu Gly Gly Pro Ser Val Phe Leu Phe Pro Pro Lys Pro
        195                 200                 205

Lys Asp Thr Leu Met Ile Ser Arg Thr Pro Glu Val Thr Cys Val Val
    210                 215                 220

Val Asp Val Ser His Glu Asp Pro Glu Val Lys Phe Asn Trp Tyr Val
225                 230                 235                 240

Asp Gly Val Glu Val His Asn Ala Lys Thr Lys Pro Arg Glu Glu Gln
                245                 250                 255

Tyr Asn Ser Thr Tyr Arg Val Val Ser Val Leu Thr Val Leu His Gln
            260                 265                 270

Asp Trp Leu Asn Gly Lys Glu Tyr Lys Cys Lys Val Ser Asn Lys Ala
        275                 280                 285

Leu Pro Ala Pro Ile Glu Lys Thr Ile Ser Lys Ala Lys Gly Gln Pro
    290                 295                 300

Arg Glu Pro Gln Val Tyr Thr Leu Pro Pro Ser Arg Glu Glu Met Thr
305                 310                 315                 320

Lys Asn Gln Val Ser Leu Thr Cys Leu Val Lys Gly Phe Tyr Pro Ser
                325                 330                 335

Asp Ile Ala Val Glu Trp Glu Ser Asn Gly Gln Pro Glu Asn Asn Tyr
            340                 345                 350

```
Lys Thr Thr Pro Pro Val Leu Asp Ser Asp Gly Ser Phe Phe Leu Tyr
            355                 360                 365

Ser Lys Leu Thr Val Asp Lys Ser Arg Trp Gln Gln Gly Asn Val Phe
        370                 375                 380

Ser Cys Ser Val Met His Glu Ala Leu His Asn His Tyr Thr Gln Lys
385                 390                 395                 400

Ser Leu Ser Leu Ser Pro Gly
                405

<210> SEQ ID NO 79
<211> LENGTH: 408
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Ala Thr Ile Pro Pro His Val Gln Lys Ser Asp Val Glu Met Glu Ala
1               5                   10                  15

Gln Lys Asp Glu Ile Ile Cys Pro Ser Cys Asn Arg Thr Ala His Pro
            20                  25                  30

Leu Arg His Ile Asn Asn Asp Met Ile Val Thr Asp Asn Asn Gly Ala
        35                  40                  45

Val Lys Phe Pro Gln Leu Cys Lys Phe Cys Asp Val Arg Phe Ser Thr
    50                  55                  60

Cys Asp Asn Gln Lys Ser Cys Met Ser Asn Cys Ser Ile Thr Ser Ile
65                  70                  75                  80

Cys Glu Lys Pro Gln Glu Val Cys Val Ala Val Trp Arg Lys Asn Asp
                85                  90                  95

Glu Asn Ile Thr Leu Glu Thr Val Cys His Asp Pro Lys Leu Pro Tyr
            100                 105                 110

His Asp Phe Ile Leu Glu Asp Ala Ala Ser Pro Lys Cys Ile Met Lys
        115                 120                 125

Glu Lys Lys Lys Pro Gly Glu Thr Phe Phe Met Cys Ser Cys Ser Ser
    130                 135                 140

Asp Glu Cys Asn Asp Asn Ile Ile Phe Ser Glu Glu Tyr Asn Thr Ser
145                 150                 155                 160

Asn Pro Asp Thr Gly Gly Gly Gly Ser Gly Gly Gly Ser Gly Gly Gly
                165                 170                 175

Gly Gly Ser Gly Gly Gly Gly Ser Thr His Thr Cys Pro Pro Cys Pro
            180                 185                 190

Ala Pro Glu Leu Leu Gly Gly Pro Ser Val Phe Leu Phe Pro Pro Lys
        195                 200                 205

Pro Lys Asp Thr Leu Met Ile Ser Arg Thr Pro Glu Val Thr Cys Val
    210                 215                 220

Val Val Asp Val Ser His Glu Asp Pro Glu Val Lys Phe Asn Trp Tyr
225                 230                 235                 240

Val Asp Gly Val Glu Val His Asn Ala Lys Thr Lys Pro Arg Glu Glu
                245                 250                 255

Gln Tyr Asn Ser Thr Tyr Arg Val Val Ser Val Leu Thr Val Leu His
            260                 265                 270

Gln Asp Trp Leu Asn Gly Lys Glu Tyr Lys Cys Lys Val Ser Asn Lys
        275                 280                 285
```

Ala Leu Pro Ala Pro Ile Glu Lys Thr Ile Ser Lys Ala Lys Gly Gln
            290                 295                 300

Pro Arg Glu Pro Gln Val Tyr Thr Leu Pro Pro Ser Arg Glu Glu Met
305                 310                 315                 320

Thr Lys Asn Gln Val Ser Leu Thr Cys Leu Val Lys Gly Phe Tyr Pro
                325                 330                 335

Ser Asp Ile Ala Val Glu Trp Glu Ser Asn Gly Gln Pro Glu Asn Asn
            340                 345                 350

Tyr Lys Thr Thr Pro Pro Val Leu Asp Ser Asp Gly Ser Phe Phe Leu
        355                 360                 365

Tyr Ser Lys Leu Thr Val Asp Lys Ser Arg Trp Gln Gln Gly Asn Val
    370                 375                 380

Phe Ser Cys Ser Val Met His Glu Ala Leu His Asn His Tyr Thr Gln
385                 390                 395                 400

Lys Ser Leu Ser Leu Ser Pro Gly
                405

<210> SEQ ID NO 80
<211> LENGTH: 406
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 80

Ile Pro Pro His Val Gln Lys Ser Asp Val Glu Met Glu Ala Gln Lys
1               5                   10                  15

Asp Glu Ile Ile Cys Pro Ser Cys Asn Arg Thr Ala His Pro Leu Arg
            20                  25                  30

His Ile Asn Asn Asp Met Ile Val Thr Asp Asn Asn Gly Ala Val Lys
        35                  40                  45

Phe Pro Gln Leu Cys Lys Phe Cys Asp Val Arg Phe Ser Thr Cys Asp
    50                  55                  60

Asn Gln Lys Ser Cys Met Ser Asn Cys Ser Ile Thr Ser Ile Cys Glu
65                  70                  75                  80

Lys Pro Gln Glu Val Cys Val Ala Val Trp Arg Lys Asn Asp Glu Asn
                85                  90                  95

Ile Thr Leu Glu Thr Val Cys His Asp Pro Lys Leu Pro Tyr His Asp
            100                 105                 110

Phe Ile Leu Glu Asp Ala Ala Ser Pro Lys Cys Ile Met Lys Glu Lys
        115                 120                 125

Lys Lys Pro Gly Glu Thr Phe Phe Met Cys Ser Cys Ser Ser Asp Glu
    130                 135                 140

Cys Asn Asp Asn Ile Ile Phe Ser Glu Glu Tyr Asn Thr Ser Asn Pro
145                 150                 155                 160

Asp Thr Gly Gly Gly Gly Ser Gly Gly Gly Gly Ser Gly Gly Gly Gly
                165                 170                 175

Ser Gly Gly Gly Gly Ser Thr His Thr Cys Pro Pro Cys Pro Ala Pro
            180                 185                 190

Glu Leu Leu Gly Gly Pro Ser Val Phe Leu Phe Pro Pro Lys Pro Lys
        195                 200                 205

Asp Thr Leu Met Ile Ser Arg Thr Pro Glu Val Thr Cys Val Val Val
    210                 215                 220

```
Asp Val Ser His Glu Asp Pro Glu Val Lys Phe Asn Trp Tyr Val Asp
225                 230                 235                 240

Gly Val Glu Val His Asn Ala Lys Thr Lys Pro Arg Glu Glu Gln Tyr
                245                 250                 255

Asn Ser Thr Tyr Arg Val Val Ser Val Leu Thr Val Leu His Gln Asp
            260                 265                 270

Trp Leu Asn Gly Lys Glu Tyr Lys Cys Lys Val Ser Asn Lys Ala Leu
        275                 280                 285

Pro Ala Pro Ile Glu Lys Thr Ile Ser Lys Ala Lys Gly Gln Pro Arg
    290                 295                 300

Glu Pro Gln Val Tyr Thr Leu Pro Pro Ser Arg Glu Glu Met Thr Lys
305                 310                 315                 320

Asn Gln Val Ser Leu Thr Cys Leu Val Lys Gly Phe Tyr Pro Ser Asp
                325                 330                 335

Ile Ala Val Glu Trp Glu Ser Asn Gly Gln Pro Glu Asn Asn Tyr Lys
            340                 345                 350

Thr Thr Pro Pro Val Leu Asp Ser Asp Gly Ser Phe Phe Leu Tyr Ser
        355                 360                 365

Lys Leu Thr Val Asp Lys Ser Arg Trp Gln Gln Gly Asn Val Phe Ser
    370                 375                 380

Cys Ser Val Met His Glu Ala Leu His Asn His Tyr Thr Gln Lys Ser
385                 390                 395                 400

Leu Ser Leu Ser Pro Gly
                405

<210> SEQ ID NO 81
<211> LENGTH: 405
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Pro Pro His Val Gln Lys Ser Asp Val Glu Met Glu Ala Gln Lys Asp
1               5                   10                  15

Glu Ile Ile Cys Pro Ser Cys Asn Arg Thr Ala His Pro Leu Arg His
                20                  25                  30

Ile Asn Asn Asp Met Ile Val Thr Asp Asn Gly Ala Val Lys Phe
            35                  40                  45

Pro Gln Leu Cys Lys Phe Cys Asp Val Arg Phe Ser Thr Cys Asp Asn
    50                  55                  60

Gln Lys Ser Cys Met Ser Asn Cys Ser Ile Thr Ser Ile Cys Glu Lys
65                  70                  75                  80

Pro Gln Glu Val Cys Val Ala Val Trp Arg Lys Asn Asp Glu Asn Ile
                85                  90                  95

Thr Leu Glu Thr Val Cys His Asp Pro Lys Leu Pro Tyr His Asp Phe
            100                 105                 110

Ile Leu Glu Asp Ala Ala Ser Pro Lys Cys Ile Met Lys Glu Lys Lys
        115                 120                 125

Lys Pro Gly Glu Thr Phe Phe Met Cys Ser Cys Ser Ser Asp Glu Cys
    130                 135                 140

Asn Asp Asn Ile Ile Phe Ser Glu Glu Tyr Asn Thr Ser Asn Pro Asp
145                 150                 155                 160
```

Thr Gly Gly Gly Gly Ser Gly Gly Gly Ser Gly Gly Gly Ser
                165                 170                 175

Gly Gly Gly Gly Ser Thr His Thr Cys Pro Pro Cys Pro Ala Pro Glu
                180                 185                 190

Leu Leu Gly Gly Pro Ser Val Phe Leu Phe Pro Pro Lys Pro Lys Asp
                195                 200                 205

Thr Leu Met Ile Ser Arg Thr Pro Glu Val Thr Cys Val Val Val Asp
            210                 215                 220

Val Ser His Glu Asp Pro Glu Val Lys Phe Asn Trp Tyr Val Asp Gly
225                 230                 235                 240

Val Glu Val His Asn Ala Lys Thr Lys Pro Arg Glu Glu Gln Tyr Asn
                245                 250                 255

Ser Thr Tyr Arg Val Val Ser Val Leu Thr Val Leu His Gln Asp Trp
            260                 265                 270

Leu Asn Gly Lys Glu Tyr Lys Cys Lys Val Ser Asn Lys Ala Leu Pro
        275                 280                 285

Ala Pro Ile Glu Lys Thr Ile Ser Lys Ala Lys Gly Gln Pro Arg Glu
    290                 295                 300

Pro Gln Val Tyr Thr Leu Pro Pro Ser Arg Glu Glu Met Thr Lys Asn
305                 310                 315                 320

Gln Val Ser Leu Thr Cys Leu Val Lys Gly Phe Tyr Pro Ser Asp Ile
                325                 330                 335

Ala Val Glu Trp Glu Ser Asn Gly Gln Pro Glu Asn Asn Tyr Lys Thr
            340                 345                 350

Thr Pro Pro Val Leu Asp Ser Asp Gly Ser Phe Phe Leu Tyr Ser Lys
        355                 360                 365

Leu Thr Val Asp Lys Ser Arg Trp Gln Gln Gly Asn Val Phe Ser Cys
    370                 375                 380

Ser Val Met His Glu Ala Leu His Asn His Tyr Thr Gln Lys Ser Leu
385                 390                 395                 400

Ser Leu Ser Pro Gly
                405

<210> SEQ ID NO 82
<211> LENGTH: 404
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 82

Pro His Val Gln Lys Ser Asp Val Glu Met Glu Ala Gln Lys Asp Glu
1               5                   10                  15

Ile Ile Cys Pro Ser Cys Asn Arg Thr Ala His Pro Leu Arg His Ile
                20                  25                  30

Asn Asn Asp Met Ile Val Thr Asp Asn Asn Gly Ala Val Lys Phe Pro
            35                  40                  45

Gln Leu Cys Lys Phe Cys Asp Val Arg Phe Ser Thr Cys Asp Asn Gln
        50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

```
Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Glu Lys Lys Lys
        115                 120                 125

Pro Gly Glu Thr Phe Phe Met Cys Ser Cys Ser Ser Asp Glu Cys Asn
    130                 135                 140

Asp Asn Ile Ile Phe Ser Glu Glu Tyr Asn Thr Ser Asn Pro Asp Thr
145                 150                 155                 160

Gly Gly Gly Gly Ser Gly Gly Gly Ser Gly Gly Gly Ser Gly
                165                 170                 175

Gly Gly Gly Ser Thr His Thr Cys Pro Pro Cys Pro Ala Pro Glu Leu
            180                 185                 190

Leu Gly Gly Pro Ser Val Phe Leu Phe Pro Pro Lys Pro Lys Asp Thr
        195                 200                 205

Leu Met Ile Ser Arg Thr Pro Glu Val Thr Cys Val Val Val Asp Val
    210                 215                 220

Ser His Glu Asp Pro Glu Val Lys Phe Asn Trp Tyr Val Asp Gly Val
225                 230                 235                 240

Glu Val His Asn Ala Lys Thr Lys Pro Arg Glu Glu Gln Tyr Asn Ser
                245                 250                 255

Thr Tyr Arg Val Val Ser Val Leu Thr Val Leu His Gln Asp Trp Leu
            260                 265                 270

Asn Gly Lys Glu Tyr Lys Cys Lys Val Ser Asn Lys Ala Leu Pro Ala
        275                 280                 285

Pro Ile Glu Lys Thr Ile Ser Lys Ala Lys Gly Gln Pro Arg Glu Pro
    290                 295                 300

Gln Val Tyr Thr Leu Pro Pro Ser Arg Glu Glu Met Thr Lys Asn Gln
305                 310                 315                 320

Val Ser Leu Thr Cys Leu Val Lys Gly Phe Tyr Pro Ser Asp Ile Ala
                325                 330                 335

Val Glu Trp Glu Ser Asn Gly Gln Pro Glu Asn Asn Tyr Lys Thr Thr
            340                 345                 350

Pro Pro Val Leu Asp Ser Asp Gly Ser Phe Phe Leu Tyr Ser Lys Leu
        355                 360                 365

Thr Val Asp Lys Ser Arg Trp Gln Gln Gly Asn Val Phe Ser Cys Ser
    370                 375                 380

Val Met His Glu Ala Leu His Asn His Tyr Thr Gln Lys Ser Leu Ser
385                 390                 395                 400

Leu Ser Pro Gly

<210> SEQ ID NO 83
<211> LENGTH: 403
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

His Val Gln Lys Ser Asp Val Glu Met Glu Ala Gln Lys Asp Glu Ile
1               5                   10                  15

Ile Cys Pro Ser Cys Asn Arg Thr Ala His Pro Leu Arg His Ile Asn
            20                  25                  30

Asn Asp Met Ile Val Thr Asp Asn Asn Gly Ala Val Lys Phe Pro Gln
        35                  40                  45
```

Leu Cys Lys Phe Cys Asp Val Arg Phe Ser Thr Cys Asp Asn Gln Lys
 50                  55                  60

Ser Cys Met Ser Asn Cys Ser Ile Thr Ser Ile Cys Glu Lys Pro Gln
 65                  70                  75                  80

Glu Val Cys Val Ala Val Trp Arg Lys Asn Asp Glu Asn Ile Thr Leu
                 85                  90                  95

Glu Thr Val Cys His Asp Pro Lys Leu Pro Tyr His Asp Phe Ile Leu
                100                 105                 110

Glu Asp Ala Ala Ser Pro Lys Cys Ile Met Lys Glu Lys Lys Pro
                115                 120                 125

Gly Glu Thr Phe Phe Met Cys Ser Cys Ser Ser Asp Glu Cys Asn Asp
        130                 135                 140

Asn Ile Ile Phe Ser Glu Glu Tyr Asn Thr Ser Asn Pro Asp Thr Gly
145                 150                 155                 160

Gly Gly Gly Ser Gly Gly Gly Ser Gly Gly Gly Ser Gly Gly
                165                 170                 175

Gly Gly Ser Thr His Thr Cys Pro Pro Cys Pro Ala Pro Glu Leu Leu
            180                 185                 190

Gly Gly Pro Ser Val Phe Leu Phe Pro Pro Lys Pro Lys Asp Thr Leu
        195                 200                 205

Met Ile Ser Arg Thr Pro Glu Val Thr Cys Val Val Val Asp Val Ser
210                 215                 220

His Glu Asp Pro Glu Val Lys Phe Asn Trp Tyr Val Asp Gly Val Glu
225                 230                 235                 240

Val His Asn Ala Lys Thr Lys Pro Arg Glu Glu Gln Tyr Asn Ser Thr
                245                 250                 255

Tyr Arg Val Val Ser Val Leu Thr Val Leu His Gln Asp Trp Leu Asn
                260                 265                 270

Gly Lys Glu Tyr Lys Cys Lys Val Ser Asn Lys Ala Leu Pro Ala Pro
            275                 280                 285

Ile Glu Lys Thr Ile Ser Lys Ala Lys Gly Gln Pro Arg Glu Pro Gln
        290                 295                 300

Val Tyr Thr Leu Pro Pro Ser Arg Glu Glu Met Thr Lys Asn Gln Val
305                 310                 315                 320

Ser Leu Thr Cys Leu Val Lys Gly Phe Tyr Pro Ser Asp Ile Ala Val
                325                 330                 335

Glu Trp Glu Ser Asn Gly Gln Pro Glu Asn Asn Tyr Lys Thr Thr Pro
                340                 345                 350

Pro Val Leu Asp Ser Asp Gly Ser Phe Phe Leu Tyr Ser Lys Leu Thr
            355                 360                 365

Val Asp Lys Ser Arg Trp Gln Gln Gly Asn Val Phe Ser Cys Ser Val
        370                 375                 380

Met His Glu Ala Leu His Asn His Tyr Thr Gln Lys Ser Leu Ser Leu
385                 390                 395                 400

Ser Pro Gly

<210> SEQ ID NO 84
<211> LENGTH: 427
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 84

| | | | | | | | | | | | | | | | |
|---|---|---|---|---|---|---|---|---|---|---|---|---|---|---|---|
| Met | Asp | Ala | Met | Lys | Arg | Gly | Leu | Cys | Cys | Val | Leu | Leu | Cys | Gly |
| 1 | | | | 5 | | | | | 10 | | | | | 15 |
| Ala | Val | Phe | Val | Ser | Pro | Gly | Ala | Ile | Pro | Pro | His | Val | Pro | Lys | Ser |
| | | | 20 | | | | | 25 | | | | | 30 | | |
| Asp | Val | Glu | Met | Glu | Ala | Gln | Lys | Asp | Ala | Ser | Ile | His | Leu | Ser | Cys |
| | | | 35 | | | | | 40 | | | | | 45 | | |
| Asn | Arg | Thr | Ile | His | Pro | Leu | Lys | His | Phe | Asn | Ser | Asp | Val | Met | Ala |
| | 50 | | | | | 55 | | | | | 60 | | | | |
| Ser | Asp | Asn | Gly | Gly | Ala | Val | Lys | Leu | Pro | Gln | Leu | Cys | Lys | Phe | Cys |
| 65 | | | | 70 | | | | | 75 | | | | | 80 | |
| Asp | Val | Arg | Leu | Ser | Thr | Cys | Asp | Asn | Gln | Lys | Ser | Cys | Met | Ser | Asn |
| | | | | 85 | | | | 90 | | | | | 95 | | |
| Cys | Ser | Ile | Thr | Ala | Ile | Cys | Glu | Lys | Pro | His | Glu | Val | Cys | Val | Ala |
| | | | 100 | | | | | 105 | | | | | 110 | | |
| Val | Trp | Arg | Lys | Asn | Asp | Lys | Asn | Ile | Thr | Leu | Glu | Thr | Val | Cys | His |
| | | | 115 | | | | | 120 | | | | | 125 | | |
| Asp | Pro | Lys | Leu | Thr | Tyr | His | Gly | Phe | Thr | Leu | Glu | Asp | Ala | Ala | Ser |
| | 130 | | | | | 135 | | | | | 140 | | | | |
| Pro | Lys | Cys | Val | Met | Lys | Glu | Lys | Lys | Arg | Ala | Gly | Glu | Thr | Phe | Phe |
| 145 | | | | 150 | | | | | 155 | | | | | 160 | |
| Met | Cys | Ala | Cys | Asn | Met | Glu | Cys | Asn | Asp | Tyr | Ile | Ile | Phe | Ser |
| | | | | 165 | | | | 170 | | | | | 175 | | |
| Glu | Glu | Tyr | Thr | Thr | Ser | Ser | Pro | Asp | Thr | Gly | Gly | Glu | Pro | Arg |
| | | | 180 | | | | | 185 | | | | | 190 | | |
| Val | Pro | Ile | Thr | Gln | Asn | Pro | Cys | Pro | Leu | Lys | Glu | Cys | Pro | Pro |
| | | | 195 | | | | | 200 | | | | | 205 | | |
| Cys | Ala | Ala | Pro | Asp | Leu | Leu | Gly | Gly | Pro | Ser | Val | Phe | Ile | Phe | Pro |
| | 210 | | | | | 215 | | | | | 220 | | | | |
| Pro | Lys | Ile | Lys | Asp | Val | Leu | Met | Ile | Ser | Leu | Ser | Pro | Met | Val | Thr |
| 225 | | | | 230 | | | | | 235 | | | | | 240 | |
| Cys | Val | Val | Val | Asp | Val | Ser | Glu | Asp | Pro | Asp | Val | Gln | Ile | Ser |
| | | | | 245 | | | | 250 | | | | | 255 | | |
| Trp | Phe | Val | Asn | Asn | Val | Glu | Val | His | Thr | Ala | Gln | Thr | Gln | Thr | His |
| | | | 260 | | | | | 265 | | | | | 270 | | |
| Arg | Glu | Asp | Tyr | Asn | Ser | Thr | Leu | Arg | Val | Val | Ser | Ala | Leu | Pro | Ile |
| | | | 275 | | | | | 280 | | | | | 285 | | |
| Gln | His | Gln | Asp | Trp | Met | Ser | Gly | Lys | Glu | Phe | Lys | Cys | Lys | Val | Asn |
| | 290 | | | | | 295 | | | | | 300 | | | | |
| Asn | Arg | Ala | Leu | Pro | Ser | Pro | Ile | Glu | Lys | Thr | Ile | Ser | Lys | Pro | Arg |
| 305 | | | | 310 | | | | | 315 | | | | | 320 | |
| Gly | Pro | Val | Arg | Ala | Pro | Gln | Val | Tyr | Val | Leu | Pro | Pro | Ala | Glu |
| | | | | 325 | | | | 330 | | | | | 335 | | |
| Glu | Met | Thr | Lys | Lys | Glu | Phe | Ser | Leu | Thr | Cys | Met | Ile | Thr | Gly | Phe |
| | | | 340 | | | | | 345 | | | | | 350 | | |
| Leu | Pro | Ala | Glu | Ile | Ala | Val | Asp | Trp | Thr | Ser | Asn | Gly | Arg | Thr | Glu |
| | | | 355 | | | | | 360 | | | | | 365 | | |
| Gln | Asn | Tyr | Lys | Asn | Thr | Ala | Thr | Val | Leu | Asp | Ser | Asp | Gly | Ser | Tyr |
| | 370 | | | | | 375 | | | | | 380 | | | | |
| Phe | Met | Tyr | Ser | Lys | Leu | Arg | Val | Gln | Lys | Ser | Thr | Trp | Glu | Arg | Gly |
| 385 | | | | 390 | | | | | 395 | | | | | 400 | |

```
Ser Leu Phe Ala Cys Ser Val Val His Glu Gly Leu His Asn His Leu
            405                 410                 415

Thr Thr Lys Thr Ile Ser Arg Ser Leu Gly Lys
            420                 425

<210> SEQ ID NO 85
<211> LENGTH: 403
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 85

Ile Pro Pro His Val Pro Lys Ser Asp Val Glu Met Glu Ala Gln Lys
1               5                   10                  15

Asp Ala Ser Ile His Leu Ser Cys Asn Arg Thr Ile His Pro Leu Lys
            20                  25                  30

His Phe Asn Ser Asp Val Met Ala Ser Asp Asn Gly Gly Ala Val Lys
        35                  40                  45

Leu Pro Gln Leu Cys Lys Phe Cys Asp Val Arg Leu Ser Thr Cys Asp
    50                  55                  60

Asn Gln Lys Ser Cys Met Ser Asn Cys Ser Ile Thr Ala Ile Cys Glu
65                  70                  75                  80

Lys Pro His Glu Val Cys Val Ala Val Trp Arg Lys Asn Asp Lys Asn
                85                  90                  95

Ile Thr Leu Glu Thr Val Cys His Asp Pro Lys Leu Thr Tyr His Gly
            100                 105                 110

Phe Thr Leu Glu Asp Ala Ala Ser Pro Lys Cys Val Met Lys Glu Lys
        115                 120                 125

Lys Arg Ala Gly Glu Thr Phe Phe Met Cys Ala Cys Asn Met Glu Glu
    130                 135                 140

Cys Asn Asp Tyr Ile Ile Phe Ser Glu Glu Tyr Thr Thr Ser Ser Pro
145                 150                 155                 160

Asp Thr Gly Gly Gly Glu Pro Arg Val Pro Ile Thr Gln Asn Pro Cys
                165                 170                 175

Pro Pro Leu Lys Glu Cys Pro Pro Cys Ala Ala Pro Asp Leu Leu Gly
            180                 185                 190

Gly Pro Ser Val Phe Ile Phe Pro Pro Lys Ile Lys Asp Val Leu Met
        195                 200                 205

Ile Ser Leu Ser Pro Met Val Thr Cys Val Val Val Asp Val Ser Glu
    210                 215                 220

Asp Asp Pro Asp Val Gln Ile Ser Trp Phe Val Asn Asn Val Glu Val
225                 230                 235                 240

His Thr Ala Gln Thr Gln Thr His Arg Glu Asp Tyr Asn Ser Thr Leu
                245                 250                 255

Arg Val Val Ser Ala Leu Pro Ile Gln His Gln Asp Trp Met Ser Gly
            260                 265                 270

Lys Glu Phe Lys Cys Lys Val Asn Asn Arg Ala Leu Pro Ser Pro Ile
        275                 280                 285

Glu Lys Thr Ile Ser Lys Pro Arg Gly Pro Val Arg Ala Pro Gln Val
    290                 295                 300

Tyr Val Leu Pro Pro Pro Ala Glu Glu Met Thr Lys Lys Glu Phe Ser
305                 310                 315                 320
```

```
Leu Thr Cys Met Ile Thr Gly Phe Leu Pro Ala Glu Ile Ala Val Asp
                325                 330                 335

Trp Thr Ser Asn Gly Arg Thr Glu Gln Asn Tyr Lys Asn Thr Ala Thr
            340                 345                 350

Val Leu Asp Ser Asp Gly Ser Tyr Phe Met Tyr Ser Lys Leu Arg Val
        355                 360                 365

Gln Lys Ser Thr Trp Glu Arg Gly Ser Leu Phe Ala Cys Ser Val Val
    370                 375                 380

His Glu Gly Leu His Asn His Leu Thr Thr Lys Thr Ile Ser Arg Ser
385                 390                 395                 400

Leu Gly Lys

<210> SEQ ID NO 86
<211> LENGTH: 402
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 86

Ile Pro Pro His Val Pro Lys Ser Asp Val Glu Met Glu Ala Gln Lys
1               5                   10                  15

Asp Ala Ser Ile His Leu Ser Cys Asn Arg Thr Ile His Pro Leu Lys
            20                  25                  30

His Phe Asn Ser Asp Val Met Ala Ser Asp Asn Gly Gly Ala Val Lys
        35                  40                  45

Leu Pro Gln Leu Cys Lys Phe Cys Asp Val Arg Leu Ser Thr Cys Asp
    50                  55                  60

Asn Gln Lys Ser Cys Met Ser Asn Cys Ser Ile Thr Ala Ile Cys Glu
65                  70                  75                  80

Lys Pro His Glu Val Cys Val Ala Val Trp Arg Lys Asn Asp Lys Asn
                85                  90                  95

Ile Thr Leu Glu Thr Val Cys His Asp Pro Lys Leu Thr Tyr His Gly
            100                 105                 110

Phe Thr Leu Glu Asp Ala Ala Ser Pro Lys Cys Val Met Lys Glu Lys
        115                 120                 125

Lys Arg Ala Gly Glu Thr Phe Phe Met Cys Ala Cys Asn Met Glu Glu
    130                 135                 140

Cys Asn Asp Tyr Ile Ile Phe Ser Glu Glu Tyr Thr Thr Ser Ser Pro
145                 150                 155                 160

Asp Thr Gly Gly Gly Glu Pro Arg Val Pro Ile Thr Gln Asn Pro Cys
                165                 170                 175

Pro Pro Leu Lys Glu Cys Pro Pro Cys Ala Ala Pro Asp Leu Leu Gly
            180                 185                 190

Gly Pro Ser Val Phe Ile Phe Pro Pro Lys Ile Lys Asp Val Leu Met
        195                 200                 205

Ile Ser Leu Ser Pro Met Val Thr Cys Val Val Val Asp Val Ser Glu
    210                 215                 220

Asp Asp Pro Asp Val Gln Ile Ser Trp Phe Val Asn Asn Val Glu Val
225                 230                 235                 240

His Thr Ala Gln Thr Gln Thr His Arg Glu Asp Tyr Asn Ser Thr Leu
                245                 250                 255

Arg Val Val Ser Ala Leu Pro Ile Gln His Gln Asp Trp Met Ser Gly
            260                 265                 270
```

```
Lys Glu Phe Lys Cys Lys Val Asn Asn Arg Ala Leu Pro Ser Pro Ile
            275                 280                 285

Glu Lys Thr Ile Ser Lys Pro Arg Gly Pro Val Arg Ala Pro Gln Val
            290                 295                 300

Tyr Val Leu Pro Pro Pro Ala Glu Glu Met Thr Lys Lys Glu Phe Ser
305                 310                 315                 320

Leu Thr Cys Met Ile Thr Gly Phe Leu Pro Ala Glu Ile Ala Val Asp
                325                 330                 335

Trp Thr Ser Asn Gly Arg Thr Glu Gln Asn Tyr Lys Asn Thr Ala Thr
            340                 345                 350

Val Leu Asp Ser Asp Gly Ser Tyr Phe Met Tyr Ser Lys Leu Arg Val
            355                 360                 365

Gln Lys Ser Thr Trp Glu Arg Gly Ser Leu Phe Ala Cys Ser Val Val
            370                 375                 380

His Glu Gly Leu His Asn His Leu Thr Thr Lys Thr Ile Ser Arg Ser
385                 390                 395                 400

Leu Gly

<210> SEQ ID NO 87
<211> LENGTH: 1284
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 87
atggatgcaa tgaagagagg gctctgctgt gtgctgctgc tgtgtggagc agtcttcgtt      60
tcgcccggcg ccatcccgcc gcacgttccc aagtcggatg tggaaatgga agcccagaaa     120
gatgcatcca tccacctaag ctgtaatagg accatccatc cactgaaaca ttttaacagt     180
gatgtcatgg ccagcgacaa tggcggtgcg gtcaagcttc acagctgtg caagttttgc      240 gatgtgagac tgtccacttg cgacaaccag aagtcctgca tgagcaactg cagcatcacg     300
gccatctgtg agaagccgca tgaagtctgc gtggccgtgt ggaggaagaa cgacaagaac     360
attactctgg agacggtttg ccacgacccc aagctcacct accacggctt cactctggaa     420
gatgccgctt ctcccaagtg tgtcatgaag gaaaagaaaa gggcgggcga gactttcttc     480
atgtgtgcct gtaacatgga agagtgcaac gattacatca tcttttcgga agaatacacc     540
accagcagtc ccgacaccgg tgggggtgag cccagagtgc ccataacaca gaaccctgt      600 cctccactca agagtgtcc cccatgcgca gctccagacc tcttgggtgg accatccgtc      660
ttcatcttcc ctccaaagat caaggatgta ctcatgatct ccctgagccc catggtcaca     720
tgtgtggtgg tggatgtgag cgaggatgac ccagacgtcc agatcagctg gtttgtgaac     780
aacgtggaag tacacacagc tcagacacaa acccatagag aggattacaa cagtactctc     840
cgggtggtca gtgccctccc catccagcac caggactgga tgagtggcaa ggagttcaaa     900
tgcaaggtca acaacagagc cctcccatcc cccatcgaga aaaccatctc aaaacccaga     960
gggccagtaa gagctccaca ggtatatgtc ttgcctccac cagcagaaga gatgactaag    1020
aaagagttca gtctgacctg catgatcaca ggcttcttac ctgccgaaat tgctgtggac    1080
tggaccagca atgggcgtac agagcaaaac tacaagaaca ccgcaacagt cctggactct    1140
gatggttctt acttcatgta cagcaagctc agagtacaaa agagcacttg ggaaagagga    1200
```
agtcttttcg cctgctcagt ggtccacgag ggtctgcaca atcaccttac gactaagacc    1260
atctcccggt ctctgggtaa atga    1284

<210> SEQ ID NO 88
<211> LENGTH: 414
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Met Asp Ala Met Lys Arg Gly Leu Cys Cys Val Leu Leu Cys Gly
1               5                   10                  15

Ala Val Phe Val Ser Pro Gly Ala Thr Ile Pro Pro His Val Gln Lys
            20                  25                  30

Ser Asp Val Glu Met Glu Ala Gln Lys Asp Glu Ile Ile Cys Pro Ser
        35                  40                  45

Cys Asn Arg Thr Ala His Pro Leu Arg His Ile Asn Asn Asp Met Ile
    50                  55                  60

Val Thr Asp Asn Asn Gly Ala Val Lys Phe Pro Gln Leu Cys Lys Phe
65                  70                  75                  80

Cys Asp Val Arg Phe Ser Thr Cys Asp Asn Gln Lys Ser Cys Met Ser
                85                  90                  95

Asn Cys Ser Ile Thr Ser Ile Cys Glu Lys Pro Gln Glu Val Cys Val
            100                 105                 110

Ala Val Trp Arg Lys Asn Asp Glu Asn Ile Thr Leu Glu Thr Val Cys
        115                 120                 125

His Asp Pro Lys Leu Pro Tyr His Asp Phe Ile Leu Glu Asp Ala Ala
    130                 135                 140

Ser Pro Lys Cys Ile Met Lys Glu Lys Lys Pro Gly Glu Thr Phe
145                 150                 155                 160

Phe Met Cys Ser Cys Ser Ser Asp Glu Cys Asn Asp Asn Ile Ile Phe
                165                 170                 175

Ser Glu Glu Tyr Asn Thr Ser Asn Pro Asp Thr Gly Gly Gly Thr His
            180                 185                 190

Thr Cys Pro Pro Cys Pro Ala Pro Glu Leu Leu Gly Gly Pro Ser Val
        195                 200                 205

Phe Leu Phe Pro Pro Lys Pro Lys Asp Thr Leu Met Ile Ser Arg Thr
    210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Pro Ala Pro Ile Glu Lys Thr Ile
    290                 295                 300

Ser Lys Ala Lys Gly Gln Pro Arg Glu Pro Gln Val Tyr Thr Leu Pro
305                 310                 315                 320

Pro Ser Arg Glu Glu Met Thr Lys Asn Gln Val Ser Leu Thr Cys Leu
                325                 330                 335

```
Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly
                405                 410

<210> SEQ ID NO 89
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: See specification as filed for detailed
      description of substitutions and preferred embodiments

<400> SEQUENCE: 89

Gly Gly Gly Gly Ser Gly Gly Gly Gly Ser Gly Gly Gly Gly Ser Gly
1               5                   10                  15

Gly Gly Gly Ser
            20

<210> SEQ ID NO 90
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 90

Gly Gly Gly Gly Ser
1               5
```